US011180253B1

(12) United States Patent
Seeley

(10) Patent No.: US 11,180,253 B1
(45) Date of Patent: *Nov. 23, 2021

(54) SYSTEM FOR FIRE SUPPRESSION BY AUTONOMOUS AIR AND GROUND VEHICLES

(71) Applicant: Brien Aven Seeley, Santa Rosa, CA (US)

(72) Inventor: Brien Aven Seeley, Santa Rosa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/211,777

(22) Filed: Mar. 24, 2021

(51) Int. Cl.
*B64D 1/16* (2006.01)
*A62C 3/02* (2006.01)
(Continued)

(52) U.S. Cl.
CPC ............. *B64D 1/16* (2013.01); *A62C 3/0242* (2013.01); *B64C 39/04* (2013.01); *B64D 9/003* (2013.01);
(Continued)

(58) Field of Classification Search
CPC .. B64F 1/362; B64F 1/322; B64F 1/30; B64F 1/31; B64F 1/02; B64F 1/025;
(Continued)

(56) References Cited

U.S. PATENT DOCUMENTS 8,459,592 B2 * 6/2013 Pahl .......................... B64C 1/22
244/129.5
10,415,581 B1 9/2019 Seeley
(Continued)

FOREIGN PATENT DOCUMENTS

GB          2573383 A    11/2019
WO   WO-2018122821 A2 *  7/2018  ............. G06Q 10/00
WO   WO-2019025872 A2 *  2/2019  ............. G06Q 10/00

OTHER PUBLICATIONS https://insideclimatenews.org/news/23082018/extreme-wildfires-climate-change-global-warming-air-pollution-fire-management-black-carbon-CO2 "A description of the climate effects of wildfire" Inside Climate News.

(Continued)

*Primary Examiner* — Philip J Bonzell
(74) *Attorney, Agent, or Firm* — Invention To Patent Services; Alex Hobson

(57) ABSTRACT

A fire suppression system has a unique combination of components that includes interoperable electric-powered vehicles, facilities, hardware and software along with their range of specifications, standards, processes, capabilities and concepts of operations that comprise a concerted, multi-modal, system for delivering fire-retardant onto fires by uniquely-capable, ultra-quiet, electrically-powered, autonomous robotic aircraft ("SkyQarts") that fly precise trajectories and perform extremely short take-offs and landings (ESTOL) at a highly-distributed network of small facilities ("SkyNests") that have standardized compatible facilities, as defined herein, that interoperate with SkyQarts as well as with versatile, autonomous robotic electric-powered payload carts and electric-powered autonomous robotic delivery carts to provide safe, fast, on-demand, community-acceptable, environmentally friendly, high-capacity, sustained, affordable, day or night delivery of fire-retardant, even in smokey, IFR conditions to wildfires or controlled burns in urban, suburban, wildlands and rural settings in both developed and undeveloped countries across the globe.

72 Claims, 20 Drawing Sheets

(51) Int. Cl.
*B64D 9/00* (2006.01)
*B64C 39/04* (2006.01)
*B64F 1/32* (2006.01)
*B64D 27/24* (2006.01)
*B64D 17/80* (2006.01)

(52) U.S. Cl.
CPC .............. *B64D 27/24* (2013.01); *B64F 1/326* (2020.01); *B64C 2211/00* (2013.01); *B64D 17/80* (2013.01)

(58) Field of Classification Search
CPC ..... B64F 1/326; B64C 3/14; B64C 2201/126; B64C 2201/128; B60L 53/30; B61B 1/02; B61B 3/02; B64D 9/003; B64D 1/16
See application file for complete search history.

(56) References Cited

U.S. PATENT DOCUMENTS

| | | | | |
|---|---|---|---|---|
| 10,443,262 | B2* | 10/2019 | Evans | ................. B60L 53/00 |
| 10,759,286 | B2* | 9/2020 | Evans | ................. B62D 31/025 |
| 10,899,240 | B2* | 1/2021 | Evans | ................. B62D 31/025 |
| 2016/0236790 | A1 | 8/2016 | Knapp et al. | |
| 2018/0320402 | A1* | 11/2018 | Evans | ................. B60L 53/14 |
| 2019/0039712 | A1 | 2/2019 | Moore et al. | |
| 2020/0040598 | A1* | 2/2020 | Evans | ................. B60L 53/53 |
| 2020/0120214 | A1 | 4/2020 | Yan et al. | |
| 2020/0361324 | A1* | 11/2020 | Evans | ................. B64F 1/31 |
| 2021/0107684 | A1* | 4/2021 | Le Lann | ................. B65D 88/121 |

OTHER PUBLICATIONS https://www.propublica.org/article/they-know-how-to-prevent-megafires-why-wont-anybody-listen."They Know How To Prevent Megafires Why Wont Anybody Listen?" ProPublica.
https://graphics.reuters.com/CALIFORNIA-WILDFIRE/AIRCRAFT/bdwpkzmyyvm/ "Air Attack How California uses Dozens of Aircraft to Battle Wildfires" Reuters, Marco Hernandez, Simon Scarr and Manas Sharma Published Sep. 9, 2020.
https://www.stryker.com/us/en/portfolios/medical-surgical-equipment/emergency-patient-transport.html "Emergency patient transport More power to you" Stryker 1998-2021.
http://donsnotes.com/reference/size-humans.html "Anthropometric Dimensions for humans" Oct. 16, 2011.
http://payload.eaa62.org/technotes/tail.htm "The formulae for calculating tail volumes" EAA The Spirit of Aviation, Chapter 62, Reid-Hill View Airport, San Jose, CA.
https://www.mcmaster.com/6603a33. "Heavy Duty Slides" Accuride International Inc. 2021.
https://graphics.reuters.com/CALIFORNIA-WILDFIRE/AIRCRAFT/bdwpkzmyyvm/ Air attack How California uses dozens of aircraft to battle wildfires.
https://www.fs.fed.us/rm/fire/pubs/pdfpubs/pdf00572852/pdf00572852.pdf. The drop patterns and coverages of fire-retardant dropped from the air.

* cited by examiner

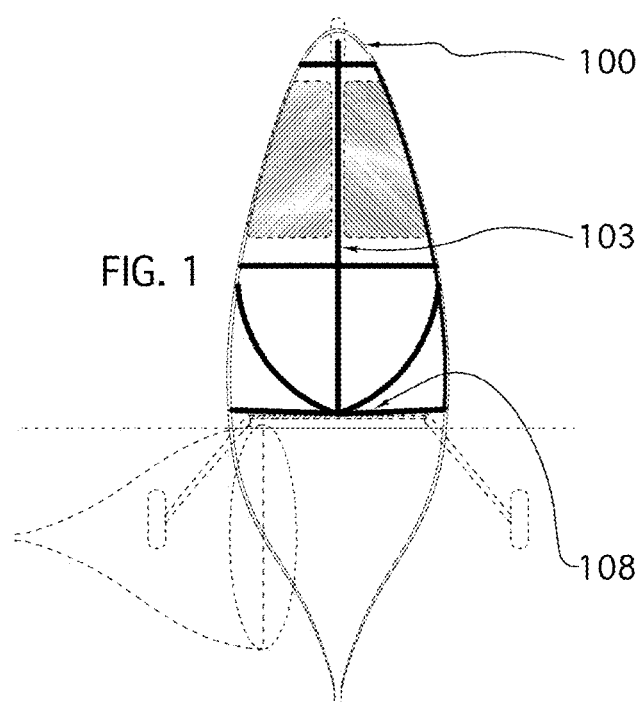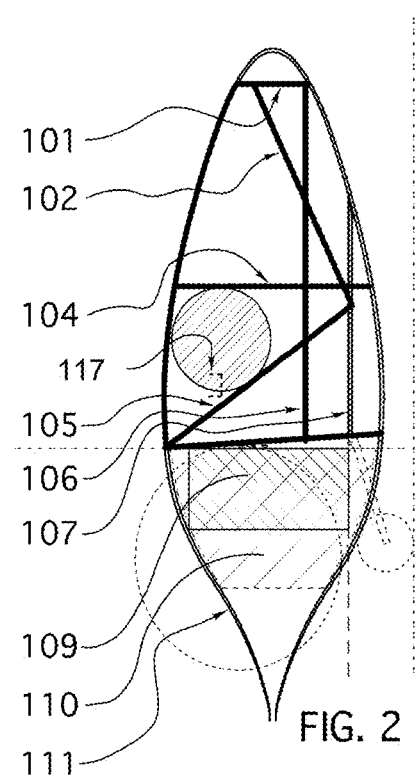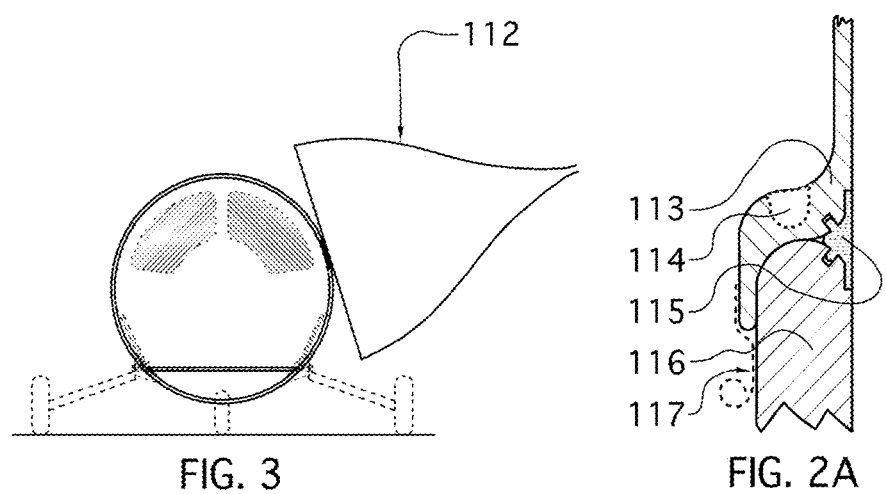

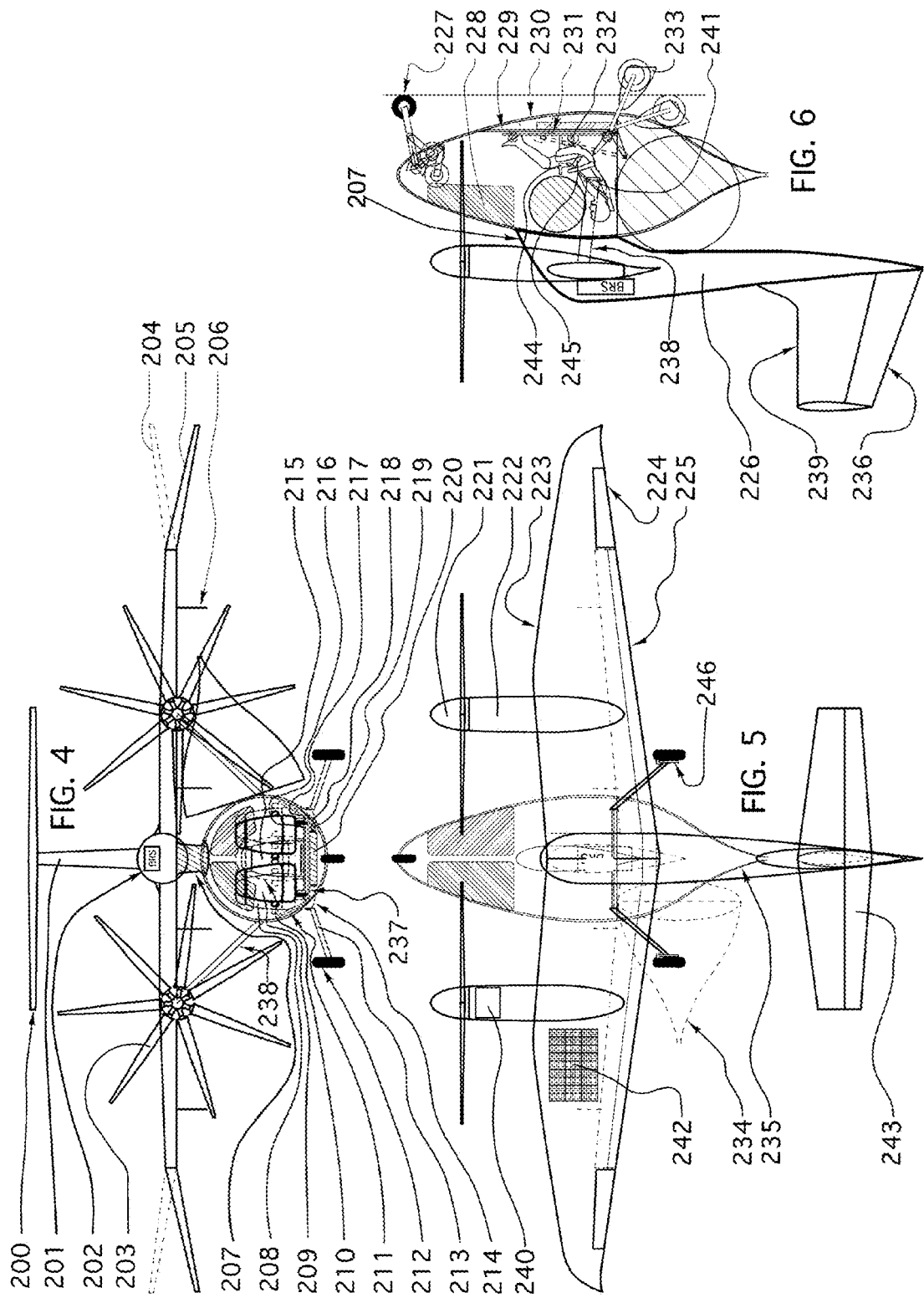

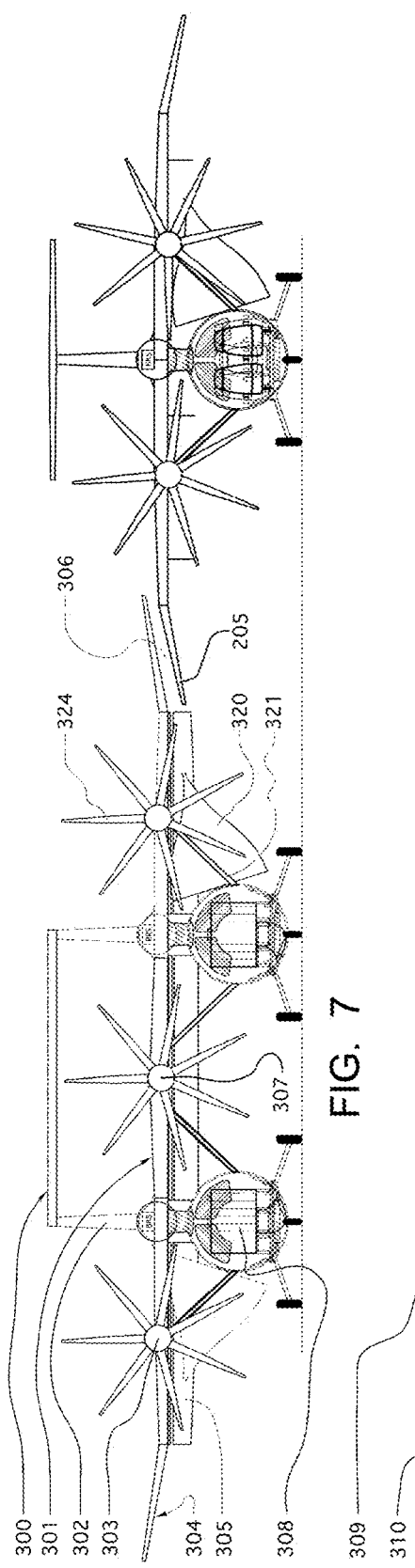
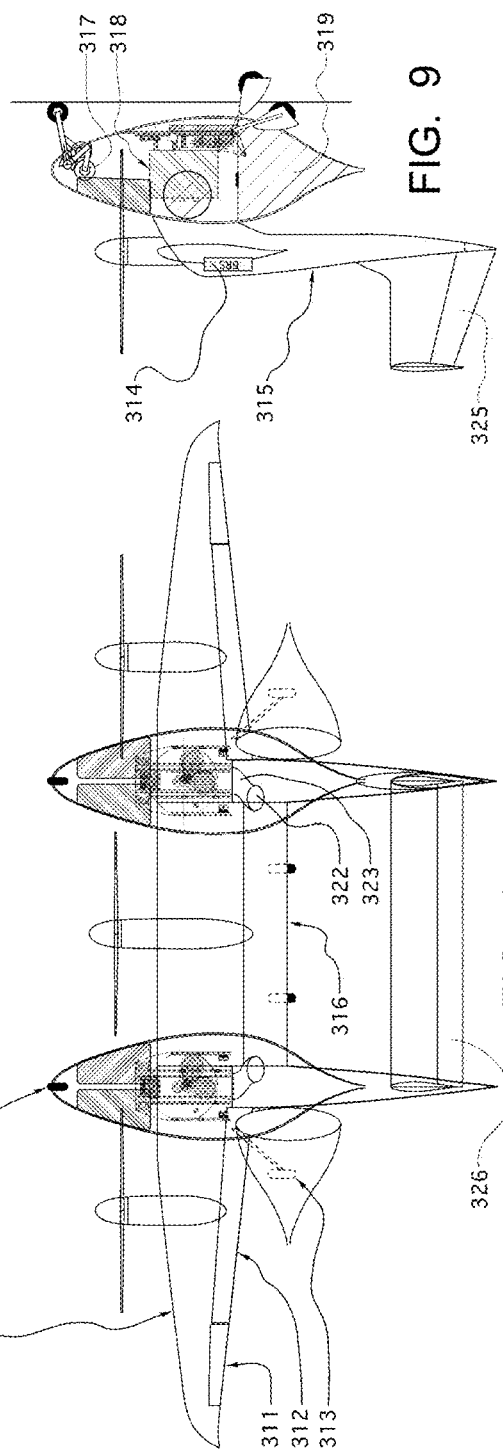
FIG. 7
FIG. 8
FIG. 9

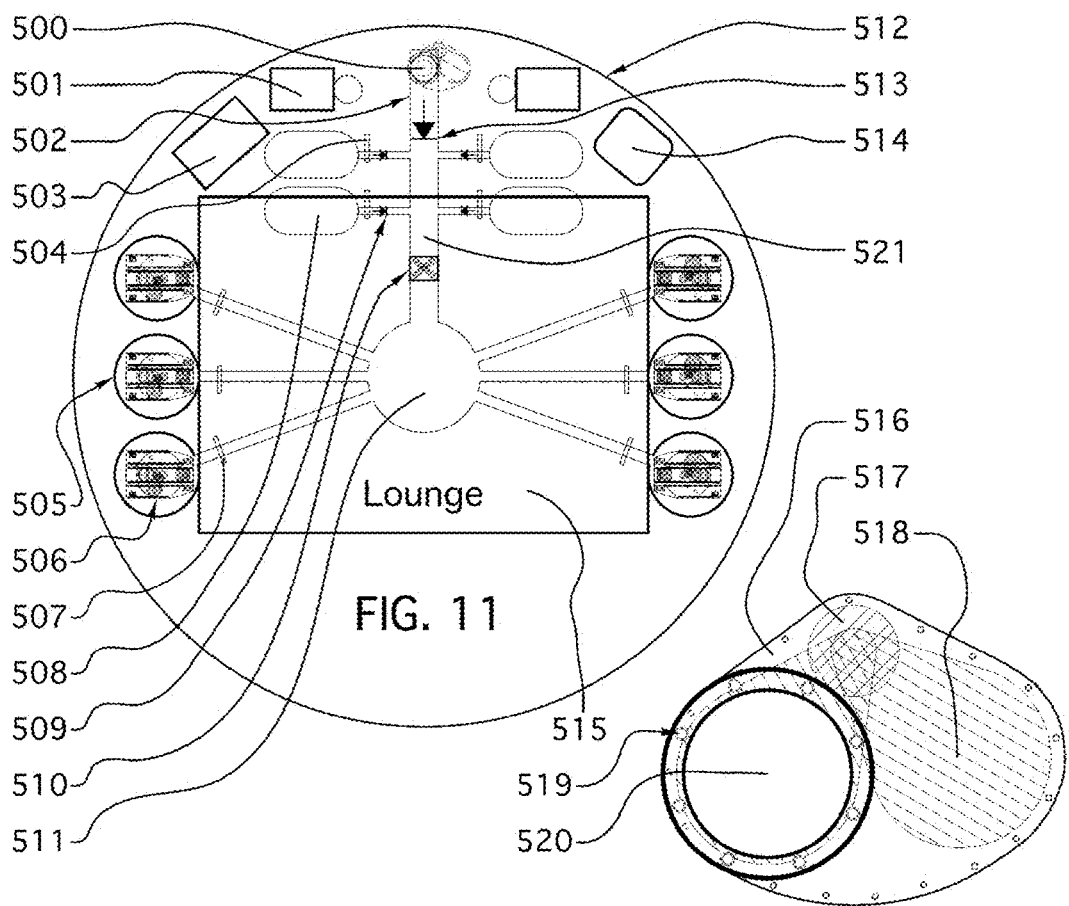
FIG. 11
FIG. 13
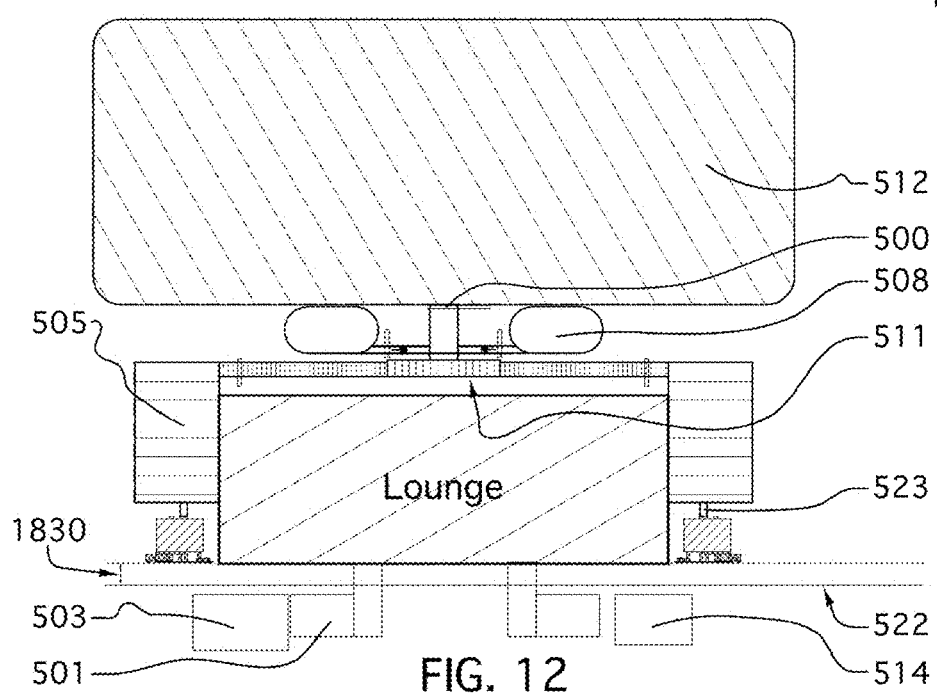
FIG. 12

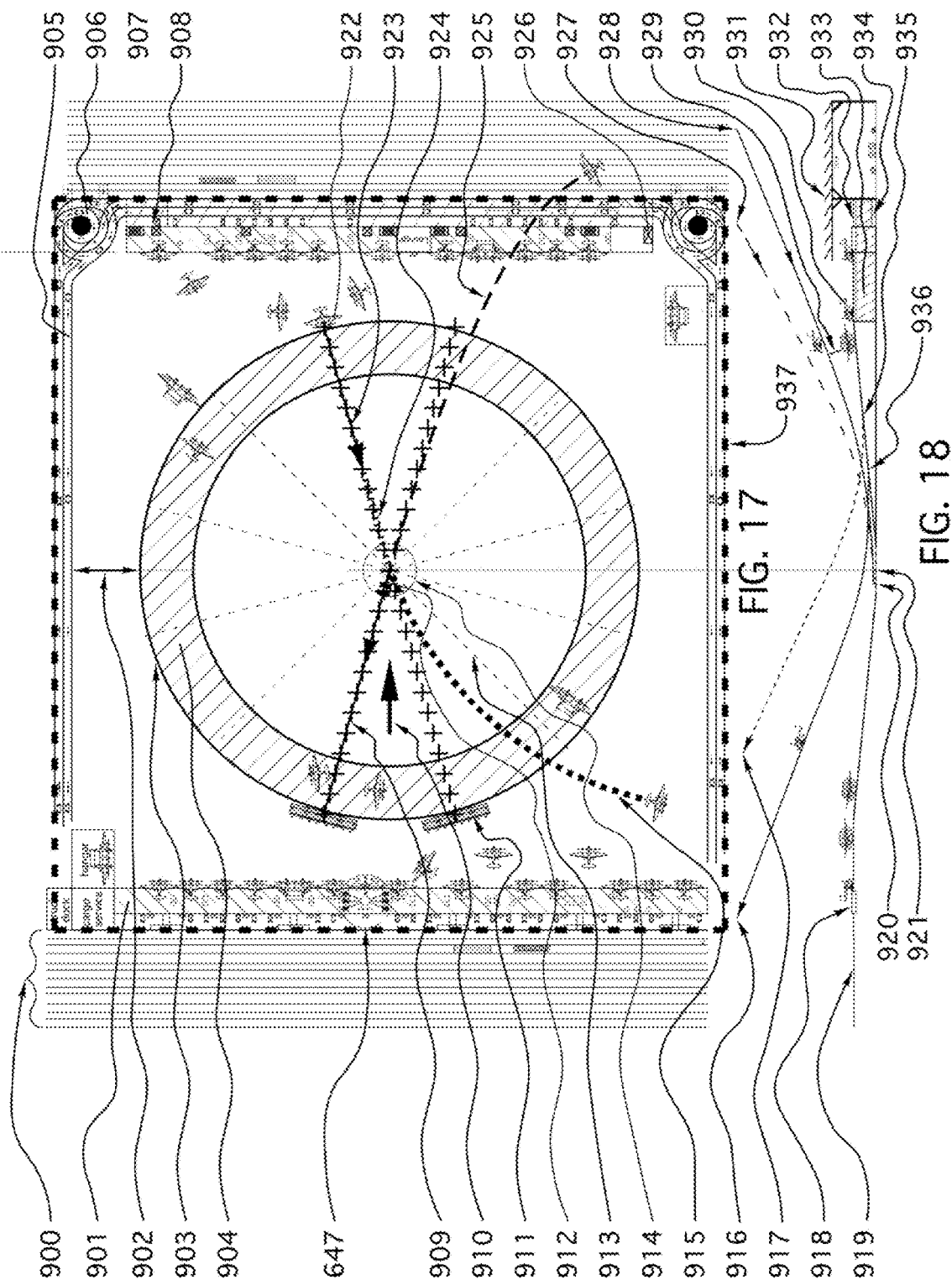

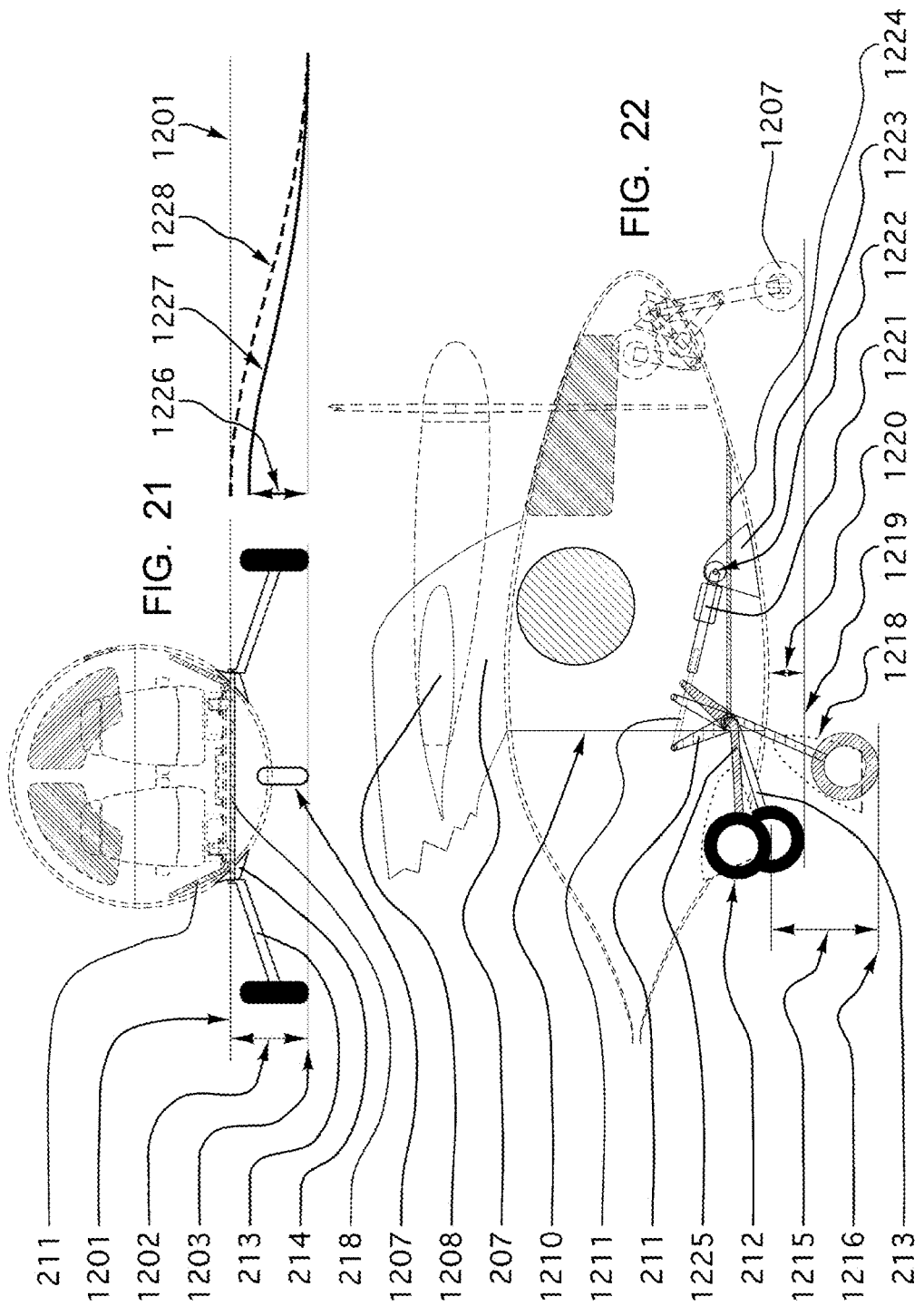

1300
1301
1302
1303
1304

1305

1306
1307
1308

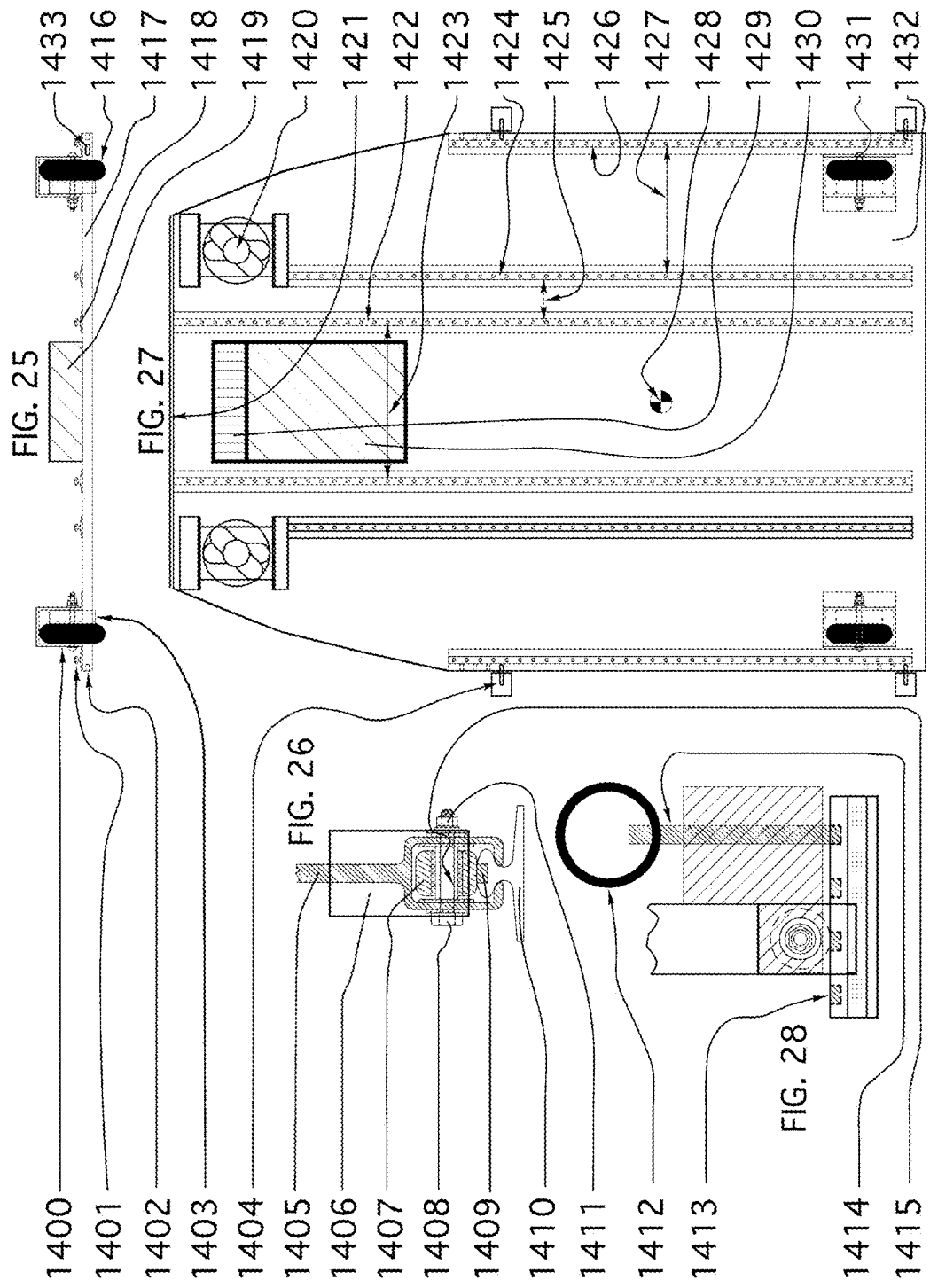

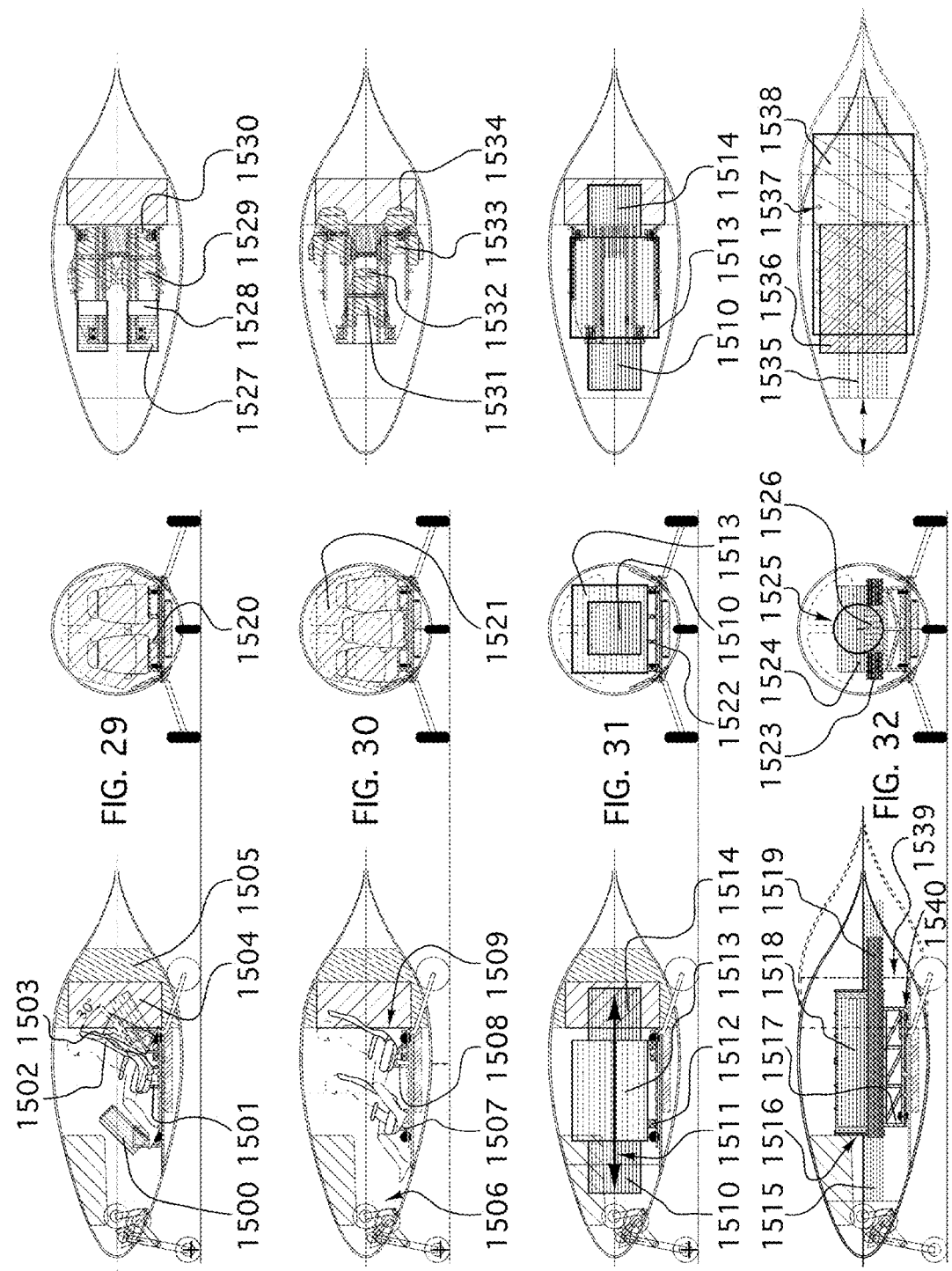

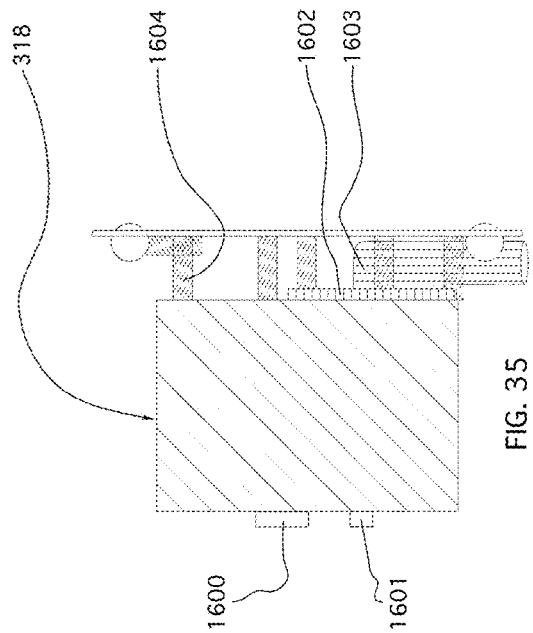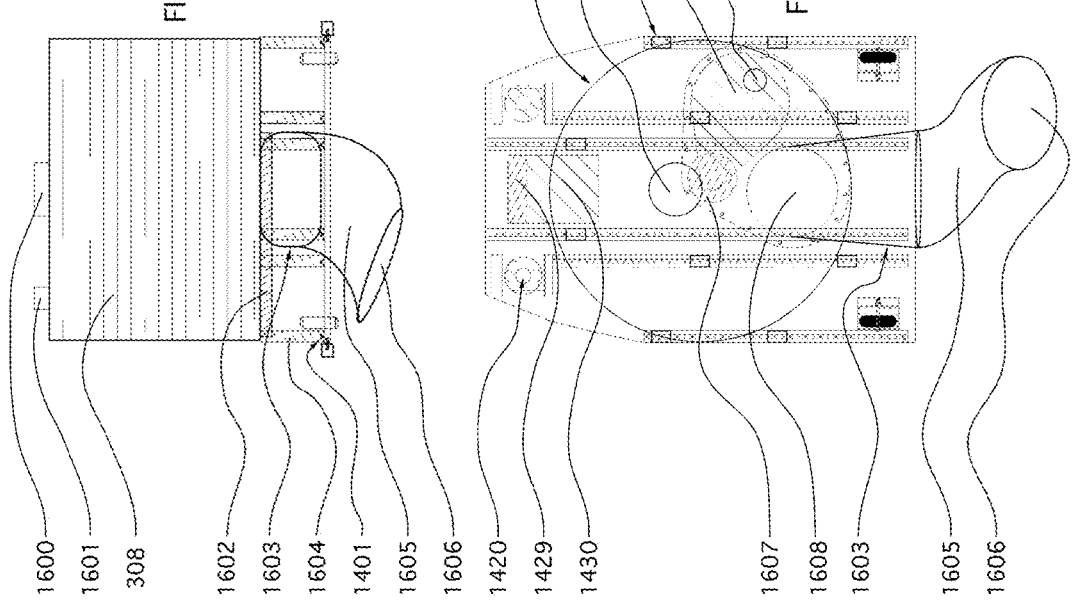

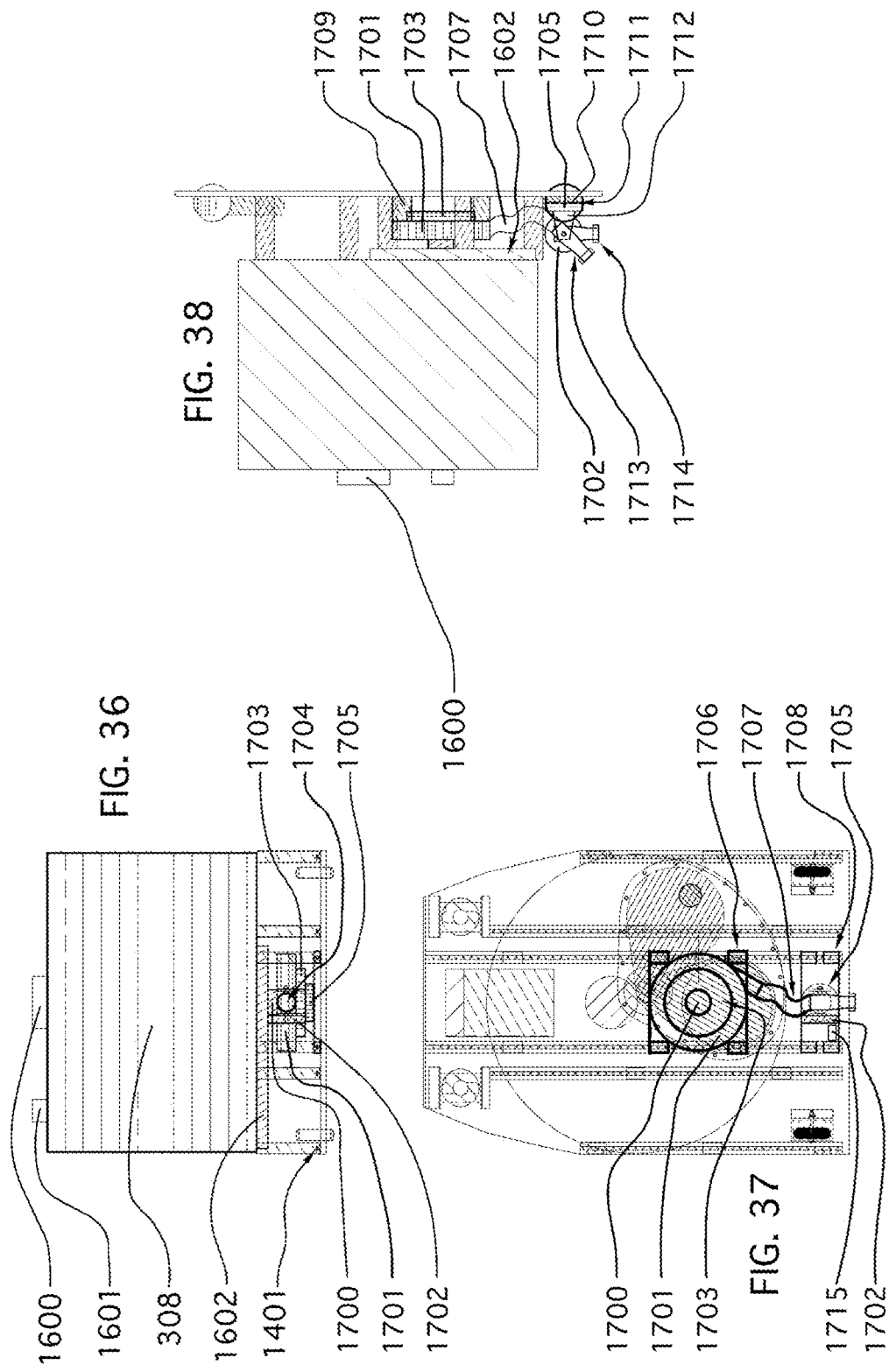

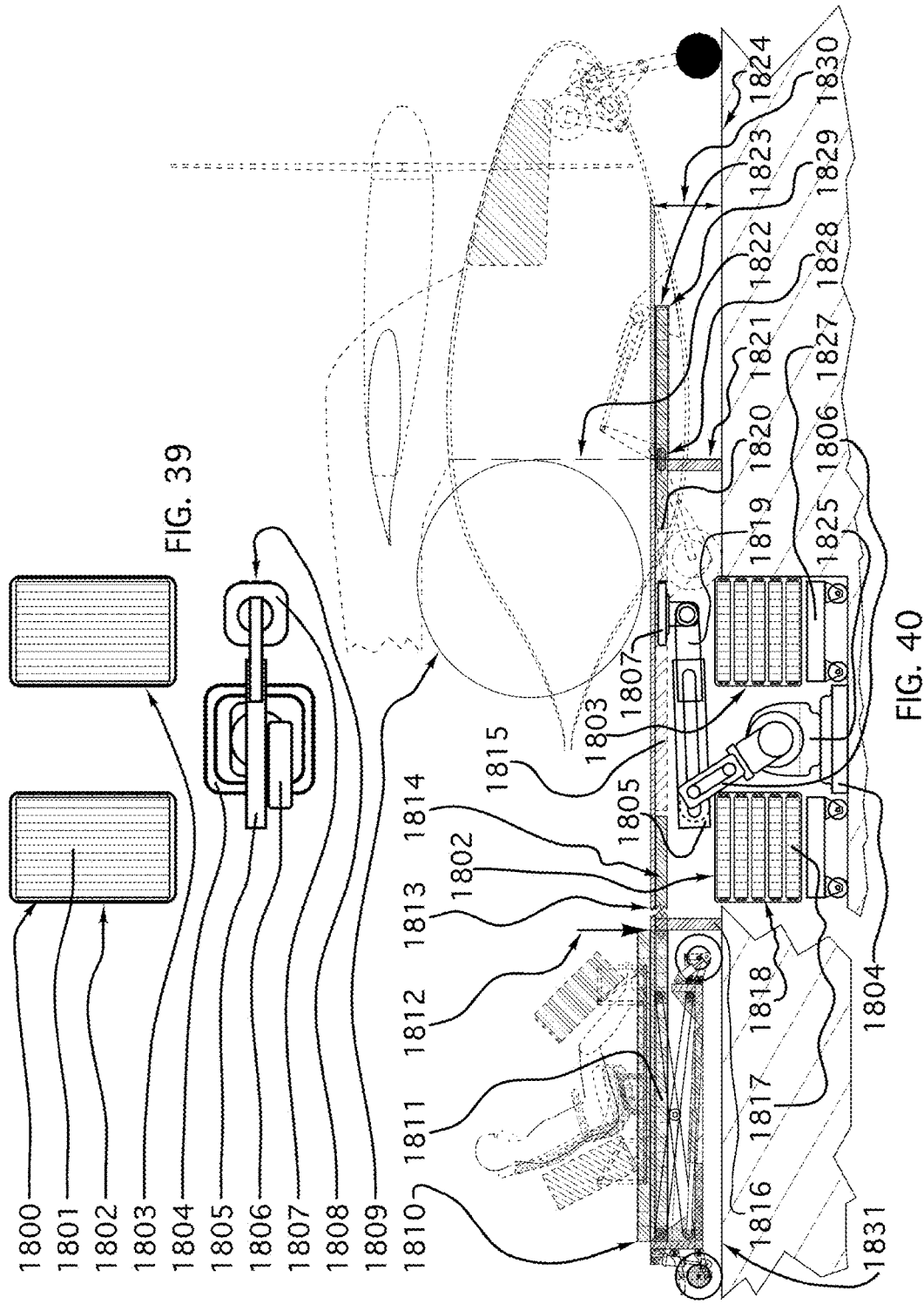

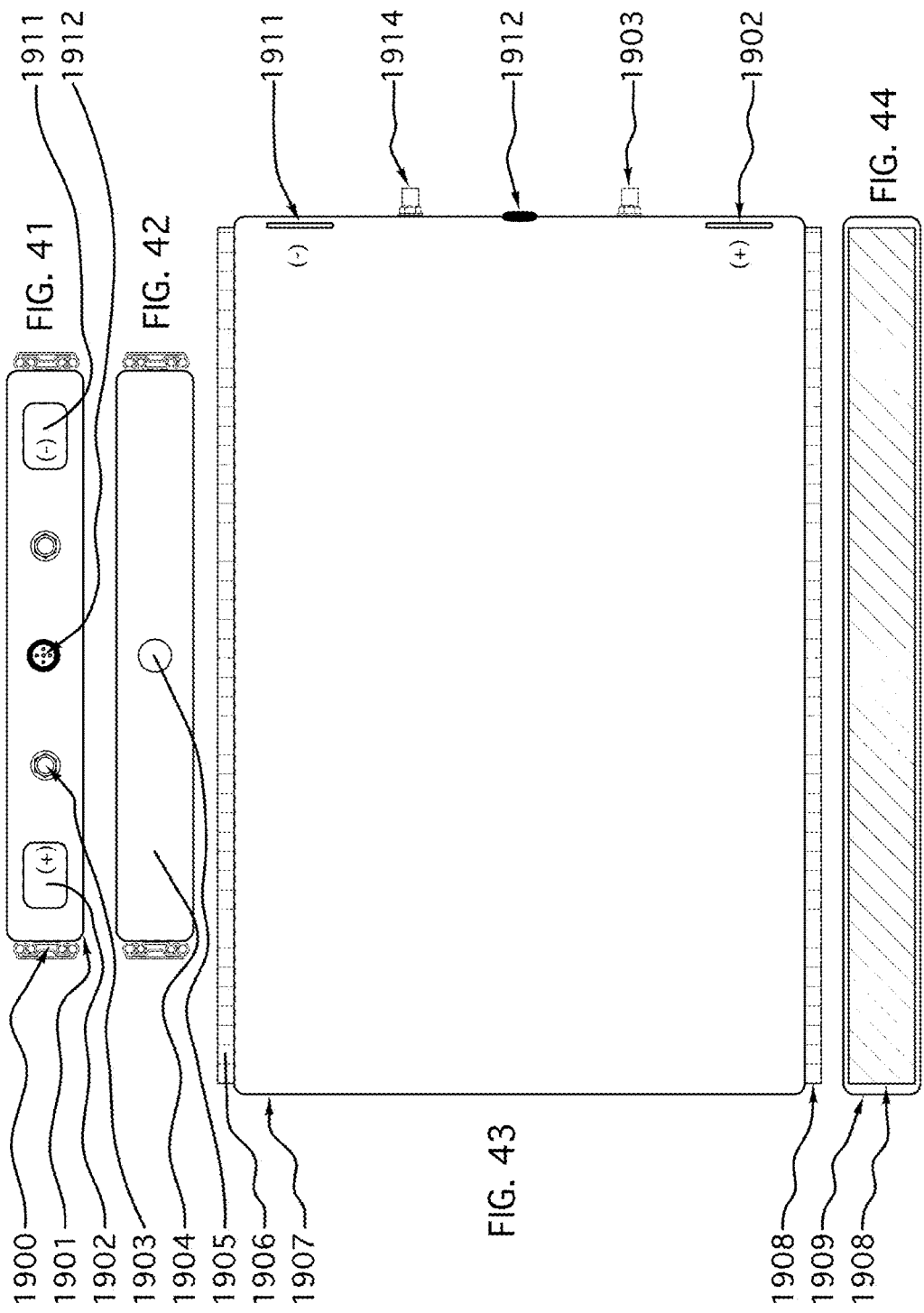

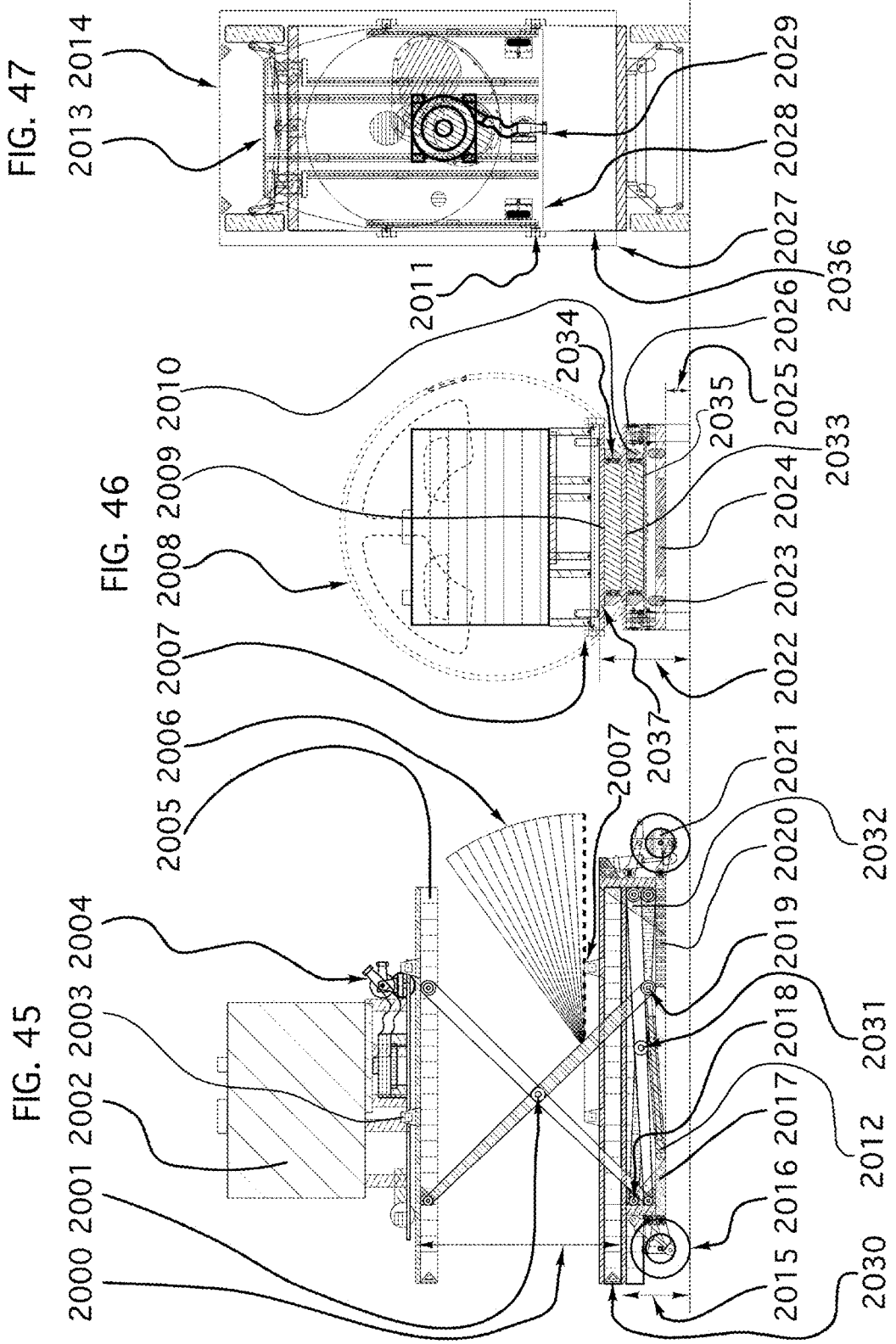

SYSTEM FOR FIRE SUPPRESSION BY AUTONOMOUS AIR AND GROUND VEHICLES

BACKGROUND OF THE INVENTION

Field of the Invention

The invention is directed to a system for fire suppression by autonomous air and ground vehicles.

Background

U.S. patent application 17,266,451, filed on Feb. 5, 2021 describes the background and demand for a quiet urban air delivery (QUAD) transportation system. The system described in the present application describes the facilities, vehicles and operations of said QUAD transportation system as modified and adapted for wildfire control and suppression.

Wildfires, which refer herein to uncontrolled fires, are becoming more and more prevalent, especially in the Western and particularly South Western United States. In 2017, there were record breaking wildfires in the Western USA and elsewhere that caused extensive unhealthy air quality and very significant losses of life and property. Due to climate change and chronically insufficient use of controlled burns, wildfires and their destructive effects are increasing around the globe in a trend that is expected to worsen in the coming years. Some estimates claim that in total. wildfires emit more than 30 billion tons of $CO_2$ globally in one year.[1] The Camp Fire alone in 2018 in California is estimated to have caused $13 billion U.S. dollars in damages. The health damaging effects of wildfire smoke are becoming increasingly recognized and their cost is inestimable at this point. In addition, agencies and officials are increasingly reluctant to authorize the necessary controlled burns because of limited resources for control and because of the liability that attends having said controlled burns erupt into wildfires[2]. These findings indicate a clear need for a larger and more effective system to suppress and contain wildfire and to ensure that controlled burns are controlled. The technology for early detection of wildfires already exists, in the form of remote sensing systems, thermographic cameras, high altitude long endurance aircraft and accurate GPS mapping and positioning. Said technology needs to be coupled with a more responsive wildfire suppression system. The extant problems in wildfire suppression with aircraft include shortages of pilots and aircraft, the high cost of fire suppression aircraft and fire-retardant, the large size and cost of air attack bases, which limits their number and proximity to fire-prone areas contributing to longer time intervals for aircraft to reach the scene of a fire, the difficulties in conducting effective and precise pattern application of fire-retardant, especially in adverse conditions such as high winds. smoke and darkness[3]. The extant problems in wildfire suppression with ground vehicles are analogous and include limited resources, limited trained crew, lack of proximity and access that is limited due to conventional fire engines that are too large to pass on narrow roads enroute to a fire. All of these problems can be addressed by the invention presented herein.

SUMMARY OF THE INVENTION

The above problems and challenges are addressed by creating a new type of system for fire suppression by autonomous air and ground vehicles that provides the following features that are compatible with and extend the utility of the QUAD transportation system:

- an array of ubiquitous, distributed small, affordable SkyNest airports with fire suppression stations (FSS) that offer high proximity to all potential fire zones and thereby expeditious arrival of air and ground vehicles at the scene of a fire
- a 24/7 capacity for a sustained high volume of fire-suppression vehicles dispatched to a wildfire
- a fleet of autonomous robotic aircraft and ground vehicles whose small size enables access to fire locations that are otherwise unreachable by conventional fire-fighting vehicles
- fully autonomous robotic (driverless) aircraft and ground vehicles that can deploy to suppress fires even at night or in fog and dense smoke
- a precision vehicle guidance systems with airline-levels of safety
- a high degree of aerial agility at relatively low airspeeds so as to enable very low drop heights of fire-suppressing liquids
- affordable mass-produced aircraft that can be affordably modified to serve as fire-suppressing aircraft
- an affordable fire suppression module (FSM) that can be rapidly filled and carried in both air and ground vehicles
- a fire suppression station (FSS) centrally located at a SkyNest and designed to provide, even in the event of a power failure, a sustained high volume supply of fire-suppressing liquids for both air and ground vehicles
- a system whose components enable rapid turnaround time at SkyNests to enable rapid reloading and re-deployment of fire-suppressing air and ground vehicles
- fire suppression aircraft ("SkyQarts") whose speed envelopes are favorable for the precise pattern application, even in high winds, of fire-suppressing liquids comprising liquids from a low height above ground level to both extinguish and slow the spread of wildfires and controlled burns
- alternative types of discharge nozzles for fire-suppressing liquids, which, when combined with autonomous vehicles having thermographic camera vision and the application of said fire-suppressing liquids to precisely-identified locations of incipient wildfire locations, enables-a tailored and verified effective pattern of application and coverage level.

These improvements in fire-suppressing aircraft are made more affordable by re-purposing the mass-produced, OEM aircraft of the QUAD transportation system with affordable modifications. These improvements can alternatively be made, though at higher cost, to purpose-built SkyQarts prior to mass production of such aircraft for the QUAD transportation system. These improvements are to be combined with new types of formulated fire-suppressing liquids that, compared to water, provide more uniform and more effective coverage with less losses due to run-off and evaporation. For the purposes of this patent, fire-suppressing liquids are called fire-retardants and fire retardants include both water and formulated fire retardants that consist of water compounded with select additives. Water as well as new and old types of fire-retardant can be provided at fire suppression stations by mixing on-site local water sources with appropriate amounts of whatever additives are ideal for formulating the fire-retardant of choice, without the need, expense and pollution of trucking enormous quantities of remotely manufactured fire-retardant to SkyNests. The dispensing of fire-retardant from the large, elevated water tank at the fire suppression stations conceived in this patent, if engineered with appropriate fall height and orifice sizes, can be accomplished entirely by gravity flow, which maintains the capability to fill and operate dozens of fire suppression vehicles even in the event of a local power failure. In addition, improved detection and localizing of wildfires by satellite or high altitude long endurance (HALE) aircraft can be interfaced with the autonomous navigation and flight control systems on these aircraft to automate their prompt arrival and application of fire-retardant. These combined improvements comprise the system that is the subject of this invention. The goal of this invention is to use interoperable components with uniform standards and parts commonality to provide a unique network of ubiquitous wildfire air attack stations, each roughly the land parcel size of a car dealership, in both urban and suburban communities, from which a fleet of air attack aircraft and autonomous robotic ground vehicles capable of fire suppression and containment can be deployed to a fire in less than 10 minutes from the moment of its detection, regardless of whether said fire is in an urban, suburban or wildlands location and regardless of the conditions of wind, smoke or darkness. Such early intervention is expected to much better contain and stop most wildfires before they grow to unmanageable extent, reach populated areas or produce extensive damage.

Successful fire suppression requires a systems approach to achieve affordable, effective results. Consequently this invention comprises a unified system that includes the integration and interdependency of both purpose-built aircraft, airport facilities, docks and ground vehicles as well as the repurposing of electric-powered aircraft and surface carts from original equipment manufacture as used in the QUAD transportation system. Rapid loading and turnaround times for the vehicles used in wildfire suppression and containment are crucial for system success. In addition, this invention includes coordination of fire suppression flights with early fire detection systems, whether by satellite or high altitude long-endurance (HALE) aircraft that are equipped with advanced imaging and geo-positioning software, and with improved fire-retardant formulations used in a future network of ubiquitous SkyNest-like airparks that are specially equipped with fire suppression stations.

This invention is a unified system comprised of a set of vehicles, devices and facilities that, as a collection of components, can employ mass-produced electric-powered aircraft and small airparks herein named SkyNests with their attendant paved surface, docks and electric-powered surface carts that can be used in both a transportation system, or said set of vehicles, devices and facilities that can be repurposed or separately developed expressly for fire suppression, in order to provide a new system of wildfire suppression and containment. A system is a collection of components that are organized for a common purpose. Systems rely upon each of their components to fulfill its important role to make the system work. Such components have little or no meaning or value as stand-alone items; only when combined and integrated into a unified system do such components become valuable. For example, a keyboard alone without a computer and monitor has little or no value. Similarly, a small SkyNest with an FSS is of little or no value without expressly compatible docking facilities, aircraft and surface carts, all of which are of little or no value to fire suppression without the fire suppression modules and fire suppression stations described herein.

A recent convergence of technologies, including the development of more advanced energy storage devices and driverless electric cars, along with the ever-worsening surface gridlock in metropolitan areas has opened the possibility for a new, multi-modal type of public transportation system that uses autonomous robotic electric-powered, low-emissions air and land vehicles to provide trips across distances of up to 220 km with many trips as short as 16 km (10 miles) or less across urban, suburban and rural areas to and from very small airports that have high proximity to where people live and work. The autonomous robotic air and land vehicles used in said new public transportation system can, by the inventions described herein, be re-purposed with minor modifications to fight wildfires. Said vehicles and components of the inventions described herein can also be created expressly for fighting wildfires, though at higher cost. These air vehicles are capable of operating expeditiously with negligible control latency and a high degree of aerial agility on precise trajectories and with extremely short take-offs and landings (ESTOL) at a highly-distributed network of very small, high-proximity, specially equipped airparks (SkyNests). The necessary aircraft are enabled by the emergence of new, high-energy density batteries, ultra-quiet propellers and driverless vehicle technologies, which enable them to combine ultra-quiet electric propulsion, reduced emissions and adequate range with highly agile, precisely controlled flight and ground operations. These ultra-quiet, electric-powered aircraft are herein named SkyQarts and they are of a specialized new unique design that fulfills a uniform set of standards for consistent ESTOL performance, operational capabilities and size. The SkyQarts as embodied herein are fixed-wing ESTOL aircraft.

Throughout this disclosure, the word "autonomous" means a vehicle or machine that is driverless and sentient of position, destination and obstacles and that is navigated and maneuvered by a computer without a need for human control or intervention The word "robotic" as used herein means a vehicle or machine that is able to receive and perform commands or instructions, whether by human operated joystick or by autonomous capability.

It is noteworthy that all electric air and land vehicles described herein are both robotic and autonomous. They are robotic in that they perform the commands of a networked situational awareness system and a precision positioning system, such as where to go, where exactly to dock and when. They are autonomous in being sentient of position, destination and obstacles and able by their on-board computerized autonomous control system to self-navigate and maneuver past traffic and obstacles when enroute to their destinations.

All SkyQarts are uniquely capable of being precisely positioned and rapidly loaded and unloaded, in as little as 20 seconds, at a dock's aircraft docking station using standardized, pre-loaded, robotic autonomous electric-powered payload carts (EPCs). The autonomous robotic EPC is an innovation that enables one of this invention's key components, i.e., the rapid loading of fire-retardant into a SkyQart intended for fire suppression. The EPC is capable of hauling a variety of payloads including passengers, and/or cargo and/or materiel and/or fire-retardant, and it is designed to be carried not just inside the axisymmetric fuselage pod of the SkyQart aircraft, but also with a piggyback transportation function atop specially designed compatible electric-powered autonomous robotic delivery carts (RDCs), as well as atop or inside other vehicles such as small cars, pick-up trucks and commercial trucks. This combination of Sky- Nests, SkyNest docks, SkyQarts, EPCs, RDCs and the other components enumerated in U.S. application No. 17,266,451, to Dr. Seeley, incorporated herein by reference, are expressly designed to comply with standards that allow them to interoperate as a multi-modal system of rapid delivery of people and goods from departing doorstep to destination doorstep. The description of the SkyNests, dock facilities, SkyQarts, autonomous robotic electric payload carts, an autonomous robotic delivery carts and the description of the energy-absorbing crash cushion from U.S. application No. 17,266.451 is hereby incorporated by reference herein, along with the entirety of the specification and figures. This new, aviation-based transportation system is named the Quiet Urban Air Delivery (QUAD) system can be employed to provide fire suppression services as described herein. Its working matrix of autonomous robotic electric-powered vehicles, facilities, hardware and software along with their range of specifications, standards, processes, capabilities, nomenclature, and concepts of operations together comprise a concerted, comprehensive, on-demand, fire suppression and containment system to complement existing fire suppression systems and is the subject of this invention. The invention shall be named the System for Fire Suppression by Autonomous Air and Ground Vehicles.

The main enabling vehicle for QUAD is its aircraft, the ultra-quiet, electric-powered, extremely short take-off and landing SkyQart. It is the combination of ultra-quiet propulsion and extremely short take-off and landing that enable the SkyQart to operate at very small, ubiquitous, community-acceptable airparks with high proximity to the wildland-urban interface (WUI). The nominal interoperable embodiment of the SkyQart presented herein is an autonomous robotic fixed-wing aircraft that is exemplary of an integrated design that can fulfill the performance requirements of the QUAD transportation system. By the practicalities and economics of said system and the extant pattern that cars in commute service carry typically less than 2 people per vehicle, the SkyQart is limited to a maximum of 6 seats. Notably, the SkyQart is not and cannot be a regional airliner type of aircraft and still fulfill the very short runway requirements of a SkyNest. Thereby, the SkyQart by necessity needs to be a relatively small aircraft. It also needs to be one that can be readily and affordably certificated by the Federal Aviation Administration and other regulatory bodies as an autonomous vehicle that is safe to both carry passengers for hire and to safely haul and deliver cargo or fire-retardant. Cadenced coordinated operations require that the EPCs, RDCs and SkyQarts at a SkyNest interoperate both on-time and just-in-time in an on-demand system of service. SkyQarts are not for scheduled flight service. The nominal interoperable embodiment of the SkyQart is further distinguished by its unique combination of several enabling innovations into one aircraft, including the following components: the extremely low drag axisymmetric fuselage pod (AFP) that contains the SkyQart's interior cabin, the cargo axisymmetric fuselage pod, active main landing gear, ultra-quiet propellers that serve as spoilers, landing gear wheelmotors in its main landing gear, retractable nose wheel landing gear, a solenoid-actuated pin-latching system, a precision positioning system, a standardized swappable battery pack (SBP) with robotic battery swapping, an autonomous control system, a community acceptable noise sphere, a closed-flotation system, the blown, double-slotted fast flap system, the automatic rear hatch, the peelable window frame for emergency exit, the DC fast-charging port, guided rate acceleration change execution (GRACE) and the Faraday cage around its battery pack By virtue of this combination of innovative components, this patent is the first application of a concerted transportation system to systematically addresses the problems in wildfire suppression and containment at meaningful scale. The maximum capacity of the QUAD system is predicated upon the use of autonomous robotic electric-powered vehicles, but the system including its fire suppression system can operate at lower capacity using human-piloted electric-powered vehicles during its initial years of demonstration start-up operations.

The safety of the QUAD system is of paramount importance and all of its vehicles and its operations will ultimately have to comply with applicable safety regulations as well as with FAA and EASA certification standards. Some of those standards will evolve as the QUAD system is implemented. The goal is to have the QUAD transportation system provide 9-sigma safety, meaning an accident rate of one per one billion operations. The components of the QUAD transportation system and particularly those of its autonomous robotic SkyQart that are important to its safety are the following: paved surface, an energy-absorbing crash cushion at an end of a paved surface, a sentient, ever-vigilant, networked autonomous control system with fused multi-sensor see-and-avoid hardware and software coupled to automated flight controls with negligible control latency to detect and prevent air traffic conflicts and provide aerial agility, a networked situational awareness system, a ballistic recovery system consisting of a vehicular parachute, a closed flotation system for buoyancy in case of ditching in the water, an emergency locator transmitter (ELT), rescue lift-hooks on airframe hardpoints for helicopter rescue of entire vehicle, peelable round window frames as emergency exits on the sides of the AFP, a Faraday cage to limit voltage shock hazard and radio frequency interference leaks, an automated check-list and self-diagnostics including automatic pre-flight self-inspection before every flight, an automatic fuel gauging and range protection system, a fire-proof or fire-resistant materials in the SkyQart airframe, a smoke and carbon monoxide detectors in the SkyQart cabin, an automatic fire extinguisher system in the SkyQart cabin, a battery management system in all standard battery packs, a fire-proof container for all standard battery packs, regularly scheduled disinfecting/cleaning of SkyQarts, EPCs and RDCs, a nominal interoperable maximum glide ratio of more than 17:1 and a taxiing SkyQart that can taxi without using a propeller or a rotor. Negligible control latency is defined herein for the autonomous control systems of the electric-powered air and land vehicles described herein as a capability of determining and activating a controlled movement of said vehicle in less than one second.

Alternative embodiments of SkyQarts have a maximum glide ratio in a conceivable range of about 15:1 or more, about 16:1 or more, about 20:1 or more, about 22:1 or more or any value between and including the ratio values provided, while the preferred range is 16:1 to 18:1 and the nominal interoperable maximum glide ratio is 17:1 as this provides a preferred combination of safety, speed, energy efficiency and range without excessive wingspans, wing weights or parking space requirements. A landing indicated airspeed that is limited to no more than 24 m/sec could have alternative embodiments wherein a landing speed is in a conceivable range of about 20 m/sec or more, about 22 m/sec or more, about 26 m/sec or more, about 27 m/sec or more or any value between and including the speed values provided, while the preferred range is 21.5 m/sec to 27 m/sec and the nominal interoperable landing speed is 24 m/sec as this provides a preferred combination of safety, low noise, shortened paved surface requirements enabling smaller airparks, adequate flight control authority during landing, expeditious airport traffic flow/capacity and sufficient cruise speeds without excessive wing area, susceptibility to flight turbulence or adverse energy efficiency.

The several components that make this system a workable, high-capacity solution are interdependent because only together can they enable the core mission requirements and operational requirements of the system to be met. Therefore, these components, including said SkyQarts, electric-powered autonomous robotic delivery carts, autonomous robotic electric payload carts, SkyNest facilities, processes, operations, components, capabilities, nomenclature and standards that comprise the concerted, interoperable, comprehensive, multi-modal, on-demand future public transportation system that is the foundation of this invention, herein described and called the System for Fire Suppression by Autonomous Air and Ground Vehicles are together the basis for this invention of a new wildfire suppression and containment system.

A fundamental and recurring principle in this invention is that its several components are definable, interdependent, interoperable and system-enabling. This principle is valid because the dimensions, performance and energy requirements are constrained within definable boundaries by combining the immutable natural and social sciences including physics, human physiology, sociology, psychology and economics along with the culture, habits and built-environment of both the extant surface transportation system and the current air attack system for wildfire suppression. These sciences determine the workable, tolerable and acceptable parameters for a unique system in terms of its noise level, speeds, accelerations, size, weight, cost, ease-of-use and safety level. To be sustainable and to function as a unified system, this system must include defined, quantified and uniform standards for these parameters and others in a range that respects those laws of science. Such physics-compatible standards are important to achieving mass production, interoperability, parts commonality and economies of scale, all of which help enable a sustainable, affordable mass implementation of the system. For most parameters there is a magnitude that fulfills the need with the physically correct size, weight, motion or user experience. The magnitudes of the parameters presented in the embodiments herein are of a physically correct scale and are thereby interoperable.

It is important to note the following definitions regarding parameters, as nominal, nominal interoperable, or standard: In order for the System for Fire Suppression by Autonomous Air and Ground Vehicles system to be a wildfire suppression system, it follows that several workable, tolerable, interoperable dimensions, weights, forces, rates and other parameters must be specified in this patent for the embodiments of the vehicles, components and facilities contained herein.

Accordingly, the definition intended by use herein of the descriptive term "nominal", is that definition given by Merriam-Webster "of being, or relating to a designated or theoretical size [or magnitude] that may vary from the actual: e.g. approximate". The descriptive term "nominal interoperable" is herein defined as "being of a designated size that can interoperate with the other components described herein". In addition, the definition intended by use herein of the descriptive term "standard", is that definition meaning "something set up and established by authority, law, custom or consensus as the specific, uniform magnitude of a quantity, weight, extent, value, or quality". It is reasonable that the nominal, nominal interoperable, or standard magnitudes of many of the parameters specified herein could be changed in the future by some authority, consensus or enterprise with such change being across a conceivable range of feasible magnitudes and with commensurate changes to other interoperable components of this system while still including such changed or alternative embodiments as legitimately encompassed by this patent. Consequently, a range of feasible and reasonable magnitudes are specified as the conceivable range following several of the nominal, nominal interoperable, or standard magnitudes specified in this specification/disclosure. In addition, a smaller or narrower preferred range that is within that conceivable range may be specified. The conceivable range and preferred range are not intended to be limiting and will, where applicable, be specified in metric units along with the nominal, nominal interoperable, or standard magnitudes that are specified herein in metric units. The reasons for the selection of these ranges will be given in light of the consequences of using magnitudes outside of these ranges. For most parameters, there is a declared nominal interoperable magnitude as well as the specified ranges of feasible alternatives. In instances where the magnitude is presented herein as either a specified standard or as a nominal interoperable embodiment, it is because such a specification is considered fundamental to fulfilling the interoperability and performance requirements of this system.

The size of the cabin or people/payload compartment of the SkyQart aircraft to be used in the QUAD system has a direct effect on the aircraft's drag, power requirement and range; consequently this compartment must be of the minimum size that can still comfortably accommodate the most common sizes of people and payloads. The people/payload compartment of the embodiment of the SkyQart described herein is named the axisymmetric fuselage pod or AFP. The AFP has a circular cross section and a tapered shape that minimizes drag. To enlarge the size of the AFP by scaling it up above its nominal 160.02 cm (63") diameter, even by a small amount, in an attempt to make it more spacious and luxurious would impose a significant cost and speed penalty that would apply on every flight and thus be multiplied by the billions of projected trips flown. Likewise, to change its cross-sectional shape from circular to square would also impose a cost, speed and compatibility penalty and would impair its capability of meeting the ESTOL requirements of a SkyNest.

To limit its cost, the size of the land parcel needed for the SkyNest likewise should be as small as practicable for safe operations within community-acceptable noise limits. The nominal embodiments of the SkyNests presented herein all are of minimum parcel size. To minimize this parcel size ultimately requires that the SkyQart aircraft be not only extremely quiet, but also autonomous (pilotless) and capable of ESTOL operations. With precise autonomous control, said SkyQart must fly consistently precise trajectories with curved traffic patterns with steep climb and descent profiles along with precise 4D approaches to precise landing touchdowns at each SkyNest. (The term 4D refers to an aircraft flight path whose approach and trajectory are specified by combining its three-dimensional (3D) path with the exact time at each location along that path, thus adding a $4^{th}$ dimension to 3D). The autonomous flight control systems of the SkyQart aircraft provide it with extreme reliability, aerial agility and negligible control latency and enable it to fly precise 4D trajectories. Extreme reliability can be defined as having a mechanical or software failure once in every one billion flight operations.

Aerial agility of the SkyQart is important to this patent because minimizing community noise impacts of flight operations will, at some SkyNests, demand extremely short take-off and landing (ESTOL) performance with extremes of acceleration rate change that approach but do not exceed levels that are tolerable to passengers of a public transportation system. The SkyQart must have extreme capabilities for brisk control of sink rate, climb rate, pitch, roll and yaw rates, thrust, lift and drag both in order to operate at standardized small landing sites herein named SkyNests and to perform agile, precise, close-proximity air drops at low drop heights over wildfires. Said SkyQarts must be highly agile and must consistently use an actuating principle that is particularly enabled in electric-powered servo-controlled aircraft with negligible control latency. That principle is herein named guided rate acceleration change execution (GRACE). The GRACE actuating principle involves the tailoring of the rate of actuation of movement across any range of motion or trajectory so that it is acceptable in a public transportation system. This means that the changes in acceleration which are called the jerk rate, across any range of motion, must rise and fall at controlled rates that remain within known tolerable jerk rates for human occupants while still achieving the necessary precise motion in time. When a SkyQart is carrying a payload other than people or animals, such as fire-retardant, it is permitted to perform rates of movement that exceed those of GRACE, if necessary, to safe and effective use.

The speeds required for the different autonomous robotic vehicles used in the QUAD system are likewise constrained by operational and physical demands. The SkyQart's nominal interoperable lift-off and climb-out airspeed and landing airspeed is 24 m/sec, which is fast enough to ensure that the aircraft's control surfaces will have enough dynamic pressure to maintain brisk control in gusty or turbulent conditions. It is also fast enough to enable the cruise speed of the SkyQart aircraft to expedite arrival on-scene of wildfires from high proximity SkyNests that have fire suppression liquids and equipment, while being slow enough to deliver precisely controlled high coverage levels of fire-retardant. It is also slow enough to enable short take-offs and landing rolls at very small SkyNests, as well as to provide enough time for the autonomous control system to process and enact de-confliction with other air traffic that is on sovereign autonomous trajectories. Alternative embodiments of the SkyQart use a landing speed that falls within a conceivable range that is 20 m/sec or more, 27 m/sec or more, or any value between and including the speed values provided, while it is preferred that the take-off and climb-out airspeed be a nominal interoperable 24 m/sec with a preferred range of 21.5 m/sec to 27 m/sec. The nominal interoperable 7.6 m/sec speed for taxiing of the SkyQart is fast enough to move with alacrity on the surface of the SkyNest while being slow enough to enable accurate autonomous trajectories, short stopping distances and tight turns. Alternative embodiments of the SkyQart have a taxiing speed that is in a conceivable range of about 6 m/sec or more, about 8 m/sec or more, about 9 m/sec or more, or any value between and including the speed values provided, while it is preferred that the taxiing speed be 7.6 m/sec as this provides a preferred combination of safety, speed, maneuverability and expeditious traffic flow without excessive braking distances or delays. The nominal interoperable 11 m/sec limit speed for the autonomous robotic delivery cart (RDC) on streets and other byways is likewise fast enough to keep surface travel times short while slow enough to comply with safe speed limits for such neighborhood electric vehicles. In its use confined to the dock premises of a SkyNest, the autonomous robotic electric payload cart (EPC) has a battery pack sufficient to a maximum range of up to 4 km. The nominal maximum speed of the EPC is constrained to the speed of a fast walk, just 2.2 m/sec, so that it can safely and autonomously move short distances along the dock premises that may be congested with pedestrians and other EPCs. Alternative embodiments of the EPC have a maximum speed that is in a conceivable range of about 2 m/sec or more, about 2.5 m/sec or more, or any value between and including the speed values provided, while it is preferred that the EPC's maximum speed be 2.2 m/sec as this provides a preferred combination of safety, speed, maneuverability and expeditious traffic flow without delays or danger to pedestrians.

Other constraints affect the sizing of the components for the System for Fire Suppression by Autonomous Air and Ground Vehicles system. For example, the autonomous robotic delivery cart (RDC) must be small enough to qualify as a neighborhood electric vehicle and fit in a bike lane yet be large enough to carry a substantial amount of fire-retardant.

The nominal interoperable size of the swappable standard battery packs (SBP) carried by the SkyQart must be large enough to provide sufficient range for its market of short trips, while being small enough to be readily interchangeable between SkyQarts. The battery packs must also be limited in size and weight such that they can be handled manually by a pair of strong adults and can be stackable and useable in parallel circuits for applications that demand extended range or power. The packs must also have provisions for fire and smoke containment, ventilation and cooling and a built-in battery management system, along with consensus standards for size and location of electrodes and latch points. The dimensions of the swappable standard battery pack (SBP) for the SkyQarts are chosen specifically to fit present day energy densities and the available volume in the belly of the SkyQart. A 600-volt standard is anticipated for this SkyQart battery pack. Alternative embodiments of the SBP have a pack voltage within a conceivable range of about 400 volts or more, about 700 volts or more or about 800 volts or more, or any value between and including the voltage values provided, while it is preferred that the nominal interoperable voltage be 600 volts with a preferred range of 550 to 650 volts as this provides a preferred combination of safety, weight savings and industry compatibility without excessive risk of shock, insulation breakdown, or internal shorting of higher voltages. The energy density of the SBP will increase in the future as new, more advanced battery chemistries evolve and this will allow its weight to be reduced while still fitting, latching and connecting inside the standard embodiment of the battery receptacle in a SkyQart.

The autonomous robotic electric payload cart (EPC) is an innovation to reduce turnaround time. The EPC has a nominal interoperable ground clearance of 2.54 cm in order to maximize the room for payloads latched onto an EPC inside the SkyQart. Alternative embodiments of the EPC have a ground clearance within a conceivable range of about 3 cm or more, about 5.1 cm or more, or any value between and including the ground clearance values provided, while it is preferred that the nominal interoperable ground clearance be 2.54 cm as this provides a preferred combination of cabin volume, weight savings, latching security, ride height atop the RDC and cost savings.

Embodiments of the SkyQart aircraft have a noise emission at a 40 m sideline distance during full power take-off that is constrained by its equivalent average continuous sound level in dBA using the "A" scale of sound measurement. This measurement is designated as the dBA level in $LA_{eq}$. If said noise level is averaged over a 5 second interval, then it is designated as the dBA in $LA_{eq}$, 5 s. Embodiments of the SkyQart aircraft have a noise emission at a 40 m sideline distance during full power take-off within a conceivable range of about 40 dBA $LA_{eq}$, 5 s or more, about 44 dBA $LA_{eq}$, 5 s or more, about 46 dBA $LA_{eq}$, 5 s or more, about 50 dBA $LA_{eq}$, 5 s or more, about 58 dBA $LA_{eq}$, 5 s or more or any value between and including the noise levels provided, while it is preferred that the nominal interoperable full-power take-off noise emissions be 555 dBA $LA_{eq}$, 5 s with a preferred range of 50-57 dBA LAeq, 5 s because this provides a preferred combination of community acceptability, achievable quietness, reduced size of the SkyNest and sufficient propeller tip speeds. These noise requirements and the operational requirements for a very short paved surface combine to dictate the size of the standard SkyNest land parcels as being the smallest parcels that can safely fulfill both of these conflicted requirements.

The solenoid-actuated pin latching system depends upon use of solenoid-actuated latching pins made of high-strength, hardened steel. These pins each have a bullet-nose shape and are of a nominal interoperable 6.35 mm diameter. Alternative embodiments of the pin-latching system have a latching pin diameter within a conceivable range of about 5 mm or more, about 7 mm or more, about 10 mm or more or any value between and including the diameter values provided, while it is preferred that the nominal interoperable pin diameter be 6.35 mm with a preferred range of 5.5-7 mm because this provides a sufficient strength, light weight, industry sizing compatibility, and mass sufficient for strong actuating forces. Since the QUAD standard embodiment calls for there to be a nominal gap of only 3.81 mm between the solenoid body block and the edge of the EPC surface deck at the location of the hole into which the pin inserts, these pins are loaded mainly in shear. Alternative embodiments of the pin-latching system have a gap within a conceivable range of about 3.5 mm or more, about 5 mm or more, about 7 mm or more, or any value between and including the gap values provided, while it is preferred that the nominal interoperable gap value be 3.81 mm with a preferred range of 3.5-5 mm because this provides the minimum gap that offers sufficient clearance for rapid loading, light weight, avoidance of bending loads, and shear strength sufficient for the expected loads. The pin's shear strength of 896,324 kPa can enable each pin to withstand a shear load of over 26689N and thus provide highly weight-efficient fixation of movable loads.

SkyNests must offer consistent standards in size, equipment and facilities in order to fit the cart vehicles defined herein and to efficiently achieve high capacities and safe operations. These standards are as important as those for the gauge of railroad tracks. For the sake of reducing costs and speeding implementation, these standards are intended to be international and are conceived to respect international cultural, dimensional and regulatory requirements. This invention includes the specifications and operational descriptions of these standards. SkyNests for the System for Fire Suppression by Autonomous Air and Ground Vehicles system must be small enough that they can be ubiquitous and be sited very near to where people live and work. Such high proximity siting also calls for operations at these SkyNests and the SkyQarts that fly there to fulfill three important but conflicted requirements, which are: 1) safe, high capacity and high proximity operations and 2) community-acceptable levels of aircraft noise and 3) precise, 4D steep approach and climb-out gradients. The simultaneous fulfillment of these three requirements distinguishes the System for Fire Suppression by Autonomous Air and Ground Vehicles system from all other prior art.

If communities allocate a nominal 1.28 ha land parcel for a SkyNest I to be sited at the center of every circle of 8 km diameter, each SkyNest I requires only 0.63% of the land area of the neighborhood that it serves. As a general guideline to the ideal ubiquity of SkyNests, a city should have about one SkyNest for every two of its high schools. From a high proximity SkyNest, SkyQarts could save time in reaching and engaging wildfires. SkyQart operations must be safe and quiet enough to cause minimal fear and noise annoyance to the neighbors living nearby the SkyNest. Vertical take-off and landing (VTOL), tilt-wing, tilt-rotor or multi-rotor (copter) aircraft are inherently noisier than fixed wing aircraft and so would require larger SkyNests in order to be community acceptable. The siting of these larger SkyNests would usually entail insufficient ubiquity and proximity to reach wildfires.

The area needed for a SkyNest is within a conceivable range of between 0.4 and 5.0 ha, with a nominal area of 1.28 ha and a preferred range of 1.2-2.4 ha. SkyNest facilities must include compatible docking and processing equipment for both vehicles and payloads. For the System for Fire Suppression by Autonomous Air and Ground Vehicles system, a SkyNest includes a fire-retardant tank filling station herein named a fire suppression station or FSS to be on or near its dock area.

The mission requirements of the aircraft necessary to the System for Fire Suppression by Autonomous Air and Ground Vehicles system are of a knowable range and they comprise an integral part of this invention. These mission requirements dictate that the SkyQart be a new and unique category of aircraft, the nominal interoperable embodiment of which will have the features, innovations and performance capabilities described herein.

The invention(s) in this patent are distinguished as unique because they define the detailed, specific, and concerted processes, ultra-quiet electric-powered vehicles, components, landing facilities and standards necessary for a sustainable, highly distributed, interoperable, comprehensive on-demand system of transportation, cargo delivery and fire suppression by air. In order to be sustainable at the scale necessary the System for Fire Suppression by Autonomous Air and Ground Vehicles system requires this strictly defined, comprehensive set of integrated standards, specifications, performance capabilities and concepts of operations for its SkyNests and its air and ground vehicles. The SkyQarts of the System for Fire Suppression by Autonomous Air and Ground Vehicles system are integrated and networked with other specialized electric-powered surface vehicles, facilities and accessories that enable high-capacity operations at SkyNests. This invention is a unified system that includes the vehicles, facilities, accessories and operations as its important components.

The importance of interoperability of components in the System for Fire Suppression by Autonomous Air and Ground Vehicles system means that they are to be taken as an integrated system of components that are interdependent. The many components of the System for Fire Suppression by Autonomous Air and Ground Vehicles system enable one another so as to enhance the overall system efficiency, capacity and affordability. Their interdependency means that changing the magnitude of any one parameter of a component specified herein as the nominal interoperable magnitude, in terms of its size, weight or performance, will for the sake of interoperability, require the changing of related parameters on a number of other components of the System for Fire Suppression by Autonomous Air and Ground Vehicles system. In addition, this interdependency of the components of the System for Fire Suppression by Autonomous Air and Ground Vehicles system and their relative uselessness as stand-alone components affirms the need for these several components to be patented as a system rather than as separate patents. Changes from the standards and nominal interoperable magnitudes presented in the embodiments herein that nevertheless remain within the conceivable ranges cited herein are therefore part of this invention. For all of the variants of SkyQarts and autonomous robotic electric vehicles described herein, the present invention is susceptible of embodiment in different forms. There is shown in the drawings and herein described in detail one or more specific embodiments, with the understanding that the present drawings, disclosure and claims are exemplary of the principles and concepts of operation of the system as an invention as comprising an article that is a complete, integrated and interoperable system. These specific embodiments are not intended to limit the invention to only those specific embodiments that are shown and described. Moreover, while the representative embodiments herein have been described in specific detail with certain components in exemplary configurations that can demonstrate and serve as interoperable standards, it will be understood by one of ordinary skill in the art that other conceivable combinations of embodiments can be implemented using similar but different specifications, configurations and/or different components. For example, it will be understood by one of ordinary skill in the art that the size, shape, speed, operation or number of certain components can be altered without substantially impairing or changing the concept or functioning of this invention's interoperable system, provided that such alterations are made interoperable. It will be understood by those skilled in the art that various changes may be made in the form and details of the described embodiments resulting in equivalent embodiments that remain within the scope of the appended claims.

The specific invention(s) of processes, concepts, standards, operations and devices that are included in this patent are important and comprise the following:

The SkyNests types I, II, III, IV and V and their amenities;
The SkyNest dock and its amenities;
The SkyNest fire suppression station (FSS) and its amenities;
The SkyQarts I, I-F II, II-F, III, III-uF and III-dF;
The fire suppression module (FSM) and the fire suppression module with aimable spray (FSM-AS), and their accessories for attachment to an autonomous robotic electric payload cart (EPC);
The fire-retardant exit duct for attachment inside a SkyQart's rear hatch;
The fire-retardant exit orifice on the lower outer surface of the SkyQart's rear hatch;
The autonomous robotic electric payload cart (EPC) with standardized latching tracks with a "Go-button" to activate movement;
The autonomous robotic electric payload cart with fire suppression module (EPC-F) with standardized latching tracks;
The electric autonomous robotic delivery cart (RDC) with scissor jack;
The electric autonomous robotic delivery cart with scissor jack and with EPC-F latched on top (RDC-F);
The solenoid-actuated pin-latching system shared by and interoperable on SkyQarts, EPCs and RDCs for latching carts, rear hatch, passenger seats, baggage bins, cargo bins, outsized cargo, fire suppression modules and its accessories;

The interoperable dimensional standards and equipment at a SkyNest dock;
The swappable standard battery pack (SBP) used in all SkyQarts:
The active main landing gear on the SkyQart;
The ultra-quiet propellers on the SkyQart;
The streamlined mono-strut on the SkyQart;
The landing gear wheelmotors for the SkyQart's main landing gear,
The wheelmotors for the EPC;
The wheelmotors for the RDC;
The precision positioning system for SkyQarts, EPCs. RDCs and dock;
The fast flaps system;
The process of networked situational awareness at Sky-Nests;
The peelable window frame with pull-in exit windows;
The precise, negligible control latency, autonomous control system for operating SkyQarts, RDCs and EPCs;
The guided rate acceleration change execution (GRACE) concept;
The precision autonomous navigation system for the SkyQart, RDC and EPC;
The latching racks for out-sized payloads to attach onto EPCs;
The SkyQart's Faraday cage surround for the SBP and shielding for wire harnesses;
The lightning strike protection (LSP) as conductive mesh built-in to the walls of the SkyQart's AFP;
The bowl-shape of the SkyNest TV with sloped pavements;
The rain runoff basin at the bowl SkyNest IV;
The heated pavement at SkyNests in areas subject to icing;
The ultra-quiet smart propeller hub with fast pitch change to alter thrust and drag;
The smart propellers that act as spoilers for sink rate control and act to provide circulation control on blown flaps;
The low drag axisymmetric fuselage pod (AFP) of the SkyQart
The automatic rear hatch opening and closing with solenoid-actuated pin-latching of the hatch on the AFP;
The SkyQart's use of landing gear wheelmotors for take-off acceleration, steering and regenerative braking;
The process of wheelie prevention by coordinated propeller thrust with wheelmotor traction control and active landing gear to avert wheelies on take-off;
The process of coordinated propeller drag or reverse thrust to shorten landing roll;
The emergency locator transmitter on all SkyQarts;
The rooftop heli-hook(s) (3) at the ballistic recovery system attachment hard-points for in-water rescue of the entire SkyQart after ditching;
The overlapping of wingtips of SkyQarts I, II and III during docking;
The SkyQart III capacity of a total of two laden EPCs;
The closed flotation system wherein all unoccupied hollows or wing bays on the SkyQart are either foam filled or water-tight for flotation buoyancy. (It can become its own life raft);
The flotation module #1;
The flotation module #2;
The extended cargo AFP
The precise, 4D, steep and banked curvilinear climb-outs and landing approaches known as curved traffic patterns flown by SkyQarts to reduce noise and, thereby, SkyNest parcel size; and The cadenced coordinated operations at SkyNests to maximize system capacity.

The SkyNest Dock Standards include a 47 cm dock height, or height of the dock surface. The dock height requires the adoption of a standard because it is deterministic of several other dimensional magnitudes in the System for Fire Suppression by Autonomous Air and Ground Vehicles system. Alternative embodiments of the dock standards have a dock height within a conceivable range of about 41 cm or more, about 44 cm or more, about 50 cm or more, about 61 cm or more or any value between and including the dock height values provided, while it is preferred that the nominal interoperable dock height be 47 cm with a preferred range of 45-50 cm because this provides a height low enough to fit a SkyQart's low-set cabin floor height (which is essential to its short take-off capability without wheelies) and to allow an adult human to climb up onto the dock as needed, while still being high enough to provide room underneath the dock for battery swapping equipment, service bays and parked main landing gear tires. The under-dock service bay is large enough to contain robotic battery swapping using SBP drawer slides and battery charging racks. The dock surface height may be effectively the same as the cabin floor height when the SkyQart is docked on the aircraft docking pavement, and the same as the height of the surface deck of the autonomous robotic delivery cart, when parked on the cart docking pavement, to enable an autonomous robotic electric payload cart to roll between the dock surface and the cabin floor of said SkyQart and between the surface deck of said autonomous robotic delivery cart and the dock surface. Effectively the same height, as used herein, preferable means that the heights of two surfaces are within about 15 mm or less of each other, and more preferably within about 10 mm or less, and even more preferably within about 5 mm or less of each other and most preferably within about 2 mm or less of each other. The less difference in the height of surfaces will produce less vibration when the autonomous robotic electric payload cart rolls from one surface to the other. The nominal interoperable dock width is 7.47 m. Alternative embodiments of the dock width have a width within a conceivable range of about 6 m or more, about 9 m or more, about 12 m or more or any value between and including the width values provided, while it is preferred that the nominal interoperable dock width be 7.47 m with a preferred range of 7-8 m as this provides sufficient room for bi-directional walkways that preserve social distancing, along with adequate width for under-dock service bays and for EPC carts to safely maneuver on the dock surface, with a dock width that is still small enough to limit land parcel size and expedite passenger throughput.

The battery charging rack under the dock for robotic battery swapping.

The robotic battery swapping underneath the dock using a specialized robot arm that can swap an SBP in a SkyQart in under 1 minute and nominally in only 10 seconds.

The abbreviations and conversions used for the units specified herein are as follows:

Dimensions: 2.54 centimeters=2.54 cm
1 meter=1 m
1 millimeter=1 mm
1 kilometer=1 km
1 square meters=1 sq m
1 kilometer per hour=1 km/hr
1 G=9.81 meters per second squared=9.81 m/sec$^2$
1 hectare=1 ha
1 kilogram=1 kg
1 kilowatt-hour=1 kWh=energy equal to 1000 watts for 1 hour
1 kilowatt=1 kW=1000 watts
1 kilopascal=1 kPa
4.45 Newtons=4.45 N
3.4 meters per second cubed=3.4 m/sec$^3$
rate or velocity in meters per second: 1 m/sec
1 decibel of noise on the A-weighted scale=1 dBA The Axisymmetric Fuselage Pod (AFP)

The axisymmetric fuselage pod (AFP) is an important component to this invention because its shape enables three key capabilities of the SkyQart aircraft used in the System for Fire Suppression by Autonomous Air and Ground Vehicles system; longer flight range, higher cruise speeds and rapid loading and unloading of payloads. The AFP is a streamlined shape with a nominal interoperable 160.02 cm (range is from 125 to 180 cm) maximum outside diameter. Alternative embodiments of the AFP have a maximum outside diameter within a conceivable range of about 125 cm or more, about 150 cm or more, about 180 cm or more or any value between and including the diameter values provided, while it is preferred that the AFP diameter be the nominal interoperable size of 160.02 cm with a preferred range of 150-165 cm because this provides sufficient room for passengers, common cargo, fire-retardant tank, battery pack and active landing gear while being small enough to minimize wetted area drag, weight, and cost. The AFP shape has a nominal 2.93 to 1 fineness ratio of length to width, giving the embodiment as presented herein a total length, $L_f$, of 4.69 m. It is a body shape whose computational fluid dynamics predict a very low form drag and it serves as the fuselage and cabin of each SkyQart. To minimize drag and maximize range for the SkyQart, the size of the AFP is chosen as the smallest that can adequately and comfortably enclose the most common types of payloads that need to be carried in QUAD. Those most common types of QUAD payloads are expected to be two adult people seated side-by-side or a cargo whose maximum horizontal dimensions are 121.92 cm by 243.84 cm. The rear portion of the AFP forms a hatch that is effectively a door that opens on a sturdy hinge and swings 90° to the side and upward at an 18° angle. With the nominal interoperable 2.54 cm wall thickness of the AFP, the open hatch provides a large, 151.7 cm opening that allows rapid loading and unloading at the dock of EPCs laden with various types of payloads. Alternative embodiments of the AFP have a wall thickness within a conceivable range of about 1.27 cm or more, about 2 cm or more, about 3.81 cm or more or any value between and including the thickness values provided, while it is preferred that the wall thickness be the nominal interoperable 2.54 cm with a preferred range of 2-3.5 cm because this provides a preferred combination of strength, low weight, industry sizing compatibility, hatch opening size and internal space. The AFP's hatch opening also exposes a DC fast-charger interface plug that can be used for recharging the SkyQart's swappable standard battery pack (SBP). The rear portion of the AFP fuselage aft of the hatch also serves as a floatation device. Where possible, its internal volume, like that of other empty volume spaces in the SkyQart, is sealed and filled with buoyant rigid closed-cell foam. The sealed foam in the rear hatch is divided into three compartments, two of which are removable modules that, when removed, can provide additional space for passenger seats to recline or for outsized baggage, cargo or fire-retardant tank. Flotation module #1 is nominally 55.9 cm L×114.3 cm H×122 cm W. It is nominally 122 cm wide at the fuselage waterline of the seat armrests, narrowing to 101.6 cm wide at the shoulder waterline. These dimensions change for alternative embodiments within the size ranges given for the AFP. The bottom of module #1 is at the waterline of the cabin floor of the SkyQart. Module #1 fits into the rear hatch in a recess in the upper front surface of flotation module #2. The absence of this module #1 offers an empty volume of space that is large enough to contain the larger cargo that occurs when carrying fire-retardant. The other removable flotation module, module #2, is much larger and is removed when carrying an EPC loaded with outsized, extra-long cargo. It has a carve-out on its forward face that exactly fits the shape of module #1 and provides a small strap fastener for joining module #1 to module #2. Excepting the volume of module #1, the volume of module #2 completely fills the interior volume that extends 96.52 cm aftward into the rear hatch from the hatch opening. All other internal volume space of the rear hatch, excluding that of Module #1 and Module #2, is likewise sealed and filled with buoyant rigid closed-cell foam.

The rear hatch of the pod can be displaced aftward by the insertion of a nominal 60.96 cm length of cylindrical fuselage extension to create a larger AFP with enough space to carry standard building materials. A special cargo hauling attachment that is a latching rack that pin-latches to the EPC's seat-latching tracks or several other cargo hauling attachments for other types of cargo can pin-latch to the EPC's seat-latching tracks. The surface of the special rack is a nominal 30.5 cm above the EPC's deck surface so that, when the payload is securely strapped to this rack, it will be in an axial position inside the cargo AFP that offers a space of maximum length for the 365.8 cm long lumber.

The axisymmetric fuselage pod's scalable surface coordinates, relative to the total length, $L_t$ of its central axis, are given in the Table 1, below, and are designated as the fractions $X/L_t$ and $Y/L_t$. The parameter X/Lt is the longitudinal coordinate given as a fraction of the total length, $L_t$. The parameter $Y/L_t$ is the vertical or thickness coordinate given as a fraction of the total length, $L_t$. It will be noted that the diameter of the AFP, at any point $X/L_t$ along its central axis where Y/b, is known, is therefore equal to $(2 \times Y/L_t) \times L_t$. An example of this calculation of the diameter of the present standard embodiment, taken from Table 1. below, is that where $X/L_t=0.471$ and $Y/L_t=0.169$ and $L_t=4.69$ m, the diameter at that longitudinal station of the AFP will be $(2 \times 0.169) \times 4.69$ m=1.585 m.

TABLE 1

Axisymmetric Fuselage Pod Surface Coordinates

| $X/L_t$ | $Y/L_t$ |
|---|---|
| 0.000 | 0.000 |
| 0.000 | 0.002 |
| 0.001 | 0.006 |
| 0.001 | 0.010 |
| 0.003 | 0.014 |
| 0.006 | 0.020 |
| 0.010 | 0.025 |
| 0.014 | 0.031 |
| 0.017 | 0.034 |
| 0.023 | 0.039 |
| 0.029 | 0.044 |
| 0.034 | 0.048 |
| 0.040 | 0.052 |
| 0.046 | 0.055 |
| 0.057 | 0.062 |
| 0.069 | 0.068 |
| 0.080 | 0.073 |
| 0.092 | 0.078 |
| 0.103 | 0.083 |
| 0.115 | 0.087 |

TABLE 1-continued

Axisymmetric Fuselage Pod Surface Coordinates

| $X/L_t$ | $Y/L_t$ |
|---|---|
| 0.126 | 0.091 |
| 0.138 | 0.096 |
| 0.149 | 0.099 |
| 0.161 | 0.103 |
| 0.172 | 0.107 |
| 0.184 | 0.111 |
| 0.195 | 0.114 |
| 0.207 | 0.118 |
| 0.218 | 0.121 |
| 0.230 | 0.124 |
| 0.241 | 0.128 |
| 0.253 | 0.131 |
| 0.264 | 0.134 |
| 0.276 | 0.137 |
| 0.287 | 0.140 |
| 0.299 | 0.143 |
| 0.310 | 0.145 |
| 0.322 | 0.148 |
| 0.333 | 0.150 |
| 0.345 | 0.153 |
| 0.356 | 0.155 |
| 0.368 | 0.157 |
| 0.379 | 0.159 |
| 0.391 | 0.160 |
| 0.402 | 0.162 |
| 0.414 | 0.164 |
| 0.425 | 0.165 |
| 0.437 | 0.166 |
| 0.448 | 0.167 |
| 0.460 | 0.168 |
| 0.471 | 0.169 |
| 0.483 | 0.170 |
| 0.494 | 0.170 |
| 0.506 | 0.171 |
| 0.517 | 0.171 |
| 0.529 | 0.170 |
| 0.540 | 0.170 |
| 0.552 | 0.170 |
| 0.563 | 0.169 |
| 0.575 | 0.169 |
| 0.586 | 0.168 |
| 0.598 | 0.167 |
| 0.609 | 0.166 |
| 0.621 | 0.164 |
| 0.632 | 0.162 |
| 0.644 | 0.160 |
| 0.655 | 0.158 |
| 0.667 | 0.155 |
| 0.678 | 0.151 |
| 0.690 | 0.147 |
| 0.701 | 0.143 |
| 0.713 | 0.138 |
| 0.724 | 0.133 |
| 0.736 | 0.127 |
| 0.747 | 0.121 |
| 0.759 | 0.115 |
| 0.770 | 0.108 |
| 0.782 | 0.101 |
| 0.793 | 0.093 |
| 0.805 | 0.086 |
| 0.816 | 0.078 |
| 0.828 | 0.071 |
| 0.839 | 0.064 |
| 0.851 | 0.057 |
| 0.862 | 0.051 |
| 0.874 | 0.045 |
| 0.885 | 0.040 |
| 0.897 | 0.035 |
| 0.908 | 0.030 |
| 0.920 | 0.025 |
| 0.931 | 0.021 |
| 0.943 | 0.017 |
| 0.954 | 0.014 |
| 0.966 | 0.010 |
| 0.977 | 0.007 |
| 0.983 | 0.006 |

TABLE 1-continued

Axisymmetric Fuselage Pod Surface Coordinates

| $X/L_t$ | $Y/L_t$ |
|---|---|
| 0.989 | 0.005 |
| 0.994 | 0.005 |
| 0.997 | 0.005 |
| 1.000 | 0.005 |

The smoothly curved continuity of the AFP's stressed composite skin is interrupted only for the openings for the rear hatch, the nosewheel landing gear well, the two main landing gear trunnion pillow block bearings, the rooftop monostrut attachment opening, the two windscreens and the two large circular side windows, which also serve as emergency exits. An alternative rear hatch with a flanged cover over an exit orifice for dropping fire-retardant is fitted when necessary. All openings are kept as small as possible to maintain the strength and smoothness of the AFP. The edges and gaps of all openings are faired to smoothly continue the AFP's external shape and their gaps are made as narrow as possible. Embedded into the nominal 2.54 cm thick composite sandwich that comprises the skin of the AFP are several reinforced carbon fiber ribs, bulkheads, spines, stringers, ribs and longerons, and these have a cross-sectional shape that is either tube-shaped or a hat-section wherein each has flange-like extensions to serve as load-spreaders. The midline longitudinal roof spine that separates the two windshields is a nominal 8.9 cm in width, and it has a material thickness that bears major structural loads imposed by the nosegear and AFP rooftop monostrut main wing attachments. The AFP also has a mid-fuselage circular circumferential structural bulkhead that is embedded into the skin of the AFP and that reinforces its floorboards and its other spines, stringers, longerons and bulkheads, while also spreading the loads from the forward wing attachment onto the roof of the AFP. There is a diagonal embedded bulkhead that joins the lower portion of the mid-fuselage bulkhead to the more aftward circular hatch door bulkhead and spreads the loads from the main wing attachment on the roof of the AFP to the AFP's lower and forward structures. There is a long horizontal longeron that joins the rear bulkhead to the middle, diagonal and forward bulkheads and stiffens the side of the AFP. This long horizontal longeron on each side of the AFP includes a load-distributing hardpoint whose bushing provides for attachment of the shear bolt at the lower end of an optional diagonal wing strut that is used when carrying heavier payloads such as fire suppression modules filled with fire-retardant. The circular rear bulkhead of the AFP stiffens its rear hatch opening and dissipates loads from both the wing and the main landing gear. The reinforced monostrut attachment points and other hard-points are molded into the composite structure of the AFP at the time of its manufacturing and cure, and they each have several smaller reinforced micro-ribs radiating outward from them in order to more widely spread the attachment loads organically onto the walls of the AFP. Some of the ribs, roof spine, bulkheads and longerons are structural items that may have wiring harnesses embedded inside them with outer shielding of those harnesses that dissipates and diffuses lightning and radio frequency interference (RFI) energy away from critical structures and components. In some embodiments, some of these structural items in the walls of the AFP contain flight control cables. The port and starboard side of the AFP each have a circular cabin side window of a nominal interoperable 71.12 cm diameter that serves as an emergency escape exit in accordance with FAR 23.807. Each emergency exit window has a window frame that is a structurally reinforced ring that itself serves as a bulkhead that adds to the strength and shape integrity of the AFP. The window frame on the AFP has a smoothly rounded cross-section so that it can safely serve as an emergency exit. The circular windows themselves are made of clear acrylic or polycarbonate and are of a nominal thickness of 4.76 mm. Each window has an internal perimeter flange that closely fits the window frame and that ensures that the window cannot be pushed or sucked out of the AFP at any time. The perimeter flange is indexed with dowel pins to ensure that the window is always correctly installed on the window frame. There are a number of finger-grip recesses in the internal surface of the window's perimeter flange to facilitate gripping and pulling the window inward toward the SkyQart's cabin in the event that it is to be used as an emergency exit. Before doing so, the thin peelable sealing tape that seals the perimeter flange of the window to the inner wall of the AFP needs to be manually stripped away, and this can be readily performed by a person of ordinary strength and dexterity. Peeling this tape is facilitated by the provision of small grip rolls at the ends of the tape. Both the window perimeter flange and the window frame are equipped with specially located narrow grooves that run entirely around the circle of the window and that engage the flexible nipples on the extruded external rubber seal that is pressed into the external gap between the window and the window frame. This rubber seal is pressed or lightly glued in place such that its edges form a flush interface with the external contour of the AFP. Both this rubber seal and the internal sealing tape on the window flange serve to secure the window to the aircraft and prevent air leaks around its perimeter. Both the rubber seal and the sealing tape are replaceable are both are designed to allow easy removal of the window in case of an emergency. In extreme emergencies, the circular window can be removed by forcibly pushing or kicking it inward toward the cabin from the outside of the aircraft.

Using EPCs, the interior of the SkyQart can accommodate a variety of payloads. The EPC is configured to fit inside the AFP even when it carries one, two or three seats with small, accessible baggage containers suited to the number of seats. Alternatively and with modified cargo hauling attachments, the EPC is fitted to carry a med-evac litter[4], a wheelchair, scooter, folded bicycles, generator, a pair of 208.2 liter (55-gallon) drums, lumber, plywood, sheetrock, solar panels, fuel cans, pets in cages or kennels or various sizes of cargo bins. Alternatively, the EPC is fitted inside the AFP when the EPC is fitted to carry a fire suppression module, which converts said EPC to an EPC-F.

The SkyQart I and SkyQart II and their Variants

The SkyQart I and II are important components to this invention. They are specialized, standardized small fixed-wing aircraft expressly designed for the QUAD system to provide efficient hauling of the most common types of payload across distances of from as little as 16 km to more than 220 km. Their size, docking connections, power, speed, and short paved surface capabilities are chosen as workable standards to fit the processes and dimensions of the QUAD transportation system. Their core mission requirements are nominally:

a SkyQart that takes off within 43.9 m (144 feet) of its point of brake release at sea level in zero wind. Alternative embodiments of the SkyQarts have a take-off distance within a conceivable range of about 0 m or more, about 35 m or more, about 52 m or more, about 68 m or any value between and including the said distances provided, while it is preferred that the take-off distance be the nominal interoperable 43.9 m with a preferred range of 40-50 m because this provides a combination of tolerable G forces, low noise emissions, safe lift-off speeds and SkyNests that comprise small land parcels.

a SkyQart that has a cruise flight airspeed of at least 193 km/hr at an altitude that is less than or equal to 914.4 m (3000') above mean sea level. Alternative embodiments of the SkyQarts have a cruise speed within a conceivable range of about 140 km/hr or more, about 210 km/hr or more, about 240 km/hr or more, or any value between and including the cruise speeds provided, while it is preferred that the cruise speed be the nominal interoperable 193 km/hr with a preferred range of 180-225 km/hr as this provides a preferred combination of short paved surface capabilities, reduced land parcel size, improved energy efficiency, enhanced range, manageable power requirements and air traffic coordination.

a SkyQart that has a flight range of at least 193 km with 10-minute reserve. Alternative embodiments of the SkyQarts have a flight range within a conceivable range of about 100 km or more, about 170 km or more, about 240 km or more, or any value between and including the maximum range values provided, while it is preferred that the nominal interoperable maximum range be ≥193 km with a preferred range of 140-200 km because this provides a workable compromise in terms of safety, minimizing battery swaps, minimizing battery pack weight, extending ridership possibilities, improving ride quality and reducing aircraft docking station size requirements.

a SkyQart whose maximum rate of climb at gross weight is at least 9.14 m/sec at an indicated airspeed of 24 m/sec at sea level. Alternative embodiments of the SkyQarts have a maximum rate of climb within a conceivable range of about 6 m/sec or more, about 8 m/sec or more, about 10 m/sec or more, about 12 m/sec or more or any rate between and including the maximum rates provided, while it is preferred that the maximum rate of climb be ≥9.14 m/sec with a preferred range of 8-10 m/sec because this, along with curved traffic patterns, provides a sufficiently rapid gain of height to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

a SkyQart whose maximum take-off noise emission is ≤55 dBA LAeq, 5 s as measured at 1 m height above ground level at a 40 m distance along any radius extending outward from the midline of the aircraft's nose. Alternative embodiments of the SkyQarts have a maximum take-off noise emission within a conceivable range of about 42 dBA LAeq, 5 s or less, about 48 dBA LAeq, 5 s or less, about 57 dBA LAeq, 5 s or less or any value between and including the maximum levels provided, while it is preferred that the maximum level be the nominal interoperable level of 555 dBA LAeq, 5 s with a preferred range of 50-57 dBA because this offers the best compromise in the power, thrust, propeller diameter and RPM needed while minimizing the size of the SkyNest land parcel necessary to contain the acceptable noise sphere.

a SkyQart that can carry an EPC that has one or two seats, each of which has a capacity of 120 kg or more.

a SkyQart that can carry an EPC that has three seats, each of which has a capacity of 91 kg or more.

The nominal embodiments of the SkyQart I and II presented herein each are 6.7 m long and have a nominal interoperable wingspan of 10.97 m. Alternative embodiments of the SkyQarts have a wingspan within a conceivable range of about 8 m or more, about 10 m or more, about 12 m or more, about 14 m or more or any value between and including the wingspans provided, while it is preferred that the wingspan be the nominal interoperable 10.97 m with a preferred range of 10-12 m because this provides a manageable wing weight and ride quality, an efficient aspect ratio and maximum glide ratio, a sufficiently rapid gain of height to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

The SkyQart I and II each have a nominal interoperable wing area of 11.44 sq m. Alternative embodiments of the SkyQarts have a wing area within a conceivable range of about 10 sq m or more, about 12 sq m or more, about 14 sq m or more, about 16 sq m or more or any value between and including the wing areas provided, while it is preferred that the wing area be the nominal interoperable 11.44 sq m with a preferred range of 11-13 sq m because this, along with the high lift coefficient of the SkyQart's fast flap system, provides a low enough stall speed without demanding excessive amounts of wetted area drag, installed power or excessive noise, and this enables the ESTOL performance that helps to keep the SkyNest land parcels small enough to enable them to be sited with high proximity to where people and goods needs to go.

The SkyQart I and II each have a nominal interoperable maximum gross weight of 857 kg. Alternative embodiments of the SkyQarts have a maximum gross weight within a conceivable range of about 800 kg or more, about 900 kg or more, about 1050 kg or more, about 1250 kg or more or any weight between and including the maximum gross weights provided, while it is preferred that the maximum gross weight be the nominal interoperable 857 kg with a preferred range of 840-900 kg because this provides a sufficiently rapid gain of height during climb-out to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

a SkyQart that has a 20° forward sweep in the trailing edge of its vertical tail.

a SkyQart that has a main wing aspect ratio of 10.525:1. Alternative embodiments of the SkyQarts have a wing aspect ratio within a conceivable range of about 8 or more, about 12 or more, about 14 or more or any aspect ratio between and including the aspect ratios provided, while the nominal interoperable aspect ratio of 10.525:1 is preferred with a preferred range of 10:1 to 12:1 because it provides an energy efficient airframe with reduced induced drag and a manageable wing weight, and reduces the demand for climb power and thereby averts excessive noise.

a SkyQart that has a main wing that has double-slotted flaps of large span.

a SkyQart that has a trailing edge of the main wing that is swept forward by a nominal 8.2° with a nominal 142.3 cm wing chord at the fuselage midline.

a SkyQart that has a nominal wing chord that tapers to 140.3 cm at the flap root, where the nested flap segments occupy a nominal chord length of 45.8 cm.

a SkyQart that has a total flap span that is a nominal 71.82% of the total wingspan.

a SkyQart that has its mid-point of the range of acceptable e.g.s located nominally at the fuselage station (FS) 200.6 cm.

Alternative embodiments of the SkyQart I and II have measurements that are different from these nominal ones given herein, and those differences may or may not be made compatible and interoperable with the other components of the QUAD transportation system, though component compatibility and interoperability are very important to sustaining such a transportation system.

a SkyQart that has a nominal aileron chord that is 28.96% of the wing chord at the inboard aileron edge.

a SkyQart that has a wing mean aerodynamic chord (m.a.c.) that is nominally 118.5 cm.

a SkyQart that has flaps that, when fully deployed and blown by the propellers, can produce a maximum lift coefficient of ≥4.8. The flaps have their high lift coefficient substantially augmented or reduced on demand by modulating the airflow over the flaps by varying the thrust or drag of the large propellers.

The nominal interoperable height of the AFP belly skin above ground level is 21.6 cm. Alternative embodiments of the SkyQarts have a belly height above ground level with a conceivable range of about 17 cm or more, about 23 cm or more, about 30 cm or more or any height between and including the belly heights provided, while it is preferred that the belly height be the nominal interoperable 21.6 cm with a preferred range of 18-24 cm because this provides a low center of gravity to avoid wheelies on take-off while providing sufficient height to allow a long travel of the landing gear, a workable dock height and enough space for the swappable standard battery pack (SBP) to be carried below the SkyQart's cabin floor. The standard cabin floor height is 47 cm above ground level, which matches the preferred standard dock height of the upper surface of the SkyNest docks. These standard dimensions for belly height, cabin floor height and dock height are deterministic for other components including the tire and wheel fairing height, dock height, seat height, cabin headroom, elbowroom, rear hatch swing clearance, main landing gear trunnion pillow block bearing track width, EPC track width, resistance to wheelies, and other component parameters. This means that if the AFP cabin floor height is changed in alternative embodiments of the SkyQarts, then the dimensions of all of these other interoperable components will be compelled to also change. These interdependencies of these components clarify and emphasize the need for the nominal interoperable QUAD transportation system to provide herein a set of 'just-right' standards that are internally consistent, mutually compatible, and scaled to fit the $95^{th}$ percentile of human needs.

To make room for the size of a standardized battery pack (SBP) with sufficient energy for the SkyQart's performance envelope, the top surface of the cabin floor of the SkyQart is nominally located 25.4 cm above the lowest point on the belly skin of the AFP.

The wing chord at the SkyQart I and II ailerons outer edge is nominally 52.5 cm. The aileron chord at its outer edge is nominally 14 cm, which is 26.48% of wing chord at that station. The aileron chord at its inner edge is nominally 24 cm, which is 28.96% of wing chord at that station. The main wing trailing edge has a nominal 8.14° angle of forward sweep.

The SkyQart's tail height is nominally 400.1 cm tall. The tall tail offers improved headroom at the ramp/dock area underneath the tail, and ensures that the autonomous robotic electric payload cart (EPC) can operate on the dock without bumping heads of passengers on the empennage of the SkyQarts docked there. In addition, the tall tail offers a large wetted area above the wing that helps balance the drag of the wetted area of the AFP below the wing. The SkyQart's pod-shaped fuselage, the AFP, has a nominal outside diameter of 160.02 cm and a fineness ratio of 2.93:1. Its shape coordinates are chosen for very low drag and its autonomous rear hatch opening facilitates rapid loading and unloading of the EPC. Interference drag is minimized by having the cantilevered wing attach to the AFP using a molded-in large surface spar extension that attaches in a removable fashion to the streamlined midline mono-strut of the AFP. The monostrut is important to the low drag of the SkyQart's fuselage pod. The monostrut uses a GOE 460 airfoil shape, which is symmetrical. This airfoil is truncated at its trailing edge to reduce wetted area. This airfoil is selected because its footprint onto the pod roof is one that rapidly grows in width and maintains good width across most of its attachment zone to the pod roof, thereby giving a strong broad base for the attachment of the AFP via the monostrut to the wing's lower surface. The leading edge of that footprint extends along the midline of the AFP, forward of the main wing's leading edge, to a point that intersects the AFP's outer skin at a reinforced point that is nominally just 2.54 cm aft of the rear edge of the windshields. The GOE 460 airfoil is deliberately chosen because it is a thick airfoil in order to broaden and strengthen the monostrut attachment to the pod and to the wing. An alternative way to strengthen the attachment of the AFP to the main wing is by the addition of diagonal wing struts. Such diagonal wing struts are commonly used on the familiar Cessna 172, for example. Such diagonal wing struts can reduce wing weight while imposing a penalty on drag. Diagonal wing struts are not used on the nominal embodiments of the passenger and cargo SkyQarts presented herein. However, they are routinely used on the heavier versions of the SkyQart that are modified for use in fire suppression, namely the SkyQart I-F, SkyQart II-F, SkyQart III-uF and SkyQart III-dF. All of the fire suppression SkyQarts, that have said -F designation, are also modified by having their rear hatch include an exit duct and an exit orifice for fire-retardant, as described below. Said diagonal struts are used as well as on some other alternative embodiments of SkyQarts that are still encompassed by this patent. When used, there is one diagonal wing strut on the starboard wing and one on the port wing. Each of these has an airfoil shape to its cross section and has its upper end attach to the main wing spar through an opening in the lower surface of the wing. That strut has its lower end attach structurally to a hardpoint designed for the purpose and located along the main longeron that is embedded into the sidewall of the AFP. The maximum chord of the monostrut GOE 460 airfoil is in that portion near the top of the monostrut, where the airfoil is nominally 36.2 cm thick. At the bottom of the monostrut, the GOE 460 airfoil is nominally 33 cm thick. The GOE 460 airfoil shape transitions into a wider (spanwise) shape as it joins the lower surface of the wing, with fillet radii to reduce interference drag and to increase its grip on the wing structure. This wider shape continues into the tailcone and comprises the forward portion of said tailcone. The tailcone is nominally 63.5 cm wide at the trailing edge (TE) of the wing, and the waterline of the tailcone is positioned to intersect the wing so as to achieve the lower drag attained by a mid-fuselage wing arrangement. The gradual tapering reduction of the tailcone's cross-sectional area begins just aft of the wing trailing edge. At the fuselage station that coincides with the rearmost edge of the rear hatch when the rear hatch is fully opened to 90°, the belly of the tailcone is nominally 198.2 cm above the ground level, enabling a walk-under height adequate even for tall people. When docked, the walk-under height from the dock surface to the lower skin of the tailcone at this same fuselage station is nominally 151.3 cm. This 151.3 cm is a height tall enough to allow even the tallest laden EPCs to drive on the dock underneath the tailcone with more than 25.4 cm clearance.

The wing and empennage can be removed from the axisymmetric fuselage pod for maintenance, repair and replacement. The wing can likewise be removed from the empennage and tail cone at a separation bulkhead in the tailcone just aft of the monostrut.

The propeller disc plane of the SkyQart propellers are both at the nominal fuselage station 81.3 cm aft of the datum, which datum is the external tip of the nose of the AFP. The propeller thrust axis of each propeller is nominally 211.2 cm above the ground. This ensures adequate ground clearance for the propeller blades of nominally 152.4 cm radius and enables the propeller thrust to help reduce wheelies on take-off. The propeller disc plane and ground clearance are different for the propellers on the dual-AFP version named herein as the SkyQart III.

The SkyQart's main landing gear is equipped with wheelmotors that are active in controlling its ground operations including take-off acceleration, speed and positioning. The main landing gear wheelmotors also have a programmable energy regeneration system that provides precise and powerful anti-lock regenerative braking. The main landing gear legs attach to their shared crossbar trunnion through a sturdy dropped arm that ensures that the landing gear legs do not scrape on the underside of the dock during docking. Each main landing gear leg has a programmable electromechanical actuator system that both absorbs landing loads at a precisely controlled rate and controls ride height and fuselage pitch angle. The active main landing gear offers a nominal maximum travel of 65.02 cm from full down to full up, and the programmable absorption utilizes all 63.5 cm on each landing touch-down to provide comfortable landings with no bounce or rebound and with GRACE. Alternative embodiments of the SkyQarts have a maximum landing gear travel within a conceivable range of about 30 cm or more, about 50 cm or more, about 70 cm or more, about 80 cm or more or any value between and including the maximum travel dimensions provided, though it is preferred that the maximum landing gear travel be the nominal interoperable 65.02 cm with a preferred range of 50-65 cm because this provides a long enough distance to gradually reduce the amount of deceleration experienced by passengers during a landing touchdown and keep the leverage forces on the landing gear legs at manageable levels while averting any scraping on the pavement of the belly of the AFP. The controllable sink rate and landing gear travel are temporally coupled with the retraction of the fast flaps and the reversal of propeller thrust to ensure full down force on the main landing gear tires within nominally 0.5 seconds of touch-down, which enables the tires to provide maximum braking action against the pavement.

Each main landing gear tire is nominally 40.6 cm in diameter. Alternative embodiments of the SkyQarts have a main landing gear tire diameter within a conceivable range of about 30.5 cm or more, about 35.5 cm or more, about 42 cm or more, about 46 cm or more or any value between and including the tire diameters provided, while it is preferred that the tire diameter be the nominal interoperable 40.5 cm because this size provides enough size to contain an in-hub wheelmotor and to bear the weight loads involved while still fitting underneath the dock during docking, and in addition is a diameter that is small enough to allow higher RPM of its wheelmotor to provide more efficient power during take-off. Each main landing gear tire has a nominal interoperable width of 12.7 cm. Alternative embodiments of the SkyQarts have a main landing gear tire width within a conceivable range of about 10.16 cm or more, about 14 cm or more, about 20 cm or more, about 25.4 cm or more or any width between and including the tire widths provided, but the preferred tire width is the nominal interoperable 12.7 cm with a preferred range of 10-15 cm because this provides sufficient area to the tire contact patch to apply the power of the wheelmotor during take-off without causing excessive tire noise, weight or frontal drag. The main landing gear track width for SkyQarts I, II and III is nominally 262.36 cm. Alternative embodiments of the SkyQarts have a main landing gear track within a conceivable range of about 220 cm or more, about 280 cm or more, about 300 cm or more or any value between and including the main landing gear track widths provided, while it is preferred that the width be the nominal interoperable 262.36 cm because this provides a width sufficient to straddle the operation of the equipment in the dock service bay, to stabilize the ground operations of the long winged SkyQart in windy conditions and, combined with the position of the SkyQart wingtip, to prevent any possibility of propeller tip ground strike during ground operations. The SkyQart's landing gear wheelbase is nominally 371.1 cm. Alternative embodiments of the SkyQarts have a landing gear wheelbase within a conceivable range of about 250 cm or more, about 350 cm or more, about 450 cm or more or any value between and including the landing gear wheelbase sizes provided, but it is preferred that the landing gear wheelbase be the nominal interoperable 371.1 cm with a preferred range of 320-380 cm because this provides sufficient stability for ground operations and allows the large landing gear loads to be applied on the AFP at its reinforced hard points, while being small enough to limit the weight and drag of the system. These nominal interoperable dimensions change on alternative embodiments if the interdependent components are likewise changed to be compatible. Each main landing gear leg is attached to and pivots on a large trunnion that rotates in the starboard and port main landing gear pillow block bearings which are integrated into the reinforced hard point structure of the AFP at a location just below the cabin floor and just forward of the rear hatch opening. The trunnions for the port and starboard main landing gear legs interdigitate in a transverse tube to provide load dissipation. The trunnion axis is nominally 50 cm above ground during docking. Each main landing gear leg can swing through an arc of nominally 64° in normal operation, which provides a diagonally aftward travel of the center of the tire contact patch of 79.8 cm and a vertical travel of nominally 65.02 cm. Each landing gear leg is rigidly attached to a trunnion that has a lever arm at the main landing gear pillow block bearing on the side of the pod, which arm operates along an arc fore-aft just inside the wall of the AFP's cabin area. The lever arms, in turn, are attached to an electrically controlled landing gear actuator that can precisely position the main landing gear leg at any position along its 64° arc of operation. There is a precise and required position for the main landing gear leg during each of these operations: taxiing, take-off, cruise flight, landing approach, docking, and maintenance. During landing approach, the landing gear is positioned at the full down position and upon touch-down, its shock absorbing motion is precisely controlled by the fast-acting actuator to ensure tolerable jerk rates for the aircraft and occupants and to take full advantage of the relative long travel for the gradual absorption of landing loads.

In the SkyQart, the main landing gear wheel fairings must reduce drag as much as possible while still being able to accommodate the very long 64° travel of the landing gear leg without striking the pavement on initial touch-down. Due to alignment when the landing gear is in the full down position during landing approach, it is necessary to truncate the aft portion of the wheel fairing so that it will not strike the ground upon landing. The wheel fairing shape is derived from a scaled-down low-drag version of the AFP of the SkyQart. The wheel fairing is clocked onto the landing gear leg so that its drag is minimized with the landing gear in the fully retracted position for cruise flight. The highly tilted angle of the wheel fairing when the landing gear is in the full-down position will increase total drag and this is intended to enhance the aircraft's capability for making steep landing approaches that minimize community noise impacts. Some versions of the wheel fairing have hinged rear portions that fair with the forward section during cruise flight, but that are actuated to retract upward to increase drag during final approach.

The Qusheat ride control seat is an electro-mechanically actuated cushioned seat that is used as standard equipment in all SkyQarts to enhance ride quality for passengers. Similar to the technology of noise-cancelling headsets, the Qusheat ride control seat has a pro-active anticipatory electro-hydraulic actuator that counter-acts the accelerations caused by gusts from turbulence that would otherwise create an uncomfortable or bumpy ride. It is an integral part of the passenger seats used in many but not all SkyQarts.

Standard human dimension[5] along with commonly accepted guidelines for business class airline seating were used to size the seating space inside the SkyQarts. The seats are sized so as to allow each seat to have port and starboard armrest. A retractable lightweight, thin but rigid, translucent plastic sheet between the side-by-side seats can be fitted onto the EPC to serve as personal protective equipment and/or to enhance privacy for passengers. The bottommost part of the passenger's seated torso is nominally 16.5 cm above the EPC surface with the seat foam compressed. From this bottommost par of the passenger's torso seated on the EPC inside the AFP, a 97.8 cm diagonal dimension to the top of the passenger's head provides the space necessary for a 188 cm tall man of 95th percentile height to have adequate cabin headroom inside the SkyQart. Alternative embodiments of the SkyQart that use larger or smaller diameter AFPs will need their cabin floor and EPC seat dimensions to preserve this 188 cm in order to provide adequate headroom for the 95$^{th}$ percentile of the population and thereby serve the general public's transportation needs.

The SkyQart's automatic rear hatch opens autonomously just prior to the loading and unloading of the SkyQart during docking. The SkyQart's cabin floor is equipped with shallow grooves to help guide an EPC's tires into the correct latching positions. The cabin sidewalls of the AFP are reinforced at the locations of the four solenoid-actuated latching pins that secure the laden EPC to the cabin structure, so that said solenoids can be securely structurally mounted to the AFP. During the loading of an EPC into or out of the SkyQart at the dock, the SkyQart's cabin floor height is maintained in alignment with the dock height by both the active main landing gear and by a set of solenoid activated shear pins that extend from the dock face into the aft face of the floorboard of the SkyQart.

The portion of the AFP aft of the rear hatch opening is a foam filled flotation device with removable modules of foam to allow different internal volume space. This comprises one component of the closed flotation system.

When any SkyQart I, II or III is modified to become a -F designation and converted to be used for fire suppression, its rear hatch is modified by the installation of an exit duct that is attached with quick-connect fasteners to a flange around the perimeter of an exit orifice that is present on the lower external skin of the AFP. Said exit orifice on passenger and cargo SkyQarts is normally sealed shut by a flush-fitting contoured cover plate that is fastened to said flange with quick-connect fasteners. When the rear hatch is closed, the forward or leading edge of said exit duct fits snugly into and seals with the trailing edge of the discharge duct of a fire suppression module when said module is carried on an EPC that is pin-latched inside a SkyQart at its nominal standard location.

The nominally 18° tilt-up angle of the rear hatch clears the dock surface and landing gear. The front of the rear hatch has a nominal interoperable outside diameter of 156.8 cm which, with its 2.54 cm thick walls affords a 151.7 cm inner diameter opening for loading payloads. The rear hatch opens on a nominally 20.3 cm long hinge upward at an 18° angle, toward the left wing, such that the hatch clears the main landing gear (including the wheel fairing) and clears the dock surface as well as the lower surfaces of the tailboom, and wing trailing edge. Its opening swing also clears the inboard flap hinge fins, which have to be placed nominally 57.3 cm outboard of the flap root in order to not obstruct the hatch movement. The rear hatch forward edge in the nominal SkyQart AFP is at fuselage station (FS) 278.9 cm, as measured from the datum that is the external forward-most tip of the nose of the AFP. This location of the hatch is chosen because it offers a large opening for loading and because it places the seam of the hatch aft of the smooth forebody of the AFP so as to preserve its low drag coefficient.

The SkyQart I has each of its wingtips tilted upward at a nominal interoperable angle of 8.84° while the SkyQart it has its wingtips tilted downward at a nominal interoperable angle of 11.87°. These different angles for the wingtips enable these two different aircraft to have overlapping wingtips when they park wingtip to wingtip at the dock at the SkyNest. Angles smaller than 8.84° or larger than 11.87° may be used, but those alternative embodiments would adversely affect either wingtip clearances or aircraft spiral stability, respectively.

The wing leading edge at the midline of the fuselage is nominally at fuselage station (FS) 179.05 cm where its chord is 142.3 cm. Other FS locations could be used in alternative embodiments but would that adversely affect the aircraft's center of gravity, wing attachment structure or propeller tip to cabin clearance dimensions. The main wing uses a unique airfoil shape that is modified from that of the GAW2 airfoil. The lower surface of the wing is a minimum of 30.85 cm above the top skin of the AFP at the midline of the aircraft. Alternative embodiments that use larger or smaller dimensions for this distance between the wing and the AFP could be used in the conceivable range of from 15 to 47 cm, but these would likely entail increases in weight and/or interference drag.

The SkyQart cabin floor during docking is set to a standard 47 cm from the top of its cabin floor to the ground or pavement level. The cabin floor is nominally 2.54 cm thick.

The length of all moment arms used in the computation of the e.g. are measured from the datum, which is at fuselage station (FS)=0.00, and which is located at the external forward-most tip of the AFP.

The ballistic recovery system is packaged in a nominally 71.1 cm×30.5 cm×19.0 cm box and is a rocket-propelled vehicle parachute. The ballistic recovery system weighs a nominal 27.2 kg.

The active main landing gear maintains the height of the cabin floor during loading. The main landing gear legs can move upward so as to squat to lower the fuselage pod belly to just above ground level for off-loading an EPC onto a 244 cm long ramp in cases where no dock is available. The pod belly needs to not touch the ground or pavement during a full jounce movement of both main landing gear, as occurs in hard landings or parachute touch-downs. Keeping the pod belly low down averts wheelies, makes docks less costly, eases off loading, adds stability and enhances ground effect. The pod belly lowermost exterior surface has a nominal interoperable ground clearance of 21.6 cm above ground level during ground operations.

SkyQart windshields are above the mid-fuselage waterline. The windshields have tight seams between their window-frames and the AFP. The nominal measurements for the windshields are as follows: The forward edge of the windshield is at FS 39.2 cm where the pod outside diameter is 69.8 cm. The aft edge of the windshield is at FS 148.2 cm where the pod outside diameter is 137.4 cm. All corners of both windshields have a 5.08 cm radius to avoid stress risers. The two 71.12 cm diameter circular side windows of the AFP serve as emergency exits. Each is held in place by an internal, replaceable, pull-to-remove perimeter adhesive tape strip. Their round shape and inner perimeter frame safe-guard them against being pressed, blown or sucked-out into the nearby rotating propeller tips. The windows each have one or more internal pull grips that enable a passenger of ordinary strength to use his or her fingertips pull the window inward to remove it, after they easily peel away its perimeter adhesive tape strip. The peelable perimeter adhesive tape strip may be made of metal, plastic, duct tape or other material. On the exterior surfaces around these round windows, a customized extruded rubber seal is pressed and lightly glued into the perimeter gap around the circular side windows to produce a flush external skin that helps to preserve the low-drag airflow on the outer surfaces of the AFP.

Using EPCs, the interior of the SkyQart can accommodate a variety of payloads. The EPC can be configured to carry one, two or three seats with small, accessible baggage containers suited to the number of seats. The aft baggage rack limits the seatback recline angle, but this is tolerable for a mass transportation vehicle that typically makes only short-range trips of less than one hour duration. Alternatively and with modified cargo hauling attachments, the EPC can be fitted to carry a med-evac litter, a wheelchair, scooter, folded bicycles, generator, a pair of 208.2 liter (55-gallon) drums, lumber, plywood, sheetrock, solar panels, fuel cans, pets in cages or kennels or various sizes of cargo bins. When an EPC is fitted with a fire suppression module (FSM), said EPC can fit inside the SkyQart AFP, but such a heavier than standard payload requires that the SkyQart be modified by the installation of diagonal wing struts as described above.

A cargo version of the SkyQarts I, II and III can be fitted with a nominally 0.61 m cylindrical extension of its AFP, making it the cargo AFP. That extension firmly attaches with fasteners to the standard AFP's rear hatchline, with flush alignment of the external skin contours of the AFP. The trailing edge of this cylindrical extension is an exact clone of that of the standard AFP, having the same dimensions and fasteners that are at the rear hatchline of the standard AFP. These fasteners provide a sturdy and flush attachment of a standard AFP rear hatch to the aft face of the cylindrical extension to make it a CAFP.

The retractable landing gear in the nose of the laminar pod is a free-swiveling type that provides up to 22.4 cm of nominal interoperable upward travel from its fully extended position. Alternative embodiments of the SkyQarts have a nose landing gear travel within a conceivable range of about 12 cm or more, about 18 cm or more, about 24 cm or more, about 32 cm or more or any value between and including the nose landing gear travel provided, while it is preferred that the nose landing gear travel be the nominal interoperable 22.4 cm with a preferred range of 20-25 cm because this provides a relatively long distance over which to gracefully absorb the vertical loads of landing while keeping the total weight and size of the nose landing gear to a size that can retract and fit inside the nose of the AFP. The nominal interoperable outside diameter of the nose tire is 30.5 cm. Alternative embodiments of the SkyQarts have a nose tire outside diameter within a conceivable range of about 22 cm or more, about 28 cm or more, about 34 cm or more, about 42 cm or more or any value between and including the nose tire outside diameters provided, while it is preferred that the nose tire outside diameter be the nominal interoperable 30.5 cm with a preferred range of 28-34 cm because this provides a size that can bear the anticipated loads on the nose landing gear and that is small enough to fit inside the space available for the retractable nose landing gear in the nose of the AFP.

The horizontal and vertical tail volumes are deliberately larger than those commonly used in order to ensure brisk and agile control under all flight conditions. The Horizontal Tail Volume coefficient for the SkyQart I and II is nominally 0.895 and the Vertical Tail Volume ($V_v$) coefficient is nominally 0.064, when using a nominal wing area of 11.4 sq m and a nominal wing m.a.c. of 188.5 cm with a mid-range e.g. The Vertical Tail Volume coefficient can be expected to act as if it were 0.07 or more due to the end-plate effect of the "T-tail", which enhances the rudder effectiveness, along with the fact that this vertical tail is very tall and thereby operates in undisturbed air. For comparison: the Beechcraft Baron with a large vertical tail has a $V_v$ value of: $16\times22.7/199.2\times38=0.048$, while having nearly the same distance between its two propeller thrust lines.

At the flap root, an 18.6 cm chord distance of exposed flap is visible on the upper surface of the wing. The flaps on each wing have a nominal total span 788.0 cm, which is 71.8% of the exposed wingspan of 1097.3 cm. The inner flap hinges are placed a nominal interoperable 57.3 cm outboard of the flap root in order to clear the swing opening of the rear hatch of the AFP. The cabin floor is nominally 25.4 cm above the lowest point on the pod's external belly skin, which is 21.6 cm above ground level. Interoperability relies upon the dock at all SkyNests being set at a standard of 47.0 cm above ground level.

For comparison, the twin engine Beechcraft Baron's propeller thrust axes are 353.0 cm apart, while the SkyQarts I & II have larger diameter propellers whose thrust axes are nominally 366.4 cm apart.

The SkyQart's rear hatch and tailcone have closed, foam-filled or air-filled flotation spaces that are part of the closed flotation system, as are the other hollow foam-filled spaces in the AFP, wing bays, empennage and tail cone that are unoccupied by equipment.

A Faraday cage surrounds the battery pack in order to safely contain its high voltage in the event of a ditching into water and is part of its fire-resistant enclosure.

The rationale for the SkyQart's T-tail design is derived from extensive aeronautical design considerations. The SkyQart must have a tail that ensures brisk, authoritative pitch and yaw control at all times, most especially during slow flight at or below its 24 m/sec nominal interoperable liftoff and touch-down speeds, when the dynamic pressure is only about 34.2 kg/m$^2$. That means that its tail surfaces must be kept large enough to be effective at low airspeeds, even though that increases wetted area and drag. The potential for asymmetric thrust and yaw during slow flight with one motor inoperative in a twin motored SkyQart demands a relatively large vertical fin and rudder. The need to abruptly execute a nose-up pitch change at just the right moment during take-off, especially in a SkyQart that is taking off downhill, also demands a large and effective horizontal tail, aided in part by a surge in power applied to the active main landing gear wheelmotors to generate a torque that helps produce a desired wheelie-like nose-up pitch attitude at the instant of lift-off.

Using a T-tail on the SkyQart has the benefit of placing substantial wetted area above the thrust line, which can help offset the large wetted area drag that exists below the thrust line due to landing gear and AFP surfaces. At the loading dock, a high T-tail keeps well above the cart movements and heads of passengers and their packages or other items that might otherwise have to duck under a low tail.

T-tails help ensure that the airflow across the vertical and horizontal tail is not 'blocked' or cavitating from upstream turbulent flows coming off of a stalled wing or a windmilling prop. By keeping the elevator up and out of the propeller slipstream, the pitch trim changes that occur with abrupt changes in thrust settings are minimized. Likewise, the T-tail minimizes the irregular or turbulent inflow that can occur at touch-down and in ground effect at high nose-up attitudes due to wing/flap downwashes that strike the ground and then deflect upward into the tail surfaces. Ideally, the forces generated by the tail surfaces are predictably related only to airspeed and control surface deflection angle and NOT to any other secondary effects.

The T-tail confers an 'end-plate effect' to the vertical tail that adds some 5-10% to its effectiveness. Unlike the conventional low-mounted horizontal tail, the high-mounted horizontal T-tail also does not block or blank the upward airflow to the vertical tail during a high angle of attack sink or spin.

The T-tail's disadvantages are that it is heavier and has a more circuitous, complex path for its elevator control cables. This is not a problem when the SkyQart aircraft is fully autonomous with fly-by-wire remote actuators in the tail and needs aft weight increased for e.g. purposes. The weight added by a T-tail can be mitigated somewhat by the structural efficiency of using a laminar flow airfoil of greater thickness to chord ratio (e.g. 15% or more) for the vertical tail, along with larger than usual chords at the points where the surfaces intersect. There have been some instances where the T-tail has been blanked due to the stalled burble airflow coming off the forward wing. The likelihood of that is much reduced when the forward wing is one of high aspect ratio, is far forward of the T-tail, and, when the negligible control latency of autonomous flight ensures that the main wing never allowed to stall. Augmenting elevator authority with a blast of propeller thrust is a benefit for low-set horizontal tails as compared to T-tails, but it also causes weird unpredictability in power induced trim settings, especially during the flare to land. Another T-tail disadvantage is that, being high above the ground, it is more difficult to inspect and service.

The nominal planforms of the tail surfaces are chosen to fit optimum design practices. Low aspect ratio wings (or tails) have the benefit of tolerating higher angles of attack before stall occurs. However, low aspect ratios have more drag and with less span, they extend across a smaller region so that areas blanked by localized stalled airflow could be more of an issue than with a larger span that extends outside the region of blanking. Sweep angles of the tail surfaces can reduce their lift coefficient and drag, but this is a relatively minor ~5% factor if the sweep angles are kept below 15°.

The tailcone length and tail surface area are chosen to comply with reasonable guidelines for the tail volume coefficients, the metrics that predict tail surface effectiveness[6]. A horizontal tail volume coefficient. $V_H$, is computed as:

$V_H = S_H \times L_H / S_W \times$ m.a.c., where $S_H$ is the horizontal tail surface area and $L_H$ is the length or distance from the horizontal tail's aerodynamic center to the aircraft's e.g. location. The horizontal tail's aerodynamic center is conventionally located at 25% of its mean aerodynamic chord. The surface area of the wing is denoted by $S_W$ and the m.a.c is the main wing's mean aerodynamic chord.

The vertical tail volume coefficient, $V_V$, is computed as: $V_V = S_V \times L_V / S_W \times b$ where $S_V$ = vertical tail area, $L_V$ is the diagonal length or distance from the vertical tail's aerodynamic center to the aircraft e.g., $S_W$ is the wing surface area and b is the wingspan. Both $V_H$ and $V_V$ must be larger than usual for the SkyQart, to ensure that it will have sufficient capability in strong crosswind landings and full and brisk control authority during its slow flight modes, landing flare and in steep approaches with windmilling props. The need for larger tail volume coefficients is eased somewhat by the SkyQart having fully autonomous flight controls with negligible control latency. This allows alternative embodiments of the SkyQart to use smaller tail surfaces.

The tail volume coefficients, $V_H$ and $V_V$, for the SkyQarts I and II are scaled in relation to the known values for successful historical twin engine aircraft. $V_H$ for general aviation twin-engine aircraft are in the range of 0.8 to 0.9. The SkyQart I and II have a nominal $V_H$ of 0.895. This value is computed upon an $S_H$ value for the SkyQart I and II of 2.8 sq m and an $L_H$ value of 430.4 cm measured diagonally from the e.g. to 25% of the mean aerodynamic chord of the horizontal tail. The mean aerodynamic chord of the horizontal tail (m.a.c.) is a nominal 75.8 cm.

The SkyQarts I & II nominal wing area, $S_W$, is 11.4 sq m and the wing mean aerodynamic chord (m.a.c.) is nominally 118.5 cm. The leading edge of the wing m.a.c. is located at a nominal 173.9 cm aft of the datum, which is taken as the forward-most point on the external surface of the AFP.

The $V_H$ of both the SkyQart I and II is a nominal 0.895. For comparison, the $V_H$ of the Luscombe is 0.442, and of the Navion is 0.692, while general aviation twins & turboprops have $V_H$ values of 0.8-0.9. For the vertical tail coefficient, $V_V = S_V \times L_V / S_W \times b$, and this computes as 0.0640, where b is 11.0 m, $S_V$ is 2.1 sq m and $L_V$ diagonally is 377.2 cm.

The mean aerodynamic chord of the vertical tail is a nominal 128.4 cm which means that 32.1 cm is the aerodynamic center of the vertical tail.

The horizontal tail airfoil section is the GAW2 with a 12% thickness to chord ratio.

The vertical tail airfoil section is the NACA 63-015A airfoil.

The tire size for main landing gear is nominally a 40.6 cm outside diameter.

Tire size for nose tire is nominally 30.5 cm outside diameter.

The maximum jounce travel for the main landing gear tire from its static position when parked on the paved surface is a nominal 18.5 cm.

The SkyQart wing's lower surface at the aircraft midline is a nominal 30.9 cm above the roof of the AFP. The vertical distance from the thrust line to the roof of the AFP is 29.6 cm. The SkyQart's main wing spar shear-web height at the aircraft midline is nominally 21.3 cm. The main wing's main spar shear web is located at a nominal 32.48% of the wing chord.

The tailcone shape can be one of circular cross-section or slightly oval with the oval's long axis oriented vertically, since the vertical loads on the tailcone are likely much larger than the side loads. The tailcone cross-section must be large enough to contain the elevator and rudder control parts.

The appearance of the tail planform shapes affects the esthetics of the whole aircraft, and they must be proportionate and not outsized to engender confidence in the design.

The nominal interoperable SkyQart I and II each have two propellers that are each mounted on a separate propeller motor that is mounted to a separate nacelle. There is a port nacelle and a starboard nacelle and each nacelle is on an opposite side of the AFP. These nacelles are attached to the leading edge of the main wing. The thrust axes of these two propellers are nominally 3.66 m apart. Alternative embodiments of the SkyQart I and II have a number of propellers with a conceivable range of two to six but the preferred nominal interoperable number of propellers is two. Propeller spinners are both of a nominal 40.6 cm base diameter covering the electrically controlled propeller hubs of the ultra-quiet 7-bladed propellers.

The three-seat variant of the EPC loaded into a SkyQart I or II is intended to be used in the development phase of these aircraft in order to allow the occupant of the front seat to manually pilot a SkyQart as an optionally piloted vehicle (OPA) using conventional stick and rudder type controls. Such manual piloting is anticipated to be the standard for early implementations of QUAD, both for passenger and cargo service, while fully autonomous capabilities are undergoing maturation and certification.

The SkyQart uses a standard of 600 volts for its battery pack whose standard outside dimensions are 8.9 cm H×66.0 cm W×101.6 cm L. This comprises the standard battery pack or SBP for the QUAD system. Alternative sized embodiments of this battery may be used, but that would entail changing the standard dimensions of many other components throughout the QUAD system.

The SBP is mounted just under the SkyQart's cabin floor. It can be easily removed from the SkyQart by sliding it out along its heavy-duty extensible drawer slides[7]. It can also be charged during docking with a DC fast-charge port located at the SkyQart's rear hatch opening. This port engages automatically as the precision positioning system (PPS) positions the SkyQart at an aircraft docking station.

The SkyQart's core equipment requirements, by name, are the following:

an ultra-quiet propeller system with electric hub that offers rapid pitch change an active main landing gear at least two smart, ultra-quiet propellers that also act as spoilers a fast flap system with double-slotted semi-Fowler flaps a solenoid-actuated pin-latching system a networked situational awareness system at SkyNests a precision positioning system with line-following software a Standard Battery Pack (SBP) with a battery management system a landing gear wheelmotors with regenerative braking an AFP: axisymmetric fuselage pod a peelable window frame with two pull-in emergency exit windows an autonomous control system with negligible control latency an automatic rear hatch on the rear portion of the AFP an ELT: emergency locator transmitter a Faraday cage around each battery pack a BRS: ballistic recovery system comprising a parachute for a SkyQart a robotic battery swap system using a robot arm an EPC: electric payload cart a Qusheat ride control seat: Autonomous passenger seats with ride control a closed flotation system, wherein unused volumes in the SkyQart are sealed watertight for flotation a cargo axisymmetric fuselage pod: the optional cargo AFP that gives a 61.0 cm cylindrical extension to the AFP a lightning strike protection (LSP) of embedded metal mesh in the AFP wall a retractable nose wheel landing gear a DC fast-charging port at its rear hatch a lightweight composite airframe a T tail configuration with large tail volume coefficients a forward swept laminar flow main wing a monostrut wing attachment to its AFP an OPA: Optionally Piloted Aircraft controls (stick, rudder, throttle, flaps)

The SkyQart III and its variants

The SkyQart III is an important component to this invention. It is the larger version of the SkyQart. It differs from the SkyQarts I and II in having two identical AFPs, each of which is identical to the AFP used on the SkyQarts I and II except that the starboard AFP in the SkyQart III has its rear hatch open toward the starboard wing tip. The central axes of the AFPs of the SkyQart III are nominally 4.57 m apart in order to fit the equal spacing between the SkyNest aircraft docking stations. A SkyQart III can be configured with both of its wingtips mounted with either an upward tilt of 9.58° dihedral in the case of a SkyQart III-u or with both wingtips mounted with a downward tilt of 11.8° anhedral in the case of a SkyQart III-d, in order to enable compact docking with overlapping wingtips. The version of the SkyQart III that is used for fire-suppression is designated as either the SkyQart III-uF in the case of the uptilted wingtips or the SkyQart III-dF for the version with the down tilted wingtips. Each of said fire suppressing SkyQart III-uF and SkyQart III-dF are further modified by the addition of a pair of diagonal wing struts to each of its AFPs and by the addition of an exit duct and exit orifice to each of its rear hatches. Each of the two AFPs of the SkyQart III-uF or SkyQart-dF are thus attached to the main wing by both the standard midline monostrut as well as by the addition of two diagonal wing struts, one port and one starboard of each AFP. The nominal embodiments of the SkyQart III all have three propellers, each driven by a separate motor on a separate nacelle on the leading edge of the wing. Alternative embodiments of the SkyQart III have a number of propellers with a conceivable range that is three or more, four or more, five or more, six or more or any number between and including the numbers provided, while it is preferred that the number be 3 propellers because this provides low noise with a broad accelerated wake of increased airflow over the wing surface for blowing on the fast flaps, while also limiting the weight and complexity of the aircraft. The SkyQart III and its variants have a nominal interoperable maximum gross weight of 1450 kg. Alternative embodiments of the SkyQart III have a maximum gross weight with a conceivable range of about 1350 kg or more, about 1450 kg or more, and about 2250 kg or more, or any weight between and including the maximum gross weight provided, while it is preferred that the maximum gross weight be the nominal interoperable weight of 1450 kg with a preferred range of 1400-1500 kg because this limits the amount of noise by limiting the amount of installed power needed for a sufficient rate of climb, while preserving a good payload weight and fitting the capacities of the tire sizes used. The SkyQart III has a nominal interoperable wingspan of 15.37 m. Alternative embodiments of the SkyQart III have a wingspan with a conceivable range of about 14 m or more, about 18 m or any wingspan between and including the wingspans provided, while it is preferred that the wingspan be the nominal interoperable 15.37 m because this provides a low span loading that enhances the rate of climb on limited power without undue increases in wing weight, while also limiting the spanwise distance necessary for docking at the SkyNest dock. The SkyQart III-u, III-d, III-uF and IIi-dF have a nominal interoperable wing area of 18.96 sq m. Alternative embodiments of said SkyQarts have a wing area with a conceivable range of about 16 sq m or more, about 19 sq m or more, about 21 sq m or more, any wing area between and including the wing areas provided, while it is preferred that the wing area be the nominal interoperable 18.96 sq m with a preferred range of 18-20 sq m because this provides a low wing loading that reduces both the landing speed and SkyNest parcel size without undue increases in wetted area. The nominal interoperable wing loading of the SkyQart III is 76.5 kg/sq m because this reduces the landing speed without undue increases in wetted area. The fire-retardant versions of the SkyQart III, herein named the SkyQart III-uF and SkyQart III-dF, have a wing loading of up to 116 kg/sq m. The nominal SkyQart III-u, III-d, III-uF and III-dF have a maximum height of 402.8 cm with a horizontal tail area of 4.9 sq m and a vertical tail area that totals 4.28 sq m. These nominal SkyQarts also have a horizontal tail volume coefficient $V_m$ that is nominally 0.926 with a range of 0.8 to 1.1. Its vertical tail volume coefficient $V_V$ is nominally 0.057, with a range of 0.05 to 0.09. These relatively large numbers for tail volume coefficient are so that the SkyQart aircraft can have enough yaw and pitch control authority to offset the large spanwise polar moment of inertial caused by its two axisymmetric fuselage pods as well as to offset its forward center of gravity that inhibits wheelies on take-off. The SkyQart III employs extensive parts commonality with the QUAD system's standard SkyQarts I and II, including its axisymmetric fuselage pods, landing gear, seating, windshields, hatch, battery packs, mono-strut, floorboards, pin-latching system, outboard wing panels, controls, and ballistic recovery system parachutes.

The nominal maximum payload for the nominal SkyQart III is 488 kg, with a limit of 244 kg per AFP. This payload is increased to as much as 1200 kg with a limit of 600 kg per AFP in the SkyQart III-uF and III-dF with their diagonal wing struts. This larger, 1200 kg payload can allow each AFP of the SkyQart III-uF and III-dF to carry up to 567.8 liters (150 gallons) of fire-retardant. The wing tips of the nominal embodiment of the SkyQart III are tilted upward from the horizontal at an angle of 9.58° to enable it to park at the dock of a SkyNest with its wingtips overlapping those of the other SkyQarts I or II. This overlapping provides more room for docking spaces and thereby increases the capacity of the SkyNest.

The SkyQart III-u, III-d, III-uF and II-dF each have a wingspan that is a nominal interoperable 15.37 m which gives a nominal interoperable aspect ratio of 12.46:1, computed as the result of wingspan squared divided by wing area. Alternative embodiments of these SkyQarts have a wing aspect ratio within a conceivable range of about 10 or more, about 12 or more, about 14 or more or any aspect ratio between and including the aspect ratios provided, while the nominal interoperable aspect ratio of 12.46:1 is preferred because it provides an energy efficient airframe with reduced induced drag and a manageable wing weight, and reduces the demand for climb power and thereby averts excessive noise.

The nominal SkyQart III-u, III-d, III-uF and III-dF have 4.91 sq m of horizontal tail.

The nominal SkyQart III-u, III-d, III-uF and III-dF have 2.14 sq m of area on each of its vertical tails, which together combine to provide a total of 4.28 sq m of vertical tail area.

The nominal SkyQart III-u, III-d, III-uF and III-dF have three propellers, each of 3.048 m diameter and each mounted on its own nacelle forward of the main wing. The central of these three propellers is mounted in the midline of the aircraft on a nacelle that attaches to the center section of the main wing. The central propeller has a thrust axis that is nominally 223.0 cm above the ground when the aircraft is parked in its static position at gross weight. The central propeller disc plane is at fuselage station 94.56 cm aft of the datum. The two outer propellers have their thrust axis slightly higher, nominally at 228.1 cm above the ground. The two outer propellers of the SkyQart SkyQart III-u, III-d, III-uF and III-dF have their propeller disc plane located at fuselage station 103.73 cm aft of the datum. Each of the two AFPs of a SkyQart SkyQart III-u, II-d. III-uF and III-dF can contain a laden EPC.

Each of the two AFPs of the SkyQart III has a nose-tire plus port and starboard main landing gear tires. Having two AFPs helps the SkyQart III-uF and III-dF to spread its fire-retardant is a dual swath onto the ground.

The SkyQart SkyQart III-u, III-d, III-uF and III-dF each have a large blown flap span, with a double-slotted fast flaps system on both the wing center section as well as on the left and right outboard wing panels.

All SkyQarts have a 21.6 cm belly ground clearance, a standard 47.0 cm cabin floor height and nominally 198.1 cm of headroom under the belly of the tailcone at the fuselage station that coincides with the rearmost edge of the fully opened rear hatch.

Alternative embodiments of the SkyQart II still fall within the concepts and processes of this patent, with dimensions and weights that differ from the nominal embodiment presented herein, provided that these alternatives are capable of ultra-quiet ESTOL and can still interoperate autonomously with compatible EPCs. RDCs, docks and SkyNest facilities.

Overlapping Wingtips

Overlapping wingtips are an important component to this invention. During high capacity operations when the SkyNest dock is heavily occupied, the dispatch software known as the networked situational awareness program for QUAD operations keeps track of whether an arriving SkyQart is of a type whose wingtips can overlap and appropriately directs the arriving SkyQart to an aircraft docking station where its particular type of wingtip can overlap that of the adjacent docked SkyQart.

SkyNests

There are five basic variations of SkyNest possible depending upon the cost, location, surroundings and passenger volume needed. These five types are:

1. Standard simple SkyNest I, surface sited, high capacity, 1.28 ha
2. SkyNest II, which is a pair of adjacent surface sited, high capacity SkyNest Is apposed as mirror-images on the sides of a buffer zone and comprising 2.8 ha
3. SkyNest III, a tiny SkyNest that borders on open space, 0.60 ha
4. SkyNest IV, a circular, bowl-shaped, all winds capable, maximum capacity SkyNest with sloped surfaces to shorten take-off and landing distances
5. SkyNest V, a reduced size rooftop circular SkyNest with its docking at a lower level one-floor down from the rooftop pavement surfaces Other variations of SkyNest are possible. For example, an initial low-cost implementation of QUAD service could use SkyNests that have no dock because they simply load and unload on the pavement of existing parking areas at conventional general aviation airports or country airstrips using the standard autonomous robotic delivery cart (RDC) to load and unload EPCs and battery packs. The use of the standard RDC instead of dedicated, standardized docking stations would mean much longer turnaround cycle times at the shared general aviation SkyNest, which would substantially reduce the capacity throughput at those facilities.

The basic standard SkyNest I is a purpose-built design that is surface sited on a small land parcel with its paved surface oriented to align with the annual average wind direction at that location. The SkyNest I has simple standard docking facilities for rapid off-loading of EPCs and battery packs. A sizeable array of solar panels can be placed above the dock and adjacent streets to provide some portion of the electrical energy use at the SkyNest I.

The SkyNest II is a larger, surface sited airpark with dual paved surfaces that can handle more flight operations and thereby larger passenger throughput. Each of its paved surfaces, taxiways and docking facilities share the same standard dimensions as those of the standard SkyNest I.

The tiny SkyNest II is sited with more than 50% of its borders on an open space selected from the group consisting of a shore line, a wild land, a community greenbelt, a highly elevated area around a building rooftop and other unpopulated area that is not noise-sensitive. The open space adjacent to the tiny SkyNest provide areas over which take-off and landing paths can be directed without annoying people on the ground with noise or low-flying aircraft. This enables the tiny SkyNest to be much smaller and less costly and still keep its perceptible aircraft noise away from people living near the SkyNest.

The SkyNest TV has a bowl shape with a small flat central area. It can be surface sited or built into a bowl excavated into the soil. The SkyNest IV has the highest capacity of any type and is the most expensive to build. Its sloped areas are used for downhill take-off runs and uphill landing runs, both of which are oriented into the prevailing wind to further shorten their distances. The design goal of the SkyNest IV remains that of keeping all residential back-yard areas free at all times of any aircraft noise level above 48 dBA.

The rooftop SkyNest V can be smaller in area because the noise from its aircraft operations will be elevated far enough above the street level as to be non-annoying to people there. This means that, ideally, the landing surface of the rooftop SkyNest V should be sited at least 36.6 m above street level in order to minimize its noise impact. For cost reasons, the rooftop SkyNest is likely to be built atop existing tall buildings or multi-level car parking structures. Moreover, for safety reasons, the rooftop SkyNest V should be placed on the tallest building in its general vicinity. In some cases, the rooftop SkyNest V can employ solar panels on its sides to generate a helpful amount of renewable electrical energy.

In one embodiment of the QUAD process at an optimum-sized SkyNest I an idealized sequence and turnaround cycle cadence of operations is described. While this idealized process is generic and can be applied at many differently sized SkyNests, it represents an extreme case of expeditiousness made possible by autonomous operations that allow very close aircraft separations and precision positioning of the vehicles. Its rapid cadence provides one departure and one landing every 10 seconds. The process described herein is one of maximum performance in a fully implemented, autonomous high-capacity QUAD system. This extreme case of the process with its rapid cadence serves to define the potential limits for speeds, distances and sizes that can be used to develop standards for the smallest conceivable SkyNests in a fully autonomous, optimized QUAD system. This process and its cadence are herein named the cadenced coordinated operations at SkyNests. Keeping SkyNests as small as possible is what enables them to be close to where people live and work and close to wildland perimeters, and this enables them to provide both a public transportation system and a highly distributed system for projecting fire suppression and containment.

In the operations at a SkyNest I presented herein, the aircraft that are airborne within the SkyNest boundaries are operating at 24 m/sec and those that are on the SkyNest surface are moving at 7.6 m/sec. These are the nominal interoperable speeds that tailor the distances that can be safely and expeditiously covered in each 10-second operational step in the sequence of landing, taxiing to the loading dock, taxiing to the departure paved surface and taking off again, to the actual size of the SkyNest land parcel. High capacity autonomous QUAD operations will ultimately require such scripted and extremely rapid cadences of operations in order to be affordable, efficient and of meaningful volume.

The ideal fast cadences for loading and unloading of payloads on the SkyNest's dock are likewise modeled for very rapid turnaround times and rely on robotic equipment and pre-loaded EPCs. While these steps represent the ideal, fully developed system with maximum capacity for the SkyNest, this system invention nevertheless includes the slower, manual, less developed operational cadences that occur during the early development and evolution of the QUAD system.

A nominal SkyNest I whose dimensions are 167.6 m×76.2 m, amounts to 1.28 ha of land. The steps in the operational sequence of the SkyQarts at this SkyNest are modeled to consume 10 seconds each, including 10 seconds for deboarding and 10 seconds for boarding. This rapid cadence of operations is predicated on fully autonomous aircraft operating in a fully developed QUAD system process and is designed to maximize capacity. This process and its cadence comprise the cadenced coordinated operations at SkyNests.

The precision positioning system (PPS) is an important innovation in this invention. It is an on-board system that enables the SkyQart, the EPC and the RDC to precisely dock and to navigate to exact positions as needed. The PPS enables the SkyQart to be rapidly parked in exactly the aligned position at the aircraft docking station such that it can rapidly load and unload both SBPs and EPCs.

This combined parking alignment technology is important and consistently aligns the parked SkyQart to within nominally f 2.0 mm of the center of the aircraft docking station so as to enable rapid loading and unloading of EPCs, as well as automated connection of the SkyQart to the dock's DC fast-charging port. The PPS can also precisely align an RDC-F to an exact designated position to allow it to effectively aim its fire-retardant spray nozzles at a fire.

Just prior to backing-in to its allotted aircraft docking station, the SkyQart automatically opens its rear loading hatch door to prepare for charging and/or unloading/loading of its EPC at the dock. Unloading of the EPC from the SkyQart will be followed immediately by the reloading of a laden EPC waiting on the dock for that particular SkyQart. This reloading of an EPC into a SkyQart is facilitated by said EPC having its own on-board navigation and autonomous control system along with a PPS with line-following software that can accurately follow a curved guideline emanating outward onto the dock surface from the dock edge at the center of each docking station. This curved guideline for the EPC on the dock surface is continuous, originating at the centerpoint of the docking station and emanating outward onto the dock surface from there.

Concurrent with these 20 seconds that the SkyQart spends at the dock, a robot located at the aircraft docking station can remove the SkyQart's spent swappable standard battery pack (SBP) and insert a freshly charged one into drawer slide rollers that guide it precisely into the belly of the SkyQart, where its correct position, latching and electrical integrity are automatically confirmed. Battery pack replacement need not occur at every instance of docking, depending upon the particular range of trips being flown by that SkyQart and the total range available per battery pack.

Just 20 seconds after arriving at the dock, when the SkyQart has completed its unloading and reloading with concurrent replacement of its SBP, it then departs the dock, and proceeds in 10 seconds to taxi onto the taxiway that is adjacent to the pavement for take-off and landing, heading toward the take-off area. The SkyQart then continues its taxiing for another 10 seconds to reach that take-off area where it stops to wait in place for take-off. Next, the SkyQart taxis in less than 10 seconds into the take-off position for brake release on take-off. Upon brake release, the nominal interoperable SkyQart rapidly accelerates in typically 4.66 seconds to roll 43.9 m on wet pavement in no wind conditions, while undergoing no more than 0.69 G's of acceleration, to reach lift-off. The timing of the take-off is maximally staggered with that of the landing aircraft so that a safe 4D separation is always maintained between the two curved traffic patterns of the arriving and departing SkyQarts. The steep descent and climb gradients ensure low noise levels and that the flight paths over the taxiways are well above the height of any taxiing SkyQart.

The total turnaround time consumed by the SkyQart is 100 seconds, as described in the above example of moving through the sequence of positions, and that 100 seconds is comprised of the following steps in the turnaround cycle:

10 seconds for descent, landing and turning off of the landing pavement 10 seconds for the first leg of taxiing 10 seconds for second leg of taxiing 10 seconds for precisely backing into the aircraft docking station 20 seconds parked at the dock: 10 seconds to de-board and 10 seconds to board concurrent battery swapping during the 20 seconds parked at the dock 10 seconds for the first leg of taxiing for departure 10 seconds for the second leg of taxiing for departure 10 seconds for taxiing onto the take-off brake release point 10 seconds for take-off and climb-out to the SkyNest boundary Total: 100 seconds turnaround time (TAT).

During operation at peak capacity, at any moment in said turnaround cycle, there are at least ten SkyQarts co-operating at said SkyNest, wherein each of said ten SkyQarts is performing one of the steps listed above. In order to maintain a continuous high capacity throughput of payloads, concurrent with each of said operational steps described in said turnaround cycle above, other operational steps take place at said SkyNest, comprising:

i) a loading and latching of an electric payload cart onto the surface deck of a docked robotic delivery cart; and ii) an unloading of an electric payload cart parked on said dock; and iii) a loading of cargo or re-loading of fire-retardant onto another electric payload cart on said SkyNest dock; and iv) a loading of passengers, cargo or a fire-retardant payload onto another electric payload cart on said SkyNest dock; and v) an unloading of a cargo or fire-retardant payload from another electric payload can on said SkyNest dock; and vi) a robotic delivery cart that is docked at a cart docking station unloads an electric payload cart from its surface deck onto said dock; and vii) a robotic delivery cart docks at a cart docking station; and viii) a robotic delivery cart departs from a nearby cart docking station to navigate to a destination in the neighborhood vicinity of said SkyNest.

ix) an electric payload cart rolls along said dock premises to position itself near its intended SkyQart or robotic delivery cart.

At any moment, the particular phase of operations occurring at some dock locations may be identical to that at other locations. In such case, there will be two or more SkyQarts ready to depart at the same time, and a short queue will form near the departure area of the pavement.

An automated dispatch system will coordinate the SkyQart movements and routes.

The high frequency and precise timing of the high capacity flight and ground operations at the SkyNest require that the SkyQarts be autonomous vehicles whose guidance systems are hardened against tampering or hijacking.

Ancillary services at the SkyNests are important components to this invention. Ancillary Services available at the SkyNest include SkyQart Service, Cart Service and Cargo Service. Ancillary Services will include a fire suppression station that can fill and recharge the tank carried on a fire-suppression module by an EPC-F. SkyQart service can be conducted on the dock or, for more elaborate service, in the SkyNest's nearby maintenance hangar.

The Cart Service building includes EPC and RDC cleaning, inspection, testing, preparation, modification, battery swapping and other servicing.

The Cargo Service building is where cargo containers may be loaded, unloaded, cleaned, inspected, attached to or removed from empty EPCs. Specialized autonomous EPCs called EPC-Fs that have hauling attachments for carrying a fire suppression module with aimable spray nozzle (FSM-AS) will be capable of pin-latching in piggyback fashion onto the surface deck of a waiting RDC, thereby converting it to an RDC-F. Then, said RDC-F with its EPC-F can leave the SkyNest's dock and drive on neighborhood streets to robotically travel to a local fire that needs to be suppressed or contained. After such delivery, the RDC-F returns autonomously ('deadhead') to the SkyNest dock where it can unload its EPC-F and thereby become ready to accept another EPC-F that is likewise equipped with a fully filled FSM-AS for further fire suppression service. Such autonomous RDCs can also qualify as neighborhood electric vehicles that carry passengers or cargo on residential streets.

Fast Flaps System

The Fast Flaps System is an important component to this invention. The double-slotted wing flaps on all of the SkyQart aircraft enable the ESTOL performance required of these aircraft. These flaps have a special design innovation that enables them to fully retract in less than 0.5 seconds, a feature that is essential to short landing distances. This is accomplished by their use of a special high instant torque, non-cogging, thin, fast-accelerating pancake motor, housed inside the mid-wing bay, whose motor rotor serves as a rotary crank actuator to precisely move a set of pushrods the exact distance necessary to simultaneously extend or retract their respective attached flap segments on the right and left wing, to their ideal exact gap and overlap positions and wherein such motor accomplishes said movement with less than 180° of shaft rotation. The result is a double-slotted, high-lift flap system occupying about 70% of wingspan and capable of extremely rapid actuation.

The extremely short pavement landing performance of the SkyQarts requires rapid and powerful braking instantaneously after touch-down because in no wind conditions the vehicle will be traveling at 24 m/sec at that instant. This rapid braking is made possible by the disc brakes and the regenerative mode of the electric motors in the wheels of the main landing gear. These wheelmotors are capable of powerful regenerative braking but only under conditions in which substantial downward weight is applied on the contact patch of the main landing gear tires. Providing this substantial downward weight at the instant of touch-down requires a near-instantaneous cessation of wing lift, which is accomplished for the SkyQart by a precisely timed and synchronized robotic automatic symmetrical retraction of its high-lift wing flaps in less than 0.5 seconds.

The SkyQart uses blown flaps that are positioned directly downstream of the large propellers that are forward of the main wing of the SkyQart so that the airstream accelerated by the propellers will blow over the flaps and increase their effectiveness in creating extra lift, with blown lift coefficients that can approach 7.0. The double-slotted flap is comprised of two flap segments; a forward flap segment and a rear flap segment.

The combined increases in wing chord and wing camber that result from full and optimal extension of the flap segments have the effect of throwing air downward and thereby provide a large increase in lift and drag during flight at the operational angles of attack used during slow flight and approach to landing. The actuation by use of simple hinges instead of rollers on tracks enable these flaps to be retracted in less than 0.5 seconds. The fast retraction process that is produced by precise rotation of the flap motor(s) is aided by aerodynamic forces at touchdown that tend to force the flaps up into their retracted, nested position.

The SkyQart SkyQart III-u, III-d, III-uF and III-dF have a fast flaps system that employs a large wing center section of constant wing chord in which large constant-chord fast flaps are installed. For the SkyQart III-uF and III-dF, the throwing downward of air by the fast flaps system augments the downward flow of the fire-retardant dropped from its axisymmetric fuselage pods.

Active Main Landing Gear

The Active Main Landing Gear is an important component to this invention. The main landing gear of the SkyQart is connected to a fast and powerful actuator system that is able to position it at any of a range of desired positions, depending upon the situation. This actuator system concept and process is called the Active Main Landing Gear. Its purpose as an invention is to enable the very steep landing approaches and short take-offs of the SkyQart along with its requirement for exact height positioning during loading at the standard dock height.

In the embodiment presented herein, to reach its full dangle-down position as occurs during final approach to land, there is 49.0° of downward swing of the main landing gear leg around its trunnion axis when measured from the static docking position of the main landing gear leg. From its static docking position, the landing gear can also be rotated upward by 14.6° around its trunnion axis to place it in the trailing cruise flight position. The total swing angle of the main landing gear leg is thus 49+14.6=63.6°.

The long-travel linear electro-hydraulic-magnetic damper used to move the landing gear lever arm and thereby move each leg of the main landing gear operates autonomously in a fast-acting closed feedback loop to precisely and actively position the landing gear at each instant during landing touch-down, with the positioning tailored to control the acceleration and jerk rates to tolerable levels while providing very long travel (jounce) to absorb the loads from arresting the descent of the SkyQart from the instant of touchdown. This process is designed to provide zero rebound after touchdown. It provides the gradual energy absorption of the full jounce travel, which is completed in 1.08 seconds across a jounce travel length of 0.65 m. The position, load and rate sensors in the system provide the near-instantaneous data necessary to this process. Table 3, below, summarizes the landing gear movement of one embodiment of this process, for which other, similar embodiments may be used.

TABLE 3

Active Main Landing Gear Travel and Rates at Touchdown:

| Time, seconds | Height, m above ground | Sink Rate, m/sec | G Level | Jerk Rate; m/sec$^3$ |
|---|---|---|---|---|
| 0.00 | 0.65 | 0.961 | 1.06 | 0.00 |
| 0.02 | 0.63 | 0.9504 | 1.05 | −1.10 |
| 0.04 | 0.61 | 0.9403 | 1.05 | −1.10 |
| 0.06 | 0.59 | 0.9306 | 1.05 | −1.10 |
| 0.08 | 0.58 | 0.9214 | 1.05 | −1.10 |
| 0.10 | 0.56 | 0.9126 | 1.04 | −1.10 |
| 0.12 | 0.54 | 0.9042 | 1.04 | −1.10 |
| 0.14 | 0.52 | 0.8963 | 1.04 | −1.10 |
| 0.16 | 0.50 | 0.8884 | 1.04 | 0.00 |
| 0.18 | 0.49 | 0.8800 | 1.04 | 1.10 |
| 0.20 | 0.47 | 0.8708 | 1.05 | 2.20 |
| 0.22 | 0.45 | 0.8602 | 1.05 | 3.30 |
| 0.24 | 0.43 | 0.8484 | 1.06 | 3.30 |
| 0.26 | 0.42 | 0.8352 | 1.07 | 3.30 |
| 0.28 | 0.40 | 0.8206 | 1.07 | 3.30 |
| 0.30 | 0.38 | 0.8048 | 1.08 | 3.30 |
| 0.32 | 0.37 | 0.7876 | 1.09 | 3.30 |
| 0.34 | 0.35 | 0.7692 | 1.09 | 3.30 |
| 0.36 | 0.34 | 0.7494 | 1.10 | 3.30 |
| 0.38 | 0.32 | 0.7282 | 1.11 | 3.30 |
| 0.40 | 0.31 | 0.7062 | 1.11 | 2.20 |
| 0.42 | 0.30 | 0.6838 | 1.11 | 1.10 |

TABLE 3-continued

Active Main Landing Gear Travel and Rates at Touchdown:

| Time, seconds | Height, m above ground | Sink Rate, m/sec | G Level | Jerk Rate; m/sec$^3$ |
|---|---|---|---|---|
| 0.44 | 0.28 | 0.6614 | 1.11 | 0.00 |
| 0.46 | 0.27 | 0.6394 | 1.11 | −1.10 |
| 0.48 | 0.26 | 0.6182 | 1.11 | −2.20 |
| 0.50 | 0.15 | 0.5984 | 1.10 | −3.30 |
| 0.52 | 0.23 | 0.5800 | 1.09 | −3.30 |
| 0.54 | 0.22 | 0.5628 | 1.09 | −3.30 |
| 0.56 | 0.21 | 0.5470 | 1.08 | −3.30 |
| 0.58 | 0.20 | 0.5324 | 1.07 | −3.30 |
| 0.60 | 0.19 | 0.5192 | 1.07 | −3.30 |
| 0.62 | 0.18 | 0.5074 | 1.06 | −3.30 |
| 0.64 | 0.17 | 0.4968 | 1.05 | −3.30 |
| 0.66 | 0.16 | 0.4871 | 1.05 | −2.20 |
| 0.68 | 0.15 | 0.4779 | 1.05 | −1.10 |
| 0.70 | 0.14 | 0.4686 | 1.05 | 0.00 |
| 0.72 | 0.13 | 0.4590 | 1.05 | 1.10 |
| 0.74 | 0.12 | 0.4484 | 1.05 | 2.20 |
| 0.76 | 0.12 | 0.4365 | 1.06 | 3.30 |
| 0.78 | 0.11 | 0.4233 | 1.07 | 3.30 |
| 0.80 | 0.10 | 0.4088 | 1.07 | 3.30 |
| 0.82 | 0.09 | 0.3930 | 1.08 | 3.30 |
| 0.84 | 0.08 | 0.3758 | 1.09 | 3.30 |
| 0.86 | 0.08 | 0.3573 | 1.09 | 3.30 |
| 0.88 | 0.07 | 0.3380 | 1.10 | 2.20 |
| 0.90 | 0.06 | 0.3182 | 1.10 | 1.10 |
| 0.92 | 0.06 | 0.2984 | 1.10 | 0.00 |
| 0.94 | 0.05 | 0.2790 | 1.10 | −1.10 |
| 0.96 | 0.05 | 0.2605 | 1.09 | −2.20 |
| 0.98 | 0.04 | 0.2434 | 1.09 | −3.30 |
| 1.00 | 0.04 | 0.2275 | 1.08 | −3.30 |
| 1.02 | 0.03 | 0.2126 | 1.08 | −2.20 |
| 1.04 | 0.03 | 0.1985 | 1.07 | −2.20 |
| 1.06 | 0.03 | 0.1853 | 1.07 | −2.20 |
| 1.08 | 0.02 | 0.1730 | 1.06 | −2.20 |

The linear electro-hydraulic-magnetic dampers used to control the position and movement of each main landing gear lever arm can be any of several different types of powered actuators without changing the concept and process of active main landing gear.

The automatic positioning of the main landing gear includes sensing and accommodating the effects of its wheelmotors in generating additive torque on the landing gear leg.

Ultra-Quiet, Multi-Bladed Propellers

The special ultra-quiet, multi-bladed propellers used on the SkyQarts I, II, III-u, III-d, III-uF and IIi-dF have a large diameter of more than 213.4 cm and have take-off and cruise rotational tip speeds that are limited to below 152.4 m/sec. These propellers vary in number from a nominal interoperable two propellers on the SkyQart I and II variants to the nominal interoperable three propellers used on the SkyQart III variants. Alternative embodiments of the SkyQarts have a number of propellers of about two or more, about three or more, about four or more, about six or more or any number between and including the numbers of propellers provided, while it is preferred that the number be three for the SkyQart III-u, III-d, III-uF and III-dF because these offer the lightest and simplest means to create blown wing flaps. The controllable blade angles of these propellers are able to deliver thrust with ideal efficiency and optimally low noise. The pitch or blade angle of the propeller blade is adjusted by the controllable pitch hub so as to produce reverse thrust. The controllable blade angle may alternatively be set so as to produce 'wind-milling' wherein the dynamic pressure of airflow from forward flight is forcing the propeller to rotate and thereby is putting energy back into its motor shaft, which is a process that generates electricity as well as airframe drag. The controllable blade angle may also be set so as to produce 'pin-wheeling' wherein the dynamic pressure from forward flight is flowing past the rotating propeller such that it neither forces nor impedes its rotation, which is a zero thrust condition. In the case of wind-milling, the resulting increase in drag serves to increase the sink rate of the aircraft during landing approach or the low approach to an active fire zone, and thereby act as a 'spoiler' effect. The amount of this drag can be modulated by regulating the power or resistance to rotation in the motor that is connected to the propeller, as well as by regulating the propeller's blade angles. The "smart" propeller refers to one that can rapidly, as in this embodiment with 12° per second blade angle change, perform these drag and/or thrust modulations automatically and in ideal proportion to the desired sink rate, climb rate, thrust or lift desired. The performance of these modulations can also be accomplished by manual means, but with less precision and greater latency. In the nominal embodiment presented herein, the propeller(s) are located forward of the main wing, as 'tractor' propellers, such that their thrust 'pulls' the aircraft through the air. In this location, the propellers in thrusting mode can provide a blast of air over the wing to increase its lift, especially when the trailing edge wing flaps are fully extended. Also, this location of the propeller(s) forward of the wing enables the propeller(s) to act as drag brakes or spoilers, whose effectiveness can be varied from very little to a very large amount, according to the need. The propeller hub with its rapidly controllable variable blade angles as well as the motor with its controllable and variable forward and reverse torque can, in their various combined actions, almost instantly command any amount of thrust or drag within the range of useable amounts for each model of SkyQart.

Electric Payload Cart (EPC) Seat-Latching Tracks and Latching Pins

The Electric Payload Cart (EPC) is an important component to this invention. The EPC is designed as a standard sized device with standardized attachment tracks. It can be loaded and latched into any SkyQart or onto the top of any RDC in order to carry the EPC's latched-on payload from point of departure to its destination. The nominal interoperable EPC can carry a 265 kg payload. Alternative embodiments of the EPC carry payloads within a conceivable range of up to 260 kg, up to 590 kg or any weight between and including the weights provided, while compatibility with the demands of fire-retardant payload favor the higher weights. The EPC is sized to provide for hauling a wide variety of different payloads of common types while still fitting inside any SkyQart and atop a standard RDC. It is important that the EPC have standardized size, height, shape, capacity, seat-latching track dimensions and track spacings in order to enable standardized attachment fixtures such as latching racks and other cargo hauling attachments that carry various common and uncommon payloads in the QUAD system. Nominal interoperable dimensions for these parameters are provided as standards herein.

The standard EPC trapezoidal platform that fits correctly inside the SkyQart is 144.8 cm long and 103.2 cm wide at its rear edge. This standard platform narrows symmetrically at the forward portion of the cart to have a width at its forward or front edge of just 71.12 cm. The narrowing of its trapezoidal platform begins at 91.44 cm forward of the rear edge of the platform, a station where, when pin-latched into its nominal interoperable position in the SkyQart, the inside diameter of the AFP is 146.7 cm. The EPC has a 119.4 cm wheelbase. Its front track is 58.1 cm wide and its rear track is 88.9 cm wide. The front wheels are sturdy swiveling castors. The rear wheels are autonomously controlled wheelmotors. Each of the four 12.7 cm diameter wheels are set 12.7 cm from the fore or aft edge of the cart. The EPC has no suspension travel and therefore has a nominal and consistent 2.54 cm of ground clearance, an important dimension that is predicated both on its need to maximize cabin room inside the SkyQart's AFP and on the need for the EPC's surface deck to have a consistent height above the cabin floor of the SkyQart. The 2.54 cm ground clearance is sufficient because EPCs normally only operate on the flat smooth dock, and the flat smooth floorboard surfaces of the SkyQarts and the RDCs, which are grooved to accommodate the standardized tire spacings of the EPC.

Each rear wheel of the EPC is attached to a powerful wheelmotor that can provide precise rotation as needed for steering and positioning of the cart on the dock and into and out of the SkyQart or RDC. The EPC has four separate sets of identical 6.86 mm diameter holes arranged in a linear array with equal 25.4 mm spacing between these holes with an array located along both the forward and aft portions of both the port and starboard sidewalls of the EPC. Each of these four arrays consists of four such holes that are horizontal and are each 12.7 mm deep. These holes serve as receptacles for the four separate 6.35 mm diameter solenoid-operated latching pins that fixate the sides of the EPC to the interior of the SkyQart's AFP and to the floor of the RDC. There are two forward solenoids and two aft solenoids, all with latching pins. This array of solenoids is structurally attached to the interior of the SkyQart's AFP structure or to the sides of the RDC's surface deck, respectively.

The aft-most of these four 6.35 mm holes for the solenoid latching pins in the sidewalls of the EPC are centered nominally 38.1 mm forward of the cart's trailing edge on both its port and its starboard sides, at the midpoint of the cart's sidewall height. An identical array of these four holes is present on both sides of the cart at a forward location near the point at which the cart's trapezoid-shaped surface tapers in width. The forward most of these forward four holes is located 88.9 cm forward of the cart's trailing edge. These four holes provide adjustment of the location at which the EPC is pin-latched inside the aircraft so that the SkyQart's center of gravity can be adjusted as needed. For both the SkyQart and the RDC, the inner surface of the rectangular solenoid body whose pin latches the EPC is located 3.81 mm laterally from the sidewall of the EPC. This narrow 3.81 mm clearance is important to the rapid loading and unloading of the EPC. A larger clearance would lead to rattle and looseness of the pin-latching and a smaller clearance would cause scraping and friction during loading and unloading.

The EPC has its own low-profile rechargeable and swappable battery pack along with an on-board navigation system. This navigation system operates using detect-and-avoid hardware and software similar to those used in driverless cars, allowing it to move autonomously around the dock and into and out of the SkyQarts there. The EPC has a multi-sensor precision positioning system that is integrated with the navigation system and that includes line-following software that enables it to precisely dock into SkyQarts and onto RDCs.

The top surface of the EPC has six separate longitudinal seat-latching tracks whose size, shape and spacings are standardized herein for the purpose of facilitating the attachment of various types of payload-holding devices, including seats, latching racks and cargo hauling attachments. These payload-holding devices are attached to the EPC before it gets loaded with a payload and before it gets pin-latched onto a SkyQart or RDC. These payload-holding devices include passenger seats of various types, baggage bins, cargo bins, latching racks for the attachment of out-sized freight and building materials and other cargo hauling attachments, including fire suppression modules. To enable interoperability, the locations and dimensions of the seat-latching tracks are standardized on all EPCs in terms of their shape, height, width, thickness, contour, hole size, material strength and spacing to make for uniform attachment specifications for the various types of payload. The shortened outermost seat-latching tracks on the cart are near the cart edges and are truncated at the forward portion of the cart where the planform of the cart platform necessarily tapers symmetrically in order to fit inside the AFP. The centers of these outermost tracks are 99.1 cm apart horizontally. At a distance of 25.4 cm inboard of the center of these outermost seat-latching tracks are the center of the EPC's medium-length seat-latching tracks, which terminate at the forward wheel casters. At a distance of 8.9 cm inboard from the medium-length seat-latching tracks are the full-length seat-latching tracks. The center of the two full-length seat-latching tracks are 30.5 cm apart horizontally, and are spaced equidistant from the longitudinal centerline of the EPC. These exact dimensions of this array of seat-latching tracks serve as a nominal interoperable set of standards to which a wide variety of payload-holding devices can be built so that they can be latched onto an EPC. The size of the EPC itself, both laden and un-laden, is designed to also fit onto the surface of the Robotic Delivery Cart (RDC) and to pin-latch onto it in the same fashion that it latches to the interior of the SkyQart, i.e., by solenoid pin-latching into the receptacle holes on the sidewalls of the EPC.

The EPC's battery pack is standardized for the QUAD system at a nominal size of 6.35 cm H×22.9 cm W×30.5 cm L. It is mounted between the inner seat-latching tracks of the EPC, straddling its centerline, on top of its surface deck, with its rear face 2.54 cm forward of the rear edge of the EPC. Just forward of this battery pack is mounted the EPC's navigation hardware pack, whose nominal dimensions are 6.35 cm H×22.9 cm W×6.35 cm L.

Cargo normally gets pre-loaded at a dedicated Cargo service building on the dock of the SkyNest rather than on the dock area where passengers are boarding near their SkyQart's appointed dock station. The standard embodiment of the seat-latching tracks on the EPC allow the conversion of EPCs to various payload purposes. However, the Cargo service building may have some specialized alternative embodiments of the EPCs that have no seat-latching tracks in order to carry unusual types of cargo. In practice, most EPCs will continue in service as either seat-equipped or cargo bin-equipped, with the modifications for carrying unusual payloads such as fire suppression modules being optional or seasonal.

EPC Payloads

As stated above, an EPC, with its nominal 119.4 cm wheelbase, can carry a variety of payloads consisting of both people and goods within its weight limits. It can alternatively carry lumber, fuel, building materials or a fire suppression module.

All EPCs carrying payloads in SkyQarts have their weight and center of gravity automatically calculated prior to boarding the SkyQart so as to determine the appropriate fore-aft position for latching the EPC inside the SkyQart. Said weight and center of gravity are calculated from data obtained from the EPC's on-board strain-gauges that are attached near each of its four wheels.

The EPC can alternatively be configured to carry not passengers but a fire suppression module (FSM). All such fire suppression module equipment is sized so that when fastened to an EPC, that EPC/module combination, herein named an EPC-F, will fit inside the interior cabin space of a SkyQart's AFP.

The AFP can be fitted with a nominally 61.0 cm long cylindrical extension to become the cargo axisymmetric fuselage pod. This cylindrical extension piece is attached at the rear hatch opening of the AFP. Using the cargo axisymmetric fuselage pod and an EPC with a latching rack, the SkyQart III-u, III-d, III-uF and III-dF can carry a fire-retardant module whose discharge path is directed through the pod extension's large doors on its belly to facilitate a rapid dumping of its full capacity.

The EPC is typically pin-latched to the AFP in the standard SkyQarts by four separate 6.35 mm diameter round solenoid pins, which pins are normally extended from their solenoid actuator. For the uncommon case of using a cargo axisymmetric fuselage pod, there are two additional intermediate solenoid pin actuators in each AFP, one on either side, and the pin centerlines of these are placed nominally 25.4 cm aft of those of the forward solenoid pin actuators. In addition, for the case of the cargo axisymmetric fuselage pod, there are two additional aft solenoid pin actuators, one on either side in the cylindrical extension piece, and these can be paired with the intermediate solenoid pin actuators to pin-latch EPCs at locations that are further aft inside the cargo axisymmetric fuselage pod. These intermediate solenoid pin actuators are standard equipment in each AFP and the aft solenoid pin actuators, which are located at the standard 77.47 cm aft of the intermediate ones, are standard equipment in each AFP cargo extension piece.

The EPC with any of its various payload configurations can also be pin-latched atop the RDC and can be off-loaded from the RDC onto a variety of other surfaces. It can be off-loaded onto a truck dock, the roof of an autonomous car, the pavement, the bed of a pickup truck, or other vehicle.

The autonomous robotic EPC has a manually operated "Go-button" that alerts its on-board autonomous robotic control system that it is ready to roll on the dock to its next destination. The Go-button is to be pressed by a passenger or attendant only when that EPC has completed all of its preparations for movement, Pressing the Go-button will have no effect unless all latching pins of the EPC are detected as being securely latched. As soon as secure pin-latching of the EPC into the SkyQart cabin or onto the surface deck of an RDC is completed, the wheelmotors of the EPC are immobilized and the SkyQart or RDC can begin its scheduled trip. When a SkyQart lands and docks with precise alignment to an aircraft docking station with its rear hatch open, the SkyQart's autonomous control system detects that successful docking and immediately and automatically unlatches the pin-latches that secure the EPC to its cabin floor. This unlatching is detected by the EPC and is interpreted by it as if the EPC's Go-button had been pressed, so that the EPC will then be activated to exit the SkyQart cabin and roll onto the dock to its next designated, intended destination. Likewise, an unlatching of the EPC from the surface deck of a docked RDC activates that EPC to roll off of the RDC onto the dock and onward to its appointed destination.

The loading and unloading of an EPC to an RDC proceeds in the same fashion as for the loading and unloading of an EPC to a SkyQart.

For an RDC-F that is carrying an EPC-F with a fire suppression module with aimable spray nozzle to a surface destination where a fire exists, the RDC-F will automatically proceed to that destination, position itself near the fire and direct its aimable spray nozzle to spray its fire-retardant toward the flames. The FSM that is mounted to said EPC-F in such a case is a modified version of the FSM known as the FSM-AS, wherein the "-AS" denotes an "aimable spray" capability for the FSM-AS. The modifications to the FSM necessary to make it an FSM-AS are the installation of a motorized pump and a separate module that includes a motor controlled, aimable spray nozzle with controlling hardware and software. A rapid succession of such RDC-Fs arriving at 10-second intervals can be used to apply a nearly continuous spray of fire-retardant in an autonomous fashion in areas too hot or dangerous for human fire-fighters. It is noteworthy and valuable that the nominal RDC-F is roughly half of the width of a standard fire engine, and this enables the RDC to maneuver on paths, trails, and narrow roads that are too narrow for a fire engine, thus improving the ability of the RDC to reach and suppress fires in some otherwise inaccessible locations.

The Robotic Delivery Cart (RDC)

The Robotic Delivery Cart (RDC) is one of the important inventions that make QUAD possible. The fundamental importance of the RDC is not its robotic navigation or its versatility for delivery to neighborhoods and other premises, it is the RDC's interoperability with the other electric vehicles in the QUAD system by virtue of its standardized track, wheelbase, height, dimensions, batteries, speed, precision positioning system along with the standard embodiment of the EPC latching system. The RDC's standards, along with its long-travel scissor jack enable the RDC to act as if it is part golf cart and part forklift while being compatible with QUAD SkyQarts, EPCs, trucking, cargo, med-evac, and local deliveries of all types, including those in bad weather, fire and smoke. The standard embodiment of the RDC presented in this invention will have many future variations and refinements and will evolve over time, but an RDC needs to retain dimensional and operational standards such as those described in the embodiment herein in order to be compatible with the QUAD system's SkyNest dock and SkyQart vehicles. The RDC is mainly intended to carry, in a type of piggyback transportation, a payload-laden EPC to its intended destination, but it is also specially equipped to service any SkyQart that happens to need its EPC removed and replaced or its standard battery pack swapped when parked at a location other than at a QUAD aircraft docking station. In the unusual event that it is necessary, the RDC can use its extensible heavy-duty battery pack drawer slides in order to unload a battery pack from a disabled or stranded SkyQart on the aircraft paved surface at a SkyNest.

When an RDC onloads an EPC, the surface deck of the RDC is set to the same height as the bottom of the EPC's tires. The RDC deck is normally set at the nominal interoperable height of 47 cm above ground level for this maneuver because that is the standard height of the surface of the dock at a SkyNest. The EPC loads from the dock surface onto the top of the surface deck of the RDC by backing up, once its tires are in alignment with the tire grooves provided in the RDC's surface deck. When it reaches the proper position on the RDC deck, the EPC is pin-latched onto the RDC by four separate solenoid latching pins. The RDC can on-load and carry an EPC-F that is loaded with a fire suppression module from either a SkyNest dock or from a SkyQart III-uF or III-dF, or from a SkyQart III-uF or III-dF that is equipped with an extended cargo axisymmetric fuselage pod. Said RDC, when loaded with an EPC-F, becomes designated as an RDC-F. Said RDC-F, if designated for duty to suppress a local fire accessible by street, path or other surface byway, must have its EPC-F equipped with the modified version of the FSM known as the FSM-AS, wherein said FSM-AS has a motorized pump and aimable spray nozzle.

The height of the top deck of the RDC is normally maintained at the standard 47.0 cm dock height by its electric scissor lift mechanism and this height is continuously adjusted and tuned to maintain dock height as loads are transferred onto and off of the RDC.

The RDC and EPC both have miniaturized modular on-board autonomous navigation and positioning hardware that couple to their rear wheelmotors and steering to enable these cats to precisely align with dock locations or wherever loading and off-loading are to occur. The precision positioning system in the EPC and RDC operates with a miniature electronic sensor suite similar to that in the SkyQart.

The dock at the SkyNest can provide on its surface a path for the EPC back up to exit out of the rear hatch of a SkyQart and then to traverse to the opposite side of the dock where it can back-up onto the surface deck of a waiting RDC and pin-latch into place. This RDC can then depart the SkyNest with that payload-laden EPC to perform the local delivery of that payload. Said payload delivery could be comprised of delivering fire-retardant by spray directed onto a designated nearby wildfire. During high capacity operations and according to need, a swarm of RDC-Fs each carrying an EPC-F that is equipped with an FSM-AS sequentially delivers a nearly continuous directed spray of fire-retardant onto a designated nearby wildfire, or fire involving a structure or building, in order to extinguish it.

The width of the RDC must be less than 1.22 m in order for it to qualify as a neighborhood electric vehicle and thereby be accorded use of bicycle lanes in some states.

The street-side or cart side of a SkyNest dock facility is typically provided with special RDC cart service bays that are called cart docking stations and that have compatible heavy-duty drawer slides under the dock surface, which surface is at the standard height of 47 cm so that the RDC can use its scissor jack and precision positioning system to align the surface deck of the RDC with that of the dock surface and then load and unload EPCs and SBPs. In alternative but less common embodiments, the cart docking stations may be adjacent to the aircraft docking stations on the same side of the dock facility as the pavement for the taxiways. To help maintain the alignment of the RDC with the cart docking station, the dock edge has two solenoid-actuated pins of 6.35 mm diameter that can protrude from the dock to engage in two pin receptacle holes in the edge of the front of the surface deck of the RDC. These pins and holes are both 81.28 cm apart and symmetrically straddle the center point of the RDC and the RDC cart docking station.

In most U.S. states, the RDC is required to have headlights, taillights, stoplights, turn signals, horn, fenders, windshield, wipers and a retractable rain roof in order to operate on city streets.

The swappable rechargeable RDC special battery pack is located inside the bottom of the frame of the RDC's steel chassis and has nominal dimensions of 5.08 cm H×50.8 cm W×50.8 cm L with a nominal capacity of 12.8 kWh and a nominal weight of 32 kg. This RDC battery can also be charged during docking through the cart docking station's DC fast-charging port that automatically connects to the RDC's DC fast-charging port on the forward edge of the RDC when it is precisely docked. The RDC battery pack is sufficient for a range of at least 32 km.

The scissor jack on the RDC is driven by dual electric or electro-mechanical linear actuators.

The RDC has a low-profile front suspension in order that the height of its surface deck can be as low as possible above street level.

The outer dimensions of the RDC are 2.44 m in length× 116.8 cm wide, becoming 1.22 m wide when the retractable rain roof is attached. The RDC has a nominal 210.5 cm wheelbase.

The top speed of the RDC is limited to 40.2 km/hr in order to qualify it as a Neighborhood Electric Vehicle (NEV).

The RDC chassis has four separate solenoid operated latch pins of 6.35 mm diameter.

Both the floor surface of the RDC and that of the SkyQart cabin provide shallow grooves that match the track width dimension of the EPC to help keep its wheels aligned during loading. Like the EPC, the RDC is equipped with a precision positioning system that includes line-following software that enables it to exactly align with the SkyQart cabin or a cart docking station, respectively.

The precision positioning system is also capable of directing the RDC-F to maneuver to exactly designated locations deliver and spray fire-retardant to exactly designated locations. The line-following software can align with and precisely move the EPC or RDC along a line projected onto the dock surface or pavement surface, respectively. A continuous guideline that emanates outward onto the pavement surface from the dock edge at the center of each docking station has a fixed width in the range of 3.175 mm to 12.7 mm. This line is either painted, taped on or projected by laser, and is of a color that sharply contrasts with that of the pavement. This line provides an alignment path to guide the line-following software that is on-board the RDC that intends to move precisely to the said center of said docking station. Both the SkyQart and the dock itself are capable of projecting such laser lines onto those surfaces so that the laser line leads the surface cart to the exact center of the floorboard of the SkyQart or the exact center of the docking station, respectively. Such exact alignment enables the latching pins of the solenoid-actuated pin-latching system to engage and pin-latch these vehicles and it prevents collisions between the carts and the solenoid bodies or pins.

The RDC has the following features:
a 40.2 km/hr maximum speed

The precision positioning system on the RDC can steer the swiveling nose tires, and its steering also uses differential control of each of its 3 kW rear wheelmotors.

If for any reason a SkyQart is unable to taxi to the dock, the RDC can drive onto the SkyNest pavement to reach that remote stranded SkyQart, use its precision positioning system and line-following software to dock with it, and can rescue its EPC and any attached payload. It can also swap that remote SkyQart's spent battery pack for a fresh one if necessary.

Dock Standards and Battery Swapping Standards

The Dock Standards and Battery Swapping Standards are two components that are important to this invention. A QUAD SkyNest must use standardized dimensions and facilities in order to achieve high capacity and to expedite deliveries. The QUAD dock height standard is 47 cm above the pavement on which the SkyQart parks. This 47 cm dimension matches and is effectively the same as height the cabin floor height of the SkyQart, which is set low in order to create a low center of gravity for the vehicle and to confer maximum room in the cabin. This 47 cm dimension also matches the height of the surface deck of the RDC during its docking operations.

The dock thickness at its outer edge where it interfaces with the SkyQart or RDC is nominally 28.58 mm. This edge contains the transponding alignment target for the precision positioning system lasers of the SkyQart and RDC, as well as the two 6.35 mm diameter solenoid-actuated tapered pins that protrude 19.05 mm from the edge surface of the dock to mechanically maintain alignment of the dock surface with the surface deck of the SkyQart and RDC during loading and off-loading of the EPC. These dock pins are 81.28 cm apart and they symmetrically straddle the center point of the docking station. During docking, these dock pins engage into equally spaced 6.86 mm diameter receptacle holes in the edge of the surface deck of either the SkyQart or RDC. There is a separate alignment target for the precision positioning system at each mating center along the dock edge and these targets are equally spaced horizontally at intervals of 4.572 m.

The nominal interoperable 4.572 m intervals for docking allow the tightly spaced side-by-side docking of SkyQarts with overlapping wingtips. The docking center is that portion of the dock that is specially equipped to off-load and on-load both EPCs and SBPs. There is a recess underneath the docking center between the dock's support pillars to allow the SkyQart's main landing gear to roll under the dock. To avoid the complexity, safety, and reliability problems of folding wings, there are two different versions of the standard SkyQart, i.e., the SkyQart I and SkyQart II, and these can be parked at the dock with overlapping wingtips. This reduces the required space between their docking station to just 9.144 m. The SkyQart III-u, III-d, III-uF and III-dF versions have a distance of 4.572 m (15 feet) between the centers of their AFPs, so that it can align and dock at any two adjacent aircraft docking stations in order to load and unload each AFP simultaneously. A computerized dock utilization program directs incoming SkyQarts of the various types to park at a compatible aircraft docking station that ensures best overlaps so as to maximum system capacity.

Battery swapping of the swappable standard battery pack (SBP) is a necessity because the SkyQarts will be operating on a nearly continuous duty cycle consisting of short-range flights. The swapping must be accomplished precisely, reliably and rapidly without risk of damage to vehicle, dock or SBP. It must not delay or impede system capacity. It must be resilient in its operations, with multiple loading, unloading and charging stations operating in parallel, including, during power failures, an allowance for manually operated swapping if necessary.

These requirements favor using sturdy extensible drawer slides for moving the battery packs during the initial interface with the SkyQart and RDC in the exchange process. Ball-bearing extensible suspension drawer slides that are strong, affordable, fast, precise, replaceable, manual, and of a consistent standard in size are to be used. McMaster-Carr offers such drawer slides as 101.6 cm long slide rails capable of supporting 199.6 kg and whose cross-section is 7.62 cm tall and 19.05 mm wide. These are adopted as the standard in this embodiment of dock facilities and vehicles for moving the swappable standard battery pack (SBP) of 8.89 cm H×66.0 cm W×101.6 cm L and that weighs 145.15 kg as used in SkyQarts I, II and III. Each battery pack is a self-contained package that includes a sturdy outer shell, internal septae and cooling passages, a battery management system, external electrodes for both power and the battery management system/charging interface and side rails that are compatible with the standardized heavy-duty drawer slides described herein. Battery packs are rated at a standard 600 volts DC. Alternative embodiments of the SBP are rated as low as 400 volts and as high as 800 volts. The standard SBP capacity is 58 kWh (with a range in alternative embodiments of 30 to 80 kWh), but this will vary between battery packs of differing vintages as energy storage technologies improve. This 58 kWh energy source is supplemented in some embodiments of the SkyQarts by the addition of a super-capacitor either inside the SBP or inside the SkyQart's AFP. The super-capacitor's purpose is to augment the capability of the battery to rapidly supply the large amounts of electrical current needed for the brief periods of high power demanded for take-off acceleration.

At the high capacity SkyNest, the facilities at the dock will have robotic stacking of battery packs onto a battery charging rack that is equipped with high capacity DC charging connections. At each aircraft docking station, these battery charging racks will be located under the dock on either side of a central battery swapping robot. There will also be a single high capacity DC fast-charging port located on the external surface of the edge of the dock at each aircraft docking station so as to mate with the DC fast-charging port that is located on the lower face of the SkyQart's rear hatch opening.

The swappable standard battery pack (SBP) is retained in the SkyQart by dual latches that can be released by either operation of an electric solenoid-actuated pin or by manual operation.

The moving of the SBP at the dock can be accomplished by a robotic arm that grips and releases the battery pack using suction cups or by an electromagnet grip face applied to a ferrous metal surface on the pack. At relatively less busy, lower capacity SkyNests, the battery swapping can be simpler and less expensive, with manual transfer of SBPs from the docked SkyQart onto the drawer slides in the space just under the surface of the dock and thence on a continuum of said drawer slides across the full width of the dock to a waiting RDC at the opposite side of the dock that can receive and then deliver the SBP(s) to a nearby charging station. Alternatively, an RDC can use its precision positioning system to approach and align with the rear hatch opening of a stranded SkyQart that is parked on the paved surface of the SkyNest and exchange its SBP directly without a dock. An RDC can also deliver a freshly charged battery to the drawer slide under the dock so that it can be inserted and latched into a waiting SkyQart.

High capacity SkyNest docks can use a specialized central robot arm to accomplish fast and precise movement of the SBPs to a battery charging rack that recharges SBPs under the dock. The articulated specialized central robot arm can rapidly move in complex 3D paths, to unload and load freshly charged SBPs to and from a battery charging rack. Such robotic arms grip the SBP without crushing it by using either vacuum cups or an electro-magnetic under-cradle to lift the SBP. There must be an alternative method to exchange the SBP in case the robot arm is without power or is inoperative. The under-dock central robot arm will have the ability to be moved out of the way when it is inoperable. A slower, manual handling option for SBPs is made possible by having two insertable 205.7 cm long drawer slide segments that can be attached and aligned with the drawer slide gap on the underside of the dock to create a continuous drawer slide path for moving SBPs from a docked SkyQart across the full dock width distance of 7.47 m to the far opposite side of the dock where an RDC can on-load them in order to transport them to a remote charging station. For general aviation airports and start-up locations for QUAD, these manual SBP swapping methods may precede the installation of high capacity robotic swapping with battery charging rack. A specialized double-decker RDC whose top surface is equipped with a second set of SBP drawer slides that can be lowered by the RDC's scissor jack to exactly align with those of the SkyQart for off-loading SBPs from docked SkyQarts provides an alternative method of loading and off-loading SBPs. However, this double-decker RDC method of off-loading SBPs is slower than the fully automatic robotic system. By use of its scissor jack and compatible precision positioning system, the double decker RDC with its upper and lower set of drawer slides can provide a versatile loading/off-loading option for SBPs on both the docked SkyQart as well as for the SkyQart that is stranded or immobilized on the paved surface.

The nominal SBP will weigh 145.15 kg. Its weight is likely to decrease as future battery energy densities improve. The SBP's kWh capacity will also rise as future energy densities improve with technologic progress, which will increase the SkyQart's range and decrease the number of SBP swaps needed per day. Alternatively, the standard battery pack for this system has different dimensions, voltages and energy capacities as long as those standards fit the standards used for drawer slide spacing and electrical systems in the affected vehicles, dock and storage racks. At the busiest hubs, swapping should be accomplished consistently in less than 20 seconds. That leaves 10 seconds for removal and 10 seconds for insertion of the fully charged SBP.

Each aircraft docking station can provide space for four battery charging racks, two on either side of the robot arm. Each battery charging rack has five slots arranged vertically. Each such slot can hold an SBP. The robot arm can insert an SBP into a slot in less than 10 seconds. It can likewise remove an SBP from a slot in less than 10 seconds. The four battery charging racks at an aircraft docking station have a combined capacity of holding and charging twenty SBPs. Each of the five slots in each battery charging rack has compatible hardware to DC fast-charge, monitor and cool an SBP. The battery charging racks themselves are arranged as modules that can receive a spent SBP in an empty slot and supply a separate fully charged SBP from another of its slots. The robot arm can grab the freshly charged SBP from a slot in the BCR and insert it into the docked SkyQart. The BCRs are mounted on sturdy 4-wheel carts in order to be movable and serviceable. A battery management system, and charge monitoring system informs the robot about which slot is empty in the BCR and which slot can provide a fully charged SBP.

The Standard Battery Pack (SBP)

The standard battery pack SBP is an important component of this invention. It is used in every model of SkyQart and it has standard specifications and interfaces that are chosen so that the SBP can be handled both manually and by robotic equipment. Said standard specifications and interfaces configure the SBP so that it is swappable. The shape of the swappable SBP is determined by its need to fit into the belly of the AFP at a low waterline so as to lower the height of the center of gravity of the SkyQart. The container of the SBP has nominal interoperable dimensions of 8.89 cm H×66.04 cm W×101.6 cm L comprising thereby 59.65 liters, which, at the energy per volume of 975 wh/liter currently claimed by Tesla[21] can provide a 58.16 kWh battery pack of 145.15 kg with a density of 2.44 kg/liter. The pack consists of a large number of cells that are wired together in series to create a standard pack voltage of 600 volts. The conceivable range of voltages is from 400 to 800 volts in alternative embodiments of the SBP, with a preferred range of 550-650 volts. The pack has its positive and negative electrodes recessed slightly below the forward surface of its outer case. Said forward surface also has a multi-pin jack that connects the SBP's battery management system to a matching aligned receiving jack in the cabin of the SkyQart. When the SBP is inserted into the extensible drawer slides in the belly of the SkyQart, these electrodes make firm and broad contact with corresponding spring-loaded electrodes in the forward belly of the SkyQart. The outer container of the SBP is nominally a 0.406 mm thick stainless-steel sheetmetal case with a honeycomb pattern of internal structural supports bonded to its inner surfaces so as to stiffen it for handling. This metal container serves to confine out-gassing or smoke emissions as well as acting as a Faraday cage and RFI filter. The rear surface of the outer container has a midline opening that serves as a smoke vent in case of smoke emissions. This smoke vent mates to a short midline stainless steel air duct in the rear hatch of the AFP that provides an external exit on the midline belly of the SkyQart. The bottom surface of the SBP's stainless steel container includes a ferrous steel plate that facilitates the ability of the robot arm to firmly grip the SBP when moving it. Firmly attached to each of the long 8.9 cm tall sidewalls of the SBP's container are the male component of the 1.9 cm wide heavy duty drawer slides that mate with the female component of those drawer slides that is rigidly attached both to the side walls of the battery compartment in the belly of each SkyQart as well as to the sides of the battery swapping drawer slides under the dock and the drawer slides on an RDC.

Autonomous Control System

The autonomous control system of the SkyQart is an important component to this invention. The autonomous control system and its suite of multiple sensors for autonomous navigation, aerial agility, 'polite', sense and avoid traffic and obstacle separation in nearly all-weather conditions, functioning at a fully independent level of autonomy, will enable special operations in the fire suppression system and in other forms of transportation. Autonomous flight controls need not be present on the first iterations of the SkyQarts in order for it to be covered under this patent. However, autonomous flight controls, when available, must include, at minimum, appropriate servo-motor control of the positions of ailerons, rudder, flaps and elevator in order to enable safe, controlled flight and use of the fast flaps system. Similar autonomous control of spoilers, propeller thrust or drag, active landing gear, wheelmotors, rear hatch, pin-latching and battery swapping will be needed for the nominal embodiments of the SkyQart to operate at SkyNests as described herein. The operation of these several autonomous control functions will comprise the autonomous control system. The SkyQart's on-board autonomous control system integrates with a computerized networked situational awareness system and a precision positioning system at each SkyNest that, along with other air and surface vehicle guidance systems, to coordinate, control and actuate the sequencing, movements (including take-off, landing and taxiing) and positioning of vehicles including SkyQarts, as well as EPCs and RDCs, on SkyNest surfaces and dock facilities. Said sequencing, movement and positioning is performed by said autonomous control system with negligible control latency. A diverse suite of multiple sensors provide a variety of signals and data to said autonomous control system. Said signals and data are simultaneously combined, compared and analyzed by a process named sensor-fusion in order to resolve and comprehend a current situational awareness for each vehicle. Said sensor-fusion is a process that is used by all of the autonomous vehicles in this invention. Said signals and data will include but not be limited to the following:

differential GPS and/or bi-phasic GPS position and time sentient of local topography barometric static pressure
dynamic pressure (by pitot tube)
outside air temperature
cabin temperature
precision clock and timer
radar altimeter
inertial navigation relative position
3-axis accelerometer ("G's")
LIDAR with obstacle detection
thermal imaging cameras
multiple video camera synthetic vision for obstacle detection
motor temperatures
motor RPM
motor power in kW
propeller thrust and drag
battery pack temperatures and cell voltages (battery management system)
tire pressures
landing gear position
fuselage pitch angle
fuselage cabin floor height
yaw angle
roll angle
signal integrity
state of charge of the battery pack and expected range remaining
ADS-B traffic detection
dock proximity
rear hatch position
rear hatch latch security
battery pack latch security
center of gravity
gross weight
flap position
angle of attack
heading
magnetic track
winds aloft
surface winds
ATIS—airport terminal information service
SIGMETS—weather alerts (significant meteorological information)
TFRs—temporary flight restrictions
cabin smoke detector
cabin carbon monoxide detector
terrain type and height below the aircraft
total time on airframe
total time on motors
total time on propellers
master dispatch authorizations and updates thereto
communications radio with discrete channel frequency
cockpit microphones and intercom for SkyQart III
wingtip microphones for synchro-phasing of propellers
rooftop ballistic parachute status
alarms and conflict alerts in the autonomous control system include but are not limited to these:

1) SkyQart is off-course from intended/declared flight path
2) SkyQart mic detects a scream or yell in the cockpit
3) SkyQart energy reserve is doubtful or insufficient for reaching the planned destination with reserves
4) SkyQart has smoke detected in the cockpit (automatic $1000 fine to the credit card of the user if due to cigarette, cigar or *Cannabis* smoke)
5) SkyQart's destination SkyNest is closed due to weather, pavement obstruction, overcrowding or equipment malfunction (automatic nearby alternate is selected)
6) SkyQart records video wide angle view of both occupants and detects vandalism, tagging, tampering or other interior harm being done (occupants are informed, warned and shown this video monitoring capability before each flight)
7) No flying unless pre-paid by credit card and verified, or authorized by agency
8) SkyQart user pushes big red "HELP" button and bunker pilot on the ground intervenes to inquire on cabin intercom, "How may I help you?"
9) SkyQart altitude is rapidly dropping inappropriately and is well below assigned flight path (provision to remotely deploy ballistic recovery parachute in such cases)
10) SkyQart detects a disconnected seat belt and alerts bunker pilot monitors
11) SkyQart cabin lighting status: emergency lighting available
12) SkyQart is flying too close to another aircraft
13) SkyQart is experiencing a loss of thrust
14) SkyQart is experiencing a pitch, yaw or roll angle that is outside normal envelope limits
15) SkyQart has shed one of its cabin exit windows (suicide jumper)
16) SkyQart has a battery compartment overtemp, fire or smoke
17) SkyQart data stream faulty or disappears off monitors in bunker Bunker responses include but are not limited to:
a) Intercom query call to check on cockpit passengers
b) Tracking SkyQart on tracking screen to determine path to destination is OK
c) Scramble security team to destination airport to detain/interrogate passengers
d) If loss of power or zero thrust, redirect flight from overwater to overland
e) Remotely deploy ballistic recovery chute if needed
f) Remotely deploy search and rescue assistance if needed
g) Deploy US Coast Guard chopper for sea rescue with skyhook if ditching in water.

Precision Positioning System (PPS)

The precision positioning system is an important component to this invention and to fire suppression. It is the concept and process by which the various types of carts of the QUAD system autonomously dock with each other and with the SkyNest dock to enable QUAD's high capacity for moving people and goods. The precision positioning system relies upon sophisticated electronic vehicle guidance devices that use multiple miniature electronic sensors in sequenced sensor-fusion to enable docking accuracy to be nominally within ±2.0 mm.

There are several types of docking in the QUAD system for which the precision positioning system is important. In every type, there is an approaching vehicle and a stationary dock or other vehicle. The types of approach include SkyQart to dock, EPC to SkyQart, EPC to RDC, RDC to SkyQart, RDC to SkyNest dock, RDC to commercial truck dock or to a compatible off-loading ramp and RDC-F to a designated position close to a wildfire. The RDC and EPC each have miniaturized modular on-board autonomous navigation and positioning hardware that couple to their rear wheelmotors and steering to enable these carts to precisely align where loading and off-loading are to occur. The precision positioning system in the EPC and RDC operates with a similar miniature electronic sensor suite as that in the SkyQart. When the rear hatch is fully open, a SkyQart may be precisely positioned and aligned with the dock manually. This can be accomplished by simple visual alignment of the fine-line markings on the SkyQart's rear floor centerline with those fine lines on the dock surface at the center of the aircraft docking station. The manual docking of a SkyQart requires use of a nosewheel towbar and a wireless remote control that is authorized to command the height settings of the active main landing gear.

Fire Suppression Module (FSM and FSM-AS)

Successful fire suppression can be achieved when multiple recurring applications of fire-retardant are promptly and precisely applied to wildfires at frequent intervals by either air or ground vehicles or by both. Both the volume and accuracy of application are important to successful fire suppression. This invention includes a fire suppression module that can be carried to an active wildfire when pin-latched onto an electric payload cart (EPC) when said EPC is carried by either an air or ground vehicle that is a driverless, autonomous, robotic device as used in the system described herein. The EPC when laden with the fire suppression module is sized to fit the weight and space limitations of both the SkyQart and robotic delivery cart (RDC) that are original equipment manufactured (OEM) for this system, when minor modifications are made to the SkyQart, EPC and RDC. Those modifications convert the SkyQart I, II or III to a SkyQart I-F, II-F, III-uF or III-dF, respectively, and convert the EPC to an EPC-F and convert the RDC to an RDC-F. The FSM has an array of vertical struts that provide attachment of its single large tank to the seat tracks of the EPC-F. These struts each contain a pin-latch that can together reversibly secure said attachment quickly to the standard array of seat-tracks on an EPC. The nominal size of said struts is 21.59 cm tall×3.81 cm wide×6.35 cm long (8.5" tall×1.5" wide×2.5" in longitudinal length), though alternative sizes are used as needed.

The fire suppression module (FSM) consists of a combination of tank, tank outlet, exit valve and other devices as needed to precisely dispense and discharge a high volume of liquid fire-retardant directed toward a fire. The discharge valve attached onto the bottom of the tank outlet is a swing knife gate valve that is electrically operated and that obtains its electricity by connection to the battery that is on-board the EPC-F. The nominal and preferred liquid capacity of the tank is 567.8 liters (150 gallons), with nominal tank dimensions of 101.6 cm diameter×71.12 cm tall (40" diameter×28" tall), though alternative embodiments use tank capacities that are in the conceivable range of 302.8 liters (80 gallons) or more, 492.1 liters (130 gallons) or more, 681.4 liters (180 gallons) or more or any capacity included within said stated ranges. The valve is sized and arranged so as to be able to empty the entire contents of the tank from a SkyQart III-F's dual axisymmetric pods in as little as 4 seconds. Combining that rapid discharge with a flight airspeed of just 22 m/sec (51 mph or 75 fps), and the entire 1135.6 liters (300 gallons) in a SkyQart III-F can be dropped across a ground distance of just 88 m (300 feet). If, as is often the case, there is a headwind of 4.5 m/sec (10 mph) in the approach to the fire zone, these distances reduce to 73 m (240 feet). With a bucket brigade-like succession of 1135.6 liters (300 gallon) drops occurring at 10 second intervals from a swarm of SkyQart III-F aircraft attacking a wildfire, an equivalent of 6813.7 liters (1800 gallons) per minute can be delivered to a roughly 80 m strip of wildfire zone. This amounts to 408824.3 liters (108,000 gallons) per hour and is substantially more than the 4542.5 liters (1200 gallon) single drop capacity of a common air tanker, the S-2T, whose typical operations can provide three to four drops per hour, which would comprise up to 18170 liters (4800 gallons) per hour[8]. Thus, this invention's swarm of SkyQart II-F aircraft can provide more than 21 times the fire-retardant drop volume of the S-2T in the extant system. In addition, the anticipated ubiquity of SkyNests equipped with large numbers of SkyQarts I-F, II-F, III-uF and III-dF aircraft offers a likelihood to have a fire suppression swarm of aircraft available to reach the fire scene in only 6 minutes instead of the 15-20 minutes typically quoted as the arrival time required for an S-2T, whose longer paved surface requirement entails having fewer air attack bases that are necessarily sited much farther, on average, from a given wildfire than this invention's ubiquitous future network of SkyNests. Such rapid arrival on-scene to a fire means that the fire will be smaller upon the arrival of the initial air attack and thereby more readily contained. For comparison, in early 2020 there are only about 23 of the S-2T aircraft for the entire state of California, and during fire season, these specially modified aircraft are commonly distributed to assignments at hundreds of different fires. The SkyQarts I-F, II-F, III-uF and III-dF offer the advantages that they are affordable, mass-produced aircraft adapted from the QUAD transportation system and that need very little modification for fire suppression operation and that their autonomous controls enable them to fly precision low and slow approaches to fires even at night and even through smokey and windy conditions. The SkyQarts I-F, II-F, III-uF and III-dF each have a blown flap system that, during its low and slow approach, can provide a substantial downwash to direct and accurately apply the released fire-retardant from each of its fuselage pods.

The operation of the fire suppression module involves its discharge duct having a discharge orifice of nominally 20.32 cm×38.52 cm (8"×15.165") dimensions that mates and seals to the aircraft's exit duct that is added as a modification to the rear hatch of the SkyQart. These ducts are large enough to allow the entire tank contents of the FSM to be evacuated in as little as 4 seconds. The exit duct is placed on the lower forward portion of the rear hatch so that it accurately mates with and seals to a gasket on the perimeter of the aft mouth of the discharge duct of the FSM, when said FSM is pin-latched onto the EPC-F which, in turn, is pin-latched to an appropriate position inside the pod of the SkyQart. The flow into the discharge duct is initiated electronically on-demand by a large, electrically-operated swing knife gate valve, the discharge valve, which releases the tank contents of fire-retardant into the discharge duct from which said contents exit through the exit duct at the exit orifice. The exit orifice is strategically placed on the lower aft external surface of the pod of the SkyQart such that the external air pressures at said orifice are negative (i.e., below static pressure) during the discharge of fire-retardant, and said negative pressures enhance the rate of said discharge.

The flow rates of emptying the tank can be calculated for gravity drainage using known values for pressures, tank dimensions and exit valve diameter. The internal and external air pressures that exist on the SkyQart can provide the necessary gradient for accomplishing such drainage. The aircraft's dynamic pressure can be conducted through the fresh air vents into the SkyQart cabin and, from there, into the one-way breather vent on the top of the tank of the fire suppression module to augment the gravity drainage of its tank contents. And, as mentioned, by placing the exit orifice at a location on the exterior bottom skin of the aircraft's rear hatch where a negative static pressure exists, the gravity drainage can be further augmented by external "suction".

From the industrial use formula for draining a cylindrical tank[9]:

For a cylindrical tank with axis vertical, the following variables are applied:

h=height of tank fluid level above the drain, 0.7112 m or 28"

D=diameter of tank, 1.016 m or 40"

A=area of exit valve orifice, with orifice diameter=0.254 m or 10", A=0.051 sq m C=discharge coefficient of orifice, assume~1.0 if smoothly curved entry radii g acceleration due to gravity, 9.81 m/sec$^2$ $\Delta t$=time to drain tank fluid from height h to discharge orifice The formula used in this calculation is:

$$\Delta t = [\pi * (D^2)/(C*A)] * ((h/8g)^{0.5}) \quad \text{Equation (1)}$$

and substituting sample values yields:

$$\Delta t = [(3.14159*(1.016)^2/(1.0*0.051)] * ((0.7112/(8*9.81))^{0.5})$$

$$\Delta t = [(3.243/0.051)] * ((0.7112/(78.48))^{0.5})$$

$$\Delta t = [(63.588)*(0.0952)]$$

$\Delta t$=6.05 seconds at 1 atmosphere

If instead of 25.4 cm (10"), the orifice is 30.48 cm (12") diameter, then: A=0.073 sq m (113 sq in) and then: $\Delta t$= [(44.42)*(0.0952)]=4.23 seconds at 1 atmosphere and this evacuation time would be further reduced if the tank was pressurized with ram air or with a small tank of compressed air. The exit nozzle area on the external bottom skin of the AFP is designed to have an oval area that is at least 0.073 sq m so as to not impeded the flow of the fire-retardant. A tank that is 1.016 m in diameter and 0.7112 m tall can hold 576.5 liters (152.3 gallons) of fire-retardant. Delivering 567.8 liters (150 gallons) in about 4 seconds is achievable with an exit valve orifice of 0.3048 m (12") diameter. This is a usable and realistic delivery rate for fire-retardant when the SkyQart III-F makes a delivery run at 522 m/sec groundspeed with no headwind. The coverage level for fire-retardant drops in the USA is defined as gallons per 100 square feet (9.29 sq m) of ground surface. Coverage levels of from 1 to 8 are commonly used. Delivering the fire-retardant as a 3 m wide swath that is 88 m in length represents a coverage level that is 150 gallons over 2860 square feet, which equates to 1 gallon for every 19 square feet or about 5 gallons per 100 square feet, comprising a coverage level of 5. With a 4.5 m/sec (10 mph) headwind, the aircraft's ground speed is reduced so that its 4-second drop of 150 gallons occurs across 73 m and then the maximum coverage level for a 3 m wide swath increases to 1 gallon for every 16 square feet which means coverage level of 6.25 (i.e., 6.25 gallons per 100 square feet). When it is considered that the SkyQart III-uF and III-dF each actually has two fuselage pods that can each simultaneously dispense a 4-second drop of 567.8 liters (150 gallons) of fire-retardant, then each SkyQart III-uF or III-dF can produce an effective coverage level even beyond the industry requirement of coverage level 8. The fire suppression module has a discharge orifice whose size is designed for the rapid discharge of the fire-retardant. When used for aerial application, said discharge orifice directs the discharge of liquids downward to the external bottom skin of the aircraft through said discharge duct and into said exit duct that is fastened onto the rear hatch of the SkyQart I-F, II-F, III-uF or III-dF.

When used on an RDC-F for neighborhood fire containment, the FSM on the EPC-F that is carried on said RDC-F is modified to be different than the FSM that is used for aerial application by the SkyQart. The FSM carried on said RDC-F is designated as an FSM-AS because it has an "aimable spray" nozzle that is attached by pin-latching to the seat tracks near the rear edge of the EPC-F. Said aimable spray nozzle is a motor-controlled device that is coupled to a heat-sensing thermographic camera that autonomously detects the location of a fire's flames and aims the nozzle at that location. Said nozzle can spray in a fixed direction or can spray while moving its aim across a range of motion up and down, side-to-side or any combination thereof that is appropriate for suppressing a fire. On the FSM-AS, said aimable spray nozzle is connected by a short, flexible, high-pressure hose to a motor-driven fluid pump that replaces the discharge duct on the bottom of the standard FSM. Said motor-driven fluid pump is affixed to and sealed to the bottom of the swing knife gate valve on the bottom of the FSM and is also pin-latched with an array of "feet" onto the seat tracks of the EPC-F. The spray nozzle can be aimed to direct its stream of fluid across a horizontal range of 30° left of center to 30° right of center and can be aimed across a vertical range of from 10° downward from level to 45° upward from level.

Said spray nozzle has a motor-operated spray pattern control near its exit tip that can vary its spray pattern from zero flow to a narrow stream to a widened stream to a diffuse wide angle fogging stream, as needed for optimum fire suppression. The pump-driven spray nozzle discharge can deliver up to 284 liters (75 gallons) per minute and its spray discharge can reach more than 15 m (50 feet) to provide a long distance spray capability. The range of its aim can be augmented by the precision positioning system of the RDC-F. At maximum, the RDC-F spray nozzle would thus empty the entire contents of the nominal 567.8 liters (150 gallon) tank in as little as 2 minutes, at which time the RDC-F would return to its nearby SkyNest for rapid swapping of its EPC-F for a fully recharged one filled with fire-retardant. During that 2 minutes of spraying at the fire, a maximum swarm of twelve other RDC-F's, each one arriving in succession at 10 second intervals from the fire suppression station, could thus deliver as much as (12×150)/2=900 gallons per minute (3407 liters per minute) to a neighborhood fire, a volume that is roughly equivalent to having 2 full size fire engines on scene. Alternatively, members of said swarm of RDC-Fs could be strategically distributed in their designated assignments to the most urgent of the neighborhood fire hot spots. Such strategic distribution could be directed by an on-site human ramp boss, or by an autonomous assessment of need. The discharge of fire suppressant from the SkyQarts used in fire-suppression is optimized by placing the discharge orifice on the lower external skin of the fuselage pod at a location that is designed to have a negative external surface pressure in order to augment the extraction of the fire suppressant and to converge the two streams of retardant from the left and right pods into a broad dual swath of ground coverage. This is done in such a way as to minimize the drag of said exit orifices when sealed off for passenger or cargo flights.

Fire Suppression Station (FSS)

Successful fire suppression requires sustained applications of fire-retardant that are promptly and precisely applied to nascent wildfires at frequent intervals by either air or ground vehicles or by both. The fire suppression system of this invention includes a facility and equipment comprising a fire suppression station (FSS) that is designed to provide the readiness to sustain the volume and duration of application of fire-retardant that are necessary to successful fire suppression. This fire suppression station is designed to be of sufficient but not excessive size and to be installed at select SkyNests of the QUAD transportation system that are located near the wildland urban interface (WUI) and other areas that are prone to wildfires. The fire suppression station is therefore an innovation that is an important part of this invention's System for Fire Suppression by Autonomous Air and Ground Vehicles.

The fire suppression station comprises an array of small fire suppression siloes that rapidly dispense water or compounded fire-retardant to fill FSMs on autonomous robotic EPC-Fs. In order to fill said siloes by gravity flow, the fire suppression station has a large, elevated water tank that supplies water through a discharge pipe to said siloes. Said water tank can be filled with reclaimed water or potable water as needed, with reclaimed water being the preferred choice. Said water tank comprises a fill port with inlet filter, a distribution manifold and discharge valve(s) to fill and refill said siloes. To accomplish this supply function, one or more high volume electric powered water pumps are connected so as to fill and keep filled said large, elevated water tank. Said pumps are powered by electricity from any of several sources including the local electric grid, a back-up generator, or by renewable energy sources including wind turbines, solar panels, pumped hydro, geothermal wells or nuclear sources. Solar panels may be arrayed on top of said elevated large water tank. When so filled, this tank ensures that the fire suppression station can provide a substantial duration of fire suppression operations using its gravity-fed delivery system, without dependency upon electricity. A back-up, emergency, gasoline, natural gas, jet fuel or diesel powered electric generator of sufficient capacity to supply the electricity necessary for the high volume pump(s) that fill said water tank is included in the fire suppression station to ensure the station's ability to operate continuously during times of failure of electrical supply if and when a protracted wildfire suppression operation remains in progress. In the off-season from wildfire season and when there is no acute or anticipated need for operation of the fire suppression station, the station's large, elevated water tank can discharge some portion of its water to serve other purposes, including but not limited to irrigation or driving a hydro-electric turbine that makes electricity in the event of electrical outage or shortage at a SkyNest.

The main release valve from the large, elevated water tank is a large swing knife gate valve that supplies water through a large discharge pipe that has a check valve that prevents back-flow into said large tank. Downstream from this check valve in the large discharge pipe are one or more side ports through which additives from smaller tanks can be added to the water to compound it into fire-retardant. The appropriate amount of additive from one or more of said smaller tanks is passed through a closeable supply valve and then through a one-way check valve on its path into a distribution manifold. Said additives include but are not limited to wetting agents, foaming chemicals, fertilizers (including ammonium and diammonium sulfate and ammonium phosphate), gel-like thickeners (including guar gum, various cellulose derivatives or other additives) and corrosion inhibitors (for aircraft safety). The addition of controlled amounts of said additives from said side ports causes said additives to become mixed with the water as it flows into the downstream distribution manifold. An inline mixer device inside said manifold ensures adequate mixing of said additives with the water. Said additives are prevented by the main check valve from flowing into and contaminating the large, elevated water tank. Each of said side ports has a shut-off valve to control or eliminate the flow of its additive into the large discharge pipe. Downstream of said side ports is the said distribution manifold that distributes the liquid to the siloes. The lower surface of each silo has a swing knife gate valve that dispenses its liquid contents into the single tank on an FSM that is pin-latched onto the EPC-F that is parked underneath said silo. The control and timing of said valve can be performed either by a human or autonomously.

The components of the fire suppression station are designed to provide an effective and sustainable supply of fire suppression liquid, flowing by gravity, into the FSMs that are used in the air and ground vehicles that are operating at a SkyNest when said vehicles are being used to suppress fires. The nominal sizing of the large, elevated water tank is 15.24 m (50 feet) diameter and 6.1 m (20 feet) in height. This size is chosen as one compatible with the cost, dimensions and needs of a SkyNest. Alternative sizes of this water tank may be used. By applying the equation (1) above to the calculation of the flow rate discharged from said large, elevated water tank when said tank is full, and assuming that the tank has a circular discharge orifice whose diameter is 0.356 m (14 inches) comprising an area of 0.0993 sq m (1.1 sq ft), yields a flow rate of 26,399 liters per minute (6974 gallons per minute). Distributing that flow rate to six siloes comprises a flow rate capability of 4400 liters per minute (1162 gallons per minute) at each silo. To fulfill the needs of rapidly sequenced aerial drops of fire-retardant, each of said siloes needs to have a flow rate capability that can fill the nominally 567.8 liters (150 gallon) tank on an FSM in 10 seconds or less, which equates to a filling rate of 3407 liters per minute (900 gallons per minute). Thus, it is apparent that a discharge orifice diameter of 0.356 m from the large, elevated water tank, when said tank is full, can provide a flow rate capability 4398.6 liters (1162 gallons) per minute per silo and that flow rate easily exceeds that needed for the rapid continuous filling of the tank on each of the succession of FSMs that are each being filled by that silo at 3407 liters per minute (900 gallons per minute)(150 gallons in 10 seconds). However, when the large, elevated water tank of 6.1 m (20 feet) in height has emptied enough to have its internal water surface height only 0.61 m (2 feet) above the bottom of said tank, then calculation with Equation (1) shows that the flow rate through its discharge orifice decreases such that a larger discharge orifice is needed. In such case, the discharge orifice in the bottom of said tank must be enlarged to a diameter of 0.556 m (21.91 inches) in order to maintain a flow rate capability of 3407 liters per minute (900 gallons per minute) at each silo. Such calculations indicate the need for a valve, such as a swing knife gate valve, that can modulate the size of the discharge orifice to size it according to the flow rates needed during a fire suppression operation.

The volume of water consumed in draining the nominal sized, 15.24 m (50 feet) in diameter and 6.1 m (20 feet) tall, elevated water tank from its full condition to the condition of having just 0.61 m (2 feet) of water height remaining in the tank is 293,759−29376=264383 gallons. If that volume is drained at a continuous controlled rate of 3406.9 liters (900 gallons) per minute per silo, with six siloes operating, then a flow rate of 6×900=5400 gallons per minute (20441 liters per minute) is required. Therefore, in order to supply said six siloes with continuous filling of FSMs, the gravity drainage of the elevated tank will consume 264383/5400=49 minutes. In the unlikely event that a nearby wildfire were to require more than 1000798 liters (264,383 gallons) of strategically placed fire-retardant, then said 49 minutes of gravity fed water supply at the FSS can be prolonged indefinitely by use of a pair of high capacity electric pumps that are sized to collectively surpass the necessary filling rate of 20441 liters (5400 gallons) per minute into the elevated tank.

Similar calculations using Equation (1) indicate that each cylindrically shaped silo at the FSS can be 1.83 m (6 feet) in diameter and 3.05 m (10 feet) tall and, with an exit orifice of nominally 15.24 cm (6 inches) diameter, and thereby supply the necessary flow rates to fill a 567.8 liter (150-gallon) FSM tank in 10 seconds using simple gravity drainage. It is noteworthy that these siloes, being located beneath whatever fluid level exists in the overhead large, elevated water tank, are essentially always full and thereby capable of maintaining at least a nominal "head" or height of water that is 3.05 m (10 feet) in height. In such case, said exit orifice of a nominal 15.24 cm (6-inch) diameter, located on the bottom surface of each of said siloes, is sufficient to provide 906 gallons per minute (3429.6 liters per minute) of continuous flow rate.

For a wildfire that is 16.1 km (10 miles) distant from a SkyNest, each of the 193 kph (120 mph) SkyQarts requires roughly 5 minutes of flight time to reach the fire. Calculations show that a continuous succession of SkyQarts sufficient to make aerial fire-retardant drops of 567.8 liters (150 gallons) at 10-second intervals on a wildfire that is 16.1 km (10 miles) distant from a SkyNest would require a fleet of 120 SkyQarts, each equipped with an EPC-F laden with an FSM. With the nominal capacity of the FSS's large, elevated water tank at 1000798 liters (264383 gallons), such a barrage would be sustained for 14.7 round trips by each of the 120 SkyQarts before exhausting said capacity. If the fire were only 8 km (5 miles) distant, then such a barrage would require only 60 SkyQarts and they would each reach the fire with roughly 2.5 minutes of flight time. If every fire-retardant drop were performed at 10-second intervals by a dual-pod SkyQart III-uF or III-dF equipped to carry 567.8 liters (150 gallons) in each of its pods, then the volume available in said large, elevated water tank would be sufficient to supply 7.35 round trips by each of said SkyQarts, and the maximum volume dropped would be 408824 liters (108,000 gallons) per hour. These required numbers of SkyQarts could be reduced 3-fold if it were acceptable for the SkyQarts to perform the aerial fire-retardant drops at 30 second intervals instead of 10-second intervals. If, alternatively, for a fire 16.1 km (10 miles) distant it were acceptable for the SkyQarts to perform the aerial fire-retardant drops at 1 minute intervals, then the requirement of 120 SkyQarts would be reduced 6-fold to just 20 SkyQarts, and if each of those 20 SkyQarts were the dual-pod SkyQarts III-uF or III-dF, then the maximum volume of fire-retardant delivered would be commensurately reduced to 1135.6 liters (300 gallons) per minute or 68137.4 liters (18,000 gallons) per hour. Said delivery rate of 68137.4 liters (18,000 gallons) per hour is comparable to a typical delivery of fire-retardant by current S-2T aircraft that each can deliver 4542.5 liters (1200 gallons) and can typically complete 3 aerial drops per hour, making 13627.5 liters (3600 gallons) per hour per aircraft. In such case, a delivery rate of 68137.4 liters (18,000 gallons) per hour would require 5 of the S-2T aircraft to be assigned to that fire. From such analysis, the same volume of delivery of fire-retardant can be readily achieved by 20 SkyQarts as by 5 of the S-2T aircraft, indicating a need for 4-fold more of the SkyQart aircraft. The cost of such aircraft is estimated to be $400,000 for a mass-produced SkyQart III-uF and $6,400,000 for a limited production S-2T, which figures reveal a 16-fold cost savings advantage for the SkyQart.

A similar calculation can forecast the required number of RDC-Fs needed for a residential or road-accessible fire that is a typical 8 km (5 miles) distant from a SkyNest. The 40.2 kph (25 mph) RDC-F can reach such a fire in 12 minutes. A continuous succession of RDC-Fs sufficient to spray fire-retardant at 10-second intervals on a residential or road-accessible fire that is 8 km (5 miles) distant from a SkyNest would require a fleet of 72 RDC-Fs, each equipped with an EPC-F laden with an FSM-AS. At a nominal spray rate of 284 liters (75 gallons) per minute, each RDC-F would consume 2 minutes of spraying to empty the entire 567.8 liters (150 gallons) from its FSM. If 12 additional RDC-F's were simultaneously engaged in spraying on the same fire, with each of said 12 requiring 2 minutes to spray its entire 567.8 liters (150 gallons) onto the fire, then the 72 RDC-Fs enroute at 10-second intervals to or from this fire would be augmented by said 12 additional RDC-Fs making a total of 84 RDC-Fs assigned to this fire. If instead it were sufficient to assign only one first RDC-F at a time to spray its entire 567.8 liters (150 gallons) onto such a fire and then every 2 minutes a next RDC-F would arrive to replace said first RDC-F and to then likewise spray its 567.8 liters (150 gallons) onto such a fire, then such a 8 km (5 mile) distant fire would require a total of 14 separate RDC-Fs, comprised of 12 enroute plus one spraying and one filling, in order to supply a succession of freshly filled RDC-Fs arriving at the fire scene at 2-minute intervals and then returning to the FSS for refilling.

From the foregoing, it is apparent that a FSS at a SkyNest, during fire season, should have on its premises a basic supply of air and ground vehicles sufficient to launch a succession of effective fire suppression vehicles. When necessary, and concurrent with said launch, an emergency call can be broadcast across that region to muster many more such fire suppression vehicles from nearby SkyNests to a designated SkyNest according to the forecast demands of suppressing a fire near said SkyNest. When a fully developed QUAD system is in place across the region, said emergency call can be expected to muster to an FSS in need a sufficient number of fire suppression vehicles to augment the basic supply of said vehicles so as to enable the deployment of a nearly continuous and sustainable barrage of fire suppression at said fire nearby. Said musters also emphasize the importance of having the modifications necessary to convert an EPC to an EPC-F and to convert a SkyQart III to a SkyQart III-uF or III-dF be modifications that are simple and quick to perform. Using quick-connect fasteners and a standardized pin-latching system, both a SkyQart and an EPC can be converted to fire duty in about 2 minutes by the attachment of the exit duct and FSM, respectively.

Swing Knife Gate Valve

The swing knife gate valve used in this invention is distinguished from prior art by using a flat or pancake servo motor to rotate its hinge pin—the pin that rotates to move the attached knife-like plate that modulates the size of the valve opening. This motor is distinguished by being a fast-acting, powerful servo motor that can open or close the valve to any desired amount from 0% open to 100% open in less than 0.5 seconds and thereby control both the timing and the flow rate through said valve. The swing knife itself is stiff enough to maintain its alignment perpendicular to the valve orifice throughout its range of motion. When closed, the knife seals around its perimeter of the valve orifice into a durable low-friction gasket. The valve motor can be operated both manually and by autonomous control commands. The swing knife gate valve is used in several components of this patent.

TABLE 7

Nomenclature Summary

| | |
|---|---|
| 3D: | three dimensional. |
| 4D: | a three-dimensional path along which each point has a specific clock time. (0025) |
| Above mean sea level, describing elevation or altitude on a standard day | |
| AFP: | axisymmetric fuselage pod. |
| c.g.: | center of gravity |
| CO2: | carbon di-oxide, a greenhouse gas |
| crash cushion: | an energy absorbing device placed at the end of a SkyNest's short paved surface |
| dBA: | decibel level on the "A" weighted scale. |
| EPC: | electric payload cart, a driverless cart that carries people or goods latched to its surface. |
| EPC-F: | electric payload cart with fire suppression module attached |
| ESTOL: | extremely short take-off and landing. |
| | Faraday cage around battery pack, to contain dangerous high voltage and radio interference |
| FlyQUAD: | the mobile device software application for reserving a flight in QUAD. |
| FSM: | fire suppression module for pin-latching onto an EPC-F |
| FSM-AS: | fire suppression module with aimable spray, for use on RDCs |
| FSS: | fire suppression station at a SkyNest, for supplying fire-retardant |
| G: | the acceleration due to gravity at sea level on Earth, 9.81 ml/sec$^2$. |
| GPS: | global positioning system. |
| Ground travel time, the total of non-airborne time during a trip using QUAD. | |
| GRACE: | Guided Rate Acceleration Change Execution |
| IFR: | instrument flight rules |
| $L_{den}$: | level in dBA, day, evening and night, a standard metric for noise measurement |
| kg: | kilogram unit of mass |
| km/hr: | kilometers per hour |
| kWh: | kilowatt-hour, unit of energy = 1000 watts for one hour |
| kW: | kilowatt, unit of power = 1.34 horsepower |
| last mile: | the final ground travel portion of a trip to reach a doorstep destination |
| Landing gear wheelmotor, an electric motor embedded inside a landing gear's wheel. | |
| m: | meter, metric unit of length, equivalent to 3.2808 feet |
| Networked Situational Awareness, software that controls vehicle movements at SkyNests. | |
| Prep-delay: | the time spent boarding, stowing personal effects or loading an electric payload cart prior to pressing its Go-button and after the appointed time of departure from the dock |
| PPS: | precision positioning system |
| QUAD: | quiet urban air delivery, a system of vehicles to move people and goods by air |
| Robotic battery swapping, a robot arm that removes and replaces standard battery packs. | |
| RDC: | robotic delivery cart, a golf-cart-like electric vehicle for hauling EPCs and SBPs |
| RDC-F: | robotic delivery cart with fire suppression module and pressurized discharge nozzles |
| RPM: | revolutions per minute |
| SBP: | standard battery pack, an energy source in a standard sized container fit for SkyQarts. |
| Solenoid-actuated pin-latching system, a fast-acting way to securely latch items together. | |
| SkyNest Dock Standards, the uniformly sized facilities/capabilities at a QUAD dock. | |
| SkyNest: | one of a series of five standardized airparks used in the QUAD system |
| SkyQart: | standardized electric-powered autonomous QUAD aircraft |

TABLE 7-continued

Nomenclature Summary

| | |
|---|---|
| Cadenced coordinated operations at Sky/Nests, the rapid cadence sequence of operations at SkyNests. | |
| VASI: | Visual Approach Slope Indicator, a pavement lighting system to guide final approach slopes |
| VFR: | visual flight rules |
| VTOL: | vertical take-off and landing, for example helicopters |
| Vmax: | maximum velocity |
| wildfire: | a fire that is not controlled, contained or intentional |

BRIEF DESCRIPTION OF SEVERAL VIEWS OF THE DRAWINGS

The accompanying drawings are included to provide a further understanding of the invention and constitute apart of this specification. They illustrate the embodiments that comprise the invention, and together with the description of their components serve to explain a nominal operation of the system.

FIG. 1 shows atop view of an exemplary Axisymmetric Fuselage Pod (AFP) showing its hard points, ribs and rear hatch.

FIG. 2 shows a side view of the exemplary Axisymmetric Fuselage Pod (AFP).

FIG. 2A shows a cross-sectional view of the window frame of the circular emergency exit window of the Axisymmetric Fuselage Pod (AFP).

FIG. 3 shows a frontal view of the exemplary Axisymmetric Fuselage Pod (AFP).

FIG. 4 shows a frontal view of SkyQart I and II with overlapping wingtips

FIG. 5 shows a top view of SkyQart I

FIG. 6 shows a side view of SkyQart I

FIG. 7 shows a frontal view of an exemplary SkyQart III-uF with diagonal wing struts and wing overlap FIG. 8 shows a top view of an exemplary SkyQart III-uF FIG. 9 shows a side view of an exemplary SkyQart III-uF FIG. 11 shows a top view of the Fire Suppression Station FIG. 12 shows a side view of the Fire Suppression Station FIG. 13 shows a detailed top view of a swing knife gate valve FIGS. 17, 18 shows a top view of the SkyNest IV (bowl-shaped) with an FSS

FIG. 21 shows a frontal view of the active main landing gear

FIG. 22 shows a side view of the active main landing gear

FIGS. 25, 26, 27 and 28 depict the details of the autonomous robotic electric payload cart (EPC) and its seat-latching tracks.

FIGS. 29, 30, 31 and 32 depict payloads other than the fire suppression module as payload loaded into a SkyQart.

FIG. 33 shows a frontal view of details of an exemplary fire suppression module (FSM) fitted onto an autonomous robotic electric payload cart, (EPC-F).

FIG. 34 shows a top view of details of an exemplary fire suppression module (FSM) fitted onto an autonomous robotic electric payload cart, (EPC-F).

FIG. 35 shows a side view of details of an exemplary fire suppression module (FSM) fitted onto an autonomous robotic electric payload cart, (EPC-F).

FIG. 36 shows a frontal view of an EPC-F depicting the size, fit and position of the fire suppression module with aimable spray (FSM-AS).

FIG. 37 shows a top view of an EPC-F depicting the size, fit and position of the fire suppression module with aimable spray (FSM-AS).

FIG. 38 shows a side view of an EPC-F depicting the size, fit and position of the fire suppression module with aimable spray (FSM-AS).

FIG. 39 shows a top view of the typical size and relative positions of a loaded RDC, a robot arm and battery charging racks at a SkyNest dock service bay FIG. 40 shows a side view of the typical size and relative positions of a loaded RDC, a robot arm and battery charging racks at a SkyNest dock service bay FIG. 41 shows a frontal view of the forward surface of a standard battery pack and its fittings FIG. 42 shows a frontal view of the rear surface of a standard battery pack and its fittings FIG. 43 shows a top view of the standard battery pack and its fittings FIG. 44 shows a side view of the standard battery pack and its fittings FIG. 45 shows a side view of the details of the RDC when it carries an FSM-AS on its surface deck.

FIG. 46 shows a frontal view of the details of the RDC when it carries an FSM-AS on its surface deck.

FIG. 47 shows a top view of the details of the RDC when it carries an FSM-AS on its surface deck.

DETAILED DESCRIPTION OF THE ILLUSTRATED EMBODIMENTS

Figure 10:
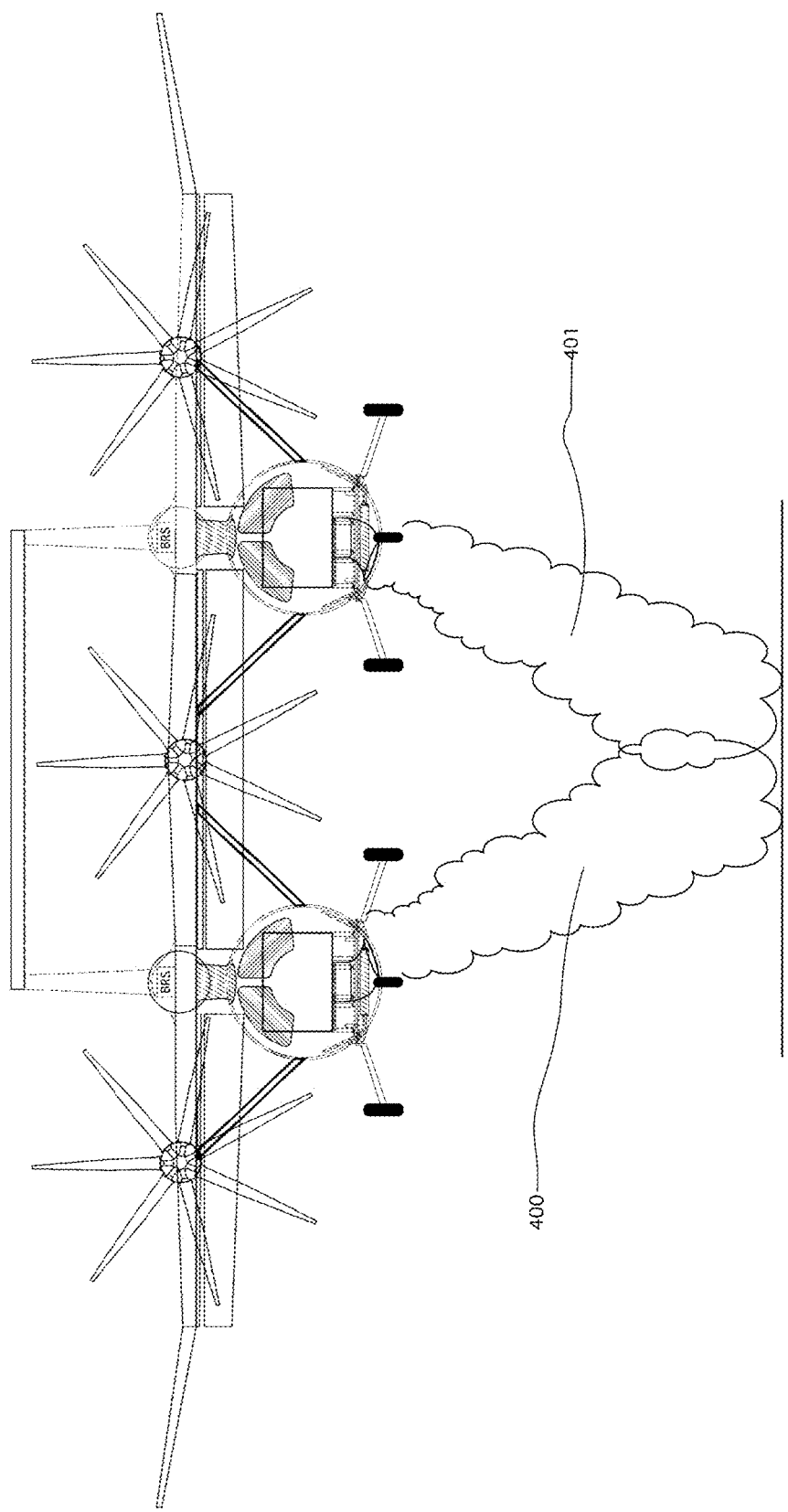
FIG. 10 shows a frontal view of SkyQart III-F's discharge pattern of fire-retardant

As used herein, the terms comprises, comprising, includes, including, has, having or any other variation thereof, are intended to cover a non-exclusive inclusion. For example, a process, method, strategy, article or apparatus that comprises a list of elements is not necessarily limited to only those elements but may include other elements not expressly listed or inherent to such process, method, strategy, article, or apparatus. Also, use of a or an are employed to describe elements and components described herein. This is done merely for convenience and to give a general sense of the scope of the invention. This description should be read to include one or at least one and the singular but it also includes the plural unless it is obvious that it is meant otherwise.

GENERAL: The invention is that of the concepts and processes that include the sequence of operations and the important components, electric-powered vehicles and specifications of the an aviation-based system that relies upon the uniquely-capable, electric-powered aircraft called SkyQarts along with versatile, compatible, standardized electric-powered ground vehicles to provide highly distributed, high-capacity delivery of fire-retardant across urban mega-regions, suburban neighborhoods and wildlands by operating to and from small, and high-proximity SkyNests that themselves have specific and standardized dimensions, structures, facilities and features and from which the SkyQarts, electric payload carts and robotic delivery carts can provide delivery and application of fire-retardant to nearby wildfires. The SkyNests provide a standard embodiment of the loading dock at which the compatible SkyQarts can be loaded and unloaded rapidly and where rapid robotic or manual replacement of its swappable standard battery pack (SBP) can take place. The SkyNest, SkyQart, EPC, RDC and SBP are all included as important, interdependent components in this patent, and together with their processes comprise the System for System for Fire Suppression by Autonomous Air and Ground Vehicles. The following detailed description of the illustrated embodiments necessarily includes some redundancy with the descriptions provided in the SUMMARY OF THE INVENTION above, but only to the extent that it provides the reader the convenience of proximate context for the description at hand. Where appropriate, the Figures are drawn with omission of components that would prevent a clear depiction of the items of interest. The convention used in the following detailed descriptions is to append immediately following each item or component its reference number in the Figures.

The Axisymmetric Fuselage Pod (AFP)

FIGS. 1, 2, 2A and 3 in show plan views of the top, side and front, respectively of the axisymmetric fuselage pod (AFP) and its window frame detail in accordance with one embodiment of the present invention. Other alternative embodiments of SkyQarts that do not have AFPs are used in alternative systems and still be included in this invention if they retain the capability of loading and unloading EPCs and or RDCs through a large door or hatch in their fuselage.

All of the embedded bulkheads and longerons shown in FIGS. 1, 2 and 3 have cross-sections that actually include a wider and gradual tapering (not shown) of their thickness at locations outward from the thick lines that depict their core structure. Only the location and core structure of each bulkhead and longeron is depicted by the thick lines in the figure.

A top view of the right side of the external surface of the nose of the axisymmetric fuselage pod (AFP) 100, shows its axisymmetric shape. The forward-most structural bulkhead 101 of the AFP 100 is positioned to dissipate the loads of the nosewheel into the AFP. A side view in FIG. 2 depicts the lower diagonal forward longeron 102 of the AFP. Said longeron is omitted in FIG. 1 for clarity. A top view in FIG. 1 depicts the longitudinal reinforced spine 103, that bisects the windshield of the AFP and that is embedded into the upper midline of the AFP and helps to carry the loads from the forward portion of the AFP and its nosewheel to the mono-strut and main wing attachment. A side view in FIG. 2 depicts a line that represents the edge of the mid-fuselage circular circumferential structural bulkhead 104, that is embedded into the skin of the AFP and that reinforces its floorboards and its other spines, longerons and bulkheads, while also spreading the loads from the forward wing attachment onto the roof of the AFP. In FIG. 2, the reference "FIG. 2A" points to the location of the cross section of the perimeter of the circular cabin side window that is depicted in larger detail in FIG. 2A below. A side view in FIG. 2 depicts a line that represents the edge of the curved diagonal embedded bulkhead 105 that joins the lower portion of the mid-fuselage bulkhead to the more aftward circular hatch door bulkhead and spreads the loads from the wing attachment on the roof of the AFP to its forward structures. A side view in FIG. 2 depicts the edge of the curved horizontal longeron 106, that joins the rear bulkhead to the middle, diagonal and forward bulkheads and stiffens the sidewall of the AFP. A side view depicts the edge of the upper surface of the composite sandwich structure of the cabin floor 107 of the AFP. A top view in FIG. 1, depicts the edge of the rear bulkhead 108 of the AFP that stiffens its rear hatch opening and dissipates loads from both the main wing and the main landing gear. A side view depicts the removable flotation module #1 109, which provides enhanced flotation for the SkyQart by filling the empty space inside the AFP's rear hatch, typically when it is used to carry an EPC that carries cargo. Module #1 109 is typically removed for most other payloads including those with a fire suppression module. The removal of Module #1 109 affords extra space to allow the seats and the rear baggage bin to recline. Module #1 measures nominally 55.9 cm L×114.3 cm H×121.9 cm W at the armrest waterline, narrowing to 101.6 cm W at the shoulder waterline. A side view depicts the larger removable flotation module #2 110, that can be removed from the rear hatch of the AFP in order to increase the rear cabin volume and enable the hauling of out-sized cargo items and, for the SkyQart I-F, II-F and III-F, the installation of a fire-retardant exit nozzle. Excepting the volume of module #1, module #2 occupies nearly all of the volume of the rear hatch forward of the fuselage station that is 96.5 cm aft of the hatchline. A side view depicts the edge of the top portion of the outer skin of the rear hatch 11 of the AFP. A frontal view of a line depicts the edge of the rear hatch 112 of the AFP when it is in its fully opened position, wherein it is swung upward at an 18° angle, the position that allows it to clear both the dock and the main landing gear. In FIG. 2A, details of the perimeter of the circular cabin window are shown. The diagonally crosshatched reinforcing perimeter flange 113 on the outer edge of the circular cabin window is depicted in cross-section. A representative finger recess 114 in the circular cabin window's perimeter flange is depicted with a dashed line outline. This finger recess and identical others distributed at several points along the window's perimeter flange serve as grips for a passenger to be able to pull the window inward into the aircraft cabin in the unlikely event of having to use the window opening as an emergency escape exit. The horizontally crosshatched, specially shaped extruded rubber external sealing strip 115, seals the outer gap between the window and the window frame. To increase its surface to volume ratio, this rubber sealing strip has small nipples that engage into each of the circumferential grooves shown in cross-section both in the window's perimeter flange and the window frame. It will be noted that this rubber sealing strip forms a flush external surface with the outer skin of the AFP when properly pressed and glued in place. The diagonally crosshatched structure that is the outer wall 116 of the AFP is depicted with a rounded contour at the edge of its window opening. This rounded contour facilitates using the opening as an escape exit. The internal sealing adhesive tape 117, joins the window's perimeter flange to the surface of the inner wall of the AFP and thereby prevents air leakage in or out of the narrow gap around the window.

The SkyQart I and SkyQart I

FIGS. 4, 5 and 6 show plan views of the front, top and side, respectively of the nominal passenger-carrying SkyQart T and SkyQart II in accordance with one embodiment of the present invention. In FIGS. 4, 5 and 6, the detailed features of the nominal SkyQart I and II are indicated by reference numbers 200 through 246. The SkyQart is sized and proportioned so as to match the dimensions of a standard SkyNest, its loading dock and its surface carts. Its wing area and span, flap area, propeller diameter, fuselage shape and size, tail volume, ground clearance, landing gear dimensions, center of gravity, cabin volume, battery pack size, and rear hatch door are all scaled to allow this aircraft to fulfill the mission requirements and processes of both the QUAD transportation system and the System for Fire Suppression by Autonomous Air and Ground Vehicles. The relative scale of these components in the 3-view drawings. FIGS. 4, 5 and 6, are accurate and are shown together in order to clarify their three-dimensional (3D) shapes. These components are shown in accordance with the nominal dimensions given in the text. When not specified, all items described apply to both SkyQart I and SkyQart II as the nominal interoperable embodiments presented herein.

In FIG. 4, The starboard tip of the fixed horizontal tail 200 of the SkyQart shows said tail to be the crossbar of a "T" shaped tail. The upper starboard portion of the fixed vertical tail surface (vertical stabilizer) 201 of the SkyQart attaches to said horizontal tail 200. Said horizontal tail 200 and said vertical stabilizer 201 comprise the "T" tailed empennage of the SkyQart I and II. The corner of the rectangular container for the emergency ballistic recovery system (BRS) 202, contains a compact rocket-fired vehicle parachute that is within the tailcone of the SkyQart and that has its attachment cables embedded and attached into appropriate hard points on the outer skin of the SkyQart. The SkyQart's starboard quiet propeller 203 is shown with its seven identical propeller blades and without its propeller spinner in place. The left or port wing has an identical seven-bladed propeller and it is shown with its axial spinner in place, covering the innermost shank portions of its propeller's blades. The SkyQart I 204 has a dihedral (upward tilt) of 8.84° of both its port and starboard wingtips. The SkyQart II 205 has an anhedral (downward tilt) of 11.87° of both its port and starboard wingtips. The lateral edge of a flap hinge fin 206 is one of four that project down below the trailing edge of the lower wing surface. These hinge fins provide the pivot axes for both the forward flap segment and the rear flap segment of the double-slotted wing flaps of the SkyQart's fast flap system. In FIG. 6, the leading edge 207 of the mono-strut is shown in side view. Said mono-strut attaches the main wing to the AFP. The seatback 208 of the starboard passenger seat is depicted for the configuration of the electric payload cart inside a SkyQart wherein a total of three seats are used. It will be noted that the other two seats of this three-seat configuration are also depicted with the same rather thin line thicknesses as item 208. A symmetrical port-side passenger seat is not labeled. A smaller midline and forward front seatback 215 represents the third seat in this configuration. The seatback 209 of the starboard passenger seat for the most common configuration of the SkyQart in which a total of two seats, side-by-side, are fitted to an EPC, is depicted as it fits inside the AFP. In this common configuration, both the starboard and port passenger seats are depicted with a thicker line width, while the port-side passenger seat is not labeled. A single, large, midline passenger seat 210 is used in the single-seat configuration of the SkyQart and its outline is depicted by a dashed line. The single-seat configuration is used either for exclusive solo privacy (at a higher fare price) or for those cases where an outsized passenger's girth or weight require that the SkyQart's payload be limited to that one person. The diagonally crosshatched lever arm 211 moves the active main landing gear through its range of motion. This lever arm is rigidly attached to the transverse horizontal trunnion bar whose bottom edge 218 is shown in frontal view. Said trunnion bar 218, whose rotation in the main landing gear trunnion pillow block bearing 214 provides the swing axis of the active main landing gear leg, with said trunnion positioned in the same horizontal plane as the SkyQart's cabin floor. The right main landing gear tire 212 of 40.64 cm diameter, like its identical mate the left main landing gear tire, is mounted on a powerful wheelmotor whose exact rotational position, RPM and power are controlled so as to provide take-off acceleration, regenerative braking on landing, as well as precisely guided trajectories for taxiing, parking and docking. Not shown in the frontal and top views of the SkyQart is the lightweight wheel fairing 233, shown in side view in FIG. 6. Each of said wheel fairings 233 provides a rigid streamlined outer cover for a main landing gear tire. The right main landing gear leg 213 of the SkyQart has its mirror-image, the port main landing gear leg, shown symmetrically on the SkyQart's port-side. Each main landing gear leg 213 has a stout axle on which is mounted its respective tire/wheelmotor. Each main landing gear leg 213 is rigidly attached to the transverse trunnion bar. The starboard main landing gear trunnion pillow block bearing 214 that bears and spreads the loads imparted by the main landing gear's transverse trunnion bar. It will be noted that the port-side pillow block bearing is on the left side of the SkyQart at a symmetrical location and that it is a mirror-image of that on the starboard side. The items 211, 212, 213 and 214 comprise the main landing gear. The seatback 215 of the single, small, low-set, midline front passenger seat is that used in the three-seat configuration of the SkyQart. It will be noted that the seatback 215 has a smaller width than that shown by reference number 210 in order for it to fit into the more forward portion of the AFP's cabin. The rear wheelmotor 216 of the autonomous robotic electric payload cart (EPC) has an identical, not-labeled, mirror-image rear wheelmotor that can be seen on the opposite side of the EPC with this frontal view. The port-side latching pin 217 of one of the SkyQart's solenoid bodies, shows that it is inserted inside the side wall of the floorboard of the EPC in order to securely pin-latch the EPC to the SkyQart. The structure that secures this solenoid body to the inside wall of the SkyQart is not depicted in order to enhance clarity. The oval-shaped DC fast-charging port 219, is shown in horizontal crosshatch in its standardized location under the floorboard of the SkyQart and just lateral to the SBP. The swappable standard battery pack (SBP) 220 is depicted to show its size and location in the belly of the AFP along with the drawer slides on its port and starboard sides. The starboard axisymmetric propeller spinner 221 is depicted in top view with its 40.64 cm base diameter. There is an identical propeller spinner shown in top view on the port-side propeller. These spinners enclose the controllable pitch hubs of the starboard and port-side propellers. The starboard motor nacelle 222 provides a structural mount and streamlined covering for the right side propmotor and its accessories. A symmetrical port-side nacelle that is not labeled is shown on the port-side of the SkyQart. These nacelles extend the propellers well forward of the wing's leading edge in order to help ensure undisturbed air inflow to the propellers, a feature that is important to minimizing propeller noise. The leading edge of the starboard main wing 223 is shown in top view in FIG. 5. The trailing edge 224 of the starboard aileron is shown in top view in FIG. 5. There is a not-labeled mirror-image of the right aileron symmetrically placed on the trailing edge of the left wing, comprising the left aileron. The trailing edge 225 of the right main wing's double-slotted flap is depicted in top view, and said flap's full chord-wise extent when nested inside the wing is depicted by the dashed line just forward of that trailing edge. A symmetrical mirror-image double-slotted flap and nested chord limit line is likewise depicted for the port-side main wing. The tapering tailcone structure 226 that joins the main wing to the horizontal and vertical tail surfaces is depicted in side view in FIG. 6. This tailcone has a circular cross-section when viewed from the frontal perspective. The ground plane of the paved surface 227, is depicted in side view in FIG. 6 at the point at which it intersects the SkyQart's 30.5 cm diameter nose tire, as would occur with a fully loaded SkyQart at static conditions on a level paved surface. The SkyQart's right side windshield 228 is depicted in side view in FIG. 6. The bottom surface of the SkyQart's cabin floor structure 229 is seen to be located just above said battery pack 220. The curved outer surface of the belly of the SkyQart's AFP 230, whose skin is comprised of a 2.54 cm thick composite sandwich structure is depicted in side view to show its height above the paved surface. The bottom edge of a rectangular latching solenoid body 231 is one of several that are arrayed inside the SkyQart and that serve to pin-latch the EPC in place. Other such solenoid bodies for latching the EPC are omitted from FIG. 6 to simplify the drawing. The structure that attaches these solenoid bodies to the interior of the SkyQart likewise is not depicted here in order to simplify. The Qusheat ride control seat 232 is the electromechanical pedestal that fits underneath and smartly moves each seat bottom so as to reduce the impact of air turbulence on the SkyQart passengers. The truncated wheel fairing 233 streamlines the airflow over the main landing gear tire. A dashed line 234 represents the outline of the AFP's rear hatch when it has been swung open 90° into its fully open position. The rear hatch swings open on a hinge that is located on the port-side of the SkyQart's AFP. That hinge has a hinge axis that is tilted 108° above the horizontal plane and this causes the rear hatch to swing along a path that makes an 18° angle above the horizontal. The rear port-side of the SkyQart's rear hatch 235 when it is in the flight-ready closed position is depicted as viewed from above. The trailing edge of the movable balanced rudder control surface 236 on the rear portion of the SkyQart's vertical tail is shown in FIG. 6. The left-hand one of the two 6.86 mm diameter dock pin alignment receptacle holes 237 is depicted at its location in the floorboard of the SkyQart. It can be seen that the starboard hole that is mate to this left-hand alignment hole is symmetrically placed and that these two holes are nominally 81.3 cm apart, straddling the midline of the SkyQart. In FIG. 4, the starboard wing's optional diagonal wing strut 238, is shown as an outline that has its upper end attached to the main wing spar through an opening in the lower surface of the wing on or near the inboard edge of the motor nacelle. Said diagonal wing strut has its lower end attached structurally to the strong main longeron that is embedded into the sidewall of the AFP. There is a mirror-image of this diagonal wing strut shown in frontal view under the left wing of the SkyQart. Said diagonal wing strut 238 is also depicted as the edge of a thin rectangle in the side view shown in FIG. 6, showing its position relative to the wing and AFP. NOTE: such optional diagonal wing struts, which are used on the SkyQarts that carry a fire suppression module, are not shown in some of the SkyQarts in other Figures herein. The leading edge of the vertical stabilizer 239 of the SkyQart is shown in side view. The port-side electric propmotor 240 that turns the propeller is depicted in top view inside of the port-side nacelle. A shear bolt 241 secures the attachment of the lower end of the diagonal wing strut to the AFP. The energy-capturing solar panel 242 fitted to the upper surface of the port-side main wing is depicted in top view. An array (not shown) of said panels is placed on the upper surfaces of the main wing of some versions of the SkyQart. A balanced elevator 243 is attached to the aft edge of the horizontal tail 200. A manual control 244 for the flight control surfaces is accessible to a seated person who is wearing an airbag-equipped seat belt and shoulder harness 245 shown in side view in FIG. 6. A disc brake 246 with caliper is on each main landing gear wheel as shown in top view.

The SkyQart III

A SkyQart III-uF is shown in FIGS. 7, 8 and 9 in frontal, top and side views, respectively, with a nominal fire suppression module and EPC-F contained inside its AFP. With the exception of its down-tilted wingtips, the components and parts of the SkyQart III-dF are all interchangeable with those shown in FIGS. 7, 8 and 9 on the SkyQart III-uF. The components and parts that are shown in FIGS. 4, 5 and 6 for passenger and cargo use on the SkyQarts I and II and that are identical to and interchangeable with those used in the SkyQart III variants III-u and III-d, are, for simplicity, not labeled in FIGS. 7, 8 and 9. Similarly, the components and parts for fire suppression used in the SkyQart III-uF and used also in the III-dF, and that are shown in FIGS. 7, 8 and 9, are identical to and interchangeable with the fire suppression components that can be used in the SkyQart I-F and SkyQart II-F, but these fire suppression components are not shown in FIGS. 4, 5 and 6. Where there exist and are shown more than one identical parts of a given type, only one of those parts will be labeled with a reference number.

The frontal view in FIG. 7 shows with reference number 306 a frontal view of the clearance gap between the overlapping wingtips of the SkyQart III 304 and SkyQart II 205, whose minimum dimension is nominally 18.3 cm. This dimension assumes that both aircraft are parked on level ground at their appropriate separation interval of 9.144 m between their adjacent nosewheels. This gap in the wingtip overlap of the SkyQart III with a SkyQart II as when docked at a SkyNest enables more efficient use of dock space. The SkyQart III is easily recognizable as different from the SkyQarts I and II because it has three propellers rather than two and has two AFPs instead of one. The fixed horizontal tail surface 300 of the SkyQart III is larger than that of the SkyQarts I and II. The main wing center section 301 of the SkyQart III is comprised of the same airfoil section as the outboard wing panels and it has a constant chord. It is also equipped with full-span double-slotted flaps 305 that operate with the fast flaps system. A frontal view of the starboard fixed vertical tail surface 302 of the SkyQart III shows there to be a matching port-side mirror-image vertical tail surface. These two surfaces together comprise the total fixed vertical tail area of the SkyQart III. These two surfaces also are seen to secure and connect the fixed horizontal tail 300 to the aircraft. Said horizontal tail 300 and said vertical tails together comprise a "twin-boom" empennage comprising the tail of the SkyQart III. The thrust axis 303 of the seven bladed propeller on the starboard wing, as well as the thrust axis of its mirror-image propeller 324 on the port-side wing, as shown, are higher above the level of the paved surface than the comparable propellers on the SkyQarts I and II, because they are mounted above rather than below the chordline of the outer wing. The bottom surface of the starboard wingtip of the SkyQart III 304 is tilted upward from the horizontal at an angle of 9.58° in order to facilitate the overlapping of wingtips with other SkyQart II aircraft at the dock of the SkyNest. Said upward tilt is present on both the starboard and port-side wingtips and is designated by the letter "u" in naming said SkyQart as a SkyQart III-u. For the version of the SkyQart III on which said wingtips are tilted downward, which tilt is designated by the letter "d", that SkyQart is named a SkyQart-d. The rear flap segment 305 of the fully extended double-slotted wing flap is mounted to the rear portion of the main wing of the SkyQart III. The thrust axis of the midline seven-bladed propeller 307 is at the center of the span of the center section of the main wing of the SkyQart III. This propeller has a diameter of 3.05 m and is identical to all other propellers in FIGS. 7, 8 and 9. The large cylindrical tank 308 of the fire suppression module is shown in its relative position atop the EPC-F when latched inside a SkyQart's axisymmetric fuselage pod. The nose-tire 309 of the port-side AFP of the SkyQart III has an identical mirror-image mate in the nose-tire symmetrically positioned on the starboard side AFP of the SkyQart III. Both of these nose tires can be retracted into their respective AFPs during flight. The leading edge 310 of the SkyQart III's port-side main wing has a mirror-image mate on the starboard main wing, and that the propellers and the nacelles on each of those main wings are placed an equal distance outboard of the longitudinal centerline of the aircraft. The trailing edge of the port-side aileron 311 on the outboard portion of the port-side main wing of the SkyQart III has a mirror-image mate in the trailing edge of the starboard aileron symmetrically placed on the outboard portion of the starboard main wing. The trailing edge 312 of the port-side main wing's double-slotted flap in its fully retracted position, also has a mirror-image of said flap trailing edge symmetrically placed on the SkyQart III's starboard main wing. The rear edge of an outline of the port-side AFP's port-side main landing gear tire has a 40.64 cm outside diameter. It can be seen that each AFP on the SkyQart III has two such main landing gear tires, a starboard and a port, making a total of four such main landing gear tires in addition to the two nose-tires. The rectangular enclosure 314 for the ballistic recovery system parachute is located along the midline of each AFP and above the main wing. These two ballistic recovery system (BRS) units are programmed to deploy their rocket powered parachutes simultaneously in the event of an unrecoverable loss of control or in-flight structural failure. A tapering tailcone 315 on the SkyQart III is shown in side view. Each SkyQart III has 2 of said tailcones and they are identical, with each tailcone serving to join the main wing to a vertical tail surface. Each of these tailcones has a circular cross-section in frontal view. The trailing edge 316 of the fully retracted double-slotted flap on the main wing center section is shown in top view. These flaps work in synchrony with the double-slotted wing flaps on the outer main wing panels as parts of the fast flap system. Each AFP has an identical retractable nose-tire. A fully retracted nose landing gear 317 including nose wheel and nose tire, shown in side view, depicts how these nest within each AFP. The leading edge 318 of the large cylindrical tank of the fire suppression module is depicted as it is nominally latched onto an EPC-F that is, itself, latched into an axisymmetric fuselage pod of a SkyQart. The rear hatch 319 of the AFP of the SkyQart III is depicted in side view in its closed position. Said hatch swings open 90° to enable a SkyQart to load and unload electric payload carts. The opened rear hatch 320 of the port-side axisymmetric fuselage pod is depicted in frontal view, opening toward the left (port-side) wingtip as does the rear hatch of the SkyQart II that is parked adjacent to the port-side wingtip of the SkyQart III in FIG. 7. It will be noted that the symmetrical matching rear hatch on the SkyQart III's starboard AFP opens toward the starboard wingtip. The port-side diagonal wing strut 321 is depicted in frontal view. When carrying an FSM, the wing attachment to each axisymmetric fuselage pod is strengthened by the addition of both a port-side and a starboard diagonal wing strut. The starboard pod's oval-shaped exit orifice 322 is depicted in top view. It will be noted that an identical exit orifice is symmetrically located on the port-side pod's rear hatch. The FSM's exit duct 323 is depicted in top view, showing its alignment with the discharge duct 1603 of the FSM. A balanced rudder control surface 325 is depicted in side view along the rear portion of said fixed vertical tail surface 302 of the SkyQart III. A balanced elevator control surface 326 is depicted in top view along the rear portion of said fixed horizontal tail surface 300.

The SkyQart III-uF Spray Pattern

Figure 14:
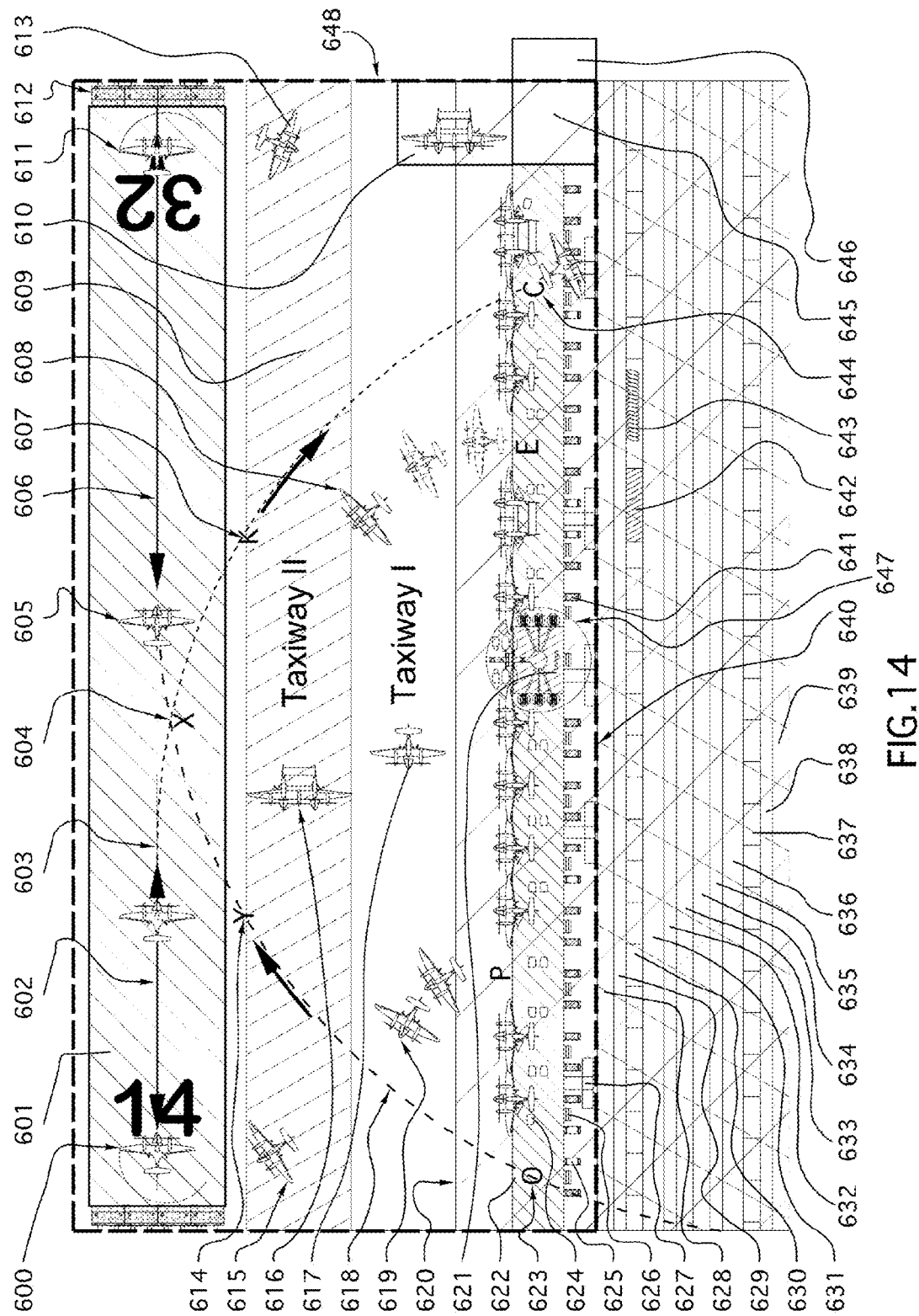
FIG. 14 shows a top view of a SkyNest I and its components

The frontal view of a SkyQart III-uF is shown in flight in FIG. 10. A frontal view of the starboard fuselage's discharge pattern 400 of fire-retardant depicts its diffusion path toward the ground below. As shown, the bottom of the nose tire of the SkyQart III-uF is just 5.8 m (19 feet) above the ground level, and this kind of high proximity precision drop of fire-retardant, made possible by precision autonomous flight and a high degree of aerial agility, is one of this system's advantages over prior human-piloted fire suppression aircraft whose drop height of fire-retardant has been more typically from a height of 15-30 m (50 to 100 feet) or more[10]. A frontal view of the port-side fuselage's discharge pattern 401 of fire-retardant depicts its diffusion path toward the ground below and the convergence with pattern 400 to create a continuous application on the ground. The full extension of the wing flaps as shown in FIG. 10 augments the downward directed path of the fire-retardant.

Fire Suppression Station

FIGS. 11, 12 and 13 depict components of a nominal Fire Suppression Station (FSS) for use at a SkyNest type airpark. Said FSS is designed to provide a sustained gravity-driven flow of a high volume of fire suppressant for rapidly filling Fire Suppression Modules. In FIG. 11, a top view depicts the center of the discharge orifice 500 of the large swing knife gate valve that discharges water from the large cylindrical tank into the main discharge pipe. This discharge orifice is shown with 2 concentric orifice sizes, which are nominally 35.56 cm (14") and 55.65 cm (21.91") diameters corresponding to the areas of opening necessary to supply 3407+ liters (900+ gallons) per minute of water flow from the large cylindrical tank 512, when at the tank-full and tank-near-empty conditions, respectively, with said flow flowing into the six siloes that are adjacent to the large cylindrical tank. A large, high volume electrically powered water pump 501 pumps water into the large cylindrical tank 512. It will be noted that there is an identical water pump symmetrically located on the opposite side of the main discharge pipe 502. The side of the main discharge pipe 502 that carries water from the large cylindrical tank is depicted in top view. The rectangular outline depicts a top view of the location of an internal combustion or turbine powered electric generator 503 that can supply the electricity necessary to drive the pumps and valves of the FSS in the emergency event of a failure of its normal electrical supply sources. One of the four smaller swing knife gate valves 504 is shown in top view. Each of said four valves controls the flow of additives from its respective oval-shaped additive tank 508 that contain fire-retardant additives. The outer edge 505 of one of the six cylindrical silo tanks is depicted in top view. Said silo tanks contain fire retardant and dispense said retardant into an FSM. Said silo tanks are each nominally of 182.88 cm (6 feet) diameter and 304.8 cm (10 feet) in height. The starboard edge 506 of an EPC-F that is parked under said silo tank is depicted in the position used for filling the single tank of its FSM. A small rectangle represents one of the six small hinge knife gate valves 507 that control the flow of fire-retardant into their respective silo tanks. Each of the four oval-shaped fire-retardant additive tanks 508 contain a different fire-retardant additive. Each of said oval-shaped additive tanks can be seen to have its own small swing knife gate valve 504 to control the flow of additive from said tank. A one-way check valve 509 downstream from each of said small swing knife gate valves prevents water from the discharge pipe from back-flowing into each of the four oval-shaped additive tanks. A mixer device 510 mixes the fire-retardant additive(s) uniformly with water inside the main discharge pipe 521 as it flows toward the circular distribution manifold 511. Said circular distribution manifold 511 can be seen to have six separate discharge pipes, one going to each of the six silo tanks. The outer surface 512 of the large, nominally 15.24 m (50 feet) diameter cylindrical water tank of the FSS, which, to enhance its utility and proximity to the dock, is nominally mounted on stilts above the passenger lounge 515 of the SkyNest. In other embodiments, the FSS is located at other locations along or near the dock of the SkyNest. The large one-way check valve 513 in the discharge pipe of the FSS large, elevated water tank, serves to block any reverse flow of fire-retardant additives from entering said elevated water tank. A hydro-electric turbine 514 that is positioned under the SkyNest's paved surface 522, can generate electricity, when necessary, from the potential energy of the mass of water in the large, elevated water tank. Said hydro-electric turbine 514, along with electric generator 503 and water pumps 501 are all located underneath the paved surface 522 of the aircraft docking pavement at the SkyNest. Each silo has a discharge duct 523 that fits into the fill port of a waiting FSM. The large rectangular passenger lounge 515 is nominally co-located with the FSS's large, elevated water tank above it. In alternative embodiments, said lounge is located separately at some distance away from the FSS.

In FIG. 13, the case 516 that contains a nominal swing knife gate valve is depicted in top view. A top view of the finely crosshatched circular pancake motor 517 shows it to be attached to an extended edge on the perimeter of a cam-shaped swing knife 518 so as to swing said swing knife of said valve in order to open and close said valve's discharge orifice 520. The coarsely crosshatched main surface of said swing knife 518 is shown in its position when said valve's discharge orifice 520 is fully open. Said pancake motor 517 can swing said swing knife 518 through an arc of 80° to fully close said discharge orifice 520. The center of one of the eight bolts 519 on the circular mounting flange of the swing knife gate valve is shown in top view. Said bolts are used to attach said valve to a tank, a pipe or other vessel.

In FIG. 12, the components of FIG. 11 are shown in side view. In addition, the swing knife gate valve 500 controls the discharge from the main elevated water tank 512 of the FSS. Reference numbers 500, 501, 503, 508, 511, 512 and 514 from FIG. 11 are labeled in side view in FIG. 12.

The SkyNest I

FIG. 14 depicts a top view of a standard 1.28 ha nominal SkyNest I with its pavement and dock facilities. SkyQarts, EPCs, RDCs, crash cushions and the concepts of their operations. Nominal embodiments of these components have each been described above in detail and, together with their sub-components, comprise the main innovations of this invention. Their interoperating and interdependent processes are best depicted by combining all of them into one detailed drawing, FIG. 14. Accordingly, the embodiment of the QUAD process in FIG. 14 depicts in fine detail an ideal sequence and cadence of operations of those components. While these operations are generic and can be applied at many differently sized SkyNests, they nevertheless represent in FIG. 14 an extreme case of expeditiousness made possible by sentient autonomous vehicles that operate with very small separations. This extreme cadence provides one SkyQart departure and one landing every 10 seconds. The process described is that of a fully implemented, autonomous QUAD system operating at maximum capacity. The process described here is called cadenced coordinated operations at SkyNests and it sets the standard for operations that can provide a very rapid turnaround time for a landing SkyQart. Cadenced coordinated operations at SkyNests are a component integral to this patent. Cadenced coordinated operations at SkyNests maximizes capacity and efficiency in order to determine the realistic limits for capacity, size, speeds and distances that, in turn, can be used to develop the necessary standards for the smallest practical SkyNest that can work in a fully autonomous, optimized QUAD system. Keeping SkyNests as small as possible is what enables them to be affordably built and to be sited close to where people live and work, an important feature if they are to reach a mass-market and provide meaningful benefits to the public transportation system. The SkyNest I 648, whose outline is shown by the rectangular dashed line in FIG. 14 is 1.28 ha in size and is presumed to be the smallest size that can be located fully inside a quiet residential area and still confine the aircraft noise to within its boundaries. Smaller SkyNests can be used in other, less noise sensitive settings. For example, if at least three of its sides have borders on open space or open water, a SkyNest can be as small as 0.61 ha and still provide the required noise containment. QUAD SkyNests located within urban and industrial areas where high levels of ambient noise exist, and those with fewer flight operations that are located within large, privately-owned campuses, ranches or family compounds, can also be smaller than the standard SkyNest I depicted in FIG. 14, but each must still provide containment of the acceptable noise sphere at the public margins of those properties. SkyNests larger than 1.28 ha can have similar operational cadences to those shown in FIG. 14, but, for system-wide uniformity, the size, speeds and landing distances of the SkyQarts operating there must still be compatible for use at all other SkyNests across the QUAD system, including the smallest SkyNests. It will be possible to 'carve out' various sizes of SkyNests within existing larger conventional take-off and landing airports in order to create early implementations of the QUAD system. According to the requirements for cadenced coordinated operations at SkyNests and the performance envelope of the SkyQarts, this invention of the QUAD transportation system is limited to SkyNests of sizes of less than 5.0 ha. In the example of operational processes shown in FIG. 14, the aircraft that are airborne within the SkyNest boundaries are operating at a nominal 24 m/sec and those that are taxiing on the SkyNest surface are moving at a nominal 7.6 m/sec. These are optimum speeds that relate the distances that can be expeditiously covered in each 10-second operational step in the sequence of autonomous landing, taxiing to the loading dock, taxiing to the departure pavement and taking off again, to the actual size of the SkyNest land parcel. The ideal fast cadences for autonomous loading and unloading of payloads on the SkyNest's dock are likewise modeled for very rapid turnaround times that rely on robotic equipment and pre-loaded EPCs. In FIG. 14, the leading edge of the left wingtip 600 of a SkyQart I or II is positioned at the brake release point on the active paved surface 601 that is shown as a rectangular crosshatched surface (runway 14) on the SkyNest. Said paved surface is comprised of a poro-elastic road surface (PERS) that has a paved surface heater underneath it. A double arrow 602 has a location and length that represent the portion of the pavement used in a nominal take-off roll of a SkyQart in dry, no wind conditions. The ground track 603 of the curved traffic pattern climb-out path of the SkyQart during a normal departure is depicted as a curved dotted line. The intersection 604 of the landing approach path with the take-off departure path of the SkyQart is projected onto the surface of the SkyNest at the point labeled "X", a point at which both the exact timing and 3D positions of the passing aircraft must be consistently and continuously coordinated in 4D to avoid conflict. That coordination is jointly performed by the networked situational awareness system and the autonomous control systems on-board each SkyQart. The networked situational awareness and autonomous control system are important components of this patent. The left wingtip of a SkyQart is located at the landing touch-down point 605 on the SkyNest paved surface. A. double arrow 606 depicts the nominal length that is the distance of the short landing roll of the SkyQart at the SkyNest. This double arrow 606 terminates at the point location 611, at which the landing SkyQart has sufficiently slowed its rolling speed to enable it to make a right turn to exit the landing pavement. A location labeled as "K" 607 along the curved climb-out path of the SkyQart, indicates the point at which it would reach a height of 19.2 m above ground level. This height at this location above the SkyNest ensures that the departing SkyQarts are well above the height of any SkyQarts that would be concurrently taxiing on the surface of the subjacent Taxiway II. A SkyQart I or II 608 has departed from position "E" at the dock and is heading toward Taxiway II in order to proceed to the departure end of the paved surface. The paved surface of Taxiway II 609 is depicted in top view as a rectangle in coarse crosshatch. The aircraft maintenance hangar 610 is large enough to contain a SkyQart III. The crash cushion 612 is depicted at the end of the paved surface for landing. An identical crash cushion is located at the opposite end of the paved surface. In other embodiments of the SkyNest, the crash cushion is a movable device that can be positioned at the end of any active runway pavement. A SkyQart 613 has just turned off of the runway pavement after landing and is in the process of taxiing to park at an aircraft docking station 622 at the dock facility. This SkyQart is traveling at 7.6 m/sec and thereby can travel 76 m in 10 seconds. A position location labeled as "Y" 614 depicts an important location along the surface projection of a SkyQart's curved landing approach. Position location "Y" is the point at which the landing SkyQart, after steeply descending over both Taxiway I and Taxiway II, has descended to a height of just 8.2 m above the surface of the SkyNest. This height of 8.2 m is enough to ensure that the descending SkyQart will readily clear the SkyQarts that are taxiing on the surface of Taxiway II. A SkyQart 615 has completed its taxing for take-off and is in a hold position awaiting entry onto the active paved surface for take-off. A SkyQart III 616 is taxiing on Taxiway II toward the hold position at which is located a SkyQart I or II 615. It will be noted that the longer wingspan of the nominal interoperable SkyQart III spans the entire 15.24 m width of Taxiway II, emphasizing the practical importance of limiting the wingspan of SkyQarts in order to limit the size of the land parcel required for a SkyNest. A SkyQart 617 is taxiing on Taxiway I toward the location of SkyQart 619, at which location a SkyQart will stop its forward taxiing so as to become able to reverse the rotational direction of its main landing gear wheelmotors so as to back-in to a vacant aircraft docking station labeled as "P" at the dock. The curved, dashed line that is the traffic pattern projection 618 onto the surface of the SkyNest is the curved landing approach path flown by a SkyQart. A line 620 is the demarcation between the dock side edge of Taxiway I, and the distal edge of the large, coarsely crosshatched area that represents the nominal 167.6 m×48.8 m solar panel array that covers the dock and adjacent street area. The centrally located rectangular-shaped passenger lounge 621 on the dock area, shown in diagonal crosshatch, is the location wherein are found restrooms, telephones, a SkyNest service counter and/or a SkyNest kiosk for making and paying for travel reservations, seating areas, vending machines, etc. The outer edge of the large cylindrical tank 647 of the fire suppression station overlies this passenger lounge. The aircraft docking station 622 adjoins the dock surface and borders the aircraft operations area. The dock has its aircraft docking stations for SkyQarts spaced at 4.57 m intervals and it will be noted that the SkyQarts I and II are shown to be docked with overlapping wingtips. The location marked as "O" 623 is the position at which the SkyQart on its approach to landing has descended to a 30 m height above the surface of the SkyNest. This 30 m height is safely above the solar panel array and dock. A trapezoidal-shaped autonomous robotic electric payload cart 624 (EPC) is one of several that are depicted on the dock surface. The several EPCs shown on the dock surface illustrate the large amount of bi-directional cart traffic on the dock, with each EPC at some phase of loading or unloading passengers, payload or fire-retardant, rolling into or out of a docked SkyQart, rolling to or from a FSS or rolling onto or off of an autonomous robotic delivery cart (RDC) at the street side of the dock. The RDC 625 is depicted parked at a cart docking station on the street-side or cart side of the dock surface. Said RDC is laden with an EPC on its surface. It can be noted that several other RDCs are also depicted as parked at adjacent cart docking stations along the dock, some with and some without EPCs on their surface. A set of stairs 626 enables passengers to climb up from street level onto the dock surface, whose surface is 47 cm above street level. Several sets of such stairs are shown in FIG. 14. Each set of such stairs is 1.83 m wide with a 15.66 cm rise and a 35.56 cm tread. An ADA-compliant ramp 627, to enable wheelchair passengers to move from street level up onto the dock, is depicted on the street-side of the dock. The 2.44 m wide public sidewalk 628 that borders the street-side of the SkyNest is adjacent to the 1.83 m wide bicycle lane 629 that borders said sidewalk. The 2.44 m wide parallel parking spaces 630 border and protect said bicycle lane. The 3.05 m wide single car lane 631 borders said parallel parking spaces. The 1.83 m wide center divide strip 632 separates said car lane from the electric mini-transit bus lane. The two central electric mini-transit bus lanes 633 and 634 are each 2.44 m wide. The 1.83 m wide center divider 635 separates the opposite direction car lane 636 from the electric mini-transit bus lane 634. The 3.05 m wide opposite direction single car lane 636 is adjacent to the 2.44 m wide parallel parking lane 637. The 1.83 m wide opposite bicycle lane 638 is adjacent to the 2.44 m wide opposite sidewalk 639. The area in FIG. 14 that is occupied by the items numbered 628 to 639 inclusive is indicated with a coarse diagonal crosshatch because these items comprise one embodiment of the type of street and sidewalk areas that would be the public amenities adjacent to a typical SkyNest. These amenities are not a part of the SkyNest I land parcel but are a generic layout of street and sidewalk that would likely be provided by local municipalities in order to provide good surface access to any type of SkyNest. The rectangular outer boundary of the SkyNest I parcel 640 is a nominal 167.6 m×76.2 m. An RDC 641 that has no EPC on its surface deck is depicted in top view. A transit bus 642 parked at the SkyNest I is shown as a diagonally crosshatched rectangle in top view. A bicycle rack 643 is depicted in top view in the parallel parking lane at the SkyNest I. The location 644 labeled as "C" marks the point where a departing SkyQart that is climbing out from the SkyNest I reached a nominal height of 40 m above the paved surface. At this height and location, its noise emissions are nearly imperceptible on the ground. The cargo service building 645 is where cargo, cargo bins and parcels are loaded and unloaded from EPCs and cargo containers. The cargo service building is appropriately located adjacent to the truck dock 646 at which shipping and receiving of larger cargo takes place. A large solar energy array whose edge 620 is shown in top view, may be installed above the dock area at SkyNests of several types and may be extended outward to cover above adjacent streets, land parcels and buildings in order to provide renewable energy for the battery charging processes that take place at the SkyNest.

Other amenities not shown in FIG. 14 but important at any SkyNest are deer-fencing, taxiway and pavement lighting, laser-guided and guideline docking alignment, weather detection and navigational aids, including but not limited to one or more of the following: differential GPS, Visual Approach Slope Indicator, Runway End Identification Lights, ceilometer, Doppler wind lidar, transmissometer, Forward Looking Infra-red Radar. Diode Laser Centerline Localizer and Diode Laser Glideslope Indicator. Ancillary businesses co-located at SkyNests but not shown in FIG. 14, though not required, are anticipated to include businesses such as coffee shops, shipping services, convenience stores, restaurants, etc.

A more detailed explanation of the cadenced coordinated operations at SkyNests process above is as follows: A SkyQart aircraft is shown at the lower left portion of FIG. 14, as it enters the SkyNest boundary during its landing approach. For noise abatement purposes, it descends steeply with a shallow, roughly 30° bank angle, (and with its propellers producing drag by wind-milling in electricity regeneration mode) from a height of nominally 30 m above ground level at the position labeled with an "O" as reference number 623 in FIG. 14, at which position its noise emissions are so low as to be nearly imperceptible on the ground. It proceeds to descend from there along the curved path shown as the dashed line 618, toward the landing portion of the SkyNest pavement. That curved path is deliberate because it provides the SkyQart with a longer distance over which to complete its descent over the SkyNest property. These precise, 4D, steep and banked curvilinear landing approaches and climb outs are herein named curved traffic patterns. Descending at an airspeed of 24 m/sec, the SkyQart travels on this 106.4 m curved traffic pattern as its landing approach path. It travels this 106.4 m in only 5.6 seconds, reaching the point of landing touch-down at a point just beyond the mid-point of the SkyNest paved surface for landing. The aircraft then consumes another 4.4 seconds by rapidly decelerating on the paved surface to the 7.6 m/sec taxiing speed at which speed it turns off the paved surface to reach the position 613, just 10 seconds after entering the SkyNest property at position "O". From the position at reference number 613, the aircraft continues taxiing at the speed of 7.6 m/sec to reach the position 617 along the arrival taxiway, i.e. Taxiway I, which is shown in FIG. 14 as being adjacent to and parallel with the dock. From position 617, the aircraft continues taxiing for another 10 seconds at 7.6 m/sec to reach the position 619. At position 619, the SkyQart stops taxiing and proceeds to use its wheelmotors to precisely back into the aircraft docking station P at the dock, which it accomplishes in 10 seconds using its multi-sensor guided precision positioning system. The backing-in and parking process rely on electronic vehicle guidance using the SkyQart's wheelmotors along with the active main landing gear ride height adjustment to consistently achieve a precise docking alignment. The precision positioning system can enable the SkyQart of QUAD to be rapidly parked in exactly the properly aligned position at the dock of the SkyNest to enable it to rapidly load and unload both SBPs and EPCs. This is accomplished using a precision positioning system comprised of one or more of the following guidance technologies: differential GPS, inertial navigation system (INS), line-following software, obstacle-avoiding video camera(s) vision system, auto-focus technologies of either active infrared or a vertical and horizontal auto-focusing CCD camera chip, a 4-beam convergent bio-medical He—Ne laser targeting a transponding receiver plate on the dock, and a capacitive proximity sensor for the final alignment to the dock surface. This combined parking alignment technology is important and consistently aligns the parked SkyQart to within ±2.0 mm of the center of the aircraft docking station so as to enable rapid loading and unloading of EPCs, as well as automated connection of the SkyQart to the dock's DC fast-charging port. Two slightly tapered pins in the dock are engaged into the two pin alignment holes in the aft face of the SkyQart's floorboard. The engagement of these pins maintains the necessary alignment of the SkyQart to the dock. Automated height adjustment of the active main landing gear of the SkyQart can also help maintain correct alignment of these pins during docking. Just prior to backing in to its allotted aircraft docking station, the SkyQart automatically opens its rear hatch door to prepare for charging and the unloading of its EPC at the dock. Unloading will be followed immediately by boarding/reloading of another EPC. Deboarding and boarding are each accomplished in just 10 seconds, using standard 144.8 cm L×103.2 cm W EPCs, an example of which is shown in FIG. 14 as reference number 624. Several other identical EPCs are shown on the dock. Concurrent with these 20 seconds that the SkyQart spends at the dock, a robot at the aircraft docking station can remove the SkyQart's spent swappable standard battery pack (SBP) and insert a freshly charged SBP into rollers that guide it precisely onto the drawer slides and into the belly of the SkyQart, where its correct position, latching and electrical integrity are automatically confirmed. Battery pack replacement need not occur at every docking, depending upon the particular range of trips being flown by that SkyQart and the total range available per battery pack. As future battery energy densities and charging rates improve and the average distance of QUAD flights diminishes, the frequency with which these robotic battery pack swaps occur at the dock will diminish and the alternative automated charging from the dock's DC fast-charging port can occur while the SkyQart is docked. Just 20 seconds after the arriving SkyQart has completed its docking and has de-boarded and boarded anew, it departs from the dock, as shown by the SkyQart 608 in FIG. 14. This exiting SkyQart proceeds in 10 seconds onto the taxiway that is adjacent to the runway pavement (Taxiway II), to reach the position 616 in FIG. 14, as it taxis toward the departure end of the paved surface labeled as runway 14. From position 616, the SkyQart continues taxiing for 10 seconds on toward the end of the taxiway to reach the position 615. From position 615, the SkyQart taxis in less than 10 seconds into the position 600, which is the brake release take-off position of runway 14. Upon brake release at position 600, the SkyQart rapidly accelerates in 4.66 seconds to roll 43.9 m on wet pavement in no wind conditions to reach the position 603, while undergoing no more than 0.69 G's of acceleration with a jerk rate kept below 3.4 m/sec$^3$ at all points during the take-off roll. From its lift-off at the position 603, the SkyQart climbs steeply over a nominal ground surface distance of 104.5 m in 4.66 seconds at an indicated airspeed of nominally 24 m/sec to reach, in just under 10 seconds, the position 644 at location "C", while achieving a height of 40 m at that location. At this location, the noise of the departing ESTOL SkyQart is nearly imperceptible on the ground. The timing of the take-off is maximally staggered with that of the landing aircraft so that a safe 4D separation is always maintained at the crossing point (labeled as "X" in FIG. 14) where the two curved flight paths cross above the pavement and at any other crossing points on the SkyNest. The steep descent and climb gradients ensure that the flight paths over the taxiways remain well above the height of any taxiing SkyQart. The nominal 10-second cadence of operations presented here is not to exclude from this invention alternative cadences of as short as 7 seconds or as long 5 minutes, which will depend upon the maturation, location and regulations that are applied to the QUAD system.

The SkyNest II

Figure 15:
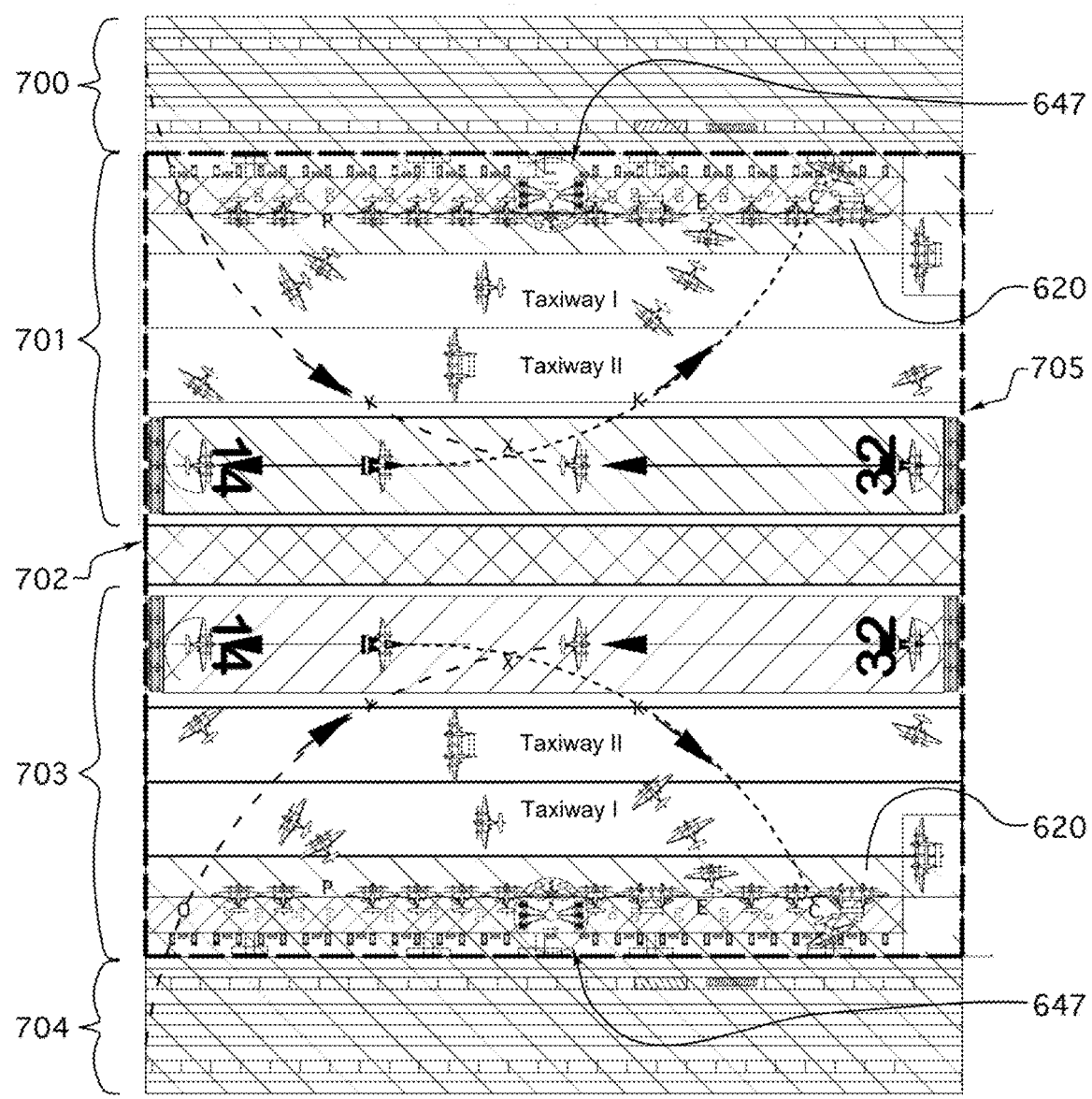
FIG. 15 shows a top view of the SkyNest II, or dual SkyNest, which is a high capacity pairing of two SkyNest I's side-by-side, each with an FSS

FIG. 15 depicts a nominal embodiment of a dual SkyNest II at which the capacity of the standard SkyNest I is doubled by having two of the standard SkyNest I's and their adjacent street amenities placed as mirror-images, top and bottom in FIG. 15. All of the operational details and subcomponents at the SkyNest II remain the same as those described with FIG. 14 for the SkyNest I except that the upper SkyNest depicted in FIG. 15 is a mirror-image of the lower SkyNest. The SkyNest II is shown in FIG. 15 with two large but separate solar panel arrays, each one covering both a dock area and the adjacent street with dimensions of 167.6 m×48.8 m, making 8175.5 sq m for each array. These are both shown in FIG. 15 as large crosshatched areas 620 and extending across the streets that are adjacent to the SkyNest II. The combined public street and sidewalk areas 700 and 704, that border each side of a SkyNest II are mirror-images. A vertically mirrored image 701 of the SkyNest I of FIG. 14, in which all of the same operational stages are shown is placed above and adjacent to the standard SkyNest I 703. The rectangular double crosshatched area 702 is the required minimum buffer zone separator that is 12.2 m wide by 167.6 m long and that is placed between the two SkyNest I facilities to create the full SkyNest II in order to ensure adequate separation of the aircraft that operate concurrently on its parallel paved surfaces. The outer surface 647 of the large, elevated water tank is depicted at each of the centrally located FSSs at the SkyNest II. The SkyNest I 705 occupies a land parcel of 2.76 ha of level land shown as a rectangular outline by the dashed line in FIG. 15. Alternative embodiments of the SkyNest II are possible, including those of different size and operational cadences, provided that they offer facilities that are compatible with the extant QUAD system vehicles.

The SkyNest III (Tiny)

Figure 16:
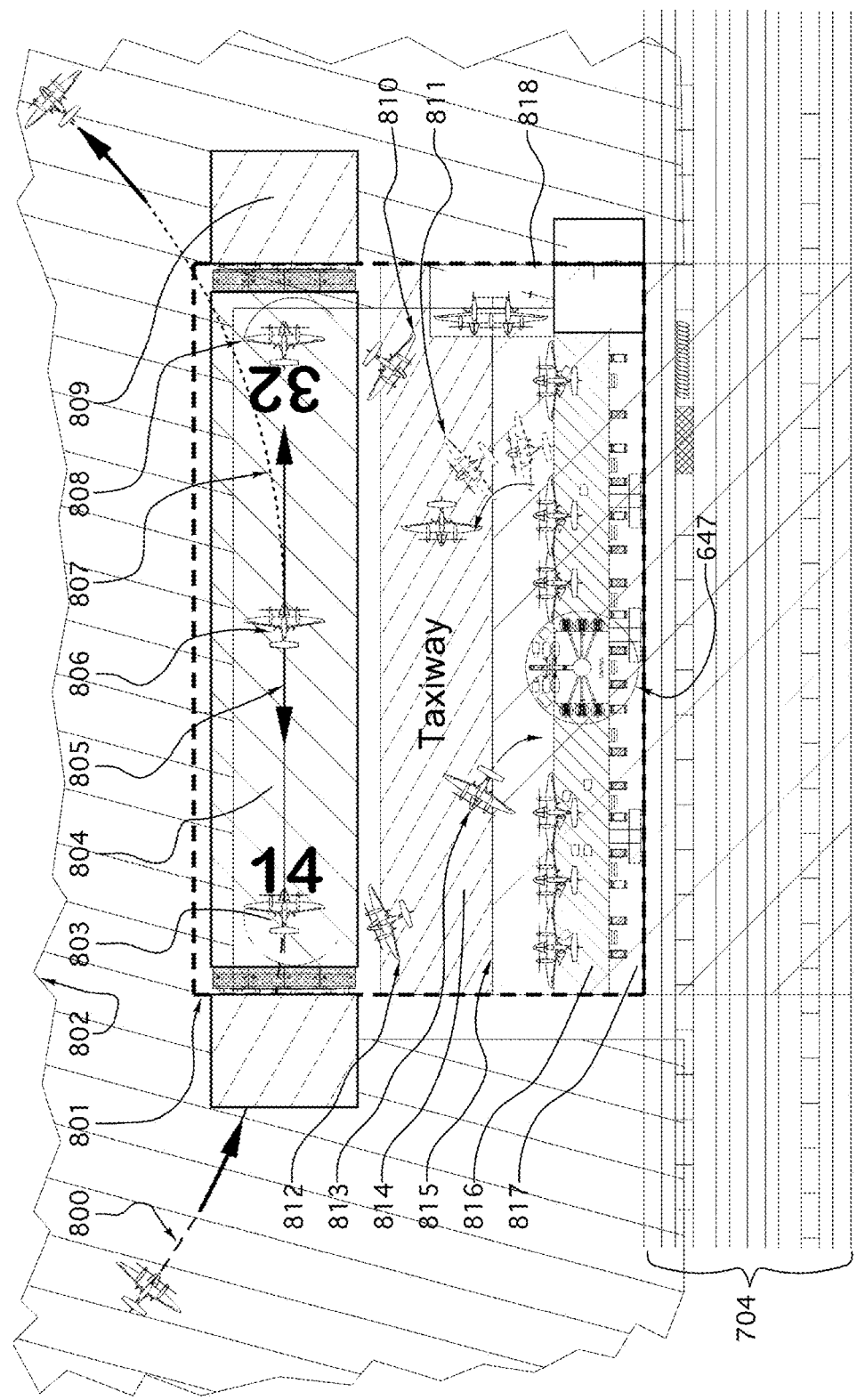
FIG. 16 shows a top view of the SkyNest III, with an FSS

FIG. 16 depicts a nominal SkyNest III, in accordance with one embodiment of the present invention. The SkyNest III is nominally only 99.1 m×61.0 m which is an area of 0.61 ha This SkyNest III can be smaller than the standard SkyNest I depicted in FIG. 14 because it is sited with its borders adjacent to open space. Such open space may be either a shore line, a wild land, a community greenbelt, a highly elevated area around a building rooftop or other unpopulated area that is not noise-sensitive. A greenbelt area may be an area of crops, grass, forest or golf course. A shore line may be along the surface of a lake, indolent river, bay or ocean. This open space provides an area over which there is a much greater tolerance for aircraft noise. It will be seen in FIG. 16 that the curved flight paths of both the arriving and departing SkyQarts at the SkyNest III are positioned over the open space for noise abatement purposes. The aircraft operations at the SkyNest III are somewhat different from those at the SkyNest I and, accordingly, are denoted by different reference numbers according to their location on the SkyNest III. For simplicity, these operations in FIG. 16 are depicted for SkyQarts I and II but not with SkyQarts III. A SkyQart ill is however shown in top view parked inside the maintenance hangar 818 at the SkyNest III. The details of the sidewalks, bicycle lanes and street adjacent to the SkyNest III are identical to those detailed in FIG. 14 and are labeled as a group with reference number 704. The landing approach path 800 of a SkyQart to the SkyNest III is depicted in top view. The dashed line outline of the SkyNest III land parcel 801, marks the location of a SkyNest perimeter fence, which here measures nominally 99.1 m×61.0 m. These dimensions are the standard for a SkyNest III and are the minimum size for the SkyQart's take-off and landing speed of 24 m/sec. These dimensions are chosen to also be large enough to ensure that the acceptable noise sphere of SkyQarts that are taking off consistently remains within that SkyNest III's boundary with the community. The outline 802 of the open undeveloped green-space or body of water surrounds three sides of the SkyNest III. The take-off brake release position 803 is depicted in top view on the paved surface. In order to efficiently share the use of the pavement, the touch-down of the landing SkyQart is sequenced to occur 10 seconds after the take-off brake release of a departing SkyQart. The crosshatched paved surface 804 of the SkyNest III is used for take-off and landings. A double arrow 805 represents the portion of the paved surface that is typically used for ground roll after touchdown during a no-wind SkyQart landing at the SkyNest III. The touchdown location for landing, as represented by the left-hand tip of said double arrow 805, is shown as being well inside the SkyNest perimeter and is thereby at a location that affords adequate vertical clearance for the aircraft's landing approach at the 2.44 m tall SkyNest deer fence. The take-off lift-off position 806 on the paved surface is the location at which a SkyQart typically lifts off to begin its climb out if a no wind condition were in effect and if the maximum take-off acceleration of 0.8 G were achieved with GRACE. The dotted line 807 represents the curved path of the departing SkyQart's climb out after lifting off at the SkyNest III. The position 808 at the end of the runway pavement depicts the location at which a landing SkyQart would turn off to begin taxiing to the dock. A clear zone 809 at each the end of the SkyNest III paved surface can greatly enhance the margin of error in take-offs and landings. The position 810 of a SkyQart that has turned off of the paved surface and is beginning to taxi on the taxiway toward an open aircraft docking station on the dock is shown in top view. The position 811 is that where a SkyQart (shown in dashed outline) would depart from the dock area to taxi onto the taxiway toward the take-off end of the pavement. The position 812 of a SkyQart that has taxied into a hold-short position for the departure end of the paved surface, is shown awaiting take-off. A SkyQart 813 that has completed its taxiing and come to a stop is at a position from which it can back-in to a vacant aircraft docking station at the dock. The shared singular taxiway 814 of the SkyNest ill is depicted in top view. The upper edge 815 of the coarsely crosshatched area represents the rooftop solar panel array for the SkyNest III. The finer crosshatched area 816 represents the raised dock surface of the SkyNest III, which is 47 cm higher than the level of the paved surface. The portion of the SkyNest III that fronts onto the sidewalk of the adjacent street 704 is the cart docking area 817 along which the RDCs line up at regularly spaced cart docking stations in order to load or off-load EPCs. The outer surface 647 of the large cylindrical elevated water tank of the FSS depicts its location at the SkyNest III. This depiction of item 647 is one embodiment, while alternative embodiments include those that position the FSS at one end of the dock surface of the SkyNest III in order to position it close to a water source. The standard for autonomous operations calls for each step in the sequence of operations at the various positions on the SkyNest III to require only 10 seconds or less. In FIG. 16, a SkyQart is shown making its steep final approach to landing at the SkyNest III along the curved dashed line 800 in the upper left side of the FIG. 16. The cadenced coordinated operations at SkyNests is the sequence of standard operations for completing the turnaround of said landing SkyQart and it is slightly different at the SkyNest III than the cadenced coordinated operations at the SkyNest I or II. Said sequence proceeds as follows at a SkyNest III: At a nominal interoperable approach speed of 24 m/sec, the landing SkyQart will touch down at a location marked by the tip of the left-hand arrowhead of the double arrow 805 on the landing portion of the paved surface and will rapidly decelerate on said paved surface 804, to reach its turn-off position 808 where its taxiing speed will have slowed to just 7.6 m/sec. From there, the SkyQart will continue to taxi at the nominal taxiing speed of 7.6 m/sec to the position 810. This interval of movement from its landing approach to reach position 810 consumes 10 seconds. Then, in the next 10 seconds, the taxiing SkyQart moves from its position 810 to position 814 where it stops momentarily and then, in the next 10 seconds, backs up into the open aircraft docking station at the dock, using its wheelmotors and precision positioning software to park in the exactly correct alignment with that station's battery swapping/charging equipment. Position 814 will vary according to which berth at the dock is unoccupied and available. The SkyQart will then de-board or unload its EPC in 10 seconds. It spends an additional 10 seconds in its berth at the dock in order to complete the boarding or loading in of a newly laden EPC for the next flight. Concurrently with the 10 seconds of de-boarding and 10 seconds of boarding time the SkyQart undergoes swapping of its spent SBP with a freshly charged SBP, providing it with another 161 km+of range. Once these steps are completed, the freshly loaded SkyQart will leave its aircraft docking station at the dock, as shown by the curved arrow along the left or port wingtips of the sequence of three SkyQarts; the right wingtip on the middle one of these three SkyQarts is position 811. The SkyQart thus departing from the dock will begin taxiing to reach, in just 10 seconds, the position 812 at the departure end of the taxiway's paved surface. During these 10 seconds of taxiing at 7.6 m/sec, the departing SkyQart must share Taxiway I with any other arriving and/or departing SkyQarts that are taxiing there. Thanks to the autonomous precision positioning using on-board navigation systems, the sense and avoid systems, the networked situational awareness program and wheelmotor controllers of the autonomous control system, this sharing is reliably and routinely accomplished without conflict. Once it reaches position 812 and has completed its automated checklist for take-off, the SkyQart then will use the next 10 seconds to taxi into the take-off brake release position 803. From there, it will then rapidly accelerate on its take-off roll to reach position 806 in less than 5 seconds, where it will lift off the paved surface and conduct over the next 5 seconds its curved climb-out path 807, to depart the SkyNest III in a curved traffic pattern at 24 m/sec. The movement from position 803 to departing the SkyNest consumes another 10 seconds. By this idealized sequence then, the total turnaround time at this SkyNest III is summarized as follows: 10 seconds for approach, touch-down, deceleration and turning off the paved surface; 10 seconds to taxi to a stop in front of an open aircraft docking station at the dock; 10 seconds to precisely back into the aircraft docking station at the dock; 10 seconds to de-board or unload the EPC from the SkyQart at the dock; 10 seconds to board or load the laden EPC into the SkyQart at the dock; 10 seconds to taxi to the hold for take-off position 812, 10 seconds to taxi onto the brake release position 803 on the pavement; 10 seconds to complete the take-off and climb out to exit the SkyNest III. This sequence comprises an 80 seconds total turnaround time at the SkyNest III.

Note that said turnaround time (TAT) at the SkyNest III is shorter (80 seconds) than for that using cadenced coordinated operations at the standard SkyNest I shown in FIG. 14. This is due to the shorter distances required for taxiing. However, the SkyNest III has fewer aircraft docking stations at its dock, eight in all, and, compared to the sixteen aircraft docking stations at the SkyNest I, this reduces the buffering effect of having several extra aircraft and aircraft docking stations available at the SkyNest for resiliency in operational sequences. The importance of the SkyNest III as one embodiment of this invention is that it provides an extreme example of high passenger capacity per acre of land parcel, which it achieves by taking advantage of siting at locations where noise sensitivities are reduced while proximity is still very near where people live and work. In FIG. 16, the SkyNest III can be seen to include the same standardized core amenities as the standard SkyNest that is shown in FIG. 14. These include the Lounge, FSS. Cargo Service, Hangar. ADA ramps, stairs to dock from sidewalk, crash cushion, EPCs, RDCs, as well as the adjacent street with short-term curbside car parking spaces, bus and bicycle rack. Alternative embodiments of the SkyNest III are possible, including those of different size and operational cadences, provided that they offer facilities that are compatible with the extant QUAD system vehicles.

The SkyNest IV (Bowl)

FIGS. 17 and 18 depict an embodiment of the SkyNest IV, in accordance with the present invention. This SkyNest IV is designed to accommodate extremely short take-offs and landings in a direction appropriate to existing current wind conditions. As such, it is a 360° circular airpark facility. In addition, the pavement of the SkyNest IV is sloped so as to give its surface a bowl shape wherein the sloped sides of the bowl substantially enhance the acceleration and deceleration of the SkyQarts that are landing or taking-off there. In effect, take-offs are made downhill and landings are made uphill. The SkyNest IV land parcel size 937 is depicted as a thick dashed line and can be seen to include the same standardized core amenities as the standard SkyNest I that is shown in FIG. 14.

These include the Lounge, FSS, Cargo Service. Hangar, ADA ramps, stairs to dock from sidewalk, crash cushion, EPCs, RDCs, as well as the adjacent street with short-term curbside car parking spaces, bus and bicycle rack. In FIG. 17, The street 900 adjacent to the SkyNest IV, is comprised of the same size and number of lanes and components as those depicted in FIG. 14. The crosshatched area 901 represents the dock surface of the SkyNest IV, which has the same standard width, 7.5 m as that depicted for the SkyNests I, II and III. A double arrow 902 represents the 19.8 m radial dimension of the flat paved surface area for taxiing that extends from the top perimeter of the paved bowl to the outer edges of the SkyNest IV. A circular line 903 represents the outer rim of a 143.3 m diameter nominal pavement bowl at a SkyNest IV. The crosshatched ring 904 represents the pavement area on the upper outer slope of the bowl, which can be used for taxiing and whose radial dimension is 15.24 m. The bidirectional cart paths 905 that are located at the outer borders of the above-ground version of the SkyNest IV wherein such paths are for the exclusive use by RDCs that need to travel to opposite sides of the SkyNest. The bidirectional spiral 906 of concentric cart paths that, in this embodiment, are located at the outer corners of the SkyNest IV property provide a path for RDCs to travel up and down the nominal 6.4 m height difference between street level and the upper cart paths surfaces of the SkyNest IV. A rectangle 907 that depicts one of the above-ground SkyNest IV's four pedestrian stairwells shows that each of said stairwells occupies a space of 8 feet by 16 feet that enables passengers to move from street level to the up-stairs dock level and vice versa. Note that these stairwells are not depicted or needed on the dock area shown on the left side of FIG. 17 because that left side dock area represents the embodiment of an excavated, street-level SkyNest IV. The edge of a square 908 depicts the location of one of the five identical passenger elevators at the dock of the above-ground SkyNest IV. Each of these five passenger elevators is shown as being 8 feet square in planform. The combination of these five passenger elevators with the four pedestrian stairwells is sufficient, when supplemented by the deliveries of people and freight that occur by RDC, to fulfill the operational capacity of the dock on one side of a SkyNest IV. Alternative embodiments of the dock facilities at SkyNests to those presented herein, including those that provide more or fewer of these elevators and stairwells or that provide them in different locations on the dock, are nevertheless still encompassed by this patent. A directional arrow 909 represents a top view of the portion of the pavement that is used for the uphill landing roll of a SkyQart. It will be noted that there are two SkyQarts shown adjacent and on either side of the upper end of this landing roll, and each of these SkyQarts is depicted to have just turned off of the landing pavement in order to taxi to its intended dock. An isolated arrow 910 indicates the direction of the prevailing wind that, for this FIG. 17, determines which runway directions will be used for the take-offs and landings at the SkyNest IV. It will be noted in FIG. 17 that the take-off runway direction is 300 different from the landing runway direction, straddling the indicated wind direction arrow 910 such that each runway direction is 15' different from that of the prevailing wind. A movable crash cushion cart 911 is positioned at the end of the take-off pavement. It can be noted that the other crash cushion is positioned at the end of the landing pavement. The exact and required standard touchdown location 912 is for landing in a zero wind condition at this embodiment of a SkyNest IV. This touchdown point is based upon the ground clearance requirements for a SkyQart that approaches its landing touchdown while descending over the downhill portion of the bowl of a SkyNest IV. For any runway chosen, this standard touchdown point will be 3.81 m beyond the center of the bowl on the surface of the flat circular area that is concentric at the bottom center of the bowl. One of the twelve thin dashed lines 913 represents an example of the spoke-like alternative runway directions that could be usable at a SkyNest IV when favored by wind conditions. While the runway headings of these thin dashed lines are placed 30° apart for illustrative purposes, the actual runway headings used by the SkyQarts operating at a SkyNest IV could be any compass headings that are suitably oriented into the prevailing wind. A circular line 914 outlines the nominal 15.24 m diameter circle of flat pavement surface that lies concentric at the bottom center of the bowl at a SkyNest IV. This outline is for illustrative purposes only because the actual transition from the flat bottom of the bowl to its up-sloped sides is not built as a sharp angle change but is instead a gentle transition with a fillet radius of 12.2 m. A curved thickly dotted line whose arc 915 depicts the climb-out trajectory of the SkyQart, beginning at the center of the bowl. This arc is 100.3 m long in the no-wind condition and it begins after the SkyQart has completed its initial climb while aligned with the runway heading from liftoff to the center of the bowl, a straight segment shown by a thinly dotted line of 29.0 m length and separately labeled as reference number 924. In FIG. 18, the tip of the curved arrow 916 represents a side view of the standard climb profile of a SkyQart in the no-wind condition showing it to reach a height of 40 m above the bottom of the bowl. The climb profile shown said curved arrow 916 is not conducted in a banked turn but is instead entirely flown while maintaining the heading of the take-off pavement. The tip of a dashed line arrow 917 represents the climb profile of a SkyQart in a 16 km/hr headwind condition, showing the larger ground clearances that result. A shallow rectangle 918 represents the dock surface that is used at the type of SkyNest IV that has its bowl shape excavated into the ground. The surface of this dock as shown is the standard 47 cm above the level of the aircraft docking pavement at the parking area adjacent to the dock, which is the standard dock height used at all other SkyNests. The width of the surface of this dock is the SkyNest standard of 7.5 m. Said dock surface is also shown to be the nominal 129.5 cm above the bottom of the under-dock service bay that contains the robotic battery swap equipment. A side view of the street level 919 is shown adjacent to the sidewalk at an excavated-bowl type of SkyNest TV. This street level is shown adjoining a sidewalk curb that is 15.24 cm tall. The sidewalk adjacent to the street level adjoins the dock at the SkyNest IV and its sidewalk surface is 47 cm below the dock height of the dock surface. The standard landing touchdown point 920 at a SkyNest IV is shown in side view. The point 921 that is at the center of the bottom of the bowl is the midpoint of the dashed horizontal line that represents the 15.24 m diameter circular flat area at the bottom of the bowl. This point 921 can be seen to coincide with the center of the bowl shown above in top view in FIG. 17. A SkyQart 922 has its nosewheel positioned on the level pavement at the top of the bowl at the brake release point for take-off on the active runway. A solid line with arrow 923 indicates a top view of the nominal 42.7 m take-off ground roll distance of a SkyQart in the no-wind condition. A thinly dotted line 924 represents the 29.0 m distance traveled by the SkyQart is its straight-ahead initial climb from its point of lift off toward the center of the bowl. The intersection of the trajectories of departing and arriving SkyQarts at the center of the bowl can be safely managed by staggering the timing of their flights as 4D trajectories. A dashed line 925 depicts the curved no-wind landing approach of the SkyQart. It will be noted that this approach comes to align with the landing runway heading and that it passes through the center of the bowl, continuing 3.81 m beyond that center to the standard point of touchdown 912. The 2.44 m×4.88 m cargo/freight/vehicle elevator 926 that is inside the Cargo Service Building lifts cargo from the street-level truck dock below to the dock level above at an above-ground type of SkyNest IV. In FIG. 18, The location at the end of a dashed line 927 depicts the point that is 40 m above the bottom of the bowl and that is the topmost point of the nominal landing approach profile of a SkyQart in a 16 km/hr headwind condition. The location at the end of a solid line 928 is 40 m above the bottom of the bowl and is the topmost point along a side view of the landing approach profile of a SkyQart in a no-wind condition. It will be noted that both approaches 927 and 928 have the same touchdown point, but that the 927 approach into the wind offers substantially larger ground clearances. A tiny double arrow 929 indicates the worst-case clearance of 4.15 m above the tail section of a taxiing SkyQart for the case of a no-wind landing approach. In FIG. 18, A SkyQart 930 is shown at the brake release position for take-off. A nominal 45.7 m wide solar panel array 931 is 12.5 m above the street area and 6.1 m above the level taxiing surface of the SkyNest IV. The surface of the RDC cart docking station 932 is adjacent to the dock surface at an above-ground SkyNest IV. A crosshatched area 933 under the surface of an above-ground SkyNest IV represents the building area for potential commercial and housing uses. The truck dock 934 is a nominal 1.22 m above street level at the above-ground type of SkyNest IV. The liftoff point 935 is for a take-off made into a 16 km/hr headwind, where the take-off distance is only 27.1 m. The liftoff point 936 is for a standard take-off in no wind, where the ground roll is 42.7 m. The outer surface 647 of the large, elevated water tank depicts its central location along the dock surface at the SkyNest TV. Alternative embodiments of the SkyNest IV are possible, including those of different size and operational cadences, provided that they offer facilities that are compatible with the extant QUAD system vehicles.

The SkyNest V (Rooftop)

Figure 19:
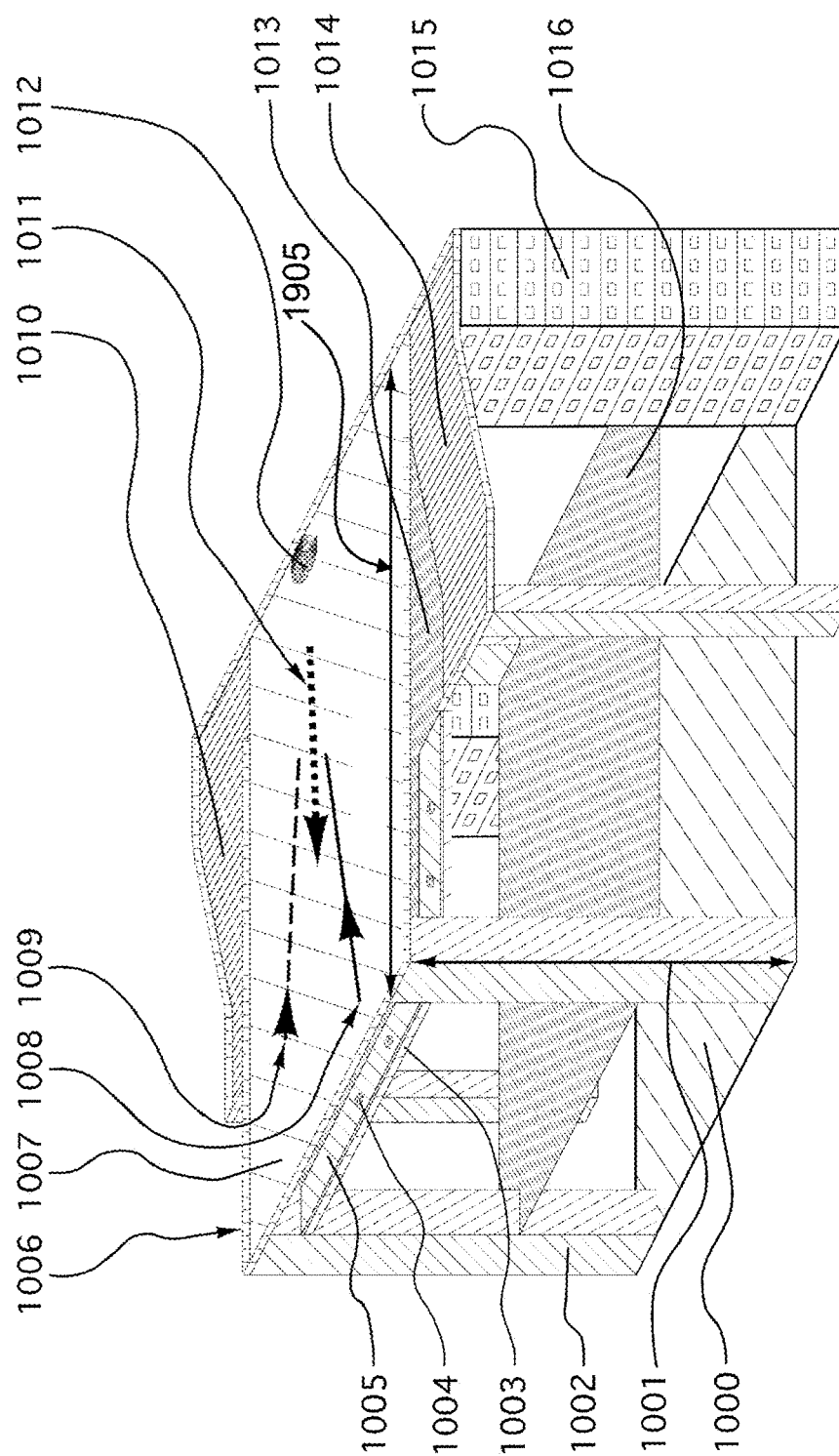
FIG. 19 shows a top view of the SkyNest V (located on a rooftop)

FIG. 19 depicts a simplified view of a standard minimum-sized rooftop SkyNest V, in accordance with one embodiment of the present invention. This embodiment depicts the standard SkyNest V with its minimum dimensions, which are predicated on the extremely short take-off and landing (ESTOL) performance capabilities of the SkyQart. Other, larger, alternative embodiments of this standard minimum SkyNest V can occur in order to fit varying sizes of existing building rooftops and these are also encompassed by this patent. The SkyNest V is anticipated to provide high-proximity quiet urban air delivery (QUAD) services to metro centers, urban canyon areas and large hub airport terminals where the built environment precludes finding a larger land parcel size for a surface SkyNest and/or where there is no proximate shoreline or greenbelt for siting of a smaller SkyNest III. The SkyNest V can be sited on the rooftop of large multi-level parking garages that are typically adjacent to many major airline hub airports and amusement parks. These hub airport SkyNest Vs would provide QUAD services for airline travelers and thereby offer them major time savings compared to their trips using ground transportation to and from the hub airports. Some SkyNest Vs are built atop multi-story office or residential buildings. In FIG. 19, The crosshatched surface 1000 is the ground floor of the building on which the SkyNest V is built, which is nominally considered to be at street level. A vertical arrow 1001 depicts the 60 m height above street level of the paved surface 1007 of the SkyNest V. This height varies depending upon the building's size, surroundings and ambient noise level. A diagonally crosshatched corner pillar 1002 is one of four or more such pillars that support the SkyNest V building. These pillars may be of varying size and may contain high-speed passenger and/or freight elevators that move people and goods to and from the SkyNest V dock and the ground floor. It should be noted that there is normally no need for pedestrian access to the rooftop paved surface 1007 at a SkyNest V, since all payload handling, passenger-boarding and de-boarding occurs on the dock surface that is located on the dock floor level 1013 below the rooftop paved surfaces. The paved surface 1007 and the dock floor level 1013 immediately beneath it together comprise the SkyNest V. It is however possible to have a rooftop SkyNest whose passenger dock is included on the rooftop; in which case it would closely resemble the layout of a SkyNest III as shown in FIG. 16. The dock service bay 1003 is where battery swapping occurs. It is an area that is underneath the dock surface 1005, a surface that is the standard 47 cm dock height above the adjacent dock floor level 1013 that serves as a taxiing surface, and is the same standard dock height used at all other types of SkyNests. A loaded EPC 1004 is depicted as a rectilinear box that is located on the dock surface 1005. A perimeter safety fence 1006 or wall surrounds the rooftop pavement and ramp area. A similar perimeter safety fence or wall would surround the outer edges of the dock on the lower level, but this is not depicted in FIG. 19 in order to clarify other features. A horizontal, life-saving perimeter net, similar to that used on the Golden Gate Bridge, would likely be placed outside the perimeter safety fence on both the rooftop and dock levels of the SkyNest V, but for the sake of simplicity and clarity in depicting other features, that perimeter net is not depicted in FIG. 19. The rooftop paved surface 1007 of the SkyNest V, has an area that is nominally 99.1 m×99.1 m making an area of 0.98 ha. The end of a solid vector line 1008 depicts the direction (shown by its arrow) and the 38.7 m length of a 0.8G GRACE take-off distance of a SkyQart at the SkyNest V. The location 1009 of a landing touchdown at the end of a dashed line that depicts the direction (shown by its arrow) and the 43.9 m length of a 0.8G GRACE landing ground roll of a SkyQart at the SkyNest V in the case of the wind direction shown by the dotted line arrow 1011. The location of landing touchdown as shown is 29.0 m beyond the intersection of the landing path with the outer edge of the rooftop. This 29.0 m is the nominal distance needed to complete a 3-meter final descent with GRACE when flying at an airspeed of 24 m/sec. Said 43.9 m length of ground roll is the nominal distance needed in zero wind conditions for the SkyQart to decelerate with GRACE at a maximum of 0.8G while using regenerative braking and reverse propeller thrust from its touchdown speed of 24 m/sec to its taxiing/turn off taxiing speed of 7.6 m/sec. The surface 1010 of the downhill exit ramp allows the arriving SkyQart to taxi to the dock floor level 1013 that is located on the lower level that is below the rooftop paved surface of the SkyNest V. A dotted arrow 1011 depicts the wind direction on which are based the take-off and landing directions and the positioning of the movable crash cushion in this depiction of the SkyNest V. The portable crash cushion 1012 is placed in the position appropriate to the dotted wind direction arrow 1011. The crash cushion is designed to slide 1.1 m to full stop in the event of a SkyQart impacting it at 20 m/sec. Accordingly, and to maximize runway length, the crash cushion is shown positioned with its impact surface inboard of the outer edge of the rooftop pavement. The surface of the paved dock floor level 1013 includes an area for taxiing that serves the dock area on the lower level of the SkyNest V. one floor below the rooftop paved surface. The uphill entry ramp 1014 allows the departing SkyQart to taxi from the dock that is located on the lower level thence upward to the rooftop paved surface of the SkyNest V. The large 14-story building 1015 serves as a support pillar for the uphill ramp 1014. A similar 14-story building is shown at the rear of the SkyNest V, supporting the downhill ramp 1010. These buildings may house offices or residences and therefore may not considered to be part of the SkyNest V land parcel footprint. Alternatively, the ramps 1010 and 1014 may be structured as gusseted, cantilevered ramps that do not have a building supporting them. A large surface 1016 represents one of the many other floors that could potentially fit into the building structure that supports the rooftop SkyNest V. In FIG. 19, these additional floors would number 13, if the separation between each floor level were the nominal standard height of 4.27 m. However, in other buildings whose rooftops harbored SkyNest Vs, these lower floors could vary widely in number from as few as two to as many as one hundred or more and could be used for car parking, housing, offices, warehousing or retail spaces.

Fast Flaps System

Figure 20:
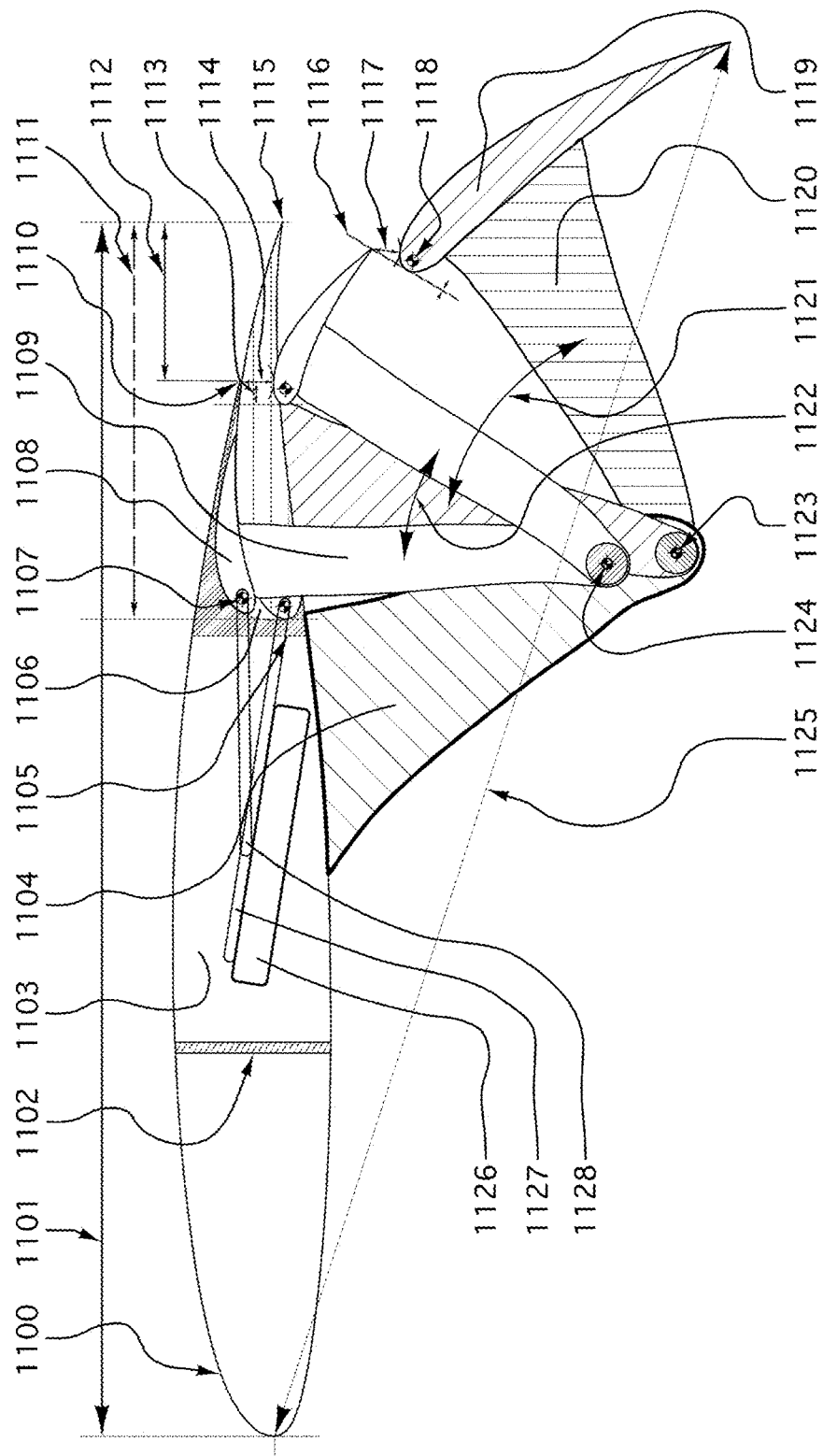
FIG. 20 shows a side view of the fast flaps system

FIG. 20 illustrates the Fast-Flaps System used on SkyQart aircraft in order to enable their ESTOL performance and aerial agility, in accordance with one embodiment of the present invention.

The fast flap system in this embodiment is a double-slotted flap system in which the two flap segments, forward and rear, are shown in both their retracted and fully extended positions. The forward flap segment nests above the larger rear flap segment, and each of them has a sturdy vertical strut firmly attached to its leading edge and internal main spar. These vertical struts, which are multiple along the flap's span and which vary from two to four struts per flap segment, extend downward underneath the wing from the flap segment to their attachment at that flap segment's hinge pin that is located on a large external hinge fin. Each flap segment has its own separate hinge pin and these hinge pins are located on a shared hinge fin. The exact locations of these hinge pins on the hinge fin are critical to the operation of the fast flap system. These hinge pin locations determine the geometry of the extension of the flap segments and, thereby, the lift-enhancing performance of the flap system. These hinge pin locations are accurately drawn in FIG. 20 so as to produce the correct gap and overlap of the fully extended flap segments. In order to minimize leakage drag, the fully retracted flap segments nest snugly inside the rear flap cove portion of the main wing airfoil within minimal gaps between them and the external wing surfaces. The fast-flap name is applied because these flaps are specially designed to fully retract in less than 0.5 seconds at the moment of touch-down on landing of the SkyQart. In FIG. 20, the forward upper surface outline 1100 of the main wing's GAW2 airfoil is depicted as it exists at the root of the wing flaps. A horizontal double arrow 1101 depicts the nominal 142.3 cm chord length of the main wing at the inboard flap root. The forward face of the main wing spar 1102 is shown in side view. The mid-wing bay 1103 is the space between the aft face of the main spar and the forward face of the rear spar 1105. There are several of said wing bays and those that are empty of components are sealed as flotation devices. The mid-wing bay is the location for the pancake motor that actuates the fast flap system. The large underwing hinge fin 1104 provides the hinge pins 1123, 1124 to which attach the flap hinge struts of each flap segment.

The forward face 1105 of the rear spar of the main wing is shown in side view. The forward portion of the recessed space known as the flap cove 1106 is shown in side view. The flap cove is behind the rear spar of the main wing and it provides the space into which the flap segments nest when fully retracted. The center point of the bolt hole 1107 attaches the pushrod from the motor to the nose of the forward flap segment. The shape of the proprietary airfoil 1108 of the forward flap segment is shown in side view. The flap hinge strut 1109 of the forward flap segment connects it to the hinge fin 1104 at the hinge pin 1124. The trailing edge 1110 of the upper surface of the main wing's flap cove is shown in side view. A dashed line double arrow 111I depicts the 46.5 cm length of the chord of the rear flap segment. A solid line double arrow 1112 depicts the 18.64 cm length portion of the upper surface of the rear flap segment that is exposed aft of the trailing edge 1110 of the flap cove. A small horizontal solid double arrow 1113 depicts the 26.8 mm length of overlap between the fully extended forward flap segment and the trailing edge of the flap cove. The small vertical solid double arrow 1114 depicts the 38.1 mm air gap between the extended forward flap segment and the underside of the trailing edge of the flap cove. The trailing edge 1115 of the rear flap segment is shown in side view in its fully retracted position. A pair of closely spaced, thin parallel solid lines 1116 are separated by the 1.07 mm distance that is the overlap between the forward and rear flap segments when both are fully extended. A small, nearly vertical solid double arrow 1117 depicts the 32.5 mm length of the air gap between the forward and rear flap segments when both are in their fully extended positions. The center point 1118 of the bolt hole is the point at which an actuating pushrod attaches to the nose of the rear flap segment. The proprietary airfoil 1119 of the rear flap segment is shown in side view. The large flap hinge strut 1120 of the rear flap segment is shown in side view. The solid line double arrow 1121 is the curved arc of 56° that depicts the range of travel of the rear flap segment from its retracted to its fully extended position. The solid line double arrow 1122 is the curved arc of 34° that depicts the range of travel of the forward flap segment from its retracted to its fully extended position. The center axis of the hinge pin 1123 for the rear flap segment and the center axis of the hinge pin 1124 for the forward flap segment are both shown in side view. A long, solid line double arrow 1125 depicts the 172 cm chord of the wing with its flaps fully extended. The rotary crank actuator 1126 is driven by a pancake motor to move the flap segments and is shown in side view with the long pushrod 1127 for the rear flap segment and the short pushrod 1128 for the middle flap segment.

Active Main Landing Gear

FIGS. 21 and 22 illustrate views of the SkyQart's Active Main Landing Gear system, in accordance with one embodiment of the present invention. The active main landing gear is an important enabling component of this invention's system because it provides a long-travel main landing gear that can gracefully absorb a high rate of sink rate upon landing and can autonomously provide very rapid and precise changes in ride height and, thereby, change the SkyQart's pitch attitude on the ground. The changes in ride height enable two key capabilities required in QUAD. The first is the capability to set the ride height to match the height of the loading dock floor. The second is the capability to rapidly rotate the aircraft into a nose-up attitude at the moment during the take-off roll when such rotation is needed for lift-off, which enables the necessary extremely short take off capability of the SkyQart. The active main landing gear accomplishes the change in ride height by moving the main landing gear's rigid lever arm that is inside the Axisymmetric Fuselage Pod (AFP). A powerful motor that uses the energy in the SkyQart's battery pack, actively moves this lever arm by exactly the appropriate amount, and this active main landing gear motor's movements are controlled by a software application that accurately, instantly, continuously and automatically senses the appropriate pitch attitude, sink rate and ride height of the aircraft. The actuating mechanism by which the active main landing gear motor(s) control(s) the movement of the main landing gear's lever arm may use different actuator devices to operate the active main landing gear in different embodiments of this system while still being included in this patent[27]. One embodiment is by a special design of linear motor that exerts direct control of the arm's position. Another is by a rotary motor that spins the shaft of a ball-screw or jack-screw, which, in turn, translates the motion of the spinning shaft to linear motion in order to move the landing gear's lever arm the appropriate distance. A third embodiment could use an actuator mechanism that is a hydraulic cylinder whose length and compression resistance is rapidly varied to the appropriate level by an electro-hydraulic pump. Yet another embodiment uses a magneto-rheological damper to modulate the position of the landing gear's lever arm. The active main landing gear has three main working positions. One is for the cruise flight condition, in which the swept-back main landing gear leg and its airfoil-shaped wheel fairing are aligned with the free-stream airflow in flight to reduce drag. The cruise flight working position is at the top of the range of motion of the active main landing gear. The second working position is the docking position, for docking the SkyQart. This docking position is one in which the main landing gear leg and lever arm are rotated from their cruise flight position downward 14.6° around the center of their trunnion. This docking position aligns the ride height of the SkyQart so that its cabin floor height exactly matches the standard 47 cm height of the loading dock. The third working position is the fully dangle down position of highest drag, called the landing approach position, which is used during a SkyQart's steep final approach to landing. The landing approach position is one in which the main landing gear leg and lever arm are rotated 490 downward from the docking position, making 63.6° of total rotation downward from the cruise flight position. The landing approach position of the main landing gear provides a nominal total landing gear travel in jounce of 65.0 cm for absorbing the landing impact upon touchdown. There are two additional working positions that, for clarity, are not shown in FIG. 22. The first of these is the nose-down pitch attitude position that is used during the initial portion of the take-off roll in order to enhance down-force on the tires to enhance their traction on the pavement and to prevent a wheelie. The nose-down pitch attitude position is also routinely used to minimize unwanted lift during the portion of the landing ground roll just after completing the full landing gear jounce after touchdown. The nose-down pitch attitude is also used during the time that a SkyQart is parked away from a dock. The second of the additional positions not depicted in FIG. 22 is the momentary position in which the main landing gear abruptly retracts enough to produce a nose-up pitch attitude of the SkyQart to suddenly increase its lift at the exact moment when it reaches its preferred lift-off speed of 24 m/sec during its take-off roll. In FIG. 21, The landing gear lever arm 211, shown in crosshatch, moves the active starboard main landing gear through its range of motion. This lever arm is rigidly attached to the transverse trunnion bar 218, shown in frontal view as a crosshatched horizontal member and, whose rotation in the two main landing gear pillow block bearings 214 provides the swing axis of the active main landing gear. A frontal view of a horizontal line 1201 that is 47 cm above the paved surface represents the dock surface which is level with the cabin floor of the SkyQart when its landing gear are in the docking position, as shown. A double arrow 1202 shows a length that represents the 47 cm height of the dock at a SkyNest. A horizontal line 1203 represents the paved surface level of the paved surface on which the tires of the SkyQart are resting when in the docking position. The right main landing gear leg 213 is shown in frontal view. The triangle-shaped starboard pillow block bearing 214 is a structure that is integrated into the AFP and that, along with the port-side pillow block bearing, bears and spreads the loads imparted by the main landing gear's contact with the pavement. The 2.54 cm diameter transverse horizontal trunnion bar 218 joins the port and starboard main landing gear legs. The nose gear tire 1207 has a semi-oval outline in frontal view. The main wing airfoil 1208 at the midline of the SkyQart I or II, is shown in its position relative to the nose and main gear tire contact patches. The midline mono-strut 207 attaches the main wing to the AFP. The empennage is omitted from FIG. 22 for simplicity. The seam in the AFP 1210 opens to separate its rear hatch from its forward portion during loading and unloading operations at the dock. The pushrod 1211 connects the powered actuator to the crosshatched main landing gear lever arm 211, with said arm shown in its dangle down, landing approach position. The finely crosshatched main landing gear leg 1225 is shown in side view in its cruise flight position. The aft edge of the starboard main landing gear tire 212 has a nominal 40.64 cm diameter, which, like its identical mate the port or left main landing gear tire, is mounted on a powerful wheelmotor whose exact rotational position, RPM and power are controlled so as to provide take-off acceleration, regenerative braking on landing, as well as precisely guided trajectories for taxiing, parking and docking. Said landing gear tire 212, is shown in its retracted, cruise flight position. A double arrow 1215 whose length of 65.0 cm, depicts the full range of jounce travel of the main landing gear tire. The paved surface 1216 is shown at the level it would have at the moment of initial touchdown of the SkyQart during landing. The right main landing gear leg 213 is shown in side view in its docking position. The dashed line 1218 outlines the shape of the wheel fairing of the crosshatched main landing gear tire when the main landing gear is in its dangle down landing approach position. Note that the nose tire 1207 relative position cannot be specified since it could be at any of several positions depending upon the fuselage pitch angle at the moment of landing touchdown. A horizontal line 1219 depicts the level of the paved surface as would occur when the SkyQart is docked. A double arrow 1220 of 21.6 cm length depicts the nominal 21.6 cm (8.5 inch) ground clearance of the belly of the AFP. The active main landing gear's powered actuator 1221 (of whatever type used) is the component moves the main landing gear lever arm to position the landing gear. The powered actuator shown has the appearance of a hydraulic ram, but many other types of actuator are used in other embodiments. The forward pivot axis 1222 for the landing gear powered actuator is shown in side view. The location of this pivot may vary in different embodiments of the SkyQart. This pivot is located at the apex of the large load-spreading gusset 1223 that is structurally integrated into the AFP. The cabin floor 1224 in the SkyQart is shown in side view. A double arrow 1226 depicts the nominal 35.56 cm (14") height that is the lowest height setting of the surface deck of an RDC and thereby becomes the reference height for the shallow off-loading ramp 1227 depicted in side view by a gently sloping solid line that slopes to be asymptotic with the paved surface 1203. Said off-loading ramp 1227 is used for on-loading or off-loading an EPC onto or from and RDC when said RDC needs to perform such loading from a paved surface. An alternative steeper off-loading ramp 1228 is depicted as a dashed line that descends to said paved surface 1203 from the height of the dock surface 1201 that is also the height of the SkyQart's cabin floor. Both ramps 1227 and 1228 can be used at auxiliary off-loading stations that have matching dock surface heights.

The Ultra-Quiet Propeller

Figure 23:
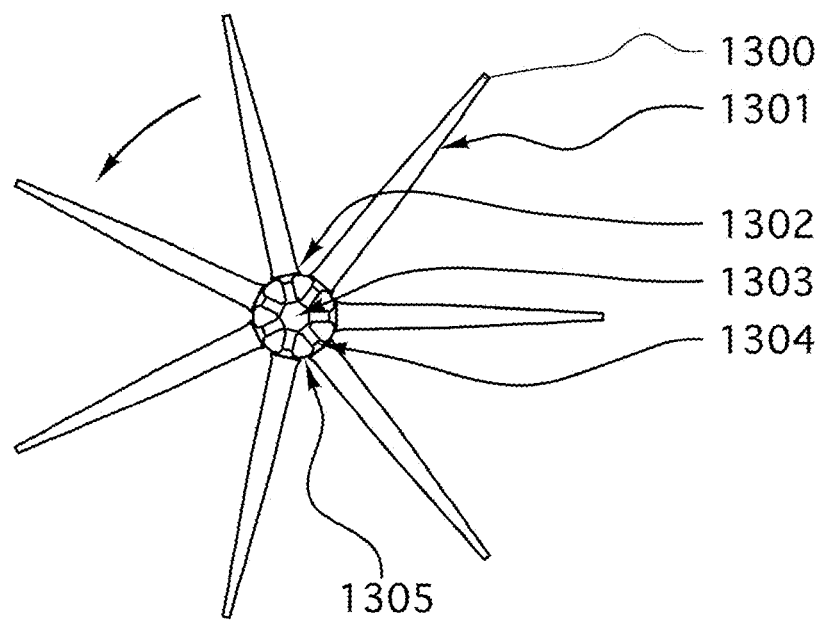
FIG. 23 shows a frontal view of a SkyQart ultra-quiet propeller.
Figure 24:
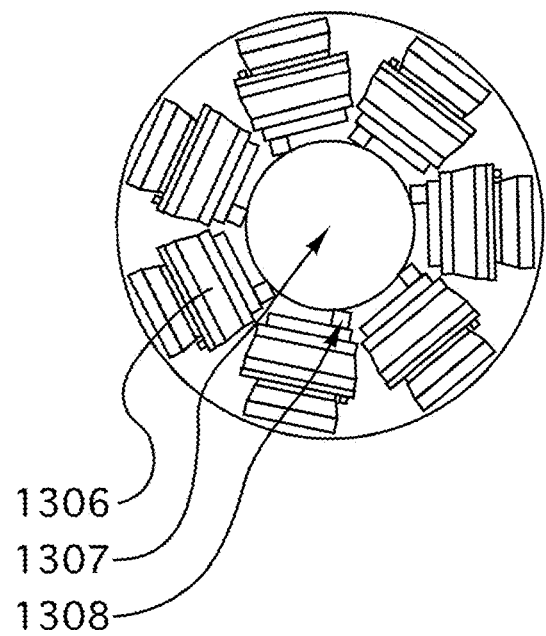
FIG. 24 shows a frontal view of an exemplary central hub of a SkyQart ultra-quiet propeller.

FIGS. 23 and 24 depict a nominal embodiment of the ultra-quiet propeller. The ultra-quiet propeller is an important component to this invention. It is a seven-bladed propeller of a nominal 3.05 m diameter that is used on the embodiments of SkyQarts depicted in this invention and this is shown in frontal view in FIG. 23, along with a separate frontal view in FIG. 24 of its central controllable pitch propeller hub. These propellers are nominally of the design used in U.S. patent number U.S. Ser. No. 10/415,581B1, to Dr. Seeley. These propellers accordingly incorporate blades of high-aspect ratio with laminar flow airfoil sections tailored by CFD to minimize spanwise flow and to have deliberate blade strengthening increases at Fibonacci intervals in order to dampen harmonic blade vibrations. These blades also incorporate that propeller patent's special blade angles near their tip that, in normal take-off operation, produce a small amount of reverse thrust so as to reduce or eliminate their blade tip vortex and the noise attendant thereto. Alternative embodiments of quiet propeller are used in the system of this patent if they fulfill the short paved surface and low noise requirements of said system. The propeller shown in FIG. 23 has seven blades with equal spacing between blades. This propeller is shown with zero blade twist in order to better depict its planform shape. The blade tip 1300 is shown in frontal planform view. The trailing edge 1301 of the propeller blade is shown at its 0.75R or 75% blade station. The trailing edge of the innermost portion of the blade 1302 is where it exits the streamlined spinner. The central thrust axis 1303 of the propeller is shown at its axial center. A line 1304 represents the nominal outer limit of the cylindrical neck of the propeller blade shank that fits inside the hub. Note that the cylindrical neck of each blade is shown here with a round nub at its inner end and without its blade retention clamps. The circular surface 1305 shows the outer circumference of the streamlined spinner that encloses the hub and the innermost portions of the blade. The generic, 7-bladed, controllable pitch propeller hub is depicted in FIG. 24. A propeller blade retention clamp 1306 is shown located inside this hub. It can be seen that there are seven of said clamps and that these are distributed at equal intervals and equal radii around the central thrust axis 1307 of the hub, which coincides with the center of the circular propeller mounting flange. Each blade has a camfollowing pin 1308 on its inner surface. To control propeller blade pitch, said pin can be moved an equal amount along an arc by a small motor inside the hub (not shown) so as to identically rotate each propeller blade to the blade angle (or pitch) that is appropriate for the desired thrust and RPM. The propeller hub's central circular propeller mounting flange attaches the hub to the propulsor unit (electric motor). The six equally spaced mounting bolt-holes in said flange are omitted for clarity. Alternative embodiments of ultra-quiet propellers could be used in this patent's system, if they fulfill the ultra-quiet and efficiency needs of said system.

The Electric Payload Cart (EPC)

FIGS. 25, 26, 27 and 28 depict a standard embodiment of the Electric Payload Cart (EPC) and its details. The EPC is an important component to this invention. It is the device that enables the very short turnaround time (TAT) for loading and unloading SkyQarts at the docks of the QUAD system. With its standard embodiment of the seat-latching rails and latching system, each EPC can provide attachments with which to pre-load various types of payload and then can be autonomously positioned on the dock surface in a position close by to where the next SkyQart will dock and open its rear hatch. Once the SkyQart's rear hatch is fully open, the EPC can autonomously and rapidly roll into the SkyQart's cabin and be automatically pin-latched securely to its interior structure. Once so latched, the rear hatch is closed and the SkyQart is ready for departure. In FIG. 25. The edge of the EPC's port-side rear wheel housing 1400 supports the axle bolt and encloses both the rear tire and its wheelmotor. The outline of the cross-section of the EPC's port-side outboard seat-latching track 1401 is shown in frontal view. Said seat-latching track is shown in greater detail in frontal view 1410. It will be seen that there are a total of six separate but parallel seat-latching tracks on the top surface of the EPC. The 6.86 mm diameter receptacle hole 1402 is shown in the side of the surface deck of the EPC by a small dashed-line rectangle. The EPC has two separate sets of four identical receptacle holes arranged in a linear array with equal spacing along each of its sidewalls. Each of these four receptacle holes are 12.7 mm deep and they are spaced 25.4 mm apart longitudinally. These holes serve as receptacles for the four, separate, solenoid-operated latching pins that fixate the sides of the EPC to the interior of the AFP and, alternatively, to the surface deck of the RDC. The bottom edge 1403 of the port rear wheelmotor housing is shown in frontal view. The forward edge 1404 of the 6.35 mm diameter latching pin inside the latching solenoid that is on the port-side of the EPC is shown in top view. There are a total of four identical latching pins and solenoids shown in top view in FIG. 27. FIG. 26 depicts one embodiment of a payload-holding device. The strut 1405 of a payload-holding device is shown in diagonal crosshatch and represents the type of strut that is used for any of a variety of payload-holding devices for the EPC, including a seat, a cargo bin, a FSM, a latching rack, etc. Said strut is seen to contain a tiny roller and to terminate in a claw shape that wraps around the rail of the extruded metal seat-latching track 1410 below it. The rectangular block-like body of the solenoid 1406 whose vertical pin latches the payload-holding device to the rail of said seat-latching track 1410, is shown in frontal view. The tiny roller 1407 that is enclosed in the terminal claw shape of said strut 1405 is shown in frontal view. Said tiny roller helps to ease movement of payload-holding devices along said seat-latching tracks when they are re-positioned in order to adjust the center of gravity of a payload. The hexagonal head bolt 1408 serves as the axle for the tiny roller 1407. The crosshatched outline of the 6.86 mm diameter vertical hole 1409 in the centerline of the rail of the seat-latching track is shown in frontal view. The extruded metal seat-latching track 1410, shows the outline of its shape including its central rail. The hexagonal nut 1411 secures the bolt 1408 into position and allows it to compress the bushing 1415 for the tiny roller 1407. In FIG. 28, the manual pull-ring 1412 can be used to manually retract and disengage the normally-extended solenoid latching pin. This pull ring, when pulled to disengage, can be latched into that disengaged position. The 6.86 mm hole 1413 is one of many equally spaced along the central rail of the extruded metal seat-latching track, as shown in side view. Each of said holes 1413 contains a latch-sensor device that detects when said hole is filled with a latching pin. The vertical solenoid latching pin 1414 secures the payload-holding device to the seat-latching track. The inner surface 1415 of the hollow shaft bushing for the tiny roller 1407 is shown in frontal view, in FIG. 25, the lateral surface 1416 of a rear tire of the EPC is shown in frontal view. The floorboard 1417 of the EPC is shown in frontal view. The inner seat-latching track 1418, extends the full length of the EPC. The battery pack 1419 of the EPC is shown in frontal view. The swivel axis 1420 of the right front castoring wheel is shown in top view. There is an identical left front castoring wheel shown with bilateral symmetry in FIG. 27. The front edge 1421 of the floorboard of the EPC is shown in top view. The centerline of the starboard inboard-most seat-latching track 1422 is shown to be full-length and to have bilateral symmetry with the full-length port-side inboard-most seat-latching track. A horizontal double arrow 1423 denotes the 30.5 cm center-to-center distance from said starboard inboard-most seat-latching track to the port-side inboard-most seat-latching track. The centerline of the starboard middle seat-latching track 1424 likewise has bilateral symmetry with the port-side middle seat-latching track. A double arrow 1425 denotes the 8.9 cm center-to-center distance from the starboard inner seat-latching track to the starboard middle seat-latching track. The centerline of the starboard outer seat-latching track 1426, likewise has bilateral symmetry with the port-side outer seat-latching track. A double arrow 1427 denotes the 25.4 cm center-to-center distance from the starboard middle seat-latching track to the starboard outer seat-latching track. The circle center 1428 depicts the end of the 228.2 cm moment arm from the e.g. datum at the nose of the AFP, which is the nominal arm length at which the seated crew weight applies when an EPC with passenger payload is pin-latched, as shown in FIG. 27, at the rear-most of its four latching pin holes. The navigation module 1429 sits atop the rear portion of the surface deck of the EPC. The rectangular crosshatched battery pack 1430 of the EPC is shown in top view. The head of the right starboard rear axle bolt 1431 of the EPC is shown in top view. The EPC 1432 has a trapezoidal outline in top view. The "Go-button" 1433 that manually authorizes movement of the EPC is located as shown in FIG. 25 on the starboard rear face of the surface deck of the EPC. Alternative embodiments of the EPC could be used in the system described in this patent, provided that their size and function are compatible with the operation of the other vehicles in the system.

The EPC Payloads

FIGS. 29, 30, 31 and 32 which depict some of the common types of payload that the standard EPC can carry, showing 3-view layered set of figures of how such payloads would fit onto the EPC and inside the AFP of the SkyQart. These common payloads include passengers, baggage, cargo and building materials. These figures are sample embodiments and do not constrain other possible payloads or loading geometries from being carried in this patent's system. In keeping with this invention functioning as a system, all payloads that the standard EPC can carry in a SkyQart can also be carried atop an autonomous robotic delivery cart (RDC), which is the ground vehicle that can deliver payloads to nearly any nearby destination that is accessible by street, cart path or other byway. The combined air and ground transportation functions of this system can haul more than just payloads that include passengers, baggage, cargo and building materials; it also can haul EPCs that carry fire suppression modules that can effectively apply fire-retardant both from the air by SkyQart-F and from the ground by RDC-F.

The cargo axisymmetric fuselage pod 1539 is shown in FIG. 32, and its use requires that the EPC be pin-latched into the SkyQart at a position nominally 25.4 cm further aft from the standard solenoid latching pin locations that are used in the standard AFP. In FIG. 29, the forward baggage compartment 1500 of a two-seat EPC/SkyQart configuration is shown in side view. The passenger seat support bracket 1501 pin-latches to the seat-latching tracks of the EPC. The seatback 1502 of the passenger seat is shown in side view in its normal non-reclined position. This same seatback is also shown in side view as a dotted outline in FIG. 29 as one that is tilted back 30°, which is its fully reclined position. The rear baggage compartment 1503 is shown in its normal non-reclined position. The outline of this same baggage compartment is also shown tilted back 34°, as it would be if the seatback were fully reclined. The space 1504, shown in coarse crosshatch, is that normally occupied by removable flotation module #1. The space 1505, shown in finer crosshatch and extending 96.5 cm aft of the rear hatchline, is that normally occupied by removable flotation module #2. In FIG. 30, the aft surface 1506 of the nosegear bulkhead at FS 68.6 cm, is where the diameter of the AFP is 87.8 cm. The front seat support bracket 1507, shown in crosshatch, is that used when an EPC has a three-seat payload. The rear seat support bracket 1508, shown in crosshatch, is that used when an EPC has a three-seat payload. The rear hatchline 1509 is where the rear hatch opens and separates from the forward portion of the AFP. In FIG. 31, the 63.5 cm L×63.5 cm H×63.5 cm W forward cargo extension bin 1510, shown in horizontal crosshatch at its nominal position, is cantilevered from the front side of the main cargo bin 1513. The interior space of said forward cargo extension bin 1510 is contiguous with that of cargo bins 1513 and 1514. A double-ended arrow 1511 depicts the 2.44 m dimension that exists inside the three combined cargo bins (1510, 1513 and 1514) to enable them together to carry packages up to 2.44 m in length. The large central Main Cargo Bin's forward support bracket 1512 is shown in fine horizontal crosshatch. Said support bracket 1512 is one of four said brackets, two forward and two rear, each of which pin-latches to the seat-latching tracks of the EPC to secure the cargo bin(s) to it. The nominal 121.9 cm L×91.44 cm H×106.7 cm W central Main Cargo Bin 1513, is shown in medium-sized horizontal crosshatch. The 63.5 cm L×63.5 cm H×63.5 cm W rear extension cargo bin 1514, shown in horizontal crosshatch, is at its nominal position cantilevered from the rear side of the main cargo bin 1513. The interior of cargo bin 1514 is contiguous with that of reference numbers 1510 and 1513. In FIG. 32, the two six-high stacks of 2×12 lumber boards 1515 are shown in side view. Each such board is 3.66 m L×3.81 cm H×28.6 cm W and there are a total of twelve such boards in the stacked payload depicted in FIG. 32. The leading edge of these lumber boards is located at FS 68.6 cm, which is bulkhead 1506. The trailing edge of these boards is at FS 434.3 cm, where the inside diameter of the cargo axisymmetric fuselage pod is 78.44 cm and that trailing edge is shown to fit inside the extended cargo axisymmetric fuselage pod, which is nominally 61.0 cm longer than the standard AFP. In the standard sized AFP, a payload of these same twelve boards would be limited to a board length of 3.05 m. The top or lid 1516 of the forwardmost of the two 208.2 liter (55-gallon) drums are shown, with fine vertical crosshatch, laying end-to-end on their sides as sample payload in a standard sized AFP. Each such drum is 87.6 cm long and both are shown to be resting atop a hauling attachment herein called a truss-braced latching rack 1517 that is pin-latched to the top surface of the EPC and is shown in diagonal crosshatch. Any of the several outsized payloads depicted in FIG. 32 can be attached to said latching rack 1517. A stack of commercial solar panels 1518, positioned atop said latching rack 1517, comprise a 54.9 cm tall stack of twelve such panels, each panel of which is 155.7 cm L×4.6 cm H×104.65 cm W. Said stack of solar panels 1518 fits fully inside the standard sized AFP. A stack of seven sheets of plywood 1519, each of which is 2.44 m L×2.86 cm H×1.22 m W is shown with fine horizontal grain crosshatch and sitting atop the latching rack with the stack's trailing edge fitting inside of the dashed outline of the cargo axisymmetric fuselage pod. The leading edge of this stack of plywood is at FS 145.5 cm where the inside diameter of the AFP is 131.45 cm. Its trailing edge is at FS 389.23 cm where the inside diameter of the cargo axisymmetric fuselage pod is 131.45 cm. In FIG. 29, the seat support bracket 1520 for the two-seat version of the SkyQart, shows its location and shape. In FIG. 30, the diagonally crosshatched area 1521 represents flotation module #1, showing the extent of the space that it occupies in the forward portion of the rear hatch of the AFP. In FIG. 31, a crosshatched forward support bracket 1522 of the large central Main Cargo Bin is shown in frontal view. There are two of said forward support brackets 1522, bilaterally symmetric across the midline, and each of which pin-latch onto their respective innermost seat-latching tracks of the EPC. Said seat-latching tracks enable adjustment of the latching position of the cargo bin support brackets as needed to achieve a correct center of gravity for flight. The forward extension cargo bin 1510 is depicted in frontal view in horizontal crosshatch to show its axial location and size. The horizontally crosshatched large central Main Cargo Bin 1513 shows in frontal view its size of 106.7 cm W×91.44 cm H, and its axial location inside the AFP. In FIG. 32, the stack of seven sheets of plywood 1523, each of which is 28.58 mm thick, is shown in finely grained horizontal crosshatch, and sits atop the latching rack on the EPC inside the AFP. The stack of twelve solar panels 1524, each of which is 45.72 mm thick, is shown in frontal view with coarse horizontal crosshatch and sits atop the latching rack on the EPC inside the AFP. A circular outline 1525 depicts the frontal end-on view of the size and position of the 208.2 liter (55-gallon) drum payload as it sits atop the latching rack on the EPC. The two stacks of 2×12 lumber 1526, are shown in frontal view, with the side-by-side stacks each containing six boards and the stacks tied or lashed onto the top of the latching rack on the EPC. In the top views that follow, items are shown as transparent in order to depict the details of the underlying EPC. In FIG. 29, the front port-side baggage compartment 1527 and its projected size and location are shown in top view in the two-seat version of the EPC inside the AFP. An identical starboard baggage compartment is shown to be bilaterally symmetric. A 34.93 cm wide rectangular computer tablet 1528 comprises the lid for that front baggage compartment. The seat-bottom 1529 of the port-side seat, is shown in diagonal crosshatch in top view for a two-seat version of the EPC inside the AFP. The headrest 1530 for the port-side seat, is shown in diagonal crosshatch, in a two-seat version of the EPC inside the AFP. In FIG. 30, the midline front seat bottom 1531, is shown in diagonal crosshatch in top view to show its size and position in a three-seat version of the EPC inside the AFP. The headrest 1532 for the midline front seat, is shown in diagonal crosshatch in a three-seat version of the EPC inside the AFP. The seat bottom 1533 of the port-side seat, is shown in top view diagonal crosshatch in a three-seat version of the EPC in the AFP. The headrest 1534 for the port-side seat, is shown in top view in diagonal crosshatch in a three-seat version of the EPC inside the AFP. It can be seen that this headrest extends aft of the rear hatchline. In FIG. 31, the front extension cargo bin 1510, is shown in top view in medium horizontal crosshatch, with said bin attached to the front of the large central Main Cargo Bin to show its longitudinal size and position. The large, central. Main Cargo Bin 1513, is shown in top view as transparent and in coarse horizontal crosshatch on top of the EPC revealing its size and position. The rear extension cargo bin 1514, is shown in top view in medium horizontal crosshatch, with said bin attached to the rear of the large central Main Cargo Bin 1513 and fitting inside the space in the rear hatch vacated by flotation module #1. In FIG. 32, a stack of lumber 1535, is shown in top view and in fine grain to depict its size and position inside the cargo axisymmetric fuselage pod. A stack of twelve solar panels 1536 is shown in top view and in diagonal crosshatch to show its size and position when mounted on the EPC, wherein each such panel is 155.7 cm L×104.65 cm W. The tiny block housing 1537 of the right hand solenoid-actuated latching pin that is fixed to the structure of the cargo extension module for the cargo axisymmetric fuselage pod is shown in top view. Block housing 1537 has a matching mate that is the port-side block housing that is symmetrically placed on the opposite side of the cargo extension module. A stack of common plywood sheets 1538, is shown in top view and in coarse diagonal crosshatch, as it would be lashed inside the cargo axisymmetric fuselage pod. For clarity, the two 208.2-liter (55-gallon) drums as payload are deliberately omitted from this top view figure. The cargo axisymmetric fuselage pod 1539 has a displaced rear hatchline that is shown as a dashed vertical line that is the trailing edge of the 61.0 cm L cylindrical cargo extension module that attaches to the rear hatch of the standard AFP to create the cargo axisymmetric fuselage pod. The aft solenoid pin 1540 that is standard equipment on the AFP cargo extension module is shown in side view.

FSM on EPC-F

FIGS. 33, 34 and 35 depict the frontal, top and side views of an exemplary fire suppression module (FSM) fitted onto an autonomous robotic electric payload cart (EPC-F). The FSM, in simple terms, comprises a cylindrical tank 308 that is supported on ten short legs whose size and spacings allow the foot of each leg to attach to the seat tracks of an EPC. The bottom surface of said tank is equipped with a motor operated swing knife gate valve whose nominally 30.48 cm (12") diameter outlet can rapidly drain said tank. In FIGS. 33, 34 and 35 the nominally 17.78 cm (7") diameter fill port 1600 is located on top of the FSM's cylindrical tank 308. Said fill port is the opening through which fire-retardant is added to the FSM's cylindrical tank. The nominally 7.62 cm (3") diameter tank vent 1601 is shown in frontal view on the starboard side of the top of said tank 308. The diagonally crosshatched knife blade 1602 of the swing knife gate valve is shown in its fully open position and is attached to the underside of said tank 308. The discharge orifice of the swing knife gate valve 1608 is shown as open in top view. The starboard lateral surface 1603 of the semi-oval outline of the large rigid discharge duct is shown in frontal view as connected to the underside of the swing knife gate valve. Said discharge duct conducts the flow of fire-retardant aftward to an exit duct 1605 that discharges said fire-retardant out an exit orifice 1606. The exit duct 1605 and exit orifice 1606 are a part of the rear hatch of the AFP for those SkyQarts that are modified for fire-suppression service. A leg 1604 that supports and provides attachment of the tank of the FSM to the seat tracks of the EPC-F. There are ten such legs used to support and attach an FSM's tank 308. Each of said ten legs contains in its foot a pin-latch for said attachment. The rigid exit duct 1605 interfaces and seals with the discharge duct of the FSM whenever the rear hatch of the AFP is closed. Said exit duct 1605 is not a part of the FSM; instead, it is rigidly attached to the rear hatch of the axisymmetric fuselage pod of the SkyQart and is included here to show the exit path for fire-retardant that is discharged from the FSM when the FSM is pin-latched onto the EPC-F. Said exit duct 1605 is not shown in FIG. 35. It will be noted that in the top view shown in FIG. 34, said exit duct discharges on the starboard side of the axisymmetric fuselage pod, and the frontal view shown in FIG. 33 confirms this position of the exit duct. When installed on the single axisymmetric fuselage pod of a SkyQart I-F or SkyQart II-F or on the port-side pod of any SkyQart III-F, said discharge of the exit duct is on the pod's starboard side. However, when the exit duct is installed on the starboard pod of any SkyQart III-F, its discharge will enter an exit duct that leads to an exit orifice on the port-side of that pod's rear hatch in order to converge the separate discharge patterns of the two pods. The exit orifice 1606 of the exit duct has an oval shape and is located on the lower surface of the rear hatch. The nominally 15.24 cm (6") diameter, crosshatched circle is a top view of the pancake motor 1607 that drives the swing knife gate valve. The front side of said tank 308 is labeled as 318 when shown in side view in FIG. 35. An outline of an extruded seat track of the EPC 1401 is shown in frontal view. The axis 1420 of the port-side swiveling caster of the left front wheel of the EPC is shown in top view. The rectangular navigation module 1429 on the forward portion of the EPC-F is shown in top view. The rectangular battery pack 1430 of the EPC-F, which lies underneath the tank of the FSM, is on the forward portion of the EPC-F. Said battery pack and said navigation module are omitted from FIG. 33 for clarity of illustration. FIG. 34 offers a top view of the items identified in frontal view in FIG. 33 and FIG. 35 offers a side view of said items.

FSM-AS on EPC-F

FIGS. 36, 37 and 38 depict the frontal, top and side views of an exemplary fire suppression module with aimable spray (FSM-AS) fitted onto an autonomous robotic electric payload cart (EPC-F). The nominal use of the FSM-AS differs from that of the FSM. The FSM is designed to pin-latch onto an EPC-F that is, in turn, pin-latched into a SkyQart in order to perform aerial application of fire-retardant. The FSM-AS is designed to pin-latch onto an EPC-F that is, in turn, pin-latched onto the top of an autonomous robotic delivery cart (RDC-F) in order to perform application of fire-retardant to fires accessible to ground rather than aerial vehicles. Accordingly, the FSM-AS, though it shares some parts commonality (its tank, swing knife gate valve and tank support legs) with the FSM, differs from the FSM by being equipped with a pump and an autonomous robotic adjustable, aimable spray nozzle in place of the discharge duct used on the FSM.

In FIGS. 36 and 38, The fill port 1600 is on the top of the nominally 101.6 cm (40") diameter cylindrical tank 308 of the FSM-AS. The smaller air vent 1601 is on the top of said tank 308. The cylindrical tank 308 is the main component of each FSM. The diagonally crosshatched rectangle 1602 represents the swing knife gate valve that is attached to the underside of said tank 308. An extruded seat track 1401 is one of many arrayed on the surface of the EPC-F. The diagonally crosshatched circular inlet pipe 1700 joins said valve 1602 to the electric pump 1701 that is shown in frontal view in horizontal crosshatch. The diagonally crosshatched pancake motor 1702 has a horizontal rotor and controls the vertical tilt angle of the spray nozzle 1713. The linearly crosshatched pancake motor 1703 that drives the electric pump 1701 is attached to its undersurface. The center of the aft (inlet) portion of the spray nozzle 1704 is the point at which attaches the flexible discharge hose from said pump. Said discharge hose 1707 is found in FIGS. 37 and 38. In FIG. 36, the vertically crosshatched pancake motor 1705 is what rotates the yoke that holds the spray nozzle in order to aim said nozzle horizontally. Said yoke 1712 is trapezoidal in side view in FIG. 38. Four rectangular legs support a roughly square frame 1706, shown in top view in heavy lines in FIG. 37, that supports the electric pump 1701 and motor 1703 and attaches them by pin-latch to the seat tracks of the EPC-F. Four rectangular legs attach a support tray 1708 that attaches the aimable spray nozzle components to the seat tracks of the EPC-F. A rectangular leg 1709 shown in side view is one of the legs that supports square frame 1706. The rectangular leg 1708 whose function is to support the tray that holds the spray nozzle components is shown in side view as leg 1710. The thin tray 1711 to which are attached the various components of the spray nozzle is shown in side view. The outer surface of the rectangular electric motor-controlled adjustable nozzle 1714 is located at the tip of the spray nozzle. Said adjustable nozzle can be set to deliver a range of spray patterns from one of a narrow stream of fire-retardant across a distance to flames to one of a broad pattern of a fogging mist for nearby smoldering fires. The pancake motors that control said nozzle can aim and direct its spray across a more than 300 range of up-down and left-right directions. A small thermographic camera 1715 is mounted beside the spray nozzle and is depicted in top view.

SkyNest Dock Facilities

FIGS. 39 and 40 depict a top and side view, respectively, of a SkyNest's dock facility comprising a cart docking station a battery charging station and an aircraft docking station. The details shown in FIGS. 39 and 40 depict the typical size and relative positions of a loaded RDC, a SkyQart, a robot arm and the battery charging racks at a battery charging station at a SkyNest dock facility. These details comprise standards for the interoperability of dock. RDC, SkyQart and battery swapping and charging that are important components of this system. These views show one embodiment of the relevant dock equipment and their positions, with dimensions drawn to scale. The embodiment shown presents the example of an RDC that is hauling a payload comprised of passengers in seats that are pin-latched to the EPC. Alternative embodiments in this system include those in which an RDC hauls a payload that comprises cargo, building materials, fire suppression modules or other materiel that is attached with appropriate fixtures to pin-latch onto an EPC that is, in turn, pin-latched onto said RDC.

The swappable standard battery pack's (SBP) left side heavy-duty drawer slide 1800 is shown in its location inside of the battery charging rack. It can be seen that there is an identical drawer slide on the right side of the SBP. The vertically crosshatched rectangular 66.04 cm W×101.60 cm L SBP 1801 is shown in top view as it fits inside the battery charging rack. The outer case enclosure 1802 of the left-hand battery charging rack is shown in top view and each such charging rack is connected to a battery charger (not shown) on its back surface. It can be seen that there is an identical outer case enclosure of the right-hand battery charging rack 1803, aligned symmetrically with reference number 1802 in FIG. 39. The top views of the battery charging racks are shown in their positions relative to each other and to the central robot arm. Not shown are two additional battery charging racks that are located in mirror-image positions of 1802 and 1803 but on the opposite side of the central robot arm and accessible to it. Straight below in FIG. 40 and aligned with the FIG. 39 top view of these battery charging racks 1802 and 1803, is a side view of these racks that shows each battery charging rack with its internal stack of five SBPs. These can be seen as the left and right battery charging racks depicted in the lower portion of FIG. 40, as part of the under-dock battery charging station equipment at the SkyNest. Said battery charging racks, along with the under-dock battery swapping robot, battery drawer slides and DC fast charger port comprise the battery charging station. A square base plate 1804 of the multi-articulated robot arm is shown in top view in FIG. 39 and in side view in FIG. 40. This base plate mounts the robot arm to the floor of the service bay under the dock. In FIG. 39, the upper large extension arm of the battery swapping robot 1805, is shown in FIG. 40 as a side view that extension arm. The main vertical extension arm of the battery swapping robot 1806, is while shown in top view in FIG. 39, is shown in side view in FIG. 40. A square plate with rounded corners 1807 serves as the gripping hand of the robot arm. This square plate can grip and move SBPs by using either the small suction cups 1808 along its edge, or by use of its internal electromagnet's magnetic grip on objects that have ferrous surfaces. The opening of the rear hatch 1809 of the AFP, shown swung open and upward to its fully opened position can be seen to be clear of the dock surface. The specialized right-angle sheetmetal flange 1810 that is mounted onto the top surface deck of the specially modified double-decker RDC is shown in coarse vertical crosshatch. Except for being mounted upside down, this flange is identical to the one that is mounted onto the undersurface of the surface deck of the RDC as reference number 2034 in FIG. 46. This up-side down flange 1810 on the top surface of the RDC is one of a pair of such flanges that are each 205.74 cm L×8.89 cm H and these flanges are 66.04 cm apart. Each such flange has centered and securely mounted onto its inner face a full 205.74 cm length of the standard 19.05 mm W×76.2 mm H heavy duty drawer slides that fit the SBP. The stiffness of these sheetmetal flanges is reinforced with a series of sheetmetal gussets that are perpendicular to said flanges, one of which gussets 2010 is shown in FIG. 46. These upper full-length drawer slides are depicted in FIG. 40 as being 205.74 cm long and are shown in a side view with fine diagonal crosshatch. Said upper drawer slides are identical to that shown as reference number 1811, which is a side view of an identical diagonally crosshatched full-length SBP drawer slide that is attached to and centered on the inner face of the lower right angle sheetmetal flange that is attached to the underside of the standard RDC's surface deck. This RDC is shown docked at a cart docking station at the street-side (cart side) of a SkyNest dock and the tires of said RDC can be seen to be resting on the street surface. A downward vertical arrow 1812 has its tip indicating the exact plane of the interface between the cart side edge of the SkyNest dock and the front surface of the RDC that is docked there. At the tip of arrow 1812, it can be seen that the top surface of the deck of the RDC is the standard 47 cm above street level and this is exactly the height that makes it flushly aligned with the top of the cart side edge of the SkyNest dock surface. A jagged edge at a gap 1813 shown in the SkyNest dock surface, indicates an imaginary separation distance between the dock portion overlying the service bay for battery swapping and the dock portion that borders on the street level where RDCs await loading. This gap is actually 4.36 m in order to provide the nominal 7.47 m standard SkyNest dock width that allows for the bi-directional movement of passengers that preserves social distancing, and for bidirectional movements of EPCs. A length of heavy-duty battery drawer slides 1814 are fastened to the underside of the dock surface on the street side of the service bay. The purpose of said drawer slides and that other length of drawer slide depicted by reference number 1820 on the underside of the other, aircraft side of the dock service bay, is to leave a gap in the drawer slides above the robot arm so that the arm can pull and fully remove SBPs from said under-dock drawer slides. By so removing SBPs, the robot arm can more quickly move them in three dimensional space into and out of the slots in the battery charging rack and the SkyQart. A dashed outline of a 184.15 cm long segment of drawer slide 1815 that is normally absent but that can be inserted as an accessory into said gap between the lengths of the under-dock drawer slides so as to effectively join them to create a continuous drawer slide that extends all the way from the aircraft side of the dock a distance of 7.47 m to the street side of the dock. The insertion of drawer slide 1815 to enable manual movement of SBPs under the dock to and from docked SkyQarts and RDCs occurs only in those instances when the robot arm and battery charging rack are either inoperative, disabled or otherwise unavailable. A sturdy vertical pillar 1816 supports the street side edge of the SkyNest dock. An SBP 1817 is stored in the bottommost of the five slots of the left-hand battery charging rack. There are five such SBPs stored in each battery charging rack shown in a side view in FIG. 40. The bottom edge of the left-hand drawer slide 1818 of an SBP is stored in one of the slots of the battery charging rack. The distal extension arm 1819 of the battery swapping robot, shows its sliding attachment to large extension arm 1805. The diagonally crosshatched segment of the under-dock battery drawer slide 1820 on the aircraft side of the dock, depicts its 45.72 cm extension into the under-dock area from the edge of the aircraft side of the dock. A sturdy vertical pillar 1821 supports the dock surface at the edge of the aircraft side of the dock. The dashed line that represents the rear hatchline of the SkyQart 1822, during docking coincides with the aircraft side of the dock, as is shown in FIG. 40. The forward edge of the SBP is shown in side view as it is normally positioned inside the SkyQart. The paved surface 1824 is the aircraft docking pavement and is located a nominal 47 cm below the dock surface 1813 at the aircraft side of the dock. The double arrow 1830 indicates said dock height. The battery swapping robot's central rotating turret 1825 is shown in side view. The main vertical extension arm of the battery swapping robot 1806 is shown in side view in FIG. 40. The small cart 1827 supports and allows movement of the battery charging rack that it supports. Normally, said carts 1827 are securely locked in place to the floor of the service bay. Crosshatched oval 1828 represents the SkyQart's portion of the DC fast-charging port that mates with and connects to the dock's DC fast-charging port in cases where battery swapping is not in use. A side view of the bottom surface of the forward edge of the 99.06 cm L×7.62 cm H×1.91 cm W battery drawer slide 1829 can be seen to hold the SBP into the belly of the SkyQart. The cart docking pavement 1831 is depicted at the same height as the aircraft docking pavement 1824. The other non-labeled components depicted for perspective in FIG. 40 include dashed line outlines of the SkyQart's AFP, main landing gear and wheel fairing, monostrut, nacelle and propeller as well as a passenger-laden EPC with front and rear baggage bins with said EPC pin-latched onto the top of the RDC. The RDC is shown with its scissor jack adjusted to position the top of the RDC's surface deck at 47 cm above street level in order to match the height of the dock surface. Note that the main landing gear and wheel fairing nest under the dock during docking and battery swap. Alternative embodiments of the SkyNest dock, including those of different dimensions and facilities, are possible provided that they interoperate with the other vehicles of this invention's system.

The Swappable Standard Battery Pack (SBP)

FIGS. 41, 42, 43 and 44 together depict an embodiment of the swappable standard battery pack (SBP). The SBP is an important component to this invention in order to provide a uniformly sized, high-quality energy storage device with standardized voltage and connections. It is used in all of the SkyQart aircraft and is made to be quickly swappable and rapidly recharged. It has definable specifications and is drawn to scale in FIGS. 41, 42, 43 and 44 which show its external components in frontal, aft, top and side views. In FIG. 41, The lateral surface of the bent sheet-metal male component 1900 of the 1.9 cm wide heavy-duty drawer slide on the side of the SBP, shows its position of attachment to the container of the SBP. The surface of the lower corner of the stainless steel sheetmetal container 1901 of the SBP is shown in frontal view. The large "+" or positive battery terminal 1902 is on the starboard side of the forward face of the SBP. The starboard cooling port 1903 is one of the two cooling ports of the SBP. In FIG. 42, The aft face of the SBP 1904 has a smoke vent 1905. The midline 3.8 cm diameter smoke vent 1905 connects to an exit tube in the rear hatch of the SkyQart (not shown). In FIG. 43, The heavy-duty drawer slide 1906 on the port-side of the SBP is shown in top view. The outer surface of the outline of the outer container 1907 of the SBP is shown in top view. In FIG. 43, the rear edge of the heavy-duty drawer slide 1908 on the starboard side of the SBP is shown in top view. In FIG. 44, The aft surface of the container 1909 of the SBP is shown in side view. In FIG. 44, The rear edge of the 7.6 cm tall heavy-duty drawer slide 1908 on the starboard side of the long edge of the SBP is shown in side view. In FIG. 41, the large "−" or negative battery terminal 1911 is shown in top view to be on the port-side of the forward face of the SBP. The center of the electrical plug 1912 in the midline of the forward face of the SBP is shown to have five electrical pin terminals, and provides a grommeted battery management system (BMS) port. In FIG. 43. The recessed "−" or negative battery terminal 1911 is on the port-side of the forward face of the SBP. The port-side cooling port 1914 is on the forward face of the SBP. The center of the midline grommeted battery management system port 1912 is on the forward face of the SBP. The forward edge of the starboard cooling port 1903 is on the forward face of the SBP. The surface of the recessed "+" or positive battery terminal 1902 is on the starboard side of the forward face of the SBP. Alternative embodiments of the SBP are possible, and may be adopted by standards organizations in the future, while the standard embodiment of the SBP presented herein is expressly sized to be compatible with all of the SkyQarts of this invention's system.

FSM-AS on Robotic Delivery Cart (RDC-F)

FIGS. 45, 46, and 47 depict an embodiment of the fire suppression module with aimable spray pin-latched onto the surface deck of a Robotic Delivery Cart (RDC-F), an important component to the system of this invention. The RDC is an autonomous electric-powered cart that qualifies as a 40.2 km/hr Neighborhood Electric Vehicle and that is able to use residential streets and bike lanes to carry one EPC with any of its various payloads to accessible neighborhood destinations. The RDC has its own solenoid latching pins that can securely pin-latch to a payload-laden EPC. It has a scissor jack below the deck surface of the RDC that allows it to adjust the height of its surface deck from very low to as high as most commercial truck docks. For payloads consisting of two passengers, the RDC can be fitted with a retractable rain-roof. FIGS. 45, 46 and 47 show three views of the RDC-F—the version of the RDC that carries an FSM-AS—with transparent views that reveal underlying components explained where necessary. FIG. 46 shows the frontal view of the RDC-F, where suspension components are omitted for clarity in depicting the scissor jack. In FIG. 45, a double arrow 2000 depicts the 106.7 cm dimension that is the full vertical range of travel of the surface deck of the RDC-F achievable with its on-board scissor jack. The tips of this double arrow point to the top surface of the RDC-F's surface deck in both its fully lifted and fully lowered positions. The center of the hinge bolt 2001 joins the two arms of the scissor jack and comprises its central pivot axis. This hinge bolt is shown in its position with the scissor jack in its fully extended up position that lifts the surface deck of the RDC-F to a 142.24 cm height above ground. As shown, each arm of the scissor jack is 159.18 cm long between centers of its end axles. The tank 2002 of the FSM-AS is shown in side view. The 10.16 cm tall trapezoidal-shaped forward solenoid mounting block 2003 is fastened to the side of the surface deck of the RDC-F. An identical rear solenoid mounting block is fastened to the side of the surface deck of the RDC-F at a position 77.47 cm aft of the forward block. These forward and rear solenoid mounting blocks are matched by two identical such blocks that are fastened symmetrically at the same fore-aft locations to the opposite side of the surface deck of the RDC-F. The upper surface 2004 of the upward aimed spray nozzle of the FSM-AS is shown in side view. The aft portion of the 8.89 cm H×205.74 cm L battery heavy-duty drawer slide 2005, shown in coarse vertical crosshatch, is fastened to the underside of the surface deck of the RDC-F. This rack stiffens the surface deck and provides a sturdy set of extensible battery drawer slides for loading and unloading spare SBPs onto the RDC-F. In FIG. 46, The upper outer corner of the port-side solenoid mounting block 2007 shows in frontal view its attachment to the side of the surface deck of the RDC-F. A dashed line outline of the circular outer surface of an axisymmetric fuselage pod 2008 of a SkyQart aircraft, depicts how the FSM-AS would fit inside said pod. The underside of the RDC-F's surface deck 2009 interfaces with the 8.89 cm H×66.04 cm W space below that is bordered on either side by heavy duty drawer slides and is normally dedicated to hauling SBPs. Said surface deck 2009 is shown with the RDC-F's surface deck positioned such that its top surface is at its standard docking height of 47 cm above the paved surface. Just below this 2009 interface is depicted the alternative, fully lowered position 2033 for this interface. When the 2033 interface of the RDC-F's surface deck and the SBP space below it are in this alternative, fully lowered position, the RDC-F's surface deck is just 35.56 cm above ground level. This lowered height position provides for easier off-loading of an EPC using an off-loading ramp, if necessary, to off-load an EPC onto street level. This lowered height position is the minimum height attainable for the RDC-F's surface deck. A finely crosshatched outline of a sheetmetal gusset 2010 stiffens the longitudinal right angle sheetmetal flange that carries the heavy-duty drawer slide on one side of the RDC-F. These drawer slides are of exactly the same dimensions as those used to carry the SBP inside the SkyQart. A longitudinal right angle sheetmetal flange 2034, is shown in frontal view to reveal its size and position underneath the surface deck of the RDC-F. The lateral side of a pin 2011 that is inside one of the four solenoid pin-latching devices on the RDC-F is shown in top view. A finely diagonally crosshatched outline 2012 represents the port-side 91 cm long linear actuator for the scissor jack of the RDC-F. An identical linear actuator is located symmetrically on the starboard side of the RDC and these two actuators work in tandem to raise and lower the surface deck of the RDC-F by pulling or pushing on the axles at the rear of the lower scissor blades. These blade axles, whose diameter is 12.7 mm, each holds a pair of 7.6 cm diameter by 3.18 cm wide cast polyurethane wheels, each of which has a wheel capacity is 272.2 kg. The forward edge of a trapezoidal shaped surface deck 2013 of an EPC, shown in coarse diagonal crosshatch, is pin-latched into its preferred position atop the RDC-F. The forward edge of the surface deck 2014 of the RDC-F, shows it to extend over the top of the low-profile front suspension components of the RDC-F. In FIG. 45, A double arrow 2015, has a 35.56 cm dimension that indicates the height above street level of the top of the surface deck of the RDC-F when in its fully lowered position. The bottom of the front tire 2016 of the RDC-F is shown in side view at its intersection with the ground. The finely stippled large triangular front gusset 2017 reinforces the attachment of the lower longitudinal beam of the RDC-F to its front suspension pillar. The center of the upper front bearing 2018 of the scissor jack, is fastened by a gusset to the undersurface of the surface deck of the RDC-F and provides a pivot for one of the scissor jack's arms. The center of the rear cross-bolt 2019 of the ram of the linear actuator that actuates the scissor jack is shown with the jack positioned at the top of its range. The finely vertically hatched 5.08 cm H×50.80 cm L×50.80 cm W nominal battery pack 2020 for the RDC-F is shown in side view as if the RDC's side rail were transparent. The hub wheelmotor 2021 of one of the rear wheels of the RDC-F is shown in side view. In FIG. 46, A double arrow 2022 depicts the 47 cm height above ground level of the surface deck of the RDC-F when positioned for docking at a SkyNest. The position of the starboard linear actuator 2023 on the floor of the RDC-F is shown in frontal view. An identical port-side linear actuator is depicted in the symmetrical position on the port-side of the floor of the RDC-F. The RDC-F's 5.08 cm H×50.80 cm W swappable battery pack 2024 is shown in frontal view in its position submerged into the bottom frame of the RDC-F as if the perimeter frame rail of the RDC were transparent. A double arrow 2025 indicates the 12.70 cm dimension that is the required ground clearance of the RDC-F in order for it to qualify as a Neighborhood Electric Vehicle (NEV). The upper outer rear wheel 2026 of the port-side arm of the scissor jack is shown in frontal view. Note that this wheel is one of a pair that are mounted on either side of the rear end of the port-side scissor jack arm and that they share a common axle bolt. Two more identical wheels are symmetrically mounted on each side of the rear end of the starboard scissor jack arm, sharing a common axle bolt. An identical pair of wheels are mounted on either side of the rear ends of both the left and right lower scissor jack arms. The port-side rear corner of the surface deck 2027 of the RDC-F is shown in top view. The trailing edge of the EPC 2028 is shown pin-latched in its normal position atop the RDC-F. The port-side edge 2029 of the rectangular adjustable spray nozzle of the FSM-AS is shown in top view. The recessed front headlight 2030 of the RDC-F is shown in side view. Said headlight position 2030 on the RDC-F is where are mounted its DC fast-charging port and a suite of miniaturized equipment required for street use including headlight, turn signal, small horn, forward looking camera, infrared sensors and LIDAR. These are all mounted outboard of the midline space that is used for loading and unloading SBPs. A similar suite of required equipment including turn signals and brake lights is mounted on the rear of the RDC-F. The central pivot axis 2031 of the scissor jack is shown in its fully lowered position. The finely stippled triangular rear frame gusset 2032 is on the side of the RDC-F. The interface 2033 of the RDC's surface deck with the below deck space for an SBP, is shown when positioned in its fully lowered position. The finely diagonally crosshatched underslung transverse steel rod 2035 serves as a brace between the central hinges of the left and right scissor jack blades. The lateral surface 2036 of the thin, finely horizontally crosshatched 4.76 mm thick sheetmetal gusset that joints the left or port-side rear horizontal and vertical frame members of the RDC-F, with said gusset labeled in side view as reference number 2032. An identical thin gusset is shown in a top view in a symmetrical position on the starboard rear side of the RDC-F. One of the two symmetrically placed 6.86 mm diameter latching pin receptacle holes 2037 in the forward edge of the RDC-F's surface deck is shown in frontal view. These two receptacle holes straddle the midline and are a nominal interoperable 81.28 cm apart. A specialized double-decker variant of the RDC-F is shown in FIG. 38, and it has been modified to have a second set of heavy-duty drawer slides attached on top of its surface deck. This second set of drawer slides, along with its scissor jack height adjustability, enable this double decker RDC to both on-load spent SBPs and off-load fully charged SBPs, allowing it to serve as a battery pack shuttle. Alternative embodiments of the RDC, including those of different size and capacity, must interoperate with the other vehicles in this invention's system. A transparent flexible plastic sheet canopy that comprises a windscreen/rain canopy 2006 can collapse into accordion-like folds and be stowed at the mar of the RDC. It is not used on the RDC-F. However, in rainy or dusty conditions, this canopy 2006 can be extended forward, to provide an arched dome-like covering to fully enclose a passenger-laden EPC. Alternatively, to make way for the loading and unloading of an EPC onto the front of the RDC, the windscreen/rain canopy is folded, accordion-like, to the rear of the RDC, as shown in FIG. 45. The entire windscreen/rain canopy device attaches to the top of the solenoid mounting blocks on both sides of the RDC's surface deck and can be quickly and easily removed when appropriate. It should be noted that all of the components described in FIG. 46 as parts of an RDC-F are also parts of an RDC.

The entirety of the following references are hereby incorporated by reference herein:

[1] https://insideclimatenews.org/news/23082018/extreme-wildfires-climate-change-global-warming-air-pollution-fire-management-black-carbon-CO2 A description of the climate effects of wildfire.
[2] https://www.propublica.org/article/they-know-how-to-prevent-megafires-why-wont-anybody-listen. The value of controlled burns in preventing wildfire.
[3] https://graphics.reuters.com/CALIFORNIA-WILDFIRE/AIRCRAFT/bdwpkzmyyvm/
[4] https://www.stryker.com/us/en/portfolios/medical-surgical-equipment/emergency-patient-transport.html. A Stryker litter is, 204.47 cm L×58.42 cm W and will fit onto the EPC if slid forward maximally, and if a slight carve out is made into the rear hatch. The litter collapses down to 160.02 cm L which helps it to fit onto the EPC.
[5] http://donsnotes.com/reference/size-humans.html The standards for size for humans.
[6] http://payload.eaa62.org/technotes/tail.htm The formulae for calculating tail volumes.
[7] https://www.mcmaster.com/6603a33. The heavy duty drawer slide type used for mounting the SBP, with 272.16 kg capacity per pair.
[8] https://graphics.reuters.com/CALIFORNIA-WILDFIRE/AIRCRAFT/bdwpkzmyyvm/
[9] https://www.haywardflowcontrol.com/assets/documents/flowcontrol/pdf/VessTime.pdf
[10] https://www.fs.fed.us/rm/fire/pubs/pdfpubs/pdf00572852/pdf00572852.pdf. The drop patterns and coverages of fire-retardant dropped from the air.

What is claimed is:

1. An ultra-quiet, multi-modal, on-demand wildfire suppression system comprising:
a) a plurality of small aircraft that are ultra-quiet electric-powered aircraft named SkyQarts that are autonomous and robotic;
b) a plurality of facilities herein named SkyNests, each comprising:
i) a paved surface having a length no longer than 200 m that is used for take-off and landing of said SkyQarts in on-demand service; and
ii) an occupied area within a perimeter that is no larger than 5 ha; and
iii) autonomous robotic electric payload carts configured to latch onto and haul a payload;
wherein said payload is selected from the group consisting of passenger, cargo, materiel and fire-retardant contained in a fire suppression module; and
iv) a dock facility comprising;
a docking station comprising:
a dock surface configured at a dock height;
cart docking stations configured to receive said autonomous robotic electric payload carts;
aircraft docking stations configured to receive said SkyQarts; and
v) an energy-absorbing crash cushion configured at an end of said paved surface; and
vi) a fence that is at least 2 m tall and configured around said perimeter of said SkyNest;
wherein for noise reduction, said SkyQarts take off from the paved surface and then climb out along a curved traffic pattern having a radius of curvature of at least 94 m (308.4 ft);
wherein said paved surface for take-off and landing comprises a poro-elastic road surface (PERS) configured to reduce tire noise; and
wherein, for noise reduction, said SkyQarts land onto the paved surface after descending along a curved traffic pattern having a radius of curvature of at least 94 m (308.4 ft);
wherein, for noise reduction, an acceptable noise sphere is configured as a virtual sphere whose intersection with said SkyNest's paved surface is entirely contained within the perimeter of said SkyNest and wherein a radius of said noise sphere at any such intersection is that distance at which a take-off noise level produced by said plurality of SkyQarts is 55 dBA LAeq, 5 s as measured along an azimuth of maximum noise from an unobstructed vantage at a height of 1 m above said paved surface for take-off and landing;

wherein said SkyNest facility is configured for on-demand flight operations conducted by said SkyQarts that are configured to haul to and from said docking stations said payload that is latched onto one of said autonomous robotic electric payload carts; and wherein ultra-quiet is defined as a community noise level of flight operations along said perimeter of said SkyNest that is maintained below 62 dBA $LA_{eq}$, 5 s.

2. The ultra-quiet, multi-modal, on-demand wildfire suppression system of claim 1, wherein said SkyNest further comprises a paved surface heater to heat said paved surface and prevent icing of said paved surface.

3. The ultra-quiet, multi-modal, on-demand wildfire suppression system of claim 1, wherein each of the SkyQarts comprises a cabin having a cabin floor;
  wherein said dock facility further comprises autonomous robotic delivery carts, each comprising:
    a powered wheel; and
    a surface deck;
  wherein each of the autonomous robotic delivery carts are configured to haul one of the autonomous robotic electric payload carts;
    wherein the autonomous robotic electric payload cart is configured to autonomously dock onto the surface deck of a docked autonomous robotic delivery cart; and
  wherein the dock facility further comprises:
    an aircraft docking pavement that is contiguous with said paved surface for take-off and landing by said SkyQarts; and
    a cart docking pavement for the autonomous robotic delivery carts to roll onto; and wherein said dock height is effectively the same as a height above said aircraft docking pavement of a cabin floor of the SkyQarts and the surface deck of an autonomous robotic delivery cart from the cart docking pavement to allow said autonomous robotic electric payload cart to roll between the dock surface and the cabin floor of said SkyQarts and between the surface deck of said autonomous robotic delivery cart and the dock surface;
    wherein said SkyQarts are autonomous having an autonomous control system with negligible control latency, with such control latency defined herein as a capability of determining and activating a controlled movement of a vehicle in less than one second, to control a take-off, flight, landing, taxiing and docking of a SkyQarts to said aircraft docking station with a positional precision of ±2.0 mm;
    wherein said autonomous robotic delivery carts are autonomous having an autonomous control system with negligible control latency to control docking of said autonomous robotic delivery cart to said cart docking station with a positional precision of ±2.0 mm;
    and to control docking of said autonomous robotic delivery cart to one of said SkyQarts with a positional precision of ±2.0 mm; and wherein said autonomous robotic electric payload carts have an autonomous control system with negligible control latency to control docking of said autonomous robotic electric payload cart to one of said SkyQarts and to said autonomous robotic delivery cart with a positional precision of ±2.0 mm.

4. The ultra-quiet, multi-modal, on-demand wildfire suppression system of claim 1, further comprising a fire suppression station located within a perimeter of the SkyNest and wherein said fire suppression station comprises:
  a large, elevated tank of at least 10 m (33 feet) diameter having at least one discharge orifice on its bottom surface, and a fill orifice on top of said large, elevated tank, with an array of smaller additive tanks, immediately below said elevated tank, and configured for dispensing controlled amounts of fire-retardant additives into a stream of water drained from said large, elevated tank's discharge orifice into a main discharge duct;
  an array of check-valves to prevent unwanted reverse flow into the several said tanks of the fire suppression system;
  an in-line mixer box in the discharge duct downstream of the additive tanks; and
  one or more high capacity water pump(s) to pump water into said large, elevated tank, with a distribution manifold to distribute said fire-retardant discharged from the large, elevated tank so that said discharge flows into the top of separate vented silo tanks located below the bottom surface of said large, elevated tank, with said dispensing controlled by control valves at the entrance to each of said vented silo tanks and with each of said vented silo tanks having an outlet into a discharge duct of sufficient size to ensure a complete gravity filling of the single tank on a fire suppression module within a time span of less than one minute and nominally to complete said gravity filling within 10 seconds; and
  wherein a hydro-electric turbine that is configured to generate electricity from the potential energy of the mass of water in the large, elevated water tank is included with the fire suppression station and, along with said high capacity pumps, is located beneath the surface of the aircraft docking pavement near said fire suppression station at the SkyNest;
  wherein said filling of said single tank is accomplished by autonomous sensing and control during the presence of an autonomous robotic electric payload cart equipped with a fire suppression module and parked directly underneath said silo such that the discharge duct of said silo aligns with the open fill port on the top of said single tank; and
  wherein said autonomous robotic electric payload cart, upon completion of the filling of said single tank of its fire suppression module, will seal shut said fill port and then proceed to maneuver said electric payload cart back to the aircraft and cart docking stations of said SkyNest where it is configured to dock and pin-latch to either a SkyQart or a robotic delivery cart.

5. The ultra-quiet, multi-modal, on-demand wildfire suppression system of claim 1, further comprising a fire suppression station comprising a tank of said fire-retardant and an outlet orifice configured to dispense fire-retardant into the fire suppression module that comprises a tank and a swing knife gate valve, wherein said fire suppression module is configured with a set of legs that allow it to be pin-latched onto an array of seat-tracks on the surface of an autonomous robotic electric payload cart.

6. The ultra-quiet, multi-modal, on-demand wildfire suppression system of claim 5, wherein each of the SkyQarts comprises a rear hatch and wherein said payload is configured to be exchanged in a plurality of turnaround steps each having a duration of 10-seconds or less, said series of turnaround steps comprising:

landing and then turning off the active paved surface for take-off and landing;

taxiing a first segment;

taxiing a second segment;

precisely backing the SkyQarts, with the rear hatches opened into an assigned aircraft docking station;

unlatching a first autonomous robotic electric payload cart and rolling said autonomous robotic electric payload cart out of the cabin and onto said dock surface;

rolling a second autonomous robotic electric payload cart from said dock surface into the cabin of one of said SkyQart and latching said second autonomous robotic electric payload cart thereto;

concurrently with said exchange of said autonomous robotic electric payload carts, battery swapping of a swappable standard battery pack into the SkyQarts as needed, followed by closure of the rear hatch;

taxiing a first segment;

taxiing a second segment;

taxiing to a position for take-off brake release;

taking off and climbing out to the SkyNest boundary;

wherein said turnaround steps above comprise a peak capacity in which a turnaround cycle time is no more than 100 seconds for an arriving SkyQart at a SkyNest to off-load and on-load a payload and depart.

7. The ultra-quiet, multi-modal, on-demand wildfire suppression system of claim 1, further comprising an auxiliary cart docking station that comprises a ramp surface at which a robotic delivery cart is configured to on-load or off-load an autonomous robotic electric payload cart and wherein said ramp surface is configured to support 1300 kg and has a slope that is effectively gradual to prevent an undersurface of the autonomous robotic electric payload cart from scraping on the ramp during on-load or off-load of an autonomous robotic electric payload cart; and wherein the robotic delivery cart comprises a scissor jack that is configured to move said surface deck of said robotic delivery cart up and down to on-load or off-load an autonomous robotic electric payload cart from the top of any of said auxiliary cart docking stations; and from a truck docking station that comprises a commercial truck dock or a truck bed at which a robotic delivery cart is configured to use said scissor jack to move said surface deck to align with the commercial truck dock or truck bed.

8. The ultra-quiet, multi-modal, on-demand wildfire suppression system of claim 7, wherein the docking station comprises said cart docking station configured on a cart side of the dock surface and said aircraft docking station on an aircraft side of the dock surface whereby an autonomous robotic electric payload cart is configured to roll from the cabin floor inside one of said SkyQarts at said aircraft docking station onto the dock surface, and then roll across said dock surface and onto the surface deck of an autonomous robotic delivery cart at said cart docking station configured on said cart side of the dock surface.

9. The ultra-quiet, multi-modal, on-demand wildfire suppression system of claim 8, wherein the SkyNest docking facility further comprises:

a dock battery charging station that is configured below said dock surface and comprises:

a battery charger;

a battery charging rack to contain and charge batteries, a robot arm to autonomously robotically interchange a depleted battery from one of said SkyQarts with said charged battery from said battery charging rack; and a DC fast-charger port configured to align with and connect to a charging input port of one of said SkyQarts or one of said autonomous robotic delivery carts when said SkyQart or said cart is docked at the aircraft docking station or cart docking station, respectively.

10. The ultra-quiet, multi-modal, on-demand wildfire suppression system of claim 9, wherein the SkyNests comprise adjacent aircraft docking stations at which a first SkyQart, of said SkyQarts, having wingtips that tilt upward and a second SkyQart, of said SkyQarts, having wingtips that tilt downward are docked, wherein said adjacent aircraft docking stations are spaced a distance to receive the first and second SkyQarts with overlapping wingtip configurations, wherein at a first aircraft docking station, said first SkyQart is docked and wherein at a second and adjacent aircraft docking station to said first aircraft docking station, said second SkyQart is docked; and wherein the distance between the first and second aircraft docking stations would not accommodate simultaneous docking of SkyQarts with the same wingtip configuration.

11. The ultra-quiet, multi-modal, on-demand wildfire suppression system of claim 10, wherein the Skynest is a SkyNest I comprising a single dock facility and a single paved surface for take-off and landing, and wherein the SkyNest I has an occupied area that is no larger than 1.28 ha.

12. The ultra-quiet, multi-modal, on-demand wildfire suppression system of claim 10, wherein the Skynest is a Skynest II comprising a pair of SkyNests I that are adjoined and mirrored along a safety buffer zone so that respective paved surfaces of the two SkyNests I extend parallel and provide a double capacity and enable two SkyQarts to take-off or land at the same time.

13. The ultra-quiet, multi-modal, on-demand wildfire suppression system of claim 10, wherein the Skynest is a SkyNest III having a single shortened paved surface for take-off and landing and that occupies an area of no more than 0.6 ha;

wherein at least 50% of the perimeter of said Skynest borders on an open space selected from the group consisting of a shore line, a wild land, a community greenbelt, a highly elevated area around a building rooftop and other unpopulated area that is not noise-sensitive.

14. The ultra-quiet, multi-modal, on-demand wildfire suppression system of claim 10, wherein the SkyNest is a SkyNest IV, wherein the paved surface for take-off and landing has a bowl-shape producing multi-directional sloped paved surfaces having a slope angle of at least 5°, wherein said SkyQarts are configured to land on said bowl-shaped paved surface uphill from any magnetic heading and take-off from said bowl-shaped paved surface downhill from any magnetic heading.

15. The ultra-quiet, multi-modal, on-demand passenger and cargo transportation system of claim 10, wherein the SkyNest is a SkyNest V;

wherein said paved surface for take-off and landing is configured on a rooftop; and wherein said dock facility is accessible by a ramp for aircraft to use to descend to a building level that is one floor below said rooftop; and wherein the fence is configured around a perimeter of said building level and said rooftop.

16. The ultra-quiet, multi-modal, on-demand wildfire suppression system of claim 10, wherein a SkyNest is configured on a portion of land that is inside the perimeter of an existing, larger airport.

17. The ultra-quiet, multi-modal, on-demand wildfire suppression system of claim 1, wherein a fire suppression module is attached by means of a latching adapter that enables it to be pin-latched to several points on the seat-tracks of an autonomous robotic electric payload cart and wherein said fire suppression module comprises:
a single tank having a top surface that includes a vent and a closeable fill port and whose bottom surface includes a discharge orifice that is configured to be opened by an electric motor-powered swing knife gate valve and wherein said discharge orifice supplies the contents of said single tank into a discharge duct whose outlet flange is in an exact and standardized position in 3-dimensional space such that, when said autonomous robotic electric payload cart is correctly pin-latched inside a SkyQart, said outlet flange fits with and seals with a lightweight removable exit duct that is affixed with fasteners to the inside of a flange surrounding the exit orifice on the external surface of the bottom of the rear hatch of the axisymmetric fuselage pod of said SkyQart.

18. The ultra-quiet, multi-modal, on-demand wildfire suppression system of claim 17, wherein the fire suppression module comprises:
a pump that is connected by a hose to an autonomous robotic aimable spray nozzle whose aim is guided by software that analyzes the real time images received from one or more heat-sensing flame-detecting thermographic camera(s), with such pump and aimable spray nozzle added to said fire suppression module for use when said module is latched onto an autonomous robotic electric payload cart that is pin-latched to the surface deck of said autonomous robotic delivery cart that is dispositioned to autonomously or robotically travel on surface streets, paths and other byways to a surface location to suppress a local fire of any type; and
wherein said aimable spray nozzle has an electric motor near its exit that operates to manually or autonomously control the selection of variable spray patterns including a narrow, long-range stream, a wider-stream and a fogging pattern for use when aimed at a fire that is at a distant, nearby or one consisting of several scattered hot-spots, respectively.

19. An ultra-quiet, multi-modal, on-demand wildfire suppression system comprising:
a) a plurality of very small airports herein named Sky-Nests, each comprising:
i) a paved surface for take-off and landing having a length no longer than 200 m; and
ii) an occupied area within a perimeter that is no larger than 5 ha; and
iii) a dock facility comprising docking stations for electric-powered land and air vehicles; and
iv) autonomous robotic electric payload carts configured to latch onto and haul a payload of passengers or cargo along said dock facility to and from said docking stations;
wherein said payload is selected from the group consisting of passenger, cargo, materiel and fire-retardant contained in a fire suppression module;
wherein the SkyQarts are configured to haul to and from said docking stations said payload of passengers or cargo that is latched onto one of the electric payload carts; and
wherein a community noise level impact of flight operations along said perimeter of said SkyNest is maintained below 55 dBA $LA_{eq}$, 5 s;
b) electric powered autonomous robotic delivery carts, each comprising
i) a powered wheel; and
ii) a surface deck; and
wherein each of the plurality of autonomous robotic delivery carts are configured to haul one autonomous robotic electric payload carts on said surface deck, wherein the autonomous robotic electric payload cart autonomously docks and pin-latches onto said surface deck of the autonomous robotic delivery cart with a piggyback transportation function; and
each of said SkyQarts comprising:
a cabin; and
a cabin floor
wherein the SkyQarts are configured to haul one or more autonomous robotic electric payload carts and take-off and land with said one or more autonomous robotic electric payload carts therein; and
wherein each of the autonomous robotic electric payload carts is configured to autonomously dock and pin-latch into the cabin floor of one of the SkyQarts.

20. The ultra-quiet, multi-modal, on-demand wildfire suppression system of claim 19, wherein the dock height and a height of said surface deck of said autonomous robotic delivery cart and a height of a cabin floor of any one of the SkyQarts are effectively the same height.

21. The ultra-quiet, multi-modal, on-demand wildfire suppression system of claim 20, wherein said autonomous robotic delivery carts are autonomous having an autonomous control system to control docking of said autonomous robotic delivery cart to said SkyQart with a positional precision of ±2.0 mm or less; and
wherein said autonomous robotic electric payload carts are autonomous having an autonomous control system to control docking of said autonomous robotic electric payload cart to said SkyQarts and to said autonomous robotic delivery cart with a positional precision of ±2.0 mm or less.

22. The ultra-quiet, multi-modal, on-demand wildfire suppression system of claim 21, wherein the payload that is pin-latched to said autonomous robotic electric payload cart comprises the fire suppression module.

23. The ultra-quiet, multi-modal, on-demand wildfire suppression system of claim 21, wherein each of the autonomous robotic electric payload carts comprises:
two castoring front wheels;
two rear wheels;
a wheelmotor that is configured to turn at least one rear wheel to steer and move the autonomous robotic electric payload cart;
an on-board rechargeable and swappable standard battery pack; and
a surface deck; and
wherein the autonomous robotic electric payload carts each have a maximum speed of at least 2.2 m/sec.

24. The ultra-quiet, multi-modal, on-demand wildfire suppression system of claim 23, wherein said surface deck of the autonomous robotic electric payload cart has a seat-track latching system comprising:
a consistently uniform array of seat-tracks, wherein each comprises a longitudinal array of regularly spaced pin receptacle holes for pin-latching a hauling attachment to said surface deck.

25. The ultra-quiet, multi-modal, on-demand wildfire suppression system of claim 24, wherein the autonomous robotic electric payload carts each have a precision positioning system to control docking of said autonomous robotic electric payload cart to one of said SkyQarts and to said autonomous robotic delivery cart with a positional precision of ±2.0 mm.

26. The ultra-quiet, multi-modal, on-demand wildfire suppression system of claim 25, wherein the precision positioning system of the autonomous robotic electric payload cart comprises an autonomous multi-sensor system to control said wheelmotor(s) and comprises one or more sensors selected from the group consisting of: differential GPS, inertial navigation system (INS), line-following software, strain-gauge sensors that are payload weight-assessing sensors, sensors that detect seat-belt latching and occupancy of a passenger seat, obstacle-avoiding video camera(s) vision system, auto-focus technologies of either active infrared or a vertical and horizontal auto-focusing charge-coupled device (CCD) camera chip, a 4-beam convergent Helium-Neon laser targeting a transponding receiver plate, and a capacitive proximity sensor for the final docking alignment to within ±2.0 mm.

27. The ultra-quiet, multi-modal, on-demand wildfire suppression system of claim 26, wherein the autonomous robotic electric payload carts each have an autonomous control system with an autonomous navigation unit and a networked situational awareness system that provides input to the precision positioning system to execute steering and movement of the autonomous robotic electric payload cart with negligible control latency.

28. The ultra-quiet, multi-modal, on-demand wildfire suppression system of claim 27, wherein the autonomous robotic electric payload carts each comprise:
a sensor-fusion software that senses when said autonomous robotic electric payload cart has a payload loaded thereon; and
wherein said sensor-fusion software is configured to sense when said payload is cargo and when said payload is the fire suppression module according to the pattern of a payload-specific hauling attachment to the seat-tracks of said autonomous robotic electric payload cart; and
wherein said sensor-fusion software is configured to sense when the pin receptacle holes of said autonomous robotic electric payload cart are pin-latched to said SkyQart or to said autonomous robotic delivery cart, and when said pin receptacle holes are pin un-latched from said SkyQart or from said autonomous robotic delivery cart.

29. The ultra-quiet, multi-modal, on-demand wildfire suppression system of claim 28, wherein when the payload is the fire suppression module, the sensor-fusion software enables the autonomous robotic electric payload cart to move when the payload is pin-latched to the autonomous robotic electric payload cart according to the characteristic pattern of an attachment for the fire suppression module; and
when a go signal is received by said sensor-fusion software from a Go-button that is activated by a person proximal to the autonomous robotic electric payload cart.

30. The ultra-quiet, multi-modal, on-demand wildfire suppression system of claim 29, wherein the autonomous control system of the autonomous robotic electric payload carts execute movements of the autonomous robotic electric payload cart with guided rate acceleration change execution (GRACE), with a limit jerk rate of less than 3.4 m/sec$^3$.

31. The ultra-quiet, multi-modal, on-demand passenger and cargo transportation system of claim 30, wherein each of the autonomous robotic electric payload carts has the pin receptacle holes for detachably pin-latching to one of said SkyQarts and, alternatively, to an autonomous robotic delivery cart,
wherein the interior of said SkyQart cabin and the surface deck of said autonomous robotic delivery cart each have a matching array of solenoid-actuated pin-latches whose locations and spacing are configured to align with and pin-latch into the pin receptacle holes of the autonomous robotic electric payload cart.

32. The ultra-quiet, multi-modal, on-demand wildfire suppression system of claim 31, wherein each fuselage pod has a rear hatch that opens to provide access for docking of an autonomous robotic delivery cart to deliver or remove an autonomous robotic electric payload cart into or from said pod by rolling said autonomous robotic electric payload cart from the surface deck of the autonomous robotic delivery cart onto a cabin floor of said pod and vice versa.

33. The ultra-quiet, multi-modal, on-demand wildfire suppression system of claim 32, wherein upon rolling to a latching position in said pod, said pin-latches align with said pin receptacle holes and wherein the sensor-fusion software comprises an automated solenoid-actuated pin-latching system wherein said autonomous robotic electric payload cart is automatically pin-latched to said pod by said solenoid-actuated pin-latching system; and wherein said autonomous robotic electric payload cart comprises a latch sensor that detects when said autonomous robotic electric payload cart is securely pin-latched.

34. The ultra-quiet, multi-modal, on-demand wildfire suppression system of claim 33, wherein the plurality of autonomous robotic electric payload carts are configured to roll on the surface deck of the autonomous robotic delivery carts and wherein said pin-latches align with said pin receptacle holes and wherein the sensor-fusion software comprises an automated solenoid-actuated pin-latching system wherein said autonomous robotic electric payload cart is automatically pin-latched to the autonomous robotic delivery cart by said solenoid-actuated pin-latching system; and wherein said autonomous robotic electric payload cart comprises the latch sensor that detects when said autonomous robotic electric payload cart is securely pin-latched to said autonomous robotic delivery cart.

35. The ultra-quiet, multi-modal, on-demand wildfire suppression system of claim 33, wherein the SkyQarts have an autonomous control system with an autonomous navigation unit and a networked situational awareness system that provide input to the precision positioning system to execute with negligible control latency, steering and movement of the plurality of said SkyQarts when moving on the paved surface of the SkyNest.

36. The ultra-quiet, multi-modal, on-demand wildfire suppression system of claim 35, wherein the precision positioning system of said SkyQarts comprise an autonomous multi-sensor system to control said wheelmotor(s) and comprises one or more of the sensors selected from the group consisting of: differential GPS, inertial navigation system (INS), line-following software, strain-gauge sensors that are payload weight-assessing sensors, sensors that detect seat-belt latching and occupancy of a passenger seat, obstacle-avoiding video camera(s) vision system, auto-focus technologies of either active infrared or a vertical and horizontal auto-focusing charge-coupled device (CCD) camera chip, a 4-beam convergent Helium-Neon laser targeting a transponding receiver plate, and a capacitive proximity sensor for the final docking alignment to within ±2.0 mm.

37. The ultra-quiet, multi-modal, on-demand wildfire suppression system of claim 36, wherein each of the SkyQarts comprises:
- an on-board electrical energy source comprising said swappable standard battery pack;
- a propulsor that is driven by an electric motor herein named a propmotor, that is powered by said swappable standard battery pack;
- a payload capacity of at least 450 kg; and
- a take-off and landing distance on a horizontal surface of less than 60 m at sea level in zero wind.

38. The ultra-quiet, multi-modal, on-demand wildfire suppression system of claim 21, wherein the plurality of autonomous robotic delivery carts comprise:
- two steerable front wheels, and
  - two rear wheels;
  - a wheelmotor;
  - wherein a wheelmotor turns at least one rear wheel to steer and move the said robotic delivery cart; and wherein the robotic delivery cart has a maximum speed of 40.2 km/hour; and
- an on-board rechargeable and/or swappable battery pack; and
- an autonomous control system with an autonomous navigation unit and a networked situational awareness system that provide input to a precision positioning system to execute steering and movement of the autonomous robotic delivery carts with negligible control latency.

39. The ultra-quiet, multi-modal, on-demand wildfire suppression system of claim 38, wherein the autonomous robotic delivery carts each have the precision positioning system to control docking of said autonomous robotic delivery cart to one of said SkyQarts or to said cart docking station at a dock with a positional precision of ±2.0 mm; and
- wherein said autonomous robotic delivery cart is automatically controlled by said autonomous navigation unit to navigate to deliver an autonomous robotic electric payload cart to a dock from a station or from a dock to a station; and
- wherein said station is a home, a place of business, a bus stop, a SkyQart, a truck dock, another vehicle, a fire suppression station or a wildfire location.

40. The ultra-quiet, multi-modal, on-demand wildfire suppression system of claim 39, wherein the precision positioning system of the autonomous robotic delivery cart comprises an autonomous multi-sensor system to control said wheelmotor(s) and wherein the multi-sensor systems comprises one or more sensors selected from the group consisting of: differential GPS, inertial navigation system (INS), line-following software, strain-gage sensors that are payload weight-assessing sensors, sensors that detect seat-belt latching and occupancy of a passenger seat, obstacle-avoiding video camera(s) vision system, auto-focus technologies of either active infrared or a vertical and horizontal auto-focusing charge-coupled device (CCD) camera chip, a 4-beam convergent Helium-Neon laser targeting a transponding receiver plate, and a capacitive proximity sensor for the final docking alignment to within ±2.0 mm.

41. The ultra-quiet, multi-modal, on-demand wildfire suppression system of claim 40, wherein the autonomous control system of the plurality of autonomous robotic delivery carts executes movements of said robotic delivery cart with guided rate acceleration change execution (GRACE), with a limit jerk rate of less than 3.4 m/sec$^3$.

42. The ultra-quiet, multi-modal, on-demand wildfire suppression system of claim 40, wherein the plurality of autonomous robotic delivery carts comprises a scissor jack to change, either automatically or manually, a height of its surface deck for docking and loading or unloading of one of the autonomous robotic electric payload carts.

43. The ultra-quiet, multi-modal, on-demand wildfire suppression system of claim 42, wherein the height of said surface deck is changed, either automatically or manually, by the scissor jack to align said surface deck of an autonomous robotic delivery cart with the cabin floor for docking and loading or unloading of one of the plurality of autonomous robotic electric payload carts.

44. The ultra-quiet, multi-modal, on-demand wildfire suppression system of claim 43, wherein the height of said surface deck is changed, either automatically or manually, by the scissor jack to align said surface deck with that of a bed of a truck or trailer for docking and loading or unloading of one of the autonomous robotic electric payload carts.

45. The ultra-quiet, multi-modal, on-demand wildfire suppression system of claim 44, wherein the fire suppression module is a fire suppression module-AS having a spray nozzle that is aimable, and wherein the height of said surface deck of said autonomous robotic delivery cart is changed, either automatically or manually, by the scissor jack to optimally position the aiming of the spray nozzle of said fire suppression module with an aimable spray that is attached as payload on said autonomous robotic electric payload cart that is latched to said autonomous robotic delivery cart; and
- alternatively, wherein the height of said surface deck is changed, either automatically or manually, to align with a surface deck of a commercial shipping dock for docking and loading or unloading of one of the plurality of autonomous robotic electric payload carts there onto.

46. The ultra-quiet, multi-modal, on-demand wildfire suppression system of claim 45, wherein each of the autonomous robotic delivery carts has a payload weight capacity of 1300 kg or more.

47. The ultra-quiet, multi-modal, on-demand wildfire suppression system of claim 46, wherein each of the autonomous robotic delivery carts has a battery pack sufficient for a range of at least 32 km (20 miles).

48. The ultra-quiet, multi-modal, on-demand wildfire suppression system of claim 47, wherein each of the autonomous robotic delivery carts has a consistently uniform array of drawer slides configured to its surface deck to receive, carry and deliver a swappable standard battery pack whose outer case is configured with compatible matching drawer slide hardware; and
- wherein said surface deck is configured to be raised or lowered by said scissor jack to position said drawer slides to align with those at a cart docking station or under the cabin floor of said SkyQart so as to exchange a swappable standard battery pack.

49. An ultra-quiet, multi-modal, on-demand wildfire suppression system comprising:
a) a plurality of small aircraft that are ultra-quiet electric-powered aircraft named SkyQarts that are autonomous and robotic and comprise:
  i) an on-board electrical power source;
  ii) a propulsor that is driven by an electric motor that is powered by said on-board electric power source;
  iii) a payload capacity of at least 120 kg; and
  iv) a take-off and landing distance on a horizontal surface of less than 60 m at sea level in zero wind; and v) a quiet take-off, wherein take-off from a horizontal surface produces a noise of no more than 55 dBA LAeq, 5 s as measured at a 40 m sideline distance along the azimuth of maximum noise from an unobstructed vantage at a height of 1 m above said horizontal surface;

wherein each of said SkyQarts comprises a fuselage with an interior cabin therein and an interior cabin floor; and b) a plurality of facilities herein named SkyNests, each comprising:
  i) a paved surface having a length no longer than 200 m that is used for take-off and landing of said SkyQarts in on-demand service; and
  ii) an occupied area within a perimeter that is no larger than 5 ha; and
  iii) autonomous robotic electric payload carts configured to latch onto and haul a payload dock along said facility to and from said docking stations; and
    wherein said payload is selected from the group consisting of passenger, cargo, materiel and fire-retardant contained in a fire suppression module; and
  iv) a dock facility comprising;
  a docking station comprising:
  a dock surface configured at a dock height;
  cart docking stations configured to receive said autonomous robotic electric payload carts;
  aircraft docking stations configured to receive said SkyQarts; and
  wherein each of the SkyQarts is configured to haul an autonomous robotic electric payload cart within said cabin and to take-off from a first SkyNest and land at a second SkyNest with the autonomous robotic electric payload cart in the cabin.

50. The ultra-quiet, multi-modal, on-demand wildfire suppression system of claim 49, wherein each of the SkyQarts comprise:
  a main wing;
  a landing gear;
  an empennage; and
  wherein said autonomous control system with negligible control latency that combines a sensor-fusion technology with a networked situational awareness software and a precision positioning system that controls the SkyQarts motion and position both in flight and on the ground, and wherein the precision positioning system controls the docking of said SkyQarts to an aircraft docking station with a positional precision of ±2.0 mm;
  wherein said precision positioning system executes all movements of the SkyQarts with guided rate acceleration change execution (GRACE), wherein said GRACE consists of movements that limit jerk rates to less than 3.4 m/sec$^3$; and
  wherein the propulsor is a propeller.

51. The ultra-quiet, multi-modal, on-demand wildfire suppression system of claim 50, wherein the sensor-fusion technology includes sensors selected from the group of sensors consisting of: differential GPS position, barometric pressure, dynamic pressure, outside air temperature, precision clock and timer, radar altimeter, inertial navigation position, 3-axis accelerometers, LIDAR obstacle detection, thermographic thermal imaging cameras, video cameras with artificial intelligence for obstacle detection, motor temperatures, RPM and power, propeller thrust and drag, standard battery pack status and its latch security, tire pressure, center of gravity, landing gear position, fuselage cabin floor height, pitch angle yaw angle, roll angle, ADS-B air traffic detection, dock proximity, entry hatch position, entry hatch latch security, gross weight, flap position, angle of attack, heading, magnetic track, winds aloft, surface winds, cabin carbon monoxide detector, cabin smoke detector, cabin microphones, wingtip microphones for synchrophasing noise control, communications radio and status of the rooftop ballistic recovery system.

52. The ultra-quiet, multi-modal, on-demand wildfire suppression system of claim 51, wherein the precision positioning system includes one or more sensors selected from the group consisting of: differential GPS, inertial navigation system (INS), line-following software, sensors that detect the presence of an autonomous robotic electric payload cart on the cabin floor, thermographic thermal cameras, obstacle-avoiding video camera(s) vision system, auto-focus technologies of either active infrared or a vertical and horizontal auto-focusing charge-coupled device (CCD) camera chip, a 4-beam convergent Helium-Neon laser targeting a transponding receiver plate, and a capacitive proximity sensor for the final docking alignment to within ±2.0 mm.

53. The ultra-quiet, multi-modal, on-demand wildfire suppression system of claim 52, wherein each of the SkyQarts comprises:
  propeller that is driven by an electric motor, herein called a propmotor,
  wherein the propeller is an ultra-quiet propeller comprising:
    at least three blades; and
    a diameter of at least 1.83M; and
  wherein said ultra-quiet propeller maintains a propeller blade tip speed of less than 152.4 m/sec; and
  a propeller hub comprising:
  a controllable-pitch hub configured to control the pitch of the propeller both to enable the propeller to act as a spoiler in order to control a sink rate of said SkyQart; and
  wherein the controllable-pitch propeller hub is configured to adjust the pitch in less than 3 seconds from a high pitch position to a low pitch or a reverse pitch position;
  wherein said propeller hub is configured to adjust the pitch in less than 3 seconds from a reverse pitch position to a high pitch position to enable the propeller to increase airflow onto the wing and flap surfaces in order to control the lift coefficient and thereby produce a blown flap effect;
  wherein a motor controller for the propmotor is configured to automatically adjust said propmotor's power output with negligible control latency;
  wherein a propeller thrust is increased at touch-down on landing to quickly reduce the sink rate of said SkyQarts; and
  wherein said controllable pitch hub adjustments to said propeller pitch are automatically commanded with negligible control latency by said autonomous control system according to the thrust requirement of the present flight condition; and
    an on-board electrical power source is selected from one or more of the group consisting of a rechargeable, swappable standard battery pack or a rechargeable super-capacitor, a fuel cell, a fuel-driven alternator or generator, an array of solar panels or solar rectennas, configured to provide energy to turn said propmotor and operate other motors on said SkyQarts.

54. The ultra-quiet, multi-modal, on-demand wildfire suppression system of claim 53, wherein each of the SkyQart comprises an active main landing gear;

wherein a wheelie on take-off is prevented by a combination of components, comprising:
said propeller whose thrust axis is at least 60 cm or more above a center of gravity of each of said SkyQarts;
wherein said on-board electrical power source comprises a swappable standard battery pack having a mass, and wherein said standard battery pack is located below the cabin floor of the axisymmetric fuselage pod in order to apply a downward force that helps prevent a wheelie;
wherein an active main landing gear is configured to rotate the main landing gear leg upward when the indicated airspeed becomes a lift-off speed of 24 m/sec so as to increase the fuselage pitch angle during take-off in order to increase wing lift and thereby induce lift-off;
wherein the main wing is configured downstream of the propeller and has extended wing flaps that during take-off produces a nose-down pitching moment that prevents wheelies by forcing the nose tire onto the pavement during take-off; and
wherein a forward location of the nose tire extends the wheelbase and moves the center of gravity forward to increase weight on the nose tire; and
wherein a horizontal tail coefficient is large enough with said forward location of said SkyQart's center of gravity to induce a nose-up lift-off when the indicated airspeed becomes a lift-off speed of 24 m/sec; and
wherein an autonomous control system that has a sensor for fuselage pitch angle detects the onset of a wheelie and modulates the thrust applied by the wheelmotors to the main landing gear tires in order to prevent it.

55. The ultra-quiet, multi-modal, on-demand wildfire suppression system of claim 54, wherein each of the SkyQarts comprises:
wing flaps that have two flap segments and that are semi-Fowler, double-slotted, and propeller-blown; and
wherein said wing flaps are ultra-fast-acting, herein called fast flaps, and wherein to enable short landings, said fast flaps is configured to be fully retracted in less than 0.5 seconds from a fully extended position; and
wherein the wing flaps comprise more than 70% of the total wingspan and a flap chord that is more than 28% of a local wing chord; and
wherein said fast flaps nest into the trailing edge of the wing with air gaps of no more than 6 mm between the flap segments and the wing; and wherein the flap movement is actuated by a rotary crank actuator that is configured to be rotated for the rapid coordinated extension and rapid retraction of the flap segment(s); and
wherein an accelerated wake of a propeller operates upstream of the fast flap system to provide a blown-flap effect to increase lift; and
wherein said blown flap produces a downwash of air that helps to direct downward a discharge of fire-retardant from the fire suppression module that is inside the SkyQart's cabin.

56. The ultra-quiet, multi-modal, on-demand wildfire suppression system of claim 55, wherein each of the SkyQarts comprises:
an axisymmetric fuselage pod that has a low drag coefficient, comprising:
a smooth streamlined outer surface defined by coordinates of Table 55 comprises:
a total length, $L_t$ of a central axis; and
a parameter $X/L_t$ that is a longitudinal coordinate given as a fraction of said total length, $L_t$;
a parameter $Y/L_t$ that is a vertical coordinate given as a fraction of said total length, $L_t$,
wherein a diameter of said axisymmetric fuselage pod at any point along its central axis where $Y/L_t$ is known, is equal to $(2 \times Y/L_t) \times L_t$;

TABLE 55

Axisymmetric Fuselage Pod Surface Coordinates

| $X/L_t$ | $Y/L_t$ |
|---|---|
| 0.000 | 0.000 |
| 0.000 | 0.002 |
| 0.001 | 0.006 |
| 0.001 | 0.010 |
| 0.003 | 0.014 |
| 0.006 | 0.020 |
| 0.010 | 0.025 |
| 0.014 | 0.031 |
| 0.017 | 0.034 |
| 0.023 | 0.039 |
| 0.029 | 0.044 |
| 0.034 | 0.048 |
| 0.040 | 0.052 |
| 0.046 | 0.055 |
| 0.057 | 0.062 |
| 0.069 | 0.068 |
| 0.080 | 0.073 |
| 0.092 | 0.078 |
| 0.103 | 0.083 |
| 0.115 | 0.087 |
| 0.126 | 0.091 |
| 0.138 | 0.096 |
| 0.149 | 0.099 |
| 0.161 | 0.103 |
| 0.172 | 0.107 |
| 0.184 | 0.111 |
| 0.195 | 0.114 |
| 0.207 | 0.118 |
| 0.218 | 0.121 |
| 0.230 | 0.124 |
| 0.241 | 0.128 |
| 0.253 | 0.131 |
| 0.264 | 0.134 |
| 0.276 | 0.137 |
| 0.287 | 0.140 |
| 0.299 | 0.143 |
| 0.310 | 0.145 |
| 0.322 | 0.148 |
| 0.333 | 0.150 |
| 0.345 | 0.153 |
| 0.356 | 0.155 |
| 0.368 | 0.157 |
| 0.379 | 0.159 |
| 0.391 | 0.160 |
| 0.402 | 0.162 |
| 0.414 | 0.164 |
| 0.425 | 0.165 |
| 0.437 | 0.166 |
| 0.448 | 0.167 |
| 0.460 | 0.168 |
| 0.471 | 0.169 |
| 0.483 | 0.170 |
| 0.494 | 0.170 |
| 0.506 | 0.171 |
| 0.517 | 0.171 |
| 0.529 | 0.170 |
| 0.540 | 0.170 |
| 0.552 | 0.170 |
| 0.563 | 0.169 |
| 0.575 | 0.169 |
| 0.586 | 0.168 |
| 0.598 | 0.167 |

TABLE 55-continued

Axisymmetric Fuselage Pod Surface Coordinates

| X/L$_t$ | Y/L$_t$ |
|---|---|
| 0.609 | 0.166 |
| 0.621 | 0.164 |
| 0.632 | 0.162 |
| 0.644 | 0.160 |
| 0.655 | 0.158 |
| 0.667 | 0.155 |
| 0.678 | 0.151 |
| 0.690 | 0.147 |
| 0.701 | 0.143 |
| 0.713 | 0.138 |
| 0.724 | 0.133 |
| 0.736 | 0.127 |
| 0.747 | 0.121 |
| 0.759 | 0.115 |
| 0.770 | 0.108 |
| 0.782 | 0.101 |
| 0.793 | 0.093 |
| 0.805 | 0.086 |
| 0.816 | 0.078 |
| 0.828 | 0.071 |
| 0.839 | 0.064 |
| 0.851 | 0.057 |
| 0.862 | 0.051 |
| 0.874 | 0.045 |
| 0.885 | 0.040 |
| 0.897 | 0.035 |
| 0.908 | 0.030 |
| 0.920 | 0.025 |
| 0.931 | 0.021 |
| 0.943 | 0.017 |
| 0.954 | 0.014 |
| 0.966 | 0.010 |
| 0.977 | 0.007 |
| 0.983 | 0.006 |
| 0.989 | 0.005 |
| 0.994 | 0.005 |
| 0.997 | 0.005 |
| 1.000 | 0.005 | a composite sandwich wall structure that comprises a stressed-skin vessel whose walls are reinforced at appropriate locations with embedded, co-molded reinforcing ribs, longerons, stringers and bulkheads that include strengthened hard points for fasteners; and a fineness ratio of length to diameter of from 2.7:1 to 3.5:1 and wherein said axisymmetric fuselage pod has a maximum diameter of from 125 cm to 180 cm with a nominal interoperable maximum diameter of 160.02 cm;

wherein the axisymmetric fuselage pod is designed to carry at least one autonomous robotic electric payload cart; and an openable, hinged, automatic rear hatch located at a fuselage station that is aft of the nose of the axisymmetric fuselage pod by at least 56% of said pod's total axial length and wherein said hatch thus comprises at most the rearmost 44% portion of the axisymmetric fuselage pod; and wherein said automatic rear hatch automatically opens and closes and latches with solenoid-actuated latching pins and wherein, prior to docking, said rear hatch swings open on a single hinge rearward and upward to open at least 90° in order to allow said SkyQart to perform a docking function; and a standard axisymmetric fuselage pod rear hatch that, when swung open by 90° reveals a hatch opening in the rear portion of the axisymmetric fuselage pod that provides access to said SkyQart's cabin interior and cabin floor, swappable standard battery pack, dock alignment pin receptacle holes, fire suppression module's discharge duct and the DC fast charge port; and wherein the lower forward portion of said fuselage pod rear hatch of any SkyQart is equipped with an exit orifice with a removable cover that, after removal of said cover, has a perimeter flange to which attachment of a detachable exit duct is configured to be made wherein, upon closure of the rear hatch, said exit duct securely anastomoses with and connects such that it is sealed to and in alignment with the aft face of said fire suppression module's discharge duct and thereby is configured to conduct the on-demand discharge of fire-retardant to the external exit orifice on the lower surface of the rear hatch; and wherein said rear hatch is detachable to allow attachment of a cylindrical cargo extension to the rear hatch opening of the axisymmetric fuselage pod and wherein said detachable rear hatch is then reattached to the aft opening of said cargo extension; and wherein said attachment of said cargo extension converts an axisymmetric fuselage pod into a cargo axisymmetric fuselage pod; and wherein said cargo extension in said cargo axisymmetric fuselage pod includes an internal cabin cargo floor whose surface and drawer slides align with and are made functionally contiguous with the cabin floor and drawer slides of the standard axisymmetric fuselage pod and wherein said cargo extension also has its own pair of solenoid-actuated latching pins for pin-latching an autonomous robotic electric payload cart therein.

57. The ultra-quiet, multi-modal, on-demand wildfire suppression system of claim 56, wherein the axisymmetric fuselage pod comprises:

a pair of longitudinally oriented drawer slides, one portside and one on the starboard side and configured underneath said cabin floor to hold a rechargeable and/or swappable standard battery pack;
  wherein said swappable standard battery pack is interchangeable between said SkyQarts;
  wherein said swappable standard battery pack is mounted and securely latched underneath the cabin floor of an axisymmetric fuselage pod of said SkyQart on said pair of extensible drawer slides; and
  wherein the weight of said swappable standard battery pack has a range of between 100 to 200 kg, and has a range of voltage and energy capacity of between 400 and 800 volts, and between 30 kwh and 80 kwh, respectively;

a pair of alignment pin receptacle holes on the aft edge of an axisymmetric fuselage pod's cabin floor, wherein each of said receptacle holes is configured to engage the solenoid-actuated alignment pins that protrude with a matching spacing from either a robotic delivery cart or from an aircraft docking station; and
  a midline streamlined body herein called a monostrut, wherein said monostrut structurally joins an area of the upper surface of said axisymmetric fuselage pod to the undersurface and internal spars of the main wing above said pod.

58. The ultra-quiet, multi-modal, on-demand wildfire suppression system of claim 57, wherein said axisymmetric fuselage pod with monostrut also has a pair of diagonal wing struts that supplement the strength of the monostrut attachment to said wing with one diagonal wing strut on the left side of said axisymmetric fuselage pod and one on the right side of said axisymmetric fuselage pod, wherein each of these diagonal struts has an airfoil shaped cross-section and has its upper end attached to the main wing spar of said main wing and with said diagonal strut's lower end attached with a shear bolt to a reinforced hard point in the structure of the lower sidewall of the axisymmetric fuselage pod; and wherein any SkyQart that is modified with the addition of said left and right diagonal wing struts and with said detachable fire-retardant exit duct and exit orifice on its rear hatch is a fire suppression SkyQart that has fire suppression capability and includes a SkyQart I-F, a SkyQart II-F, a SkyQart III-uF and a SkyQart III-dF.

59. The ultra-quiet, multi-modal, on-demand wildfire suppression system of claim 57, wherein the SkyQarts comprise a SkyQart III has two separate axisymmetric fuselage pods, each of which is attached by a separate monostrut to a single main wing above said pods; and wherein each separate monostrut on said main wing has a structurally attached tailcone extending aft-ward to serve as attachment for the empennage.

60. The ultra-quiet, multi-modal, on-demand wildfire suppression system of claim 59, wherein the SkyQarts include a SkyQart III-u having an upward wingtip angle and a SkyQart III-d having a downward wingtip angle; wherein the a main wing for said SkyQart III-u and said SkyQart III-d comprises:
an aspect ratio from as low as 10:1 and as high as 14:1; and
a wingspan from 14 m to 18 m; and
a wing area from 16 sq m to 21 sq m; and
a forward wing sweep angle of at least 6.2°; and
a gross weight with a range from 1350 kg to 2250 kg; and
a nominal wing loading of at least 76.5 kg/sq m;
wherein the SkyQart III-u has a wingtip angle with an upward tilt of 9.58° dihedral, and the SkyQart III-d has a wingtip angle with a downward tilt of 11.8° anhedral, in order to enable compact docking with overlapping wingtips.

61. The ultra-quiet, multi-modal, on-demand passenger and cargo transportation system of claim 60, wherein the empennage on said SkyQart III comprises:

a twin boom configuration comprising two separate vertical tail surfaces whose respective laminar flow airfoils are structurally attached to an aft portion of its respective tailcone; and wherein a fixed horizontal tail surface has a laminar flow airfoil and has its tips span between and structurally attached at the top of the twin vertical tail surfaces and wherein said horizontal tail surface has a moveable, balanced elevator control surface comprising its trailing edge;

wherein two separate fixed vertical tail surfaces, one port and one starboard, each of which is structurally attached to the rear portion of a port and a starboard tailcone, respectively, and each of which has a moveable, balanced rudder control surface comprising its trailing edge; and wherein all of said surfaces on said empennage of said SkyQart ill are of a size, location, structure and tail volume coefficients sufficient to the aircraft's longitudinal loads, center of gravity range, indicated airspeeds, stability and control requirements, while providing sufficient headroom for passengers and laden EPCs to pass underneath said tailcones and empennage when said SkyQart III is docked at an aircraft docking station at the SkyNest.

62. The ultra-quiet, multi-modal, on-demand wildfire suppression system of claim 57,
wherein the SkyQarts comprise a SkyQart I and a SkyQart II and wherein the main wing is a fixed wing for each of the SkyQart I and SkyQart II, said main wing comprising:
an aspect ratio determined as a wing span squared divided by a wing area, from as low as 8:1 to as high as 14:1; and
the wingspan from as low as 8 m to as high as 14 m; and
the wing area from 10 sq m to 16 sq m; and
a nominal forward wing sweep angle of at least 5°; and
a gross weight within a range from 800 kg to 1250 kg; and
a nominal interoperable wing loading of at least 74.9 kg/sq m.

63. The ultra-quiet, multi-modal, on-demand wildfire suppression system of claim 62, comprising:
wherein the SkyQart I has a wingtip angle having an upward tilt of at least 8.84° dihedral; and
wherein the SkyQart II has a wingtip angle having a downward tilt of at least 11.86° anhedral; and
wherein the SkyQart I is configured for parking next to said SkyQart II with overlapping wingtips for compact parking and docking at said SkyNest.

64. The ultra-quiet, multi-modal, on-demand wildfire suppression system of claim 57, wherein the main wing has a laminar flow airfoil shape; and
wherein the main wing has a main spar, rear spar and trailing edge that provide a structural attachment of a tailcone having an aft end to which is attached the empennage; and
wherein the main wing has a pair of ailerons, one port aileron and one starboard aileron, comprising a movable control surface comprising the trailing edge of an outboard portion of the main wing wherein the movement of said ailerons controls the roll angle of said SkyQart; and
wherein the main wing has a plurality of sealed internal wing bays comprising water-tight hollow spaces that comprise components of a flotation system whereby buoyancy is augmented with said wing bays and with other sealed water-tight hollow spaces inside the axisymmetric fuselage pod, tailcone and empennage.

65. The ultra-quiet, multi-modal, on-demand wildfire suppression system of claim 64, wherein each of said SkyQarts has external upper surfaces that are equipped with high efficiency energy-capturing solar panels or carbon nano-tube rectennas.

66. The ultra-quiet, multi-modal, on-demand wildfire suppression system of claim 64, wherein the SkyQarts comprise a SkyQart I and a SkyQart II, and
wherein the empennage has a fixed horizontal tail surface that is structurally attached at the top of the vertical tail surface, and that has a moveable balanced elevator control surface comprising its trailing edge; and
wherein the empennage has a fixed vertical tail surface whose lower edge is structurally attached to the rear portion of said tailcone and that has a moveable balanced rudder control surface comprising its trailing edge; and
wherein all of said surfaces on said empennage of said SkyQart I and said SkyQart II are of a size, location, structure and tail volume coefficients sufficient to the aircraft's longitudinal loads, center of gravity range, indicated airspeeds, stability and control requirements, while providing sufficient headroom for passengers and laden EPCs to pass underneath said tailcones and empennage when said SkyQarts are docked at an aircraft docking station at the SkyNest.

67. The ultra-quiet, multi-modal, on-demand wildfire suppression system of claim 64, wherein each of the SkyQarts has manual control configured to allow a human pilot to exercise an option to manually control the SkyQart.

68. The ultra-quiet, multi-modal, on-demand wildfire suppression system of claim 64, wherein the each of SkyQarts comprises a main landing gear that is electronically controlled; and
wherein a fast-acting, linear actuating device is configured to position said main landing gear leg with said GRACE; and
wherein an active main landing gear comprises:
a wheel;
a track width that having a range from 220 cm to 300 cm;
a travel of said landing gear leg ranging from 30 cm to 80 cm;
a landing gear wheelbase ranging from 250 cm to 450 cm;
a main landing gear tire diameter ranging from 30.5 cm to 46 cm;
an autonomously controlled wheelmotor and disc brake on each of said main landing gear wheels configured to control with said GRACE,
a steering of the SkyQart's free-swiveling nose wheel by differential wheel thrust or wheel braking;
an acceleration said SkyQart during take-off without tire slip or wheelie;
a deceleration said SkyQart during its landing roll;
a spinning up of the main landing gear tires to match their circumferential tread speed to the landing touch-down speed to minimize tire chirp and noise;
a precise positioning of the SkyQart during parking or docking;
a ground operations without need of propeller thrust;
an anti-skid and anti-lock functions;
a low-noise, high-traction, run-flat tire on all wheels of the landing gear; and
a free-swiveling, retractable nose wheel landing gear in each of its nose landing gear, comprising:
a nose tire diameter from 22 cm to 42 cm; and
a nose landing gear travel from 12 cm to 32 cm; and
wherein each of said main landing gear wheel and tire is enclosed in a wheel fairing that is configured to be positioned for low drag in cruise flight.

69. The ultra-quiet, multi-modal, on-demand wildfire suppression system of claim 68, wherein the SkyQarts include a SkyQart I and a SkyQart II each of whose main wing has two nacelles wherein each nacelle extends forward an equal distance from its wing's leading edge and wherein one nacelle is portside and the other nacelle is on the starboard side of the central axisymmetric fuselage pod; and wherein each nacelle is the same spanwise distance from the midline of the axisymmetric fuselage pod and wherein the forward portion of each nacelle holds an electric propmotor and an ultra-quiet controllable pitch propeller.

70. The ultra-quiet, multi-modal, on-demand wildfire suppression system of claim 68, wherein the SkyQarts include a SkyQart III whose main wing has three nacelles wherein one nacelle extends forward from main wing leading edge at the midline of said SkyQart III and two additional nacelles, which are the outer nacelles, and wherein each outer nacelle extends forward an equal distance from said main wing's leading edge and wherein one outer nacelle is on the portside of the portside axisymmetric fuselage pod and the other outer nacelle is on the starboard side of the starboard side axisymmetric fuselage pod; and wherein each outer nacelle is the same spanwise distance from the midline of its adjacent axisymmetric fuselage pod and wherein the forward portion of each nacelle holds an electric propmotor and an ultra-quiet controllable pitch propeller; and
wherein the SkyQart III has two axisymmetric fuselage pods, one on the portside and one on the starboard side, each of which has its own active main landing gear and retractable free-swiveling nosegear.

71. The ultra-quiet, multi-modal, on-demand wildfire suppression system of claim 68, wherein the SkyQarts include a plurality of SkyQarts I, SkyQarts II and SkyQarts III that are specifically designed to interoperate with said SkyNests, said SkyNest docks and said electric-powered carts and to have a combined performance capabilities comprising:
SkyQarts performance capabilities in zero wind at mean sea level including:
a flight range of at least 193 km with 10-minute reserve; and
a cruise flight airspeed of at least 193 kph at an altitude that is less than or equal to 914.4 m (3000') above mean sea level; and
a take-off distance within 43.9 m (144 feet) of its point of brake release, including a maximum acceleration of from 0.6 to 0.8 g with GRACE at ≤3.4 m/sec$^3$ jerk rate; and
a landing touchdown indicated airspeed of 24 m/sec or less and a landing, deceleration with GRACE at less than 0.7 g to slow to a taxiing speed of 7.6 m/sec in no more than 69.4 m; and
a maximum rate of climb from 6 m/sec to 12 m/sec with a nominal interoperable rate of climb of 9.14 m/sec at an indicated airspeed of between 21.5 to 27 m/sec; and
a glide ratio that is at least 15:1.

72. The ultra-quiet, multi-modal, on-demand wildfire suppression system of claim 71 wherein each of the SkyQart comprises safety enhancing devices comprising: a ballistic recovery system (BRS) parachute for an entire SkyQart; and a closed flotation system, comprising;
a flotation module #1 and a flotation module #2 that nest together inside the rear hatch or tail portion of the axisymmetric fuselage pod; and
a water-tight seal enclosing the largest of the vacant or hollow spaces and wing bays inside the aircraft structures to provide additional flotation in the event of a water ditching; and
an emergency locator transmitter (ELT); and
an airbag-equipped seat belt and shoulder harness for all seats; and
a rescue lift-hooks on airframe hardpoints for helicopter rescue of a SkyQart; and
a peelable window frames as an emergency exit on the sides of said axisymmetric fuselage pod; and
a Faraday cage around a swappable battery pack to limit voltage shock hazard and radio frequency interference; and
an automated check-list and self-diagnostics program including automatic pre-flight self-inspection before every flight; and
a maximum glide ratio of more than 15:1; and
a landing airspeed limited to no more than 24 m/sec; and
an automatic fuel gauging and range protection program; and
an airframe comprising fire-proof materials; and a smoke and carbon monoxide detector in the SkyQart cabin; and an automatic fire extinguisher system in the SkyQart cabin; and a battery management system in all swappable battery packs; and a fire-proof container for all swappable standard battery packs; and a taxiing SkyQart without need of a spinning propeller.

* * * * *